United States Patent [19]
Rivette et al.

[11] Patent Number: 5,809,318
[45] Date of Patent: Sep. 15, 1998

[54] METHOD AND APPARATUS FOR SYNCHRONIZING, DISPLAYING AND MANIPULATING TEXT AND IMAGE DOCUMENTS

[75] Inventors: Kevin G. Rivette, Palo Alto; Michael P. Florio, Atherton; Adam Jackson, Belmont; Don Ahn, Daly City; Irving S. Rappaport, Palo Alto; Deborah Kurata, Pleasanton, all of Calif.

[73] Assignee: Smartpatents, Inc., Menlo Park, Calif.

[21] Appl. No.: 832,971

[22] Filed: Apr. 4, 1997

Related U.S. Application Data

[63] Continuation of Ser. No. 423,676, Apr. 18, 1995, Pat. No. 5,623,679, which is a continuation-in-part of Ser. No. 341,129, Nov. 18, 1994, which is a continuation-in-part of Ser. No. 155,752, Nov. 19, 1993, Pat. No. 5,623,681.

[51] Int. Cl.$^6$ .................................................. G06F 17/00
[52] U.S. Cl. .......................................... 395/773; 395/762
[58] Field of Search .................................... 395/773, 774, 395/776–778, 762

[56] References Cited

U.S. PATENT DOCUMENTS

| | | | |
|---|---|---|---|
| 5,392,428 | 2/1995 | Robins | 395/603 |
| 5,559,942 | 9/1996 | Gough et al. | 395/349 |
| 5,592,607 | 1/1997 | Weber et al. | 395/358 |
| 5,596,700 | 1/1997 | Darnell et al. | 395/340 |
| 5,628,003 | 5/1997 | Fujisawa et al. | 395/615 |

*Primary Examiner*—Joseph R. Burwell
*Attorney, Agent, or Firm*—Sterne, Kessler, Goldstein & Fox P.L.L.C.

[57] ABSTRACT

The system synchronizes, displays, and manipulates text and image documents in electronic form for display. The text and image files are synchronized to produce Equivalent Files using heuristic algorithms to create an approximate equivalence relationship between the text and the image files. The graphic user interface of the present system allows a user to selectively view an Equivalent File in a window while simultaneously viewing an image file within one or ore image windows on the display. The user may also create and manipulate notes and subnotes as annotations to document objects or document portions. The notes and subnotes may be linked to text documents, image documents, text objects, or other non-text objects or documents, such as images, audio clips, etc. The user may create new subnotes associated with selected objects or selected portions, and the user may enter information pertaining to the selected objects in the new subnote. The new subnotes may be created in a particular notes window, or if a note window is not open at the time that the user selects an object or document portion, a new note may be created in response to the selected object. The notes and subnotes may be stored in a note database associated with sets of documents.

42 Claims, 84 Drawing Sheets

United States Patents [19]

Krauskopf

[54] MICROPROCESSOR BREAKPOINT
APPARATUS

[75] Inventor: Joseph C. Krauskopf, Santa Clar
Calif.

[73] Assignee: Intel Corporation, Santa Clara,

[*] Notice: The portion of the term of thi

FIG.4

```
PATN
WKU   051650274
SRC   7
APN   7036760
APT   1
ART   237
APD   19910520
TTL   Microprocessor breakpoint apparatus
ISD   19921117
NCL   16
ECL   1
EXA   Tung; Kee M.
EXP   Shaw; Dale M.
NDR   3
NFG   5
DCD   20060822
. . .
BSUM
PAC   BACKGROUND OF THE INVENTION
PAR   1. Field of the Invention
PAR   The invention relates to the field of hardware implemented breakpoints for
      computer programs, primarily used for analyzing or "debugging" programs.
PAR   2. Prior Art
PAR   Numerous techniques are used to analyze the performance of computer
      programs, particularly during their development. This is often referred to
      as "debugging". The debugging process is recognized as a significant part
      of the development of a computer program, and in some cases, the time
      required for debugging exceeds that required to write the program.
```

FIG.5

PAR Numerous techniques are used to analyze the performance of computer programs, particularly during their development. This is often referred to as "debugging". The debugging process is recognized as a significant part of the development of a computer program, and in some cases, the time required for debugging exceeds that required to write the program.

FIG.6

Numerous techniques are used to analyze the performance of computer programs, particularly during their development. This is often referred to as "debugging". The debugging process is recognized as a significant part of the development of a computer program, and in some cases, the time required for debugging exceeds that required to write the program.

MICROPROCESSOR BREAKPOINT APPARATUS

This application is a continuation of application ser. No. 07/593,399 filed Oct 3, 1990, now U.S. Pat. No. 5,053,944, which was a continuation of application Ser. No. 07/370,024 filed Jun. 22, 1989 now abandoned, which was a continuation of application Ser. No. 07/274,636 filed Nov. 15, 1988, now U.S. Pat. No. 4,860,195, which was a continuation of application Ser. No. 06/822,263 filed Jan. 24, 1986, now abandoned.

BACKGROUND OF THE INVENTION

1. Field of the Invention

The invention relates to the field of hardware implemented breakpoints for computer programs, primarily used for analyzing or "debugging" programs.

2. Prior Art

Numerous techniques are used to analyze the performance of computer programs, particularly during their development. This is often referred to as "debugging". The debugging process is recognized as a significant part of the development of a computer program, and in some cases, the time required for debugging exceeds that required to write the program.

data, a virtual address bus, address translation means for converting the virtual address on the bus to a physical address, interpretation means for interpreting the program instructions, and arithmetic means for operating upon the data in accordance with the interpreted instructions. The apparatus includes a first register for storing a predetermined address in the form of a virtual address at which a breakpoint is to occur. A second register is used for storing control bits which permit the user to select certain conditions of the breakpoint such as whether the breakpoint is to occur at a reference to computer program or data. A comparator means compares the predetermined virtual address with the address generated by the computer (current virtual address). A first logic means determines if the current virtual address is a reference to program instructions or data by examining address control signals. This logic means is also controlled by the control bits stored in the second register. Gating means used to provide the breakpoint signal and interrupt the operation of the computer is coupled to the output of the comparator means and the first logic means. The entire apparatus is formed on the same substrate with the microprocessor. The apparatus also includes second logic means to determine if the current virtual address

PATENTWORKS WORKBENCH—DEMONSTRATION

CASE  EDIT  PATENT  NOTE  LIBRARY  VIEW  WINDOW  HELP

DEMONSTRATION   4,760,478   4,760,478   455   4,760,478

4,760,478 COLUMN: 3 OF 6        4,760,478 (IMAGE)        BRIEF DESCRIPTION   HIT 0 OF 0

— 420        410        — 162

3        4,760,478

FIG. 7 is a graph of vibration amplitude versus fre-
quency for the magnetic head suspension of FIG. 6
when modified in accordance with the embodiment
of the present invention shown in FIG.2;
  FIG. 8 is a bottom plan view of an alternate embodi- 5
ment of a magnetic head suspension embodying the
present invention;
  FIG.9 is a longitudinal section view taken along lines
9—9 of FIG. 8;
  FIG.10 is a section view taken along lines 10-10 of 10
FIG.8;
  FIG. 11 is a section view taken along lines 11—11 of
FIG. 8;
  FIG. 12 is a top plan view of a further embodiment
of magnetic head suspension embodying the present
invention;
  FIG. 13 is a longitudinal section view taken along 15
lines 13—13 of FIG. 12;
  FIG. 14 is a section view taken along lines 14—14 of
FIG.12;
  FIG. 15 is a graph of vibration amplitude vs.
frequency for the magnetic head suspension;       160     20 surface, resonant freq
components of the as
tions at one or more
to vary significantly t
thereby degrading the
representation of the
ent frequencies for a
Fig. 6.
  In accordance with t
element is positioned
pered elongated flat s
constraining member
contact with the expo
This structure signifi
shear energy absorpti
ment. The structure i
mode vibrations (alo
vibration, and bendin
  In the specific embo
damping element 34
of the tapered elonga
the side of section 30

FIG. 7 is a graph of vibration amplitude versus fre-
quency for the magnetic head suspension of FIG. 6
when modified in accordance with the embodiment
of the present invention shown in FIG.2;
  FIG. 8 is a bottom plan view of an alternate embodi- 5
ment of a magnetic head suspension embodying the
present invention;
  FIG.9 is a longitudinal section view taken along lines
9—9 of FIG. 8;
  FIG.10 is a section view taken along lines 10-10 of 10
FIG.8;
  FIG. 11 is a section view taken along lines 11—11 of
FIG. 8;
  FIG. 12 is a top plan view of a further embodiment
of magnetic head suspension embodying the present
invention;
  FIG. 13 is a longitudinal section view taken along
lines 13—13 of FIG. 12;
  FIG. 14 is a section view taken along lines 14—14 of 15
FIG.12;
  FIG. 15 is a graph of vibration amplitude vs.
frequency for the magnetic head suspension;          20
  FIG. 16 is a graph of vibration amplitude vs.
frequency for the magnetic head suspension of FIG.
15 is modified in accordance with the embodiment of 25
the present invention shown in FIG. 12;
  FIG. 17 is a section view of another embodiment of

FIG.32

PATENTWORKS WORKBENCH-LITIGATION

CASE  EDIT  LIBRARY  VIEW  WINDOW  HELP

LITIGATION   5,165,027

5,165,027 COLUMN: B1

United States Patent [19]    [11] Patent Number    5,165,027
Krauskopf                 [45] Date of Patent: *Nov. 17, 1992

[54] MICROPROCESSOR BREAKPOINT APPARATUS

[75] Inventor: Joseph C. Krauskopf, Santa Clara, Calif.

[73] Assignee: Intel Corporation, Santa Clara, Calif.

[*] Notice: The portion of the term of this patent subsequent to Aug. 22, 2006 has been disclaimed.

160

[21] Appl. No.: 703,676

[22] Filed: May 20, 1991

Related U.S. Application Data

[63] Continuation of Ser. No. 593,399, Oct. 3, 1990, Pat. No. 5,053,944, which is a continuation of Ser. No. 370,024, Jun. 22, 1989, abandoned, which is a continuation of Ser. No. 274,636, Nov. 15, 1988, Pat. No. 4,860,195, which is a continuation of Ser. No. 822,263, Jan. 24, 1986, abandoned.

[51] Int. Cl. .................... G06F 12/00

5,165,027 — 165
BIBLIOGRAPHY — 162
BIBLIOGRAPHY
ABSTRACT
BACKGROUND OF THE
BRIEF DESCRIPTION OF
DETAILED DESCRIPTION
CLAIMS
— 170

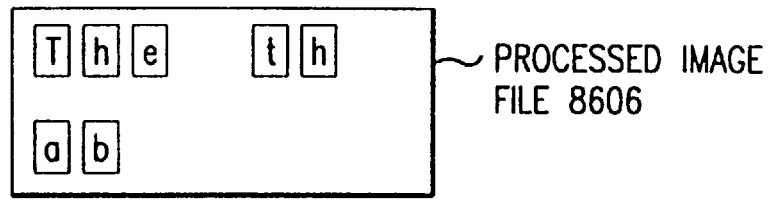
PROCESSED IMAGE FILE 8606
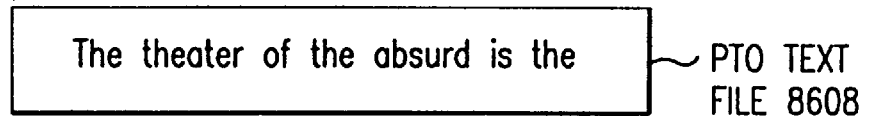
PTO TEXT FILE 8608
LOOK-UP TABLE 8610
| Th | 1 |
|----|---|
| he | 2,5,14,25 |
| th | 4,13,24 |
| ea | 6 |
| at | 7 |
| te | 8 |
| er | 9 |
| of | 11 |
| ab | 16 |
| bs | 17 |
| su | 18 |
| ur | 19 |
| rd | 20 |
| is | 22 |
ANCHOR PAIR TABLE 8612
| Th | 1 |
|----|---|
| he | 2,5,14,25 |
| th | 4,13,24 |
| ab | 16 |
FIG.86

| PATENT(S) | BEGIN LOCATION(S) | END LOCATION(S) | PEN COLOR(S) | SUBNOTE TEXT |
|---|---|---|---|---|
|  |  |  |  |  |
|  |  |  |  |  |
|  |  |  |  |  |
|  |  |  |  |  |

FIG.88

METHOD AND APPARATUS FOR SYNCHRONIZING, DISPLAYING AND MANIPULATING TEXT AND IMAGE DOCUMENTS

This application is a continuation of application Ser. No. 08/423,676, filed Apr. 18, 1995, now U.S. Pat. No. 5,623,679, which is a Continuation-In-Part of application Ser. No. 08/341,129 filed Nov. 18, 1994, which is a Continuation-In-Part application of Ser. No. 08/155,752 filed Nov. 19, 1993, now U.S. Pat. No. 5,623,681.

BACKGROUND OF THE INVENTION

1. Field of the Invention

The present invention relates to the fields of publishing, document editing and manipulation, and displaying documents and images. More particularly, the present invention relates to paginating, extracting, synchronizing, and displaying, a document in electronic form.

2. Art Background

As the development of multimedia computer display systems continues to advance, more computing power and features are available to computer users. For example, information which has historically been limited to published paper documents is now being made available through on-line computing services from publishers and information vendors. As an increasing market share of the data and computing capacity is provided through low cost high performance personal computers, some of the on-line information is also being made available in compact disks (CD) and magnetic media formats. Compact disk and magnetic media technology offer cost effective mass storage of documents, images and other data, in a format readily accessible for use with personal computers in a home or office environment. The combination of personal computers, compact disk technology and multimedia interactive graphic user interfaces, permits the access and display of textual and graphic information by personal computer (PC) users in a manner not previously known in the industry. The type of information potentially available to a PC user includes professional and technical publications, newspapers, magazines, and other scientific and literary data and images.

However, much of the information which is published through, for example, government sources, newspapers and magazines is not in machine readable form, but rather is printed on paper. Because of the amount of work and effort required to convert the printed information into a machine readable form, only a small portion of the total published information is currently available for use by PC users using magnetic disks, CDs and the like. In addition, the information which is in machine readable form is typically available either as an image of the original document or as a stream of text data. An image of a document has the advantage of presenting the information in its original format as published, including non-text material, such as drawings, equations, symbols, diagrams, etc. The viewer is familiar with the format, and the information is easily recognized and understood. However, since a document image is often stored as a bitmap, the content of the document cannot be easily searched or manipulated. Alteratively, a text data stream format has the advantage of presenting the information in a manipulable and searchable format. Unfortunately, in many cases, the format of presentation is not the format in which the information was originally published in print. Thus, the users are often unfamiliar with the format, inhibiting easy navigation of the document making information difficult to find and use.

One example of the problem of reproducing originally published documents stored in machine readable form, is the storage and display of United States patent documents by the United States Government. The United States Patent Office (herein referred to as the "PTO") provides magnetic tapes of issued U.S. patents and other documents, in the form of a scanned in image, and as a separate stream of text data. The magnetic tape storing the text data does not include graphical illustrations such as drawings, charts, textual tables, or much in the way of formatting data. Thus, the reproduction of a United States patent from PTO Text Files stored on magnetic tape does not result in the display of a U.S. patent as originally published by the U.S. Government. An example of a well known system for displaying text files provided by the PTO is that of the LexPat® system provided by Mead Data offered in conjunction with the Lexis® display system. Using the LexPat® system, the display of a U.S. patent on a terminal, such as a PC, results in a display of text only, and does not include drawings, charts, graphs, or original formatting information. The text of a selected patent appears in ASCII format, but does not appear as the original patent issued by the PTO, and may not be referenced by the original column and line numbers from the published patent. Other systems display text files of periodicals such as the Wall Street Journal or legal documents such as contracts. However, the text files do not appear as the original documents.

The U.S. Patent Office also provides magnetic tapes with image files comprising a scanned in image of the original U.S. patent issued by the PTO and published by the U.S. Government. The image files provided on magnetic tape by the PTO simply represent a bitmap image of the original published patent. As a scanned in image, the entire patent is provided including drawings, charts, graphs, text and the original format, since it represents a simple bitmap of the scanned original document. However, a scanned document may not be easily searched, edited, navigated or otherwise manipulated as can a text file.

As will be described, the present invention provides a method and apparatus for extracting, synchronizing, displaying, navigating and manipulating text and image documents simultaneously in electronic form. The present invention is described with particular reference for use with U.S. patent documents, and includes the process of extracting patent text and image data from magnetic tapes provided by the PTO, synchronizing the text and image data for recovering the original format (i.e., columns and lines) of the original published patent, and displaying the formatted text along with images using a unique graphical user interface (GUI) workbench. Although the present invention is described with reference to patent documents, it will be appreciated that the invention has application to a variety of different types of documents and applications.

The present invention's graphical user interface permits a user to selectively view ASCII text documents as well as bitmapped scanned images simultaneously on a display. When used in conjunction with U.S. patent documents, the graphic user interface of the present invention allows a user, such as a patent attorney, to display and manipulate both textual as well as graphic portions of patents. The text of a patent may be viewed on the display as it was originally published by the PTO, including column and line numbers. Simultaneously, the user may view the figures of a patent in the form of an image comprising a bitmap. Various functions are provided by the present invention for viewing, manipulating and displaying the patent documents. In order to assist the reader in understanding of graphic user interface (GUI)

technology, it is suggested that certain references be considered for background. Many user interfaces utilize metaphors in the design of the interface as a way of maximizing human familiarity, and conveying information between the user and the computer. As for the use of familiar metaphors, such as desktops, notebooks, spread sheets, and the like, the interface takes advantage of existing human mental structures to permit a user to draw upon the metaphor analogy to understand the requirements of the particular computer system. (See for example, Patrick Chan "*Learning Considerations in User Interface Design: The Room Model*", Report CS-84-16, University of Waterloo, Computer Science Department, Ontario, Canada, July, 1984 and the references cited therein.) In addition, the reader is referred to the following references which describe various aspects, methods and apparatus associated with prior art graphic user interface design: U.S. Pat. No. Re.32,632; U.S. Pat. No. 4,931,783; U.S. Pat. No. 5,072,412; and U.S. Pat. No. 5,148,154, and the references cited therein.

As will be described more fully below, the present invention's graphic user interface is based on a desktop "windows" metaphor, and provides the user with the ability to simultaneously display text and image documents in both a synchronized and unsynchronized fashion, as will be more fully described herein.

SUMMARY OF THE INVENTION

The present invention provides a method and apparatus for extracting, synchronizing, displaying, and manipulating text and image documents in machine readable form for display. In the preferred embodiment of the present invention, text and image files for documents, such as for example patent documents, are initially stored on separate magnetic tape media. These data files are extracted from the respective tapes and placed onto a faster medium, such as a hard disk drive. Catalogs are generated of the contents of the tapes and procedures are provided for locating and loading tapes from a tape inventory. The text and image files are synchronized to produce Equivalent Files using heuristic algorithms to create an approximate equivalence relationship between the text and the image files. In the presently preferred embodiment, the automatic pagination of the text and image files provides an equivalence relationship, and a final Equivalent File is obtained through human intervention to correct any inaccuracies still remaining after the automatic process has been completed. However, the present invention also contemplates an entirely automatic pagination process which would require no human intervention to obtain a usable Equivalent File. A word based inverted tree index is created for the text files to allow for very fast text searching using a graphic user interface (GUI) workbench.

The Equivalent Files and image files residing on, for example, a hard disk drive or compact disk (CD), are coupled as a resource to a computer display system. The computer display system includes a computer having a central processing unit (CPU) coupled to memory and input/output (I/O) circuitry. The computer is also coupled to a CD ROM, hard disk drive, or other mass memory device onto which the Equivalent File and image file have been stored. The computer is coupled to a display, such as a cathode ray tube (CRT) or liquid crystal display, as well as a keyboard and a cursor control device. The graphic user interface of the present invention is displayed by the computer on the CRT, and includes a menu bar and a tool bar, each bar having a plurality of command options for selection by a user. The graphical user interface of the present invention permits the user to display, manipulate, and navigate the Equivalent File created using the process of the present invention, and to simultaneously view the image file on the display. In accordance with the teachings of the present invention, the Equivalent File may be synchronized with the image file, or alteratively, an Equivalent File may be displayed along with a completely separate and distinct image (for example, viewing the Equivalent File of one patent while viewing the image file of another patent). Once created, and as shown on the display, the Equivalent File is displayed in substantially the same column and line format as a printed patent published by the U.S. Government.

Using the graphic user interface of the present invention, a user may create libraries of patent text Equivalent Files and image files, as well as open cases to include a plurality of different patents or other documents. The Equivalent File may be selectively viewed on the display in an equivalent window. The Equivalent File may be navigated, highlighted, searched, and otherwise annotated using highlights, patent and case notes. Simultaneous with the viewing of the Equivalent File of a patent within the equivalent window, the user may view the exact portion of the image file corresponding to the display of the Equivalent File, or any portion of an image file within one or more image windows on the display. The present invention further provides search mechanisms for defining and searching key words chosen by the user or selected from the Equivalent File, or a word list. Boolean and proximity searches may also be performed on the Equivalent File and the results displayed. The search terms may be used to search documents within the equivalent window of a current Equivalent File, current library of documents, documents notes (referred to herein as "patent notes" and/or "case notes"), as well as other selected cases. The word list includes an alphabetical list of all words within the selected library, document or the like. The present invention also permits the user to display an image, for example a patent drawing image, within the image window by placing a cursor in the text of a patent Equivalent File and signaling the computer. In response to this signal, the computer displays the last referenced figure drawing within the image window. The interface of the present invention also permits the user to select portions of text and/or drawings within the image window, and enlarge or reduce the selected image for viewing by the user. The interface further permits the user to select any element number appearing on the patent drawings in the image window. The selection of an element number in a patent drawing results in the automatic highlighting of the first and every subsequent occurrence of that element number in the Equivalent File comprising a specification and claims of the selected patent equivalent displayed in the equivalent window. Additionally, multiple patents, drawings and/or other documents may be viewed simultaneously on the display in accordance with the teachings of the graphic user interface comprising the present invention. A variety of other features and functions are provided by the present invention for the manipulation, navigation and display of patent documents on the user interface. The user may display either a synchronized Image File wherein the image displayed is synchronized with the Equivalent file displayed, or an unsynchronized Image File wherein the image displayed is at some page other than the one containing the column of text in the Equivalent File. A user may also copy and paste a portion of, or the whole, Equivalent File to notes of third party programs, such as word processors or drawing programs as well as allowing the user to import ASCII text into the notes from third party systems, such as deposition testimony in ASCII format into patent notes that relate to the topic of the testimony. Particularly when using the present invention with patents, it may be used to facilitate patent searching in the preparation and prosecution of patents, licensing of patents, litigation of patents, conducting infringement and validity studies of patents, producing infringement claim charts, managing and valuing a portfolio or group of patents, conducting 35 U.S.C. § 112 searches on patents or pending applications, and many other uses which are regularly performed by a patent attorney, patent agent or technical personnel.

NOTATION AND NOMENCLATURE

In some of the detailed descriptions which follow, the present invention is presented partly in terms of interface display images, process steps, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities may take the form of electrical or magnetic signals capable of being stored, transferred, combined, compared, displayed and otherwise manipulated. It proves convenient at times, principally for reasons of common usage, to refer to these signals as bits, values, elements, symbols, characters, images, terms, numbers, or the like. It should be borne in mind, however, that all of these similar terms are to be associated with the appropriate physical quantities and are merely convenient labels applied to these quantities.

In the present invention, the operations referred to are machine operations performed in conjunction with a human operator. Useful machines for performing the operations of the present invention include general purpose digital computers, digitally controlled displays or other similar devices. In all cases, the reader is advised to keep in mind the distinction between the method of operating a computer and/or display system, and the method of computation itself. The present invention relates to methods for operating a computer and interactive display system, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method steps presented herein are not inherently related to any particular computer or other apparatus. Various general purpose machines may be used with programs in accordance with the teachings herein, or it may prove more convenient to construct specialized apparatus to perform the required method steps. As such, no particular programming language is provided, as any one of a variety of languages may be utilized to implement the invention. The required structure for a variety of these machines and programming environments will be apparent from the description given below.

BRIEF DESCRIPTION OF THE DRAWINGS

FIG. 4 illustrates an enlarged portion of an image file comprising the bibliography page of U.S. Pat. No. 5,165,027.

FIG. 5 illustrates a sample portion of a PTO Text File for U.S. Pat. No. 5,165,027 illustrated in FIG. 4.

FIG. 6 illustrates an example of the column information listed in the PTO Text File for the U.S. Pat. No. 5,165,027 illustrated in FIGS. 4 and 5.

FIG. 7 illustrates the paragraph shown in FIG. 6 as it is stored in the PTO Image File for U.S. Pat. No. 5,165,027.

FIG. 8 illustrates the column line number information provided by a published United States patent.

FIG. 30 illustrates the present invention's simultaneous display of an equivalent window and an image window, as well as the display of a Patent Image Toolbox for operating upon images displayed within the image window.

FIG. 31 illustrates the present invention's simultaneous and synchronized display of an Equivalent File in an equivalent window and enlarged image displayed in an image window on the display screen.

FIG. 32 illustrates the display of patent section headings and the ability of a user to navigate the patent sections displayed within the equivalent window through the selection of section headings.

FIG. 34 illustrates the present invention's use of an outline box to identify an area of the patent image to be enlarged.

FIG. 45 illustrates the Update Case dialog box which is displayed upon the activation of the Update Case sub-command item illustrated in FIG. 41.

FIG. 58 illustrates the user interface of the present invention in which two equivalent windows are displayed side by side on the display screen after selection of Screen Layout of the Screen Layout dialog box.

FIG. 59 illustrates the graphic user interface of the present invention in which two equivalent windows and two image windows are displayed on the display screen subsequent to the selection of Screen Layout of the Screen Layout dialog box.

FIG. 62 illustrates a patent note of the present invention.

FIG. 63 illustrates the present invention's use of multi-notes wherein multiple patent notes may be created within a single patent note.

FIG. 72 illustrates the patent notes in Case dialog box which is displayed upon the selection of the View Patent Note sub-command item illustrated in FIG. 70.

FIG. 86 is used to illustrate the preferred manner in which the present invention performs character stream matching.

FIGS. 87 and 88 illustrate note databases according to first and second embodiments, respectively, of the present invention.

DETAILED DESCRIPTION OF THE INVENTION

In the following description, numerous specific details are set forth such as functional blocks, representative data processing devices, window configurations, specific patent documents, text and drawings, etc., to provide a thorough understanding of the present invention. However, it will be apparent to one skilled in the art that the present invention may be practiced without these specific details. In other instances, well known circuits and structures are not described in detail in order not to obscure the present invention unnecessarily.

The present invention will be described in various sections including a discussion of the general system configuration, the tape extraction process, the pagination process, the indexing process, and the graphic user interface. It is to be understood that although the following description is directed to U.S. patent documents, the present invention is not limited to patents, and has application to a variety of documents and images, as may be required by a particular application, such as for example, legal contracts, the Wall Street Journal, The Los Angeles Times, etc.

GENERAL OVERVIEW OF THE INVENTION

The general system configuration of the present invention discloses one possible implementation of the present invention for the display, navigation, manipulation and editing of text and image data in a graphical user interface. As will be described, the general system configuration describes a computer display system which may be in the form of a personal computer, workstation, or dedicated processor system to permit the user to utilize the teachings of the present invention. No particular computer hardware is described within this specification, and the general system configuration description is intended to encompass a broad range of possible data processing systems in which the present invention may be implemented.

Figure 1:
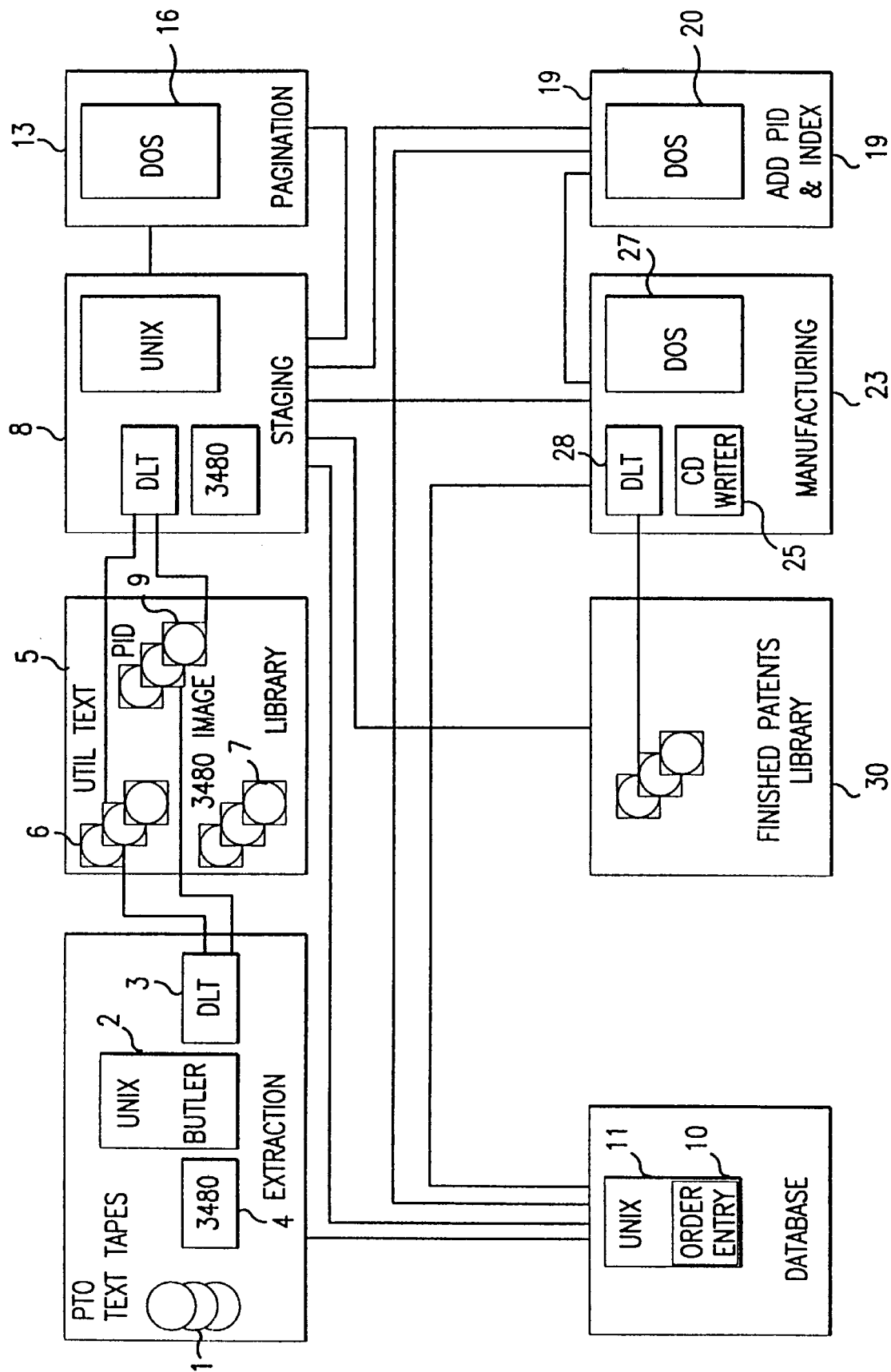
FIG. 1 is a block diagram of production configuration to extract text and image files, paginate the text files with the image files to produce Equivalent Files, and index the Equivalent Files.
Figure 2:
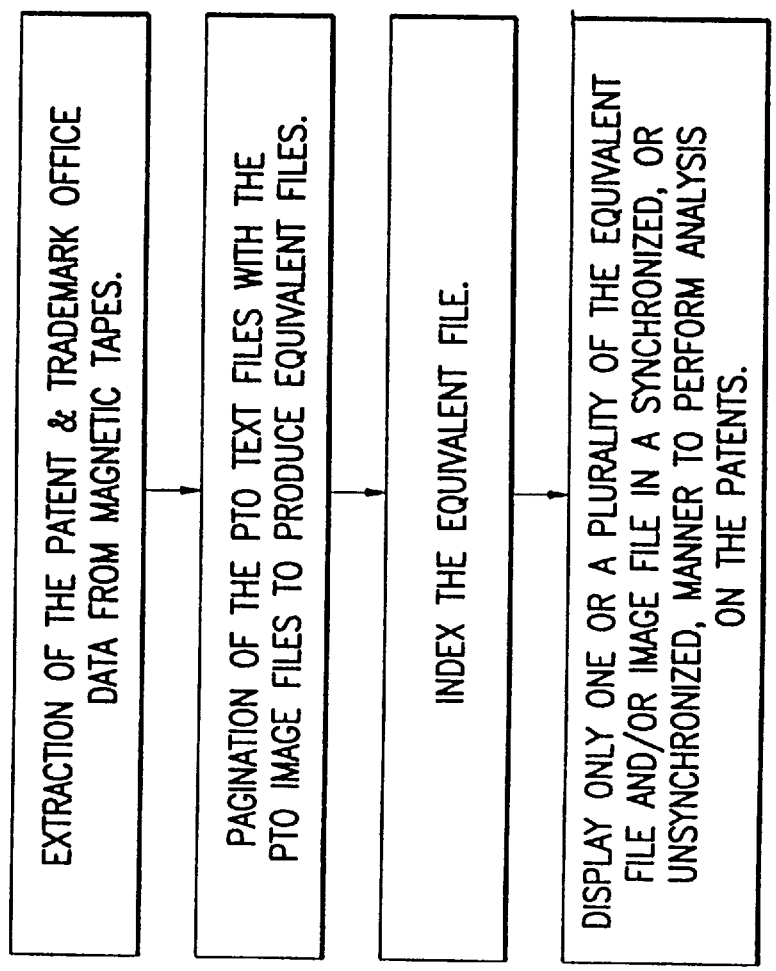
FIG. 2 is a flow chart illustrating the sequence of steps utilized by the present invention to extract text and image files, paginate the text files with the image files to produce Equivalent Files, index the Equivalent Files and display the Equivalent Files and/or Image Files on a display.

A general overview of the system of the present invention is shown in FIG. 1, and a flow chart of the primary process steps comprising the method of the present invention is illustrated in FIG. 2.

The tape extraction process of the present invention extracts data files from PTO text and PTO Image File magnetic tapes provided by the PTO. The data files are extracted from these tapes onto a faster medium (such as a hard disk drive) to provide access times which are useful in modem data processing systems. As will be described, the process of extraction involves appropriately generating catalogues and inventories of the contents of the tapes, as well as procedures for selecting and loading tapes from the newly created tape inventories.

The process of paginating the PTO Text Files and the PTO Image Files to produce "Equivalent Files" is performed by using a heuristic set of algorithms to automatically create an approximate equivalent relationship between the text and image files. A human operator verifies the results to finalize the Equivalent File, such that the original formatting of the published patent document is reflected in the Equivalent File.

As will be described, a process for creating an inverted tree index for the text contained in the PTO Text Files is disclosed. This indexing process results in a pre-built index for very fast text searching when using the graphic user interface of the present invention. Although the present invention describes an inverted tape index, other types of text searching methods may be employed, instead of the inverted tape index.

The graphic user interface ("GUI") of the present invention displays the Equivalent File and the PTO Image File, and allows the user to perform analysis on the displayed files or other stored files. The Equivalent File is formatted and displayed with a similar appearance to the PTO Image File, having the same column and line formatting as the published patent. The user may then, for example, use the GUI to perform text searches to generate accurate column and line citations, navigate the Equivalent File via section headings to locate desired sections of text, as well as to view the figures or text images in the displayed files or other stored files. Images and equivalent patent text may be viewed either in a synchronized or unsynchronized fashion using the teachings of the present invention.

GENERAL SYSTEM CONFIGURATION

FIG. 1 illustrates a block diagram of the present invention's production configuration to extract text and image files, to paginate the text files to produce Equivalent Files, and to index the Equivalent Files. The process begins with the PTO magnetic tapes 1 that are of type 3480 from the PTO. There are three different categories of PTO magnetic tapes: PTO text tapes, PTO image tapes and PTO assignment tapes. A UNIX machine 2 reads the data in the PTO tapes 1 into a large file buffer. The data is then parsed to find each of the documents that are on the tapes. Parsing creates a table which contains patent numbers, the physical locations of the patent files on the tapes, the total number of bytes and other control information about each document that appears on the tape. A document can be either a patent, a certificate of correction, a reissued patent disclaimer or any other post-issuance document. The data can then be either stored in a digital linear tape (DLT) 3 or in any other suitable data storage medium. Because the amount of disk storage space required for the total active set of patents is greater than 1 terabyte (TB), currently the data is stored into libraries S. The libraries may contain PTO Text Files 6, PTO Image Files 7 and post issuance documents 9. If a disk drive system with a large enough storage is available, the data can be stored in a disk drive. At present, the PTO image tapes are left in their original medium, namely the 3480 magnetic tapes.

Continuing to refer to FIG. 1, when an order 10 requesting a list of patents is entered into a UNIX database 11, the UNIX database 11 sorts the request list by patent location to minimize the number of different tapes that need to be mounted, and sends to the staging machine 8 the list of patents and other pertinent information such as the volume serial number of the tapes, and location information that allows the staging machine 8 to fast forward to the individual patent files that are requested. The staging machine 8 creates a file on its disks of all the text and image portions of each patent that has been requested to process. When the staging machine 8 has the text and image files available, it sends the text and image files to the pagination machine 13.

Further referring to FIG. 1, at present, the pagination machine 13 utilizes one or more DOS based machines 16 to paginate the text and image files and to create Equivalent Files as described more fully in the Terminology and Definition section in this Specification. After pagination, an index machine 19 adds post issuance documents 9 and indexes the Equivalent Files. The index machine 19 incorporates one or more DOS based machines 20. Next, the manufacturing machine 23 creates a CD ROM image of the Equivalent Files and the Image Files and writes the image to a CD ROM and digital linear tapes 28. The manufacturing machine 23 may utilize one or more DOS based machines 27, a CD ROM writer 25 and digital linear tapes 28. The CD ROM with the Equivalent Files and the Image Files are delivered to a user who then uses a system, such as the one illustrated in FIG. 3, to display and manipulate the files. The digital linear tapes with the finished patents are stored in a library 30, and the database 11 is updated so that when a particular patent in the library 30 is requested, the staging machine 8 mounts the finished patent from the library 30, and the database flags that the patent has already been paginated and indexed, so that pagination and indexing steps can be skipped for a faster process. Although in the present invention, specific machines such as UNIX machines and DOS machines are disclosed, these are mere examples of different types of computer systems that can be incorporated and not limitations upon the present invention.

As evident from the above description, the present invention involves a significant amount of transfer of data between machines, such as between the extraction machine, the libraries 5, the staging machine 8, and the pagination machine 13 (in practice, these machines may be implemented using a single computer platform, or multiple computer platforms). The manner in which such data transfer takes place according to a preferred embodiment of the present invention shall now be described with reference to FIGS. 73 and 74.

Figure 73:
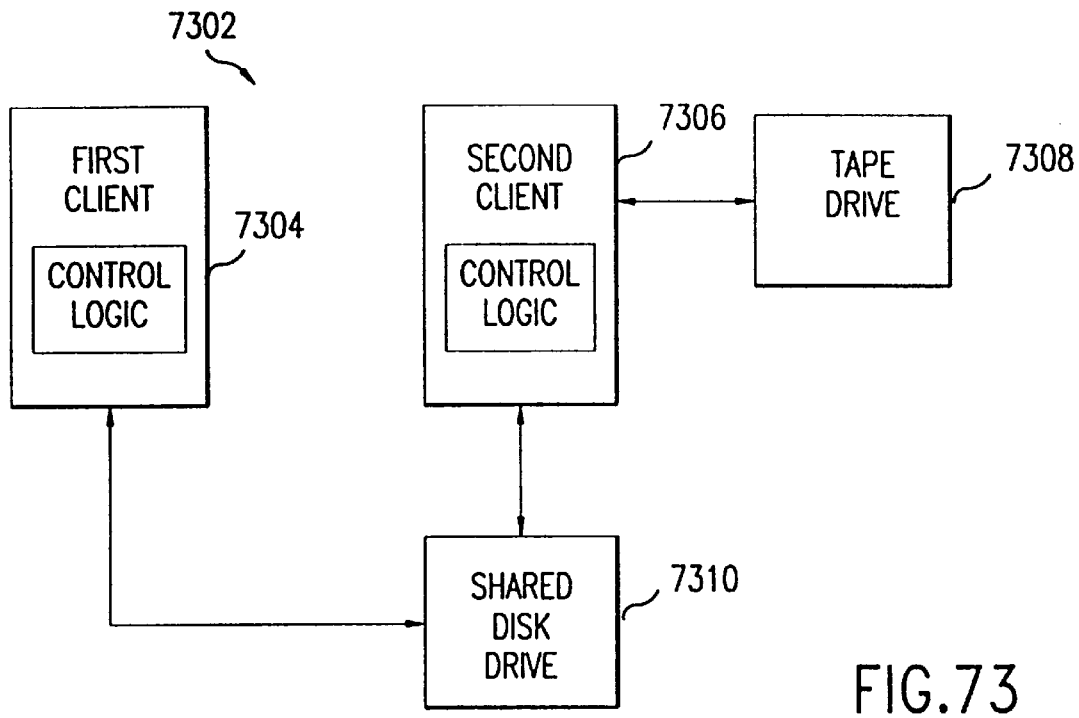
FIG. 73 is a simplified block diagram of a computer system according to a preferred embodiment of the present invention.

FIG. 73 is a simplified representation (in block diagram form) of the system configuration shown in FIG. 1. FIG. 73 shows a computer system 7302 that includes a first client machine 7304, a second client machine 7306, a shared disk drive 7310, and a tape drive 7308. The shared disk drive 7310 is preferably part of the second client machine 7306, and the second client machine 7306 is preferably a UNIX-based machine. Preferably, the shared disk drive 7310 can be directly accessed by both the second client 7306 and the first client 7304.

As will be appreciated, in UNIX-based systems, file rename operations are atomic operations. Thus, the shared disk drive 7310 cannot perform any other file-related operations when it is performing a file rename operation (this is the case, since the shared disk drive 7310 is part of the UNIX-based second client machine 7306).

There are instances when the first client 7304 will want to access data in the tape drive 7308 via the second client 7306. Consider the case where the first client 7304 represents the pagination machine 13, the second client 7306 represents the staging machine 8, and the tape drive 7308 represents the library 5. Often, the pagination machine 13 will want to access data in the library 5. To do so, the pagination machine 13 will have to interact with the staging machine 8. Preferably, such interaction between the pagination machine 13 and the staging machine 8 is achieved by using the shared disk drive 7310. In particular, the pagination machine 13 (i.e., the first client 7304) writes a "read" command on the shared disk drive 7310. The staging machine 8 (the second client 7306) retrieves the "read" command from the shared disk drive 7310 and then performs the "read" command, wherein such performance of the "read" command results in data being read from the library 5 (tape drive 7308) and transferred to the pagination machine 13. Other data transfer scenarios in the system configuration shown in FIG. 1 will be apparent to persons skilled in the relevant art.

As will be appreciated, handshaking must be implemented between the first client 7304 and the second client 7306 to ensure that the second client 7306 does not read the "read" command from the shared disk drive 7310 before the first client 7304 has finished writing the "read" command to the shared disk drive 7310. Otherwise, improper operation will result.

Figure 74:
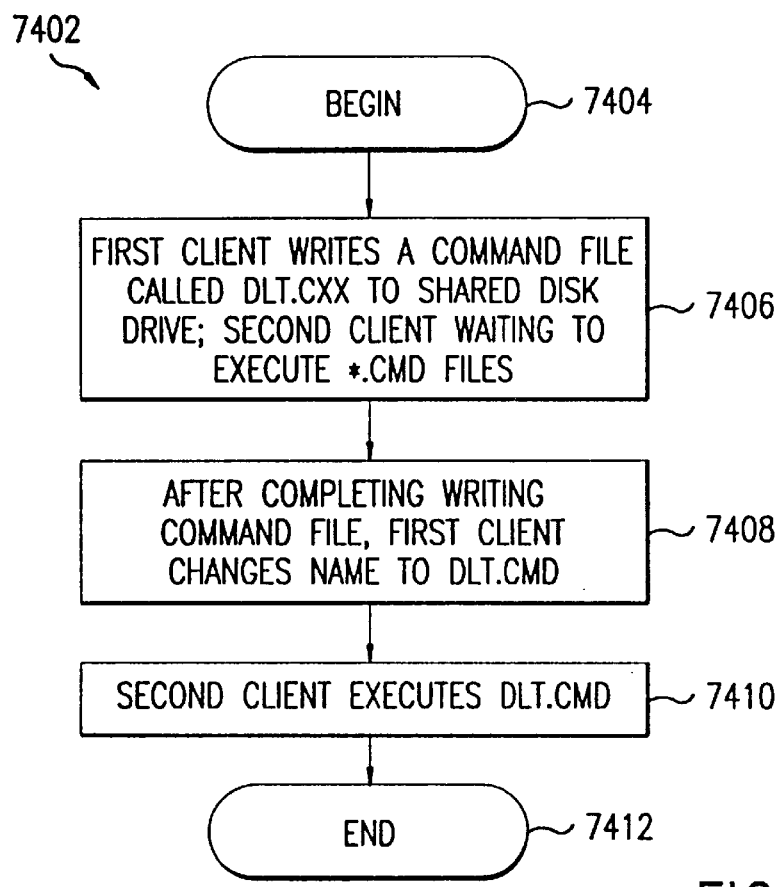
FIG. 74 is a flowchart depicting the preferred manner in which data transfer operations occur between machines in the computer system of FIG. 73.

FIG. 74 is a flowchart 7402 representing the operation of the first client 7304 and the second client 7306 during data transfer operations. Such operation of the present invention achieves handshaking during data transfer operations without requiring any explicit communication between the first and second clients 7304, 7306. This helps in reducing the load on system resources (such as communication bandwidth), thereby optimizing system performance. Flowchart 7402 begins with step 7404, where control immediately passes to step 7406.

In step 7406, the first client 7304 begins writing a read command file (which contains commands that instructs the second client 7306 to read data from the tape drive 7308) to the shared disk drive 7310. The read command file is named "DLT.CXX". The second client 7306 periodically scans through the shared disk drive 7310 and retrieves and executes files with a ".CMD" extension.

Step 7408 is performed after the first client 7304 has completely written the file "DLT.CXX" to the shared disk drive 7310. In step 7408, the first client 7304 changes the name of the "DLT.CXX" file to "DLT.CMD". As discussed above, file rename operations are atomic operations. Thus, the second client 7306 is not able to read the "DLT.CMD" file from the shared disk drive 7310 until the rename operation is complete (and the rename operation is not initiated until the read command file has been completely written to the shared disk drive 7310).

In step 7410, after the rename operation is complete, the second client 7306 discovers that a file with a ".CMD" extension is located in the shared disk drive 7310 (i.e., the "DLT.CMD" file). The second client 7306 retrieves the "DLT.CMD" file from the shared disk drive 7310, and executes it. Operation of flowchart 7402 is complete after step 7410 is performed, as indicated by step 7412.

Figure 3:
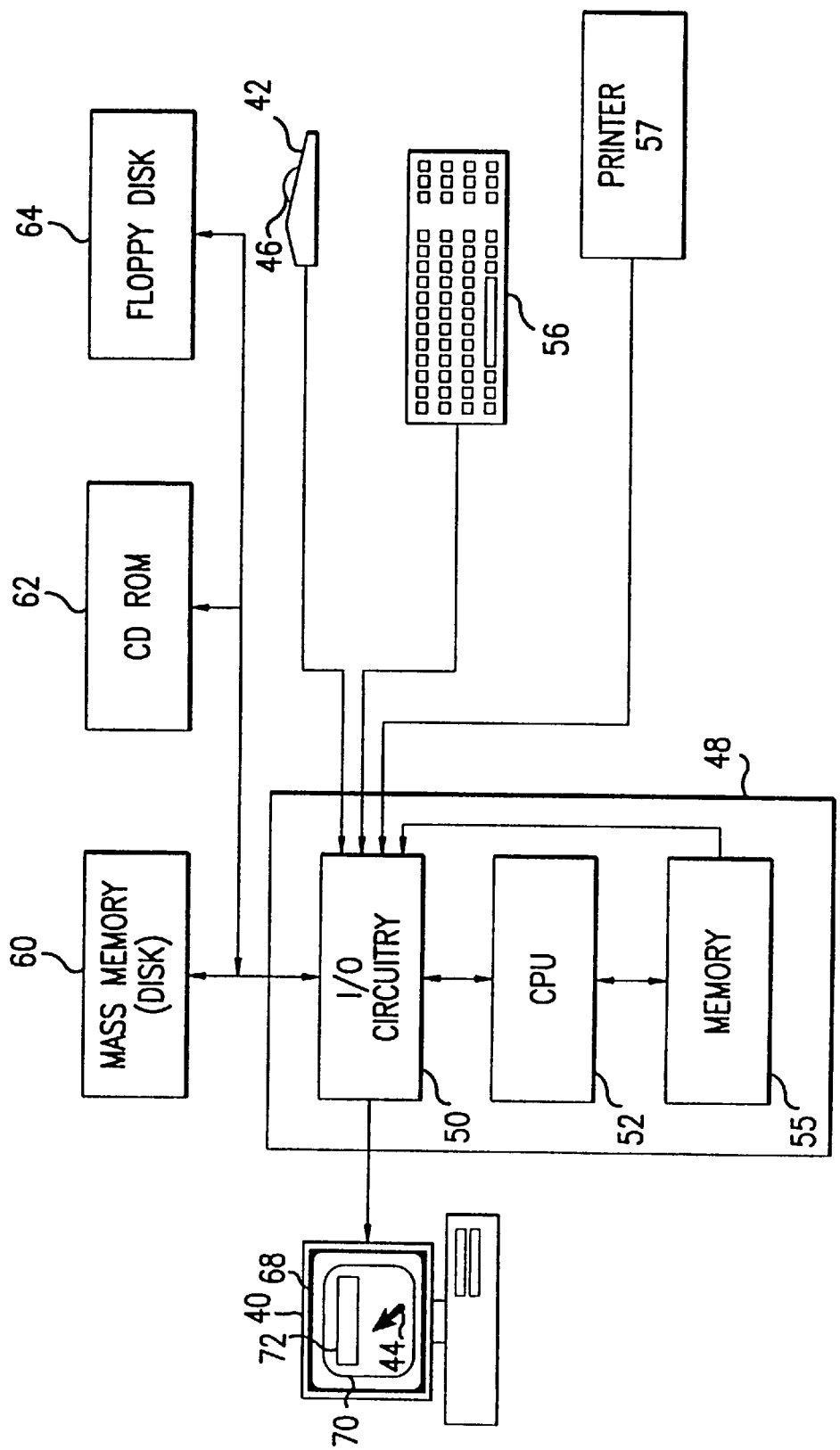
FIG. 3 is a functional block diagram illustrating a computer display system incorporating the teachings of the present invention.

Referring now to FIG. 3, an exemplary computer display system for use in accordance with the teachings of the present invention is shown. The computer system includes a display 40, such as a CRT monitor or a liquid crystal display (LCD), and further includes a cursor control device 42, such as a mouse of the type shown in U.S. Pat. No. Re.32,632, a track ball, joy stick, keyboard or other device for selectively positioning a cursor 44 on a display screen 68 of the display 40. Typically, the cursor control device 42 includes a signal generation means, such as a switch 46 having a first position and a second position. For example, the mouse shown and described in U.S. Pat. No. Re.32,632 includes a switch which the user of the computer system uses to generate signals directing the computer to execute certain commands. As illustrated, the cursor control means 42 (hereinafter all types of applicable cursor control devices, such as mice, track balls, joy sticks, graphic tablets, keyboard inputs, and the like, are at times collectively referred to as the "mouse 42") is coupled to a computer 48.

The computer 48 comprises three major components. The first of these is an input/output (I/O) circuit 50 which is used to communicate information in appropriately structured form to and from other portions of the computer 48. In addition, the computer 48 includes a central processing unit (CPU) 52 coupled to the I/O circuit 50 and a memory 55. These elements are those typically found in most general purpose computers, and in fact, computer 48 is intended to be representative of a broad category of data processing devices capable of generating graphic displays.

Also shown in FIG. 3 is a keyboard 56 to input data and commands into the computer 48, as is well known in the art. A mass memory disk 60 is shown coupled to I/O circuit 50 to provide additional storage capability for the computer 48. In addition, a CD ROM 62 and a floppy disk 64 is further coupled to the I/O circuit 50, for providing, as will be described, a library of textual documents and images to be displayed on the display 40. It will be appreciated that additional devices may be coupled to the computer 48 for storing data, such as magnetic tape drives, as well as networks, which are in turn coupled to other data processing systems. A printer 57 is coupled to the I/O circuit 50 for printing documents, images, and the like, as is well known.

In one embodiment, the present invention is a computer program product (such as a floppy disk, compact disk, etc.) comprising a computer readable media having control logic recorded thereon. The control logic, when loaded into memory 55 and executed by the CPU 52, enables the CPU 52 to perform the operations described herein. Accordingly, such control logic represents a controller, since it controls the CPU 52 during execution.

As illustrated in FIG. 3, the display 40 includes the display screen 68 in which a window 70 is displayed. The window 70 may be in the form of a rectangle or other well known shape, and may include a menu bar 72 disposed horizontally across the length of the window, or in any other desired position on the window. As is well known, the movement of the mouse 42 may be translated by the computer 48 into movement of the cursor 44 on the display screen 70. The reader is referred to literature cited in the background describing object-oriented display systems generally, and in particular, desktop metaphor window-based systems for additional description related to other computer systems which may be utilized in accordance with the teachings of the present invention. The system illustrated in FIG. 3 is intended to represent a general computer display system capable of providing a graphic user interface display.

In this specification, the present invention is described with reference to the display, navigation, and manipulation of United States patent documents. In particular, the invention is described herein as providing a unique method and apparatus for extracting, paginating, displaying, manipulating, navigating and editing the text of issued United States patents, and simultaneously displaying an image of a patent including the drawings on the display 40. Although the description herein describes the invention with reference to patent documents, as has previously been mentioned, it will be appreciated by one skilled in the art that the present invention may be used in a variety of applications which require the simultaneous display, synchronization of, or unsynchronized display of, text and images on a display. For purposes of this specification, all references to "patents" or documents generally, shall be understood to encompass documents of every type, and are not limited solely to patent documents.

In addition, it will be noted that no particular programming language has been disclosed to implement the present invention using the computer display system illustrated in FIG. 3. A variety of programming languages such as C, C++, Visual Basic, etc. may be used to implement the present invention on many different computer display platforms, using the teachings described herein.

TERMINOLOGY AND DEFINITIONS

A "PTO Image File" is an electronically stored data file in the format specified in the document: "U.S. Patent and Trademark Office APS U.S. Patent Image Data File". Each of these files contains one or more image pages from a patent document. Each image page in a PTO Image File is an electronic representation of an actual page of a patent or a related patent document (such as a Certificate of Correction).

The image pages are created by the U.S. Patent and Trademark Office by the use of an electronic scanner, and are stored in the PTO Image File in Group 4 compressed format (see Federal Information Processing Standards publication 150: "Facsimile Coding Schemes and Coding Control Functions For Group 4 Facsimile Apparatus"). An enlarged portion of an exemplary image page (the bibliography page of U.S. Pat. No. 5,165,027) is shown in FIG. 4.

A "PTO Text File" is an electronically stored data file in the format specified in the document: "U.S. Patent and Trademark Office Patent Full-Text/APS File". Each of these files contains an ASCII text representation of most of the textual data in a patent document. Generally, the bibliography information and the text paragraphs in the main body of the patent will be found in this file. Some equations and tables of textual information that appear in a patent will also be stored in this type of file. Visual information, such as diagrams and tables containing information of a graphical nature, and formatting information will not be found in the PTO Text File. In addition, the column and line number information that appears on published patents is not stored in the PTO Text File nor is the format of the bibliographical page.

The ASCII data in a PTO Text File is stored in fixed-length eighty character records. The first four characters of each record are an ID code that identifies what type of data the record contains, the fifth character is a blank, and the last seventy-five characters of the record store the actual data values. If the first four characters are all blanks, then the record is a continuation of the previous record.

For example, in the PTO Text File for U.S. Pat. No. 5,165,027 (part of which is illustrated in FIG. 5), there is a record that begins with "TTL" followed by "Microprocessor breakpoint apparatus". This "TTL" record stores the title of the patent which is "Microprocessor breakpoint apparatus". One of these "TTL" records is required in every patent.

Another record, which begins with "ISD" and contains "19921117", shows the issue date of the patent which is Nov. 17,1992.

In both of the above examples, the amount of data to be stored is seventy-five characters or less and therefore fits in one record. In many instances, there is too much data to fit in one record. Paragraphs of text from the main body of the patent are often split into multiple records because they have more than seventy-five characters. The first record of such a paragraph would start with an identifier ("ID") such as "PAR" (which indicates a paragraph whose first line is indented). The subsequent records used to hold the paragraph would start with an ID of four blanks indicating that these records are continuations of the first record. As many words as will fit in the seventy-five characters (without breaking the words) are stored in ear-h record (see FIG. 5).

The PTO Text File stores data relating to a patent in an informational format using ASCII text rather than a visual display format (see FIG. 5). The Text File is comprised of records that contain labeled pieces of information. This is a very convenient format for processing the information about a patent using a computer (such as performing a text search or navigating the text of the patent).

The PTO Image File stores data relating to a patent in a scanned bitmap display format that is very easy for a human being to work with (see FIG. 4) since it visually appears as the original published patent. The PTO Image File comprises a series of digitized page images that are created by using a page scanning device to capture black and white pictures of typeset patent pages. This is a very convenient format for allowing a human to view the information contained in a patent. For example, the image pages can be printed on a laser printer to produce a readable paper document that visually displays the diagrams, equations and figures of the patent, as it was published by the U.S. Government.

An "Equivalent File" is an electronically stored data file which contains pagination information that details the equivalence relationship between a PTO Text file and a PTO Image File. This relationship makes both the PTO Text file and the PTO Image File more useful by specifying how the record-based ASCII data of the PTO Text file can be manipulated to be substantially equivalent in appearance to the PTO Image File and yet still retain its useful properties as an ASCII file.

"Pagination" is a process by which an Equivalent File is created from a PTO Text File and a PTO Image File. The PTO Image File is read to determine the locations of column breaks, column number, line breaks and line numbers as well as the locations and sizes of imbedded tables, structures, equations, and other non-text information in the specification. Pattern recognition techniques familiar to those skilled in the art are used to block and segment the layout of the image pages.

The PTO Text File is read to determine bibliographic information, figure references, section headings, font style, point size, superscript, subscript, boldness or presence of italicized type, and special characters.

The results of these two operations are then combined either manually, or by the use of Optical Character Recognition techniques to produce the equivalent File. Each of the PTO Text File paragraphs that begins with a bibliographic information ID code is formatted to approximate the appearance of the Bibliography section on a typeset PTO Bibliography Image Page. Likewise each of the text paragraphs from the PTO Text File in the Specification and Claims sections is processed to produce a text file formatted to approximate the appearance of the Specification or Claims section in typeset PTO Specification and Claims image page(s).

The requirement for pagination of the PTO Text File and the PTO Image File arises from several distinct requirements in the field of use. In citing a patent in, for example, a legal proceeding, the specific reference is made by the column number and line number of the portion of interest. These column and line numbers are printed in the published patent and appear in the format of the page represented by the PTO Image File. However, these column and line numbers do not appear in the PTO Text File, making it difficult to discern a proper citation from the PTO Text File. In use, a user may perform a word search on the PTO Text File to locate a specific term. Once located in the PTO Text File, should the user wish to cite that reference, he or she must refer back to the PTO Image File (or the actual paper patent) to locate the exact column number and line number, without the benefit of any information as to that location.

Another requirement for pagination arises from the practice of placing pure images in line with the text in the columns of the patent. For example, a diagram of a structure followed by the text description of that structure, in the PTO Text File would appear only as text, without the image of the structure. The user must refer back to the PTO Image File (or the paper patent) to locate and study the diagram of the structure, again without any information regarding the physical location of the illustration, diagram, figures or the like, from the data in the PTO Text File.

The specific information about how the typesetting equipment processes the data from the PTO Text File to produce the PTO Image File is not available from the U.S. Government. Therefore, the two files must normally be treated as completely separate entities. (The PTO itself uses the files separately on two computers manufactured by Sun Microsystems, Inc.) The PTO Text File is normally used to search for text but has no information as to where or how the information appears in the typeset patent image pages. The PTO Image File is used to view the typeset text, diagrams, figures, and equations but has no representation of the data stored in a format that can be searched by a computer.

The purpose of the Equivalent File of the present invention is to paginate the PTO Text File so that the data in the Text file can be presented in a paginated patent-like format, thus facilitating searching in, and direct citation from the text, a function heretofore not available using the PTO Text Files. The pagination process formats the PTO Text File with correct column breaks, column numbers, end of the breaks, and line numbers, thus allowing direct citation, along with the benefits of pure text searching. The information contained in the Equivalent File can be used in both a familiar visual format by a human being and automatically by the computer at the same time.

A "synchronized" display is a method of navigating an Equivalent File and the corresponding Image File in a way that a user can view a column in the Equivalent file and the same column in the Image File simultaneously. For example, when the user views column 3 of the Equivalent File in a window, he can simultaneously view column 3 of the Image File in another window. Thus, the user can view two files, an Equivalent File and an Image File, in a synchronized manner.

An "unsynchronized" display is a method of displaying one portion of an Equivalent File and another portion of an Image File asynchronously. For example, assume there is a sentence in column 2 of the Equivalent File stating "referring to FIG. 5, the system illustrates . . . " If a user selects the sentence in the Equivalent File, the Image File will display the first page which contains FIG. 5. Thus, the Equivalent File and the Image File do not refer to the same column, but they refer to the related matters. Another example of an unsynchronized display is displaying one portion of the Equivalent File while displaying a completely unrelated drawing, an unrelated table, or a different text portion of the Image File of the same patent or an Image File of another patent. Accordingly, in an unsynchronized display, there may be no relationship or linkage between the Equivalent File and the Image File displayed simultaneously.

The underlying structure of the information stored in the Equivalent File may be stored in many forms. It may be stored in a binary structure format for fast access by a language that implements structure operations such as the C programming language. Another alternative is to store some of the underlying structural information about the text in a generalized markup language such as SGML (Standardized Generalized Markup Language) and store the raw positional information in a binary structure format. There are many alternatives having their own impact on capabilities, speed, and ease-of—use of the present invention. The reader may therefore implement the present invention in the particular programming language which best accommodates the reader's system requirements. As previously described, the present invention may be implemented using a variety of computer systems, including the system shown in FIG. 3.

The SGML may be used in a variety of applications. The SGML may be used to write a patent application that is equivalent in appearance to a published patent. The SGML may be also utilized to create a compound document that contains both the Equivalent File and bit scanned images of tables, flow charts, equations and the like.

Equivalent Files are associated with at least the following types of synchronization information:

1. Column

The positions within the PTO Text File of the first character of each patent text column as those columns are displayed in the PTO Image File. This permits the present invention to determine which ASCII text is displayed in each column of the main body of the patent.

2. Line

The positions within the PTO Text File of the first character of each line of text as those lines are displayed in the PTO Image File. This permits the present invention to determine which ASCII text is displayed in each line of each column of the main body of the patent.

3. Column Line Number

The approximate line number in the patent column that each line of text in the PTO Text File is adjacent to, permitting the present invention to determine the approximate vertical positions of the ASCII text lines displayed in each column of the main body of the patent.

4. Bibliographic formatting

The approximate arrangement of the bibliographic data from the PTO Text File as it appears on the bibliographic page images in the PTO Image File.

5. Graphic Item Locations

The locations in the PTO Image File of the various figures, figure elements, equations, non-text tables, structures and diagrams referred to in the PTO Text File.

6. Sections

The positions within the PTO Text File of the various logical sections of the document (e.g., background of the invention, brief description of the drawings, the claims section, etc.) as they are displayed in the PTO Image File.

7. Font

The font style in which the various ASCII characters in the PTO Text File are displayed in the PTO Image File.

8. Point Size

The font size in which the various ASCII characters in the PTO Text File are displayed in the PTO Image File.

9. Superscript or Subscript

Whether the various ASCII characters in the PTO Text File are displayed as superscripts or subscripts in the PTO Image File.

10. Boldness

The degree of boldness of the font style in which the various ASCII characters in the PTO Text File are displayed in the PTO Image File.

11. Italics

The degree of italicness of the font style in which the various ASCII characters in the PTO Text File are displayed in the PTO Image File.

12. Special Characters

Some of the ASCII characters in the PTO Text File are displayed in the PTO Image File as special characters. Typically a group of characters in the PTO Text File (e.g., ".OMEGA.") will map to one special character in the PTO Image File (e.g., "$\Omega$"). This is due to the ASCII standard not defining many special characters that are useful.

As an example of the "Column" information listed above, refer to the paragraph of text from the main body of U.S. Pat. No. 5,165,027 that begins with "Numerous techniques are used . . . ". FIG. 6 shows how the ASCII characters for this paragraph are stored in the PTO Text File. The same paragraph is displayed in the PTO Image File for U.S. Pat. No. 5,175,027 in FIG. 7.

It should be noted that the paragraph in the PTO Text File (see FIG. 6) is 5 lines long, and that the same paragraph displayed in the PTO Image File (see FIG. 7) is 7 lines long. In addition, no words are broken across fines in the PTO Text File. Words at the ends of lines displayed in the PTO Image File may be spht so that part of the word appears at the end of one line, followed by a hyphen, and the rest of the word appears on the next line (e.g., "perfor-mance").

The Equivalent File is associated with line numbers to identify which of the ASCII characters in the PTO Text File fall in which lines displayed in the PTO Image File. For example, the Equivalent File would store the lines of the paragraph in the PTO Image File (see FIG. 7) beginning with the following characters in the PTO Text File:

Line 1: The "N" in "Numerous".
Line 2: The "m" in the middle of "performance".
Line 3: The "d" in "development".
Line 4: The "T" in "The".
Line 5: The "p" in "part".
Line 6: The "s" in "some".
Line 7: The "t" in "that".

As an example of the "Column" information listed above, refer to the first page image of the specification of U.S. Pat. No. 5,165,027, shown in FIG. 8. As illustrated, the first column of the patent begins with the "M" in "MICROPROCESSOR". The second column of the patent begins with the "d" in "data". These positions are stored in the Equivalent File in order to identify which of the ASCII data in the PTO Text File falls within which columns.

FIG. 8 also shows an example of the "Column Line Number" information listed above. The column of numbers that runs down the middle of the page indicate what line numbers within the patent text columns each of the lines of text falls on. For column 1, shown in FIG. 8, the line that contains "This application is a continuation of application Ser. " is line 4 of the column. In column 2, shown in FIG. 8, the line that shows "address at which a breakpoint is to occur. A second" is line 8 of the column. This information is associated with the Equivalent File to identify the approximate vertical position on the page image where a given line of text appears.

As an example of "Bibliographic formatting" information, reference is made to FIGS. 4 and 5. Notice that the title record which starts with "TTL" has its data displayed in bold below the words "United States Patent", the inventor's name, and a horizontal ruler line. Each piece of bibliographic information is stored as a column of text in the Equivalent File.

Paginating the bibliography data from the PTO Text File to the formatting on the bibliography pages in the PTO Image Files also involves adding text labels to the Equivalent File. For example, the characters "United States Patent [19]" that appear at the top of every bibliography page are not found anywhere in the PTO Text File. These words appear at the top of every patent so their presence in the PTO Image File is unnecessary. However, in order to create an Equivalent File that is similar in appearance to the PTO Image File, these words must be specified in the Equivalent File. The pagination algorithm is designed to add these text labels when they are needed.

EXTRACTION

Figure 9:
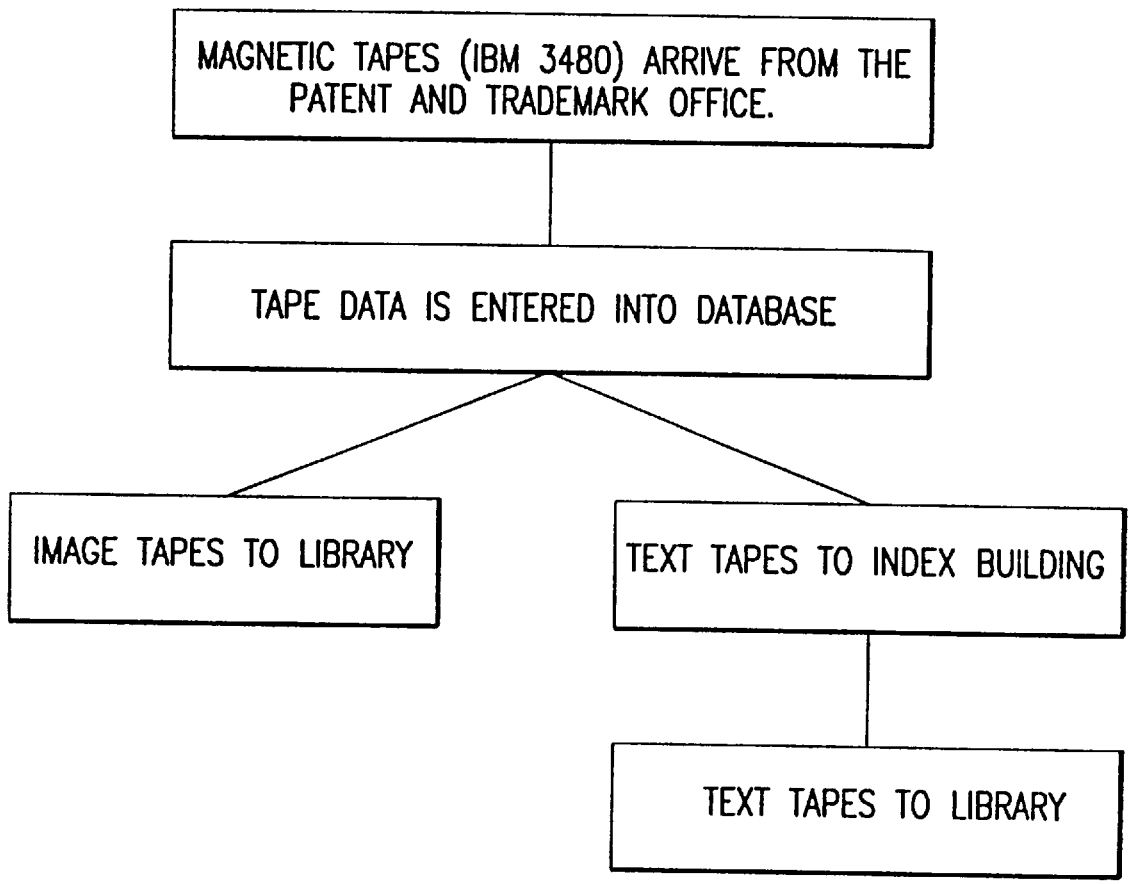
FIG. 9 illustrates a flow chart block diagram of the extraction process utilized by the present invention to extract PTO Text Files and PTO Image Files for magnetic tapes provided by the PTO for use by the processing system of the present invention to synchronize and index the text and image files.

The extraction process of the present invention is illustrated in block diagram form in FIG. 9. The PTO provides the PTO Text File and PTO Image Files on IBM® 3480 magnetic tapes. The extraction process identifies the particular IBM® 3480 tape that a specific PTO Text File or a PTO Image File is located in, extracts those files from the tape(s) and converts them for use by the processing system which synchronizes and indexes the files.

PTO Text Tapes are issued by the PTO on specific calendar dates and contain a unique Volume Serial Number (VSN). All patents issued on a certain date should be present in the tape(s) issued on that date. The tapes do not contain an index. Therefore, extracting a specific PTO Text File requires that the entire 200 MB IBM® 3480 tape be read into a magnetic disk buffer and stripped of header blocks, tape marks labels, etc., and then parsed to create a Volume Table of Contents (VTOC). The VTOC contains the document number, byte count offset from the beginning of the tape, and the length of the document file in bytes. A separate program may then be used to index the beginning byte of the file and copy the file segment to another file, which then becomes the PTO Text File for the specific patent. It is possible for a PTO Text File to span multiple PTO Text Tapes. When this happens, a procedure is utilized by the present invention to concatenate the multiple file segments together. The VTOC created from the magnetic disk buffer is used to update a Relational Database System (RDB) for future reference, and the buffer is then erased.

PTO Text Files are stored on the magnetic tapes in uncompressed format. PTO Image Files are stored on the magnetic tapes preferably in compressed format, preferably in Group 4 2D (two dimensional) fax format.

According to the present invention, PTO Text files are processed in uncompressed format. However, PTO Image files are processed at least in part in compressed format. The processing of Image Files according to the present invention is generally depicted in FIG. 75.

Figure 75:
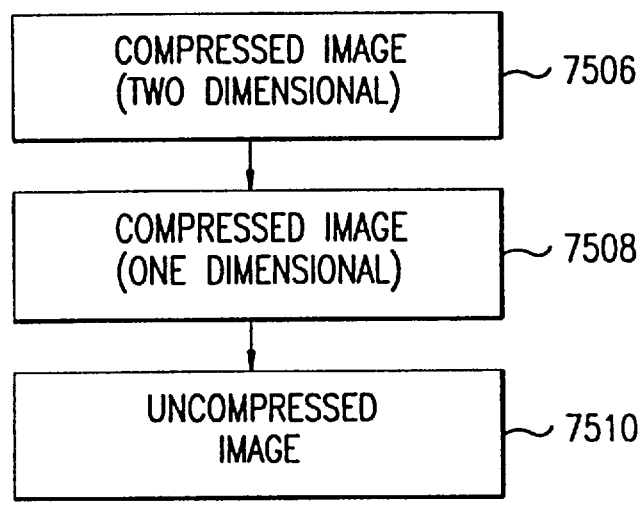
FIGS. 75, 76A, and 76B are used to describe the manner in which PTO Image files are compressed according to a preferred embodiment of the present invention.

An example 2D compressed Image is shown in FIG. 75 as block 7506. According to the present invention, the 2D compressed Image 7506 is converted to a 1D compressed Image 7508. Many functions performed by the present invention involve processing this 1D compressed Image 7508. (With some operations, such as with zooming and with pagination, the 1D compressed image 7508 is decompressed to an uncompressed format, as represented by item 7510 in FIG. 75. Typically, this uncompressed Image file contains 2320 bits by 3408 bits. Zooming and pagination is discussed below.) In contrast, conventionally such functions are performed by solely processing uncompressed images.

Figure 76A:
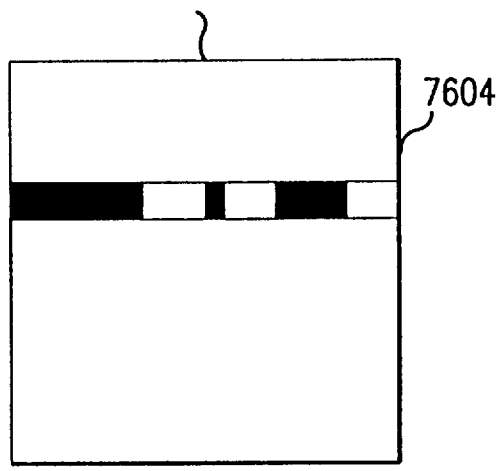

The structure of a 1D compressed Image shall now be described with reference to FIGS. 76A and 76B. FIG. 76A illustrates a representation of an example uncompressed Image 7602. A typical line 7604 in this uncompressed Image 7602 is shown. This line 7604 includes a number of black spaces (each black space representing a logical 1 bit) and a number of white spaces (each white space representing a logical 0 bit).

Figure 76B:
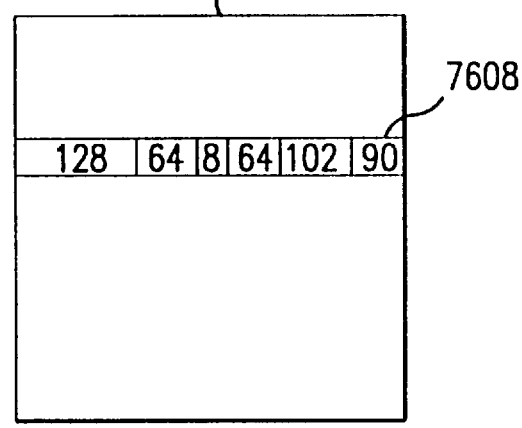

A 1D compressed Image 7606 corresponding to the uncompressed Image 7602 is shown in FIG. 76B. This 1D compressed Image 7606 includes a line 7608 (called the compressed line 7608) corresponding to the line 7604 (called the uncompressed line 7604) in the uncompressed Image 7602. The compressed line 7608 represents the uncompressed line 7604 by quantifying the number of black and white spaces in the uncompressed line 7604, while preserving the sequence of such black and white spaces. Thus, as indicated in the compressed line 7608, the uncompressed line 7604 contains 128 black spaces, followed by 64 white spaces, followed by 8 black spaces, followed by 64 white spaces, followed by 102 black spaces, followed by 90 white spaces.

Procedures for converting between uncompressed Images, 2D compressed Images, and 1D compressed Images will be apparent to persons skilled in the relevant art. Such procedures are discussed in many publicly available documents, such as Federal Information Processing Standards Publication No. 150, entitled "Facsimile Coding Schemes and Coding Control Functions for Group 4 Facsimile Apparatus, " Nov. 4, 1988, incorporated herein by reference in its entirety.

INITIAL AUTOMATIC PAGINATION

Figure 10:
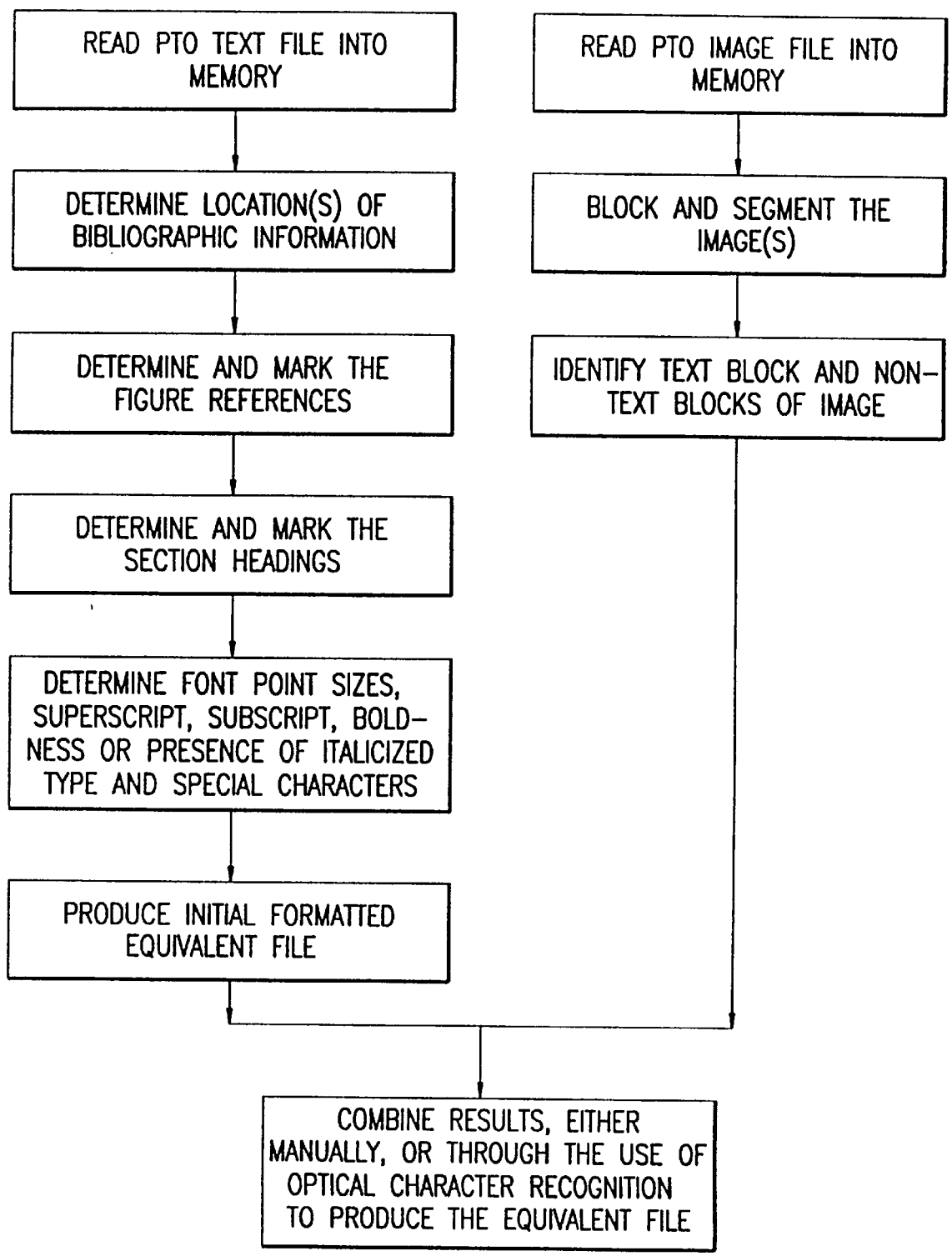
FIG. 10 is a flow chart illustrating the pagination process of the present invention to synchronize the PTO Text File and the PTO Image File to produce an Equivalent File.

The initial automatic pagination process is illustrated in flow chart form in FIG. 10. The automatic pagination process utilizes the PTO Text File and creates an Equivalent File that is an initial approximation of the formatting of the original published patent.

The steps of initial pagination of the present invention are as follows:

1. Read the PTO Text File into memory of a computer system (for example, a computer system of the type shown in FIG. 2 may be utilized).
2. Assign each of the ASCII data records that begins with a bibliographic information ID code, an approximate location on the corresponding image page of the PTO Image File at which its data should be displayed. See the document "U.S. Patent and Trademark Office Patent Full-Text/APS File" for a listing of all the bibliographic data record ID codes. Also, see the document "Patents and Trademarks Style Manual" for a specification of how bibliography information is formatted on bibliography pages.
3. Process each of the paragraphs of the main body of the patent. Build a list of the locations of the Logical Groups that are found (see the document "U.S. Patent and Trademark Office Patent Full-Text/APS File" for a listing of the Logical Groups that can appear in the main body of the patent, i.e. "GOVT", "PARN", "BSUM", "DRWD", "DETD", "CLMS ", "DCLM").
4. Save the pagination information to disk in an Equivalent File.

In steps 2 and 3 above, the paragraph formatting procedure is performed whenever there is a data value that might span more than one line in the corresponding page image in the PTO Image File. In addition, the autopagination technique may be utilized on compressed data.

Figure 78:
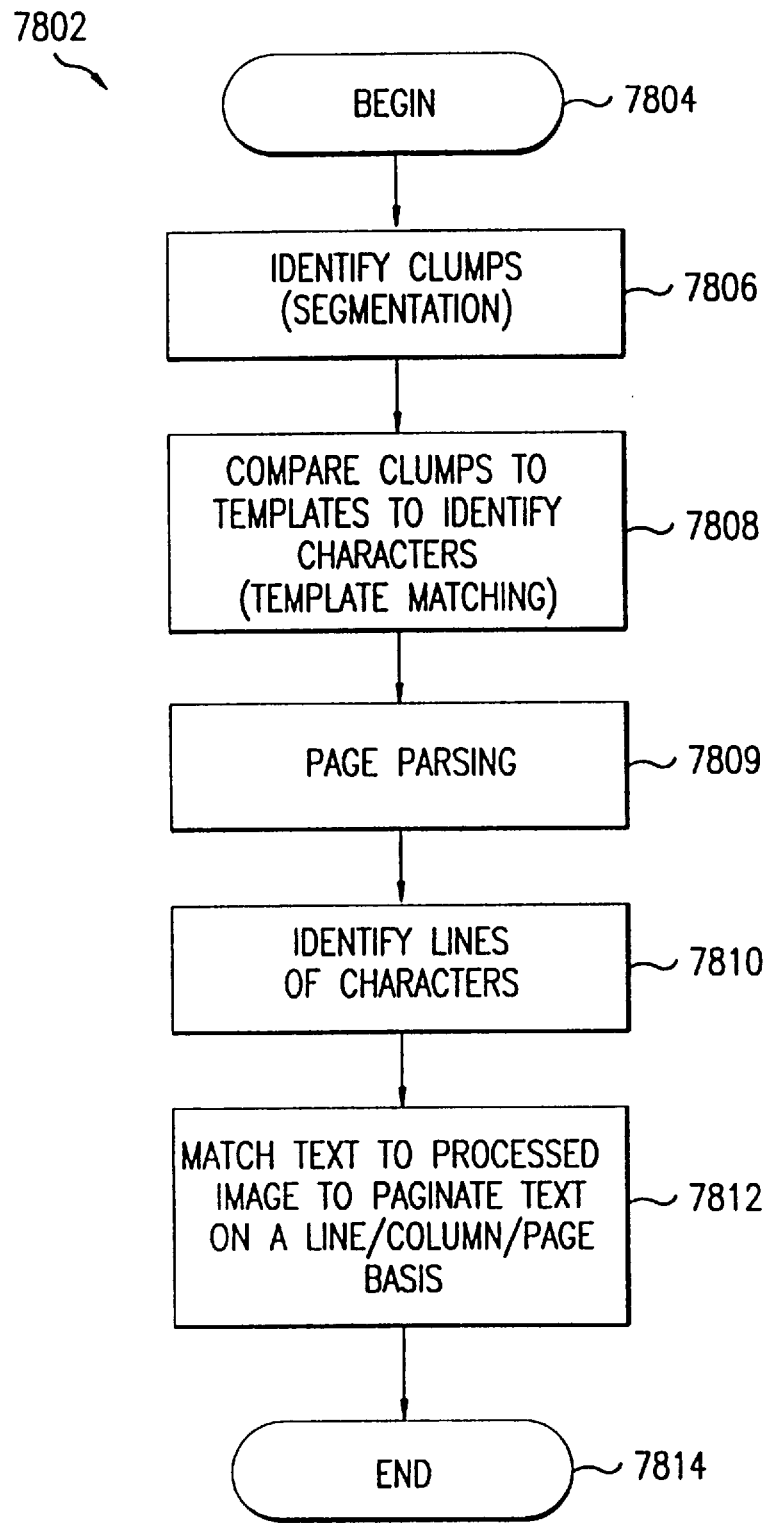

The manner in which the autopagination technique may be utilized on compressed data shall now be described. As discussed above, the present invention generates a 1D compressed image file from the uncompressed image file provided by the PTO. According to an embodiment of the present invention, pagination is performed using the uncompressed PTO text file and the 1D compressed image file. This embodiment is described below with reference to a flowchart 7802 shown in FIG. 78. Flowchart 7802 begins with step 7804, where control immediately passes to step 7806.

In step 7806, clumps are identified in the 1D compressed image file. A clump is a group of dark spaces (each "dark space" representing a logical "1" value) that are adjacent to one another either vertically (between lines) and/or horizontally (within lines) and/or diagonally. In an alternate embodiment, a clump can represent a group of white spaces. The operation performed in step 7806 is called "segmentation". Conventionally, segmentation is not performed using compressed data images. Instead, segmentation is conventionally performed using uncompressed data images. According to such conventional procedures, it is necessary to search an uncompressed data image in the vertical, horizontal, and diagonal directions. However, since the present invention uses 1D compressed images, it is only necessary to search in the vertical and diagonal directions (this is assuming that clumping is done vertically, horizontally, and diagonally; if clumping is only done horizontally and vertically, then the present invention searches only vertically). This is the case since 1D compressed images are already clumped in the horizontal direction (this is apparent from FIG. 76B). Thus, the use of the present invention of 1D compressed images significantly decreases the processing time to perform segmentation.

Figure 85A:
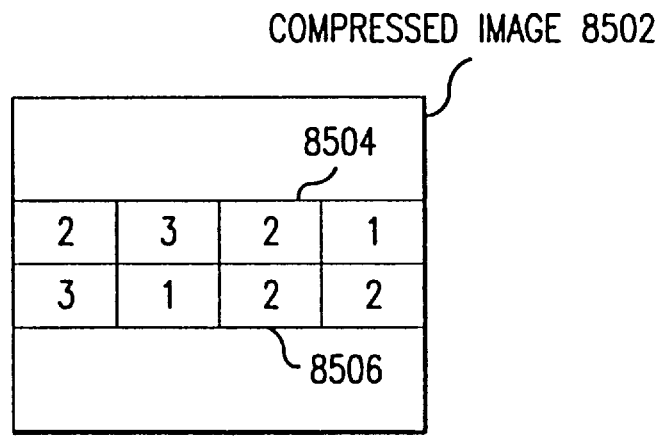
FIGS. 85A and 85B are used to illustrate the preferred manner in which the present invention performs clumping.
Figure 85B:
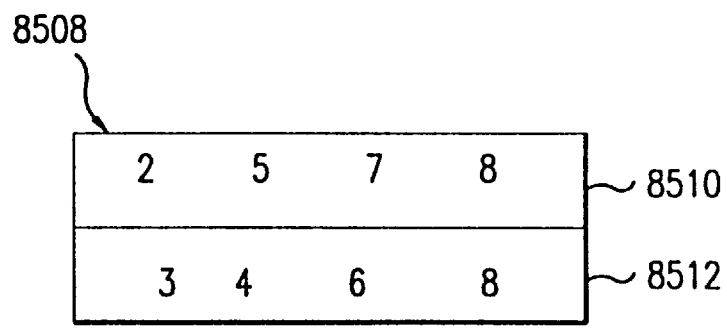

Preferably, the present invention in step 7806 searches for dark spaces in adjacent rows which vertically overlap. Consider an example 1D compressed image 8502 shown in FIG. 85A, where two rows 8504 and 8506 are shown. Row 8504 has 2 dark spaces, followed by 3 white spaces, followed by 2 dark spaces, followed by 1 white space. Row 8506 has 3 dark spaces, followed by 1 white space, followed by 2 dark spaces, followed by 2 white spaces. The present invention generates a table 8508 shown in FIG. 85B from rows 8504 and 8506. Table 8508 contains information that denotes the boundaries between groups of white and dark spaces in rows 8504 and 8506. Table 8508 contains an entry for each row in the compressed image 8502, such as entries 8510 and 8512 that correspond to rows 8504 and 8506, respectively. Entry 8510 is derived by adding each value in row 8504 with the preceding value or sum. Thus, the "5" in entry 8510 is derived by adding "3" plus "2" from row 8504. The "7" in entry 8510 is derived by adding "2" from row 8504 plus "5" (i.e., The prior sum). Each entry in table 8508 is generated in the same way.

Once table 8508 is generated, clumps are identified by analyzing the dark space boundary information contained in entries 8510 and 8512. For example, the dark space boundary information contained in entry 8510 indicates that row 8504 has dark spaces in bit positions 1–2 and 5–7. The dark space boundary information contained in entry 8512 indicates that row 8506 has dark spaces in bit positions 1–3 and 4–6. Bit positions 1–2 vertically overlap bit positions 1–3. Thus, these dark spaces in rows 8504 and 8506 represent at least a part of a clump. Also, bit positions 5–7 vertically overlap bit positions 4–6. Thus, these dark spaces in rows 8504 and 8506 represent at least a part of another clump. This analysis is performed for all of the entries in the table 8508. Note that it was possible to identify these clumps based on the dark space boundary information contained in table 8508.

Each of the clumps identified in step 7806 may represent a character. In step 7808, the clumps are compared to character templates. The character templates are bit patterns corresponding to characters, such as alphanumeric characters, punctuation characters, graphical characters, etc. Thus, in step 7808, the clumps are compared to character templates for the purpose of recognizing the clumps as characters.

The operation performed in step 7808 is called "template matching." Preferably, template matching is performed by finding the center of gravity of the clump being processed (each clump is processed, i.e., matched, in turn) and the center of gravity of each template (the centers of gravities of the templates are preferably calculated in advance). The center of gravity is defined as the (x,y) location where the x coordinate in this (x,y) location is equal to the average of all of the x coordinates in the dark spaces of the clump, (the terms "spaces" and "pixels" are used interchangeably herein) and the y coordinate in this (x,y) location is equal to the average of all of the y coordinates in the dark spaces of the clump. Then, the clump is aligned with a template (each template is processed in turn) such that the center of gravities of the clump and the template coincide. The number of pixels in the template and the clump having the same value is then determined. Consider, for example, the pixels at the center of gravity of the clump and the template. If they are both equal to 1, or are both equal to 0, then the sum is incremented by 1. Otherwise, the sum is not incremented. This comparison operation is performed for each pixel in the clump and the template. Then, the sum is divided by the total number of pixels in the smallest rectangle enclosing both the clump and the template. If this resulting quotient (also called score) is above a predetermined threshold, then the clump is said to match the template and is recognized as that character represented by the template. Preferably, this predetermined threshold is approximately 90%, although other values could alternatively be used, and could vary from template to template. The above analysis is performed for each template until the clump is recognized. It should be noted that not all clumps are recognized.

In one embodiment, the character templates have been previously compressed such that they are 1D compressed character templates. Such 1D compressed character templates are compared to the clumps in step 7808. Alternatively, the character templates are not compressed. Instead, the clumps are decompressed, and are then compared to the uncompressed character templates in step 7808.

In step 7809, page parsing is performed. With respect to patent documents, the present invention first locates column numbers (appearing at the top of columns in patents) in the processed image file. This is done by looking for clumps which have been recognized in the previous step as large-sized numbers in the processed image file. Then, the present invention locates the patent number which appears in large-sized numbers at the top of each page in a patent. As will be appreciated, PTO Image files include a series of line numbers (i.e., 5, 10, 15, 20, etc.) between the left and right columns on each page of text. The present invention searches for these line number sequences to identify these columns. The present invention uses this information to identify which clumps are in which columns. These clumps are assigned sequential position numbers, preferably starting from 1. Similarly, the characters in the PTO text file are assigned sequential position numbers, preferably starting from 1. As described below, these position numbers are used to compare the processed image file with the PTO text file for matching purposes.

In step 7810, lines of characters (such characters having been recognized in step 7808) are identified. Step 7810 may be performed using any well known line recognition technique. One such line recognition technique operates by processing each character in turn. If the center of a character is between the top and bottom of the previous character, then the two characters are considered to be in the same line. For reference purposes, the lines of characters recognized by the above-described operations are called the processed image file.

In step 7812, the present invention matches the PTO text file to the processed image file. The purpose of this matching operation is to identify the ends of lines, columns, and pages in the processed image file, and to then reflect such ends of lines, columns, and pages in the PTO text file to thereby generate the Equivalent File. The Equivalent File is synchronized to the Image File on a line/column/page basis.

For example, suppose the PTO text file includes the following sentence: "The present invention includes a computer platform." In step 7812, the present invention matches each word in this sentence to words in the processed image file. Suppose that the word "computer" in this sentence is presently being analyzed. The word "computer" from the PTO text file is matched with an identical word in the processed image file. If this word is at the end of a line in the processed image file, then the present invention reflects this end-of-line information in the Equivalent File. Similarly, if this word is at the end of a column or the end of a page in the processed image file, then the present invention reflects this end-of-column/end-of-page information in the Equivalent File.

In one embodiment, Step 7812 is performed as follows. First, unique pairs of adjacent characters (not counting spaces) are identified in the PTO text file. These character pairs may include overlapping characters in words. Second, a look up table having an entry for each character pair is created. The positions in the PTO text file where the character pairs are located are stored in the respective entries of the table. Third, unique pairs of adjacent characters (in the horizontal direction) in the processed image file are identified. These character pairs from the processed image file, which are also called anchor pairs, may include overlapping characters in words.

Processing then continues to map the anchor pairs to the characters in the PTO text file. An anchor pair table is created having an entry for each anchor pair. These entries include the position information from the lookup table associated with the PTO text file for the anchor pairs. Then, positions from this anchor pair table corresponding to impossible sequences of characters are eliminated.

For example, a portion of an example PTO text file 8608 is shown in FIG. 86. A processed image file 8606 corresponding to this PTO text file 8608 is also shown. Only the clumps identified in step 7808 are shown in FIG. 86. The lookup table for the PTO text file 8608 is shown as item 8610. Item 8612 represents the anchor pair table before positional information is deleted. Such positional information is deleted as follows. The first anchor pair, in this case "Th", is selected. The left-most position (in this case, the only position) of this anchor pair is position 1. The other anchor pairs are then evaluated with respect to this anchor pair "Th" to determine whether their positions (in the PTO text file) can possibly correspond to the anchor pairs. First, the anchor pair "he" is evaluated. This anchor pair occurs at positions 2, 5, and 14 in the PTO text file 8608. The anchor pair at "he" can occur only at position 2 with respect to the anchor pair "Th", since it is known that "he" is in the same word as "Th" (this information is known since "Th" is very close to "he" in the processed image file). Accordingly, positions 5, 14, and 25 are deleted. Searching is performed in both a forward and a backward direction. Consider the case where the anchor pair "ab" is selected. The anchor pair "th" can occur only at positions 4 and 13 with respect to anchor pair "ab", since anchor pair "ab" appears after anchor pair "th" in the processed image file 8606 (at least with respect to the clumps identified in the processed image file 8606). Each anchor pair is selected, and then the other anchor pairs processed with respect to the selected anchor pair, in both a backward and forward direction. After as many of the positions from the anchor pair table 8612 have been deleted, it is possible to match the processed image file 8606 to the PTO text file 8608 to identify end-of-lines in the PTO text file 8608.

Flowchart 7802 is complete after step 7812 is performed, as indicated by step 7814.

The automated pagination feature of the present invention as described above results in an Equivalent File that is synchronized on a line, column, and page basis. In alternate embodiments, the text file is automatically paginated such that the Equivalent File is only synchronized on a page basis, a column basis, a line basis, or any combination of the above.

PAGINATION CORRECTION TOOL

The pagination correction tool allows a human to check and correct the results of the initial automatic pagination process. A computer system of the type illustrated in FIG. 3 may also be used. This tool is a software program with a graphical user interface that provides the following capabilities, and completes the following steps:

Open and read into memory a PTO Text File;

Open and read into memory a previously edited Equivalent File on media;

Use a cursor control device (for example, mouse 42) to mark or unmark characters that begin a patent column.

Use a cursor control device (for example, mouse 42) to mark or urunark characters that begin lines within a patent column.

Add or remove blank lines to set the appropriate vertical line spacing so that the lines of text fall on the same line numbers of the patent text column they are in as shown in the PTO Image File;

Use a cursor control device to mark or unmark paragraphs as being section titles.

Indicate which figures are on which drawing sheets.

As is typical in computer programs, the specified tasks listed above do not need to be performed in any particular order except that the file must be opened at the beginning and closed (and usually saved) at the end.

In an alternate embodiment, automatic pagination is not performed. Instead, pagination is entirely, manually performed by using the pagination correction tool. This embodiment is particularly useful when it is only necessary to synchronize on a page basis, or a column basis, for example. For reference purposes, such page basis synchronization, column basis synchronization, etc., are collectively called synchronization levels.

Figure 77:
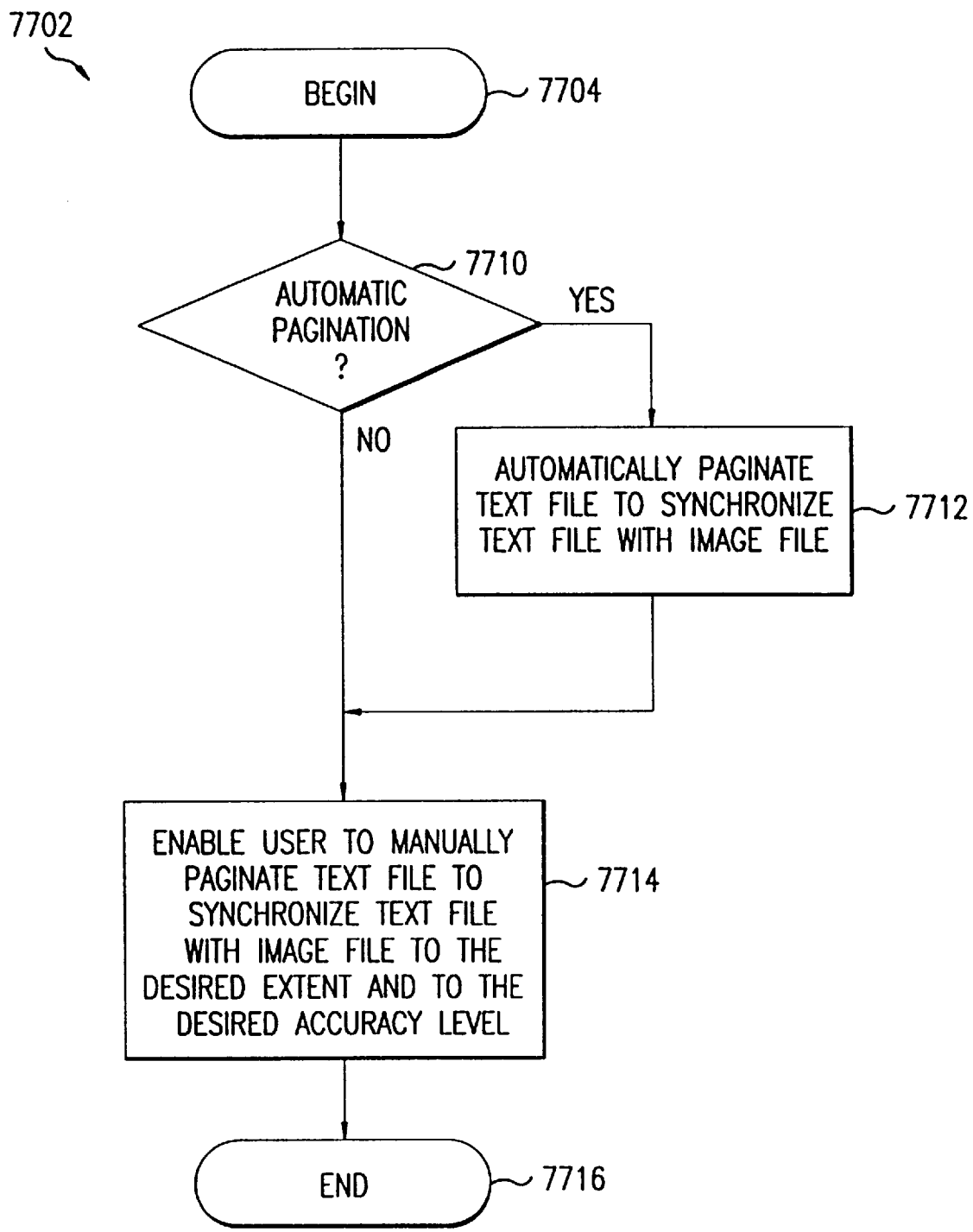
FIGS. 77 and 78 are flowcharts depicting the manner in which pagination is performed according to a preferred embodiment of the present invention.

In other embodiments, the operator is provided with an option of automatic pagination or manual pagination, or any combination of the two. This embodiment is represented by a flowchart 7702 shown in FIG. 77. In step 7710, the operator may select automatic pagination or manual pagination. If the operator selects automatic pagination, then step 7712 is performed, wherein pagination is performed automatically, as discussed above. After step 7712 is performed, or if the operator did not select automatic pagination in step 7710, then step 7714 is performed. In step 7714, the operator uses the pagination correction tool to perform manual pagination.

INDEXING

A B+-tree inverted index of words is generated for a group of one or more Equivalent Files to greatly speed the process of searching the text of the files. These indexes are built from all the words in the PTO Text File. The index generator ignores end-of-line hyphens when building indexes but does not ignore hyphens in the middle of lines.

The present invention utilizes the following build/search index technique: when indices are built, all punctuation marks in a text file are stripped, and the resulting alphanumeric words are entered individually into an index database. The word position in the text file is also stored. For example, a string such as "[Ax,Bx,Cx]" is converted to three separate words-"Ax", "Bx", "Bx" and "Cx", and the individual words are entered into the index database as three separate items.

When a user enters a search string such as "[Ax,Bx,Cx]", the string is converted into the following tokens: "Ax", "Bx" and "Cx". The tokens are searched using the text conversion technique described above, and the resulting search produces three lists of search matches. These lists are processed and filtered for all occurrences. The occurrence of "Ax" is immediately followed by the occurrence of "Cx". This technique allows words originating from the source text to be searched directly, without the need to store a large number of punctuation mark locations.

USER INTERFACE

The graphic user interface of the present invention is comprised in part of a computer program which is stored in either mass memory 60, CD-ROM 62, or floppy disk 64, of the system illustrated in FIG. 3. Appropriate programming code is loaded into memory 55 by the I/O circuit 50 and executed by the CPU 52. It will be appreciated that the computer program of the present invention may also be stored in random access memory (RAM), or in other machine readable form and media. The graphic user interface displays the Equivalent File and the PTO Image File, described above in previous sections, and provides a variety of viewing and editing options.

Figure 11:
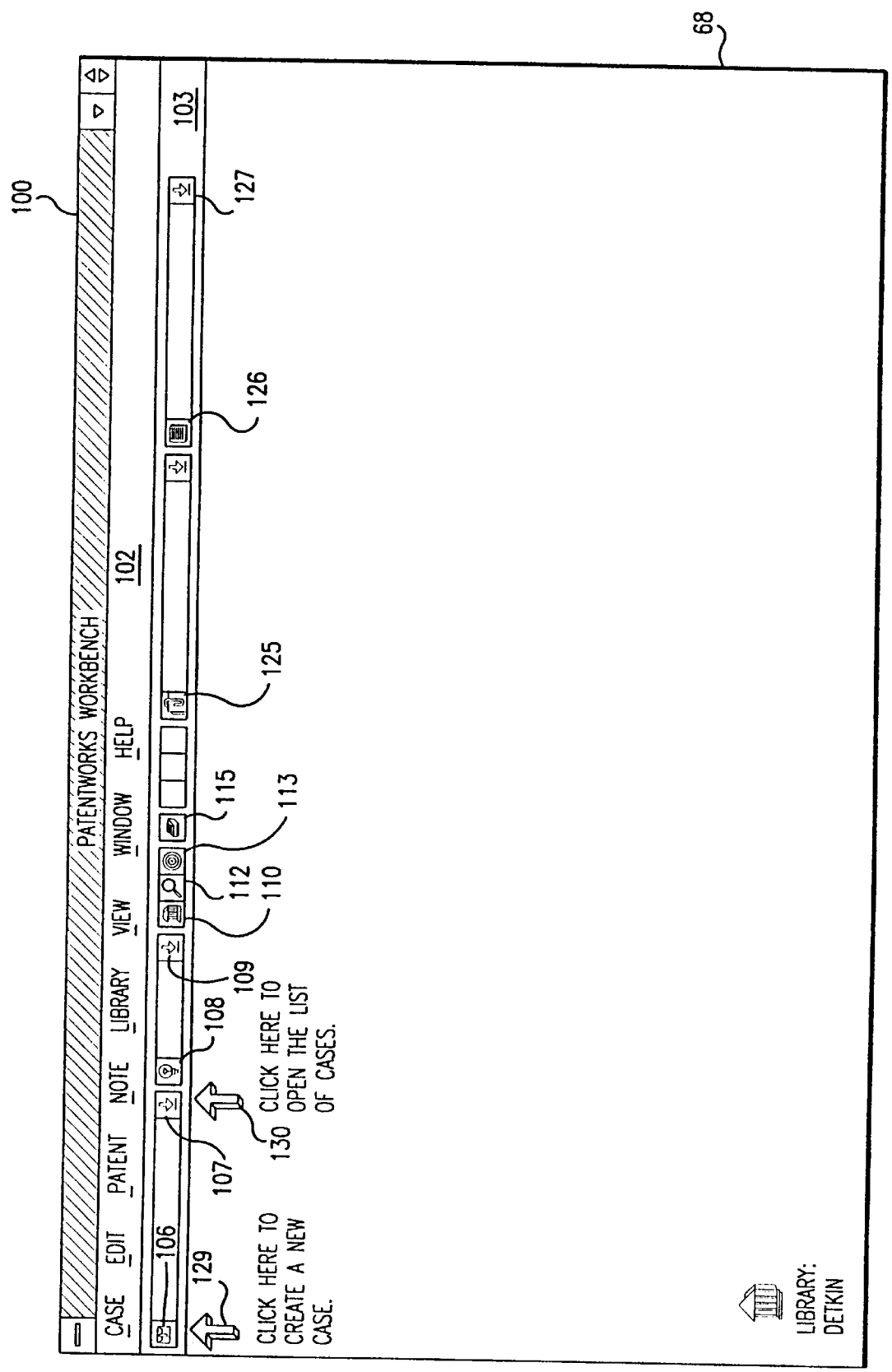
FIG. 11 illustrates the user interface of the present invention upon system start including the title, menu and tool bars.

Referring now to FIG. 11, the display screen 68 is shown in detail. Illustrated within the display 68, is a title bar 100 for identifying the title of the program in which the user interface of the present invention is utilized. In the example of FIG. 11, the title of the program is PatentWorks Workbench™, however, depending on the nature of the program in which the present invention is used, the title may change in accordance with the particular application. In addition, a menu bar 102 is provided which includes a plurality of command options such as "Case", "Edit", "Patent", "Note", "Library", "View", "Window", and "Help". Additionally, other context specific command options may be displayed depending on the specific application in which the present invention is used.

As illustrated in FIG. 11, a tool bar 103 is displayed immediately below the menu bar 102. The tool bar 103 comprises the primary source of options and selection items which a user of the present invention will commonly access. As will be described more fully below, the tool bar of the present invention includes a briefcase icon 106, a direction button 107 for dropping a list of available cases, a light bulb icon 108 for designating a patent to a case, and a direction button 109 for obtaining a list of all patents or other documents which may be displayed in an Equivalent File format from a case. Additionally, a library icon 110 is provided on the tool bar 103, the selection of which provides a listing of all the patents available in the patent library. A magnifying glass icon 112 is displayed for selecting a search box to appear on the display screen. A target icon 113 is provided for identifying search results. Other icons displayed along the menu bar 103 include a printer icon 115 for printing documents. A case note icon 125 for displaying case notes is also provided on the tool bar 103. A patent note icon 126 and a direction button 127 are also provided for reviewing and accessing patent notes.

The specific functions and operations of these various icons and command options displayed on the menu bar 102 and tool bar 103 will be described more fully below. It will be noted that all tool bar icons or button functions have keyboard equivalents designed to allow the user to perform the functions of the icons and button functions without using the cursor control device. All of the functions of the tool bar 103 are also displayed in the menu bar drop down menus. Additionally, as shown in FIG. 11, two instructional arrows 129 and 130 are displayed on screen 68. The instructional arrows 129 and 130 provide initial instruction to the user to begin work using the interface of the present invention. These instructional arrows may be selectively turned on or off by the user. Moreover, as shown in FIG. 11, in the lower left hand corner of the screen is a minimized image of the current library identified as the "Detkin" library.

Referring again to FIG. 11 and FIG. 3, in accordance with the teachings of the present invention, a user may access various functions by placing the cursor 44 over a command option on the menu bar 102 and signaling the CPU 52 using the mouse 42 or keyboard 56. A variety of methodologies may be employed for the selection of subcommand items illustrated in the various drop down menus once a command option on a menu is selected. The present invention operates independently of the particular methodology for function selection employed by the computer system illustrated in FIG. 3.

Figure 12:
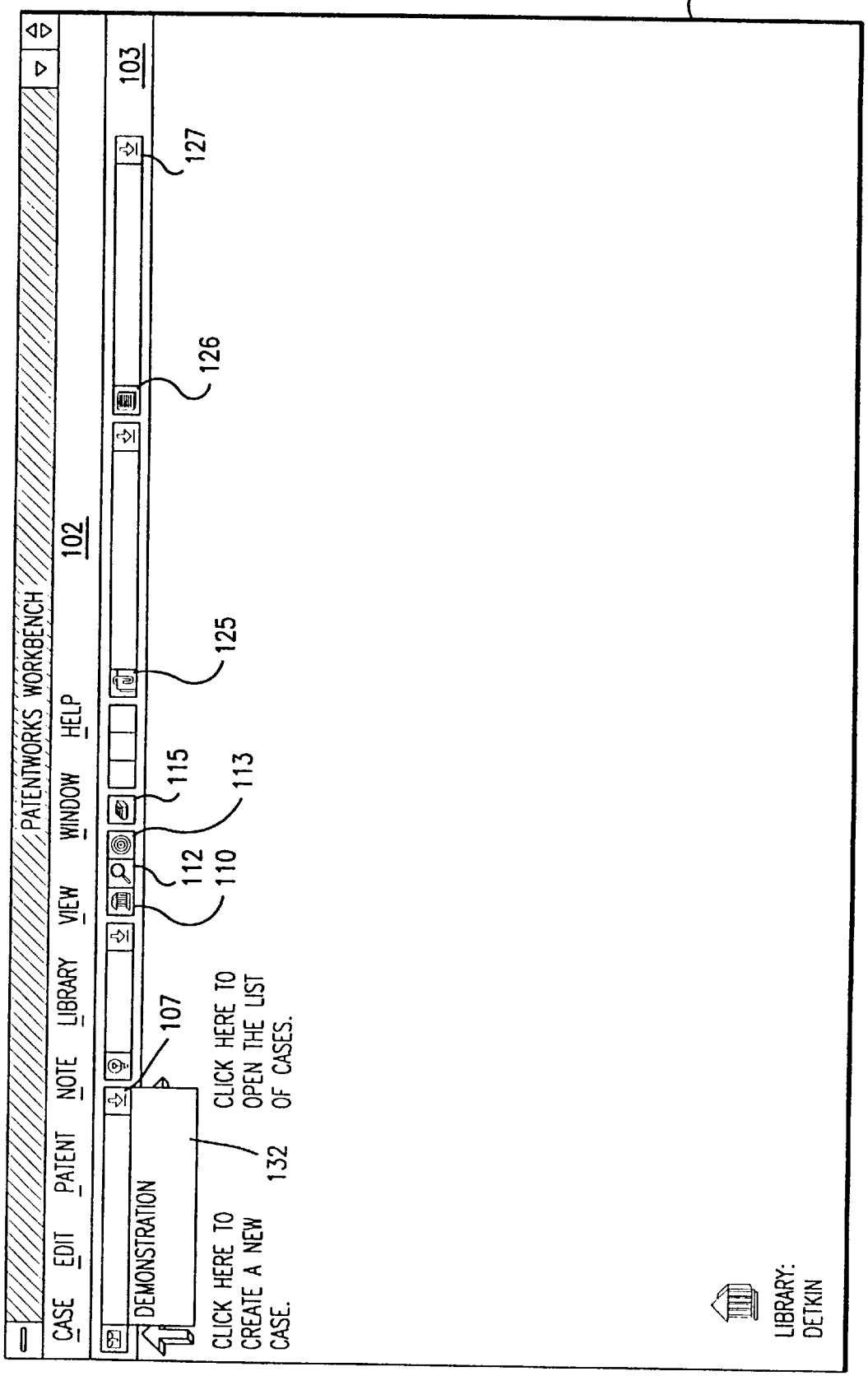
FIG. 12 illustrates the selection by a user of a down arrow function to open a list of available cases.
Figure 13:
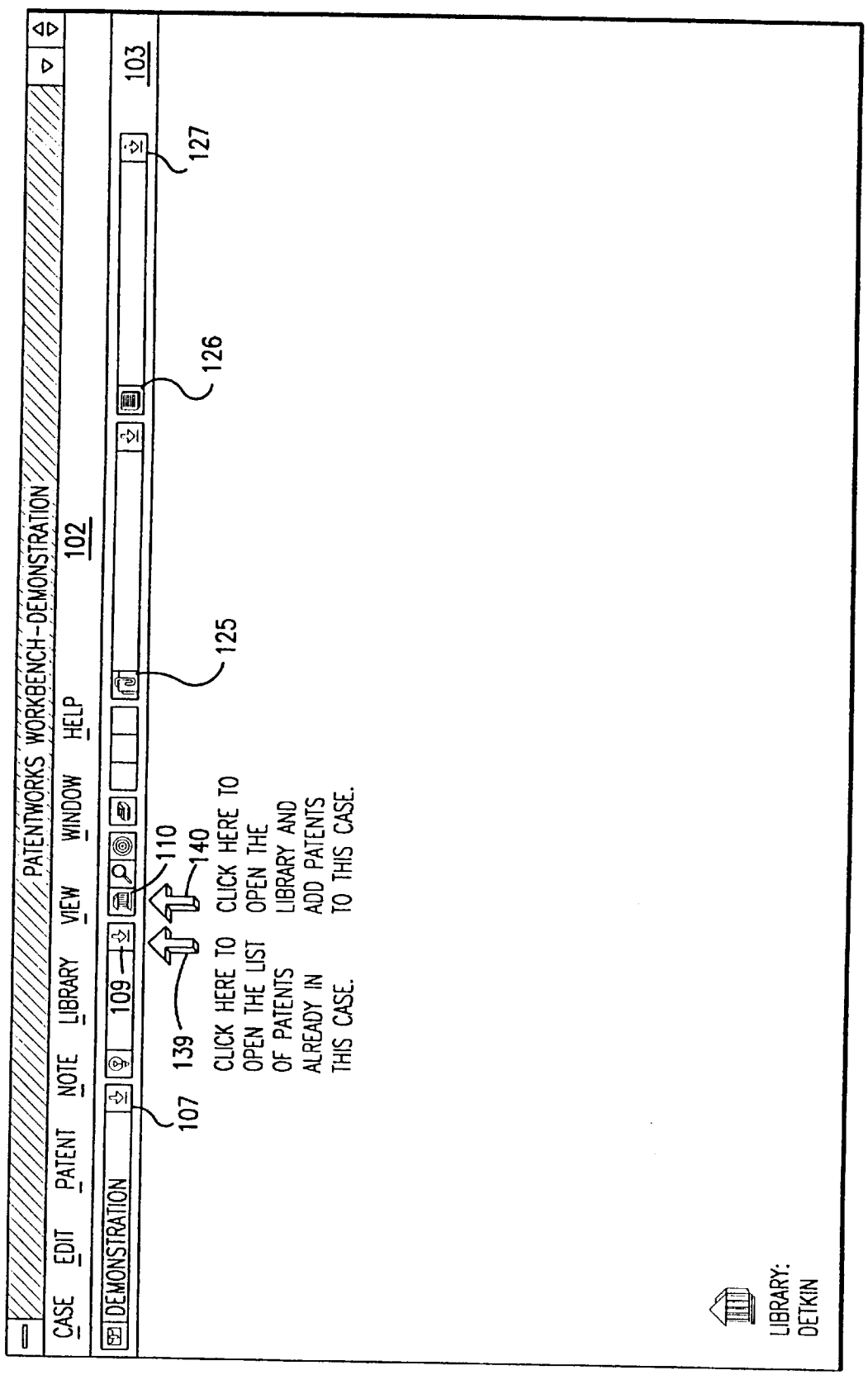
FIG. 13 illustrates the present invention's use of information arrows to direct the user to currently available options for execution.

As illustrated in FIG. 12 and FIG. 3, the placement of cursor 44 over the direction button 107, and the activation of button function 107 using either the mouse 42 or the keyboard 56, results in the display of a list 132. The list 132 lists all the cases in the system. In the example illustrated in FIG. 12, there is currently one case which exists in the "System" library, and which is referred to as "demonstration". It will be appreciated that if the "System" library includes additional cases, then the names of these cases will be displayed in the list 132 as well. As illustrated in FIG. 13, the selection of the case referred to as "demonstration" results in the display of the case name along the tool bar 103. Additionally, the instructional arrows of the present invention provide guidance to the user as to available options which may be selected in the current state of the user interface. For example, in FIG. 13, instructional arrow 139 instructs the user to click on down arrow 109 to open and view the list of patents already disposed within the case "demonstration". Instructional arrow 140 informs the user that he may click on the library icon 110 to open the library and add patents to the case "demonstration". A case may contain patents from several libraries.

Figure 14:
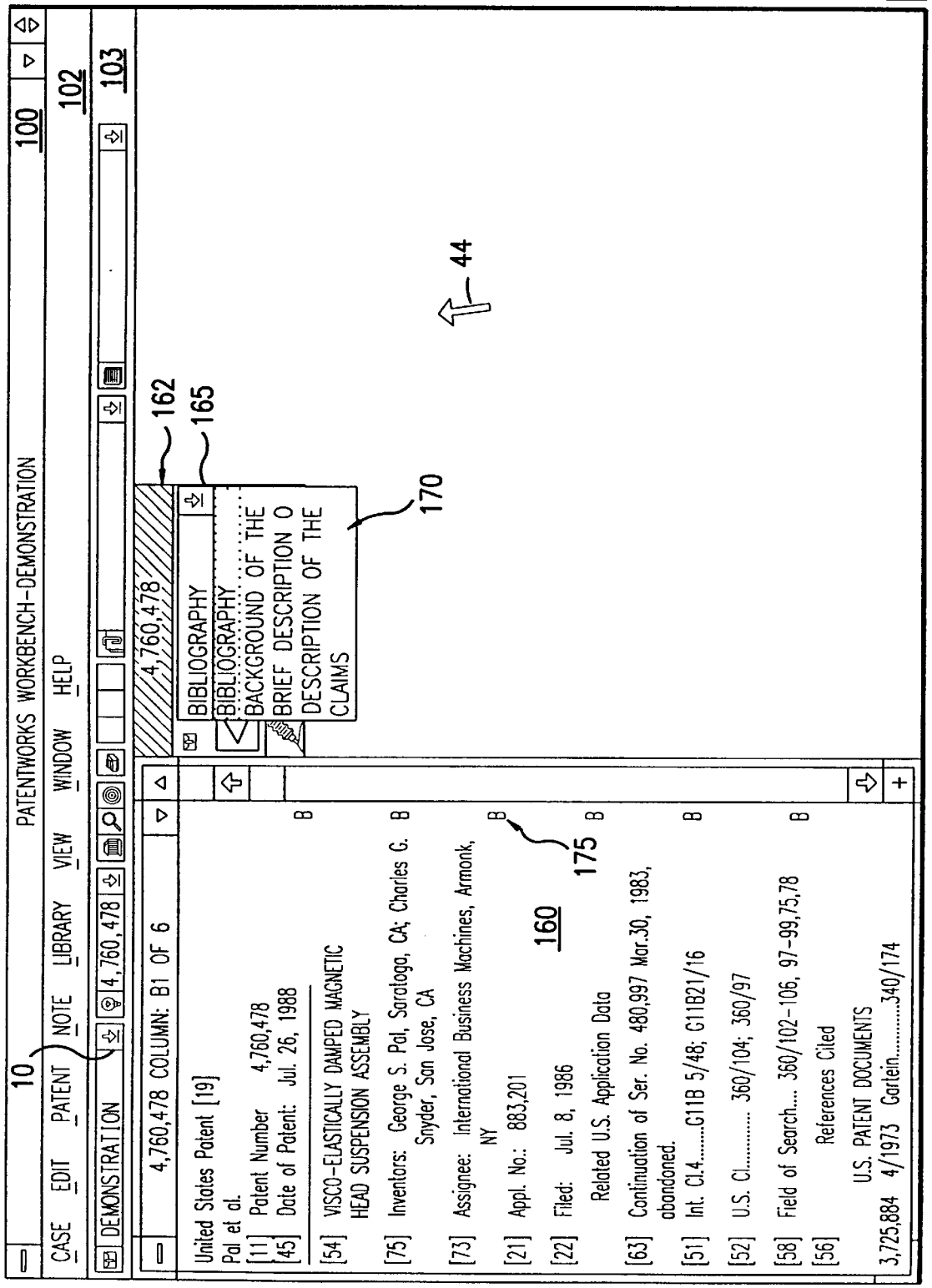
FIG. 14 illustrates the patent text toolbox of the present invention and the display of a menu of patent section headings to assist the user in navigating a selected patent.

Referring now to FIG. 14, assume for example that a user activates button function 109 which results in the display of patents within the case "demonstration". Assume further that the user has selected U.S. Pat. No. 4,760,478 (hereinafter . . . 478"). As shown in FIG. 14, the computer system illustrated in FIG. 3 displays the Equivalent File of the '478 Patent in an equivalent window 160. As previously described in the specification, the Equivalent File of the '478 Patent was generated in accordance with the teachings of the present invention, including the processes of extraction, synchronization, indexing and the like as hereinabove described. Additional features of the equivalent window 160, and its operation in conjunction with other functions of the present invention will be described in more detail below. Also shown in FIG. 14, is a Patent Text Toolbox 162. A downward arrow button function 165 has been activated in FIG. 14 by a user, resulting in the display of a drop down list 170. As shown, the drop down list 170 includes a listing of the sections of the Patent '478 displayed in the equivalent window 160.

As will be described, a user may quickly navigate from section to section by selecting one of the various sections of Patent '478 displayed in list 170. For example, in FIG. 14, the bibliography section has been selected. In response to the selection of the bibliography section by the user, the CPU 52, illustrated in FIG. 2, displays the bibliography portion of the Equivalent File in the equivalent window 160. A user may verify that the bibliography section is currently being displayed within the equivalent window 160, by observing a letter "B" (referred to by numeral 175) displayed along the right edge of the equivalent window 160. In the present example, the letter "B" indicates that the text displayed within the equivalent window 160 corresponds to the bibliography section of the patent. Additional features and functions of the equivalent window 160 will be described more fully below.

Figure 15:
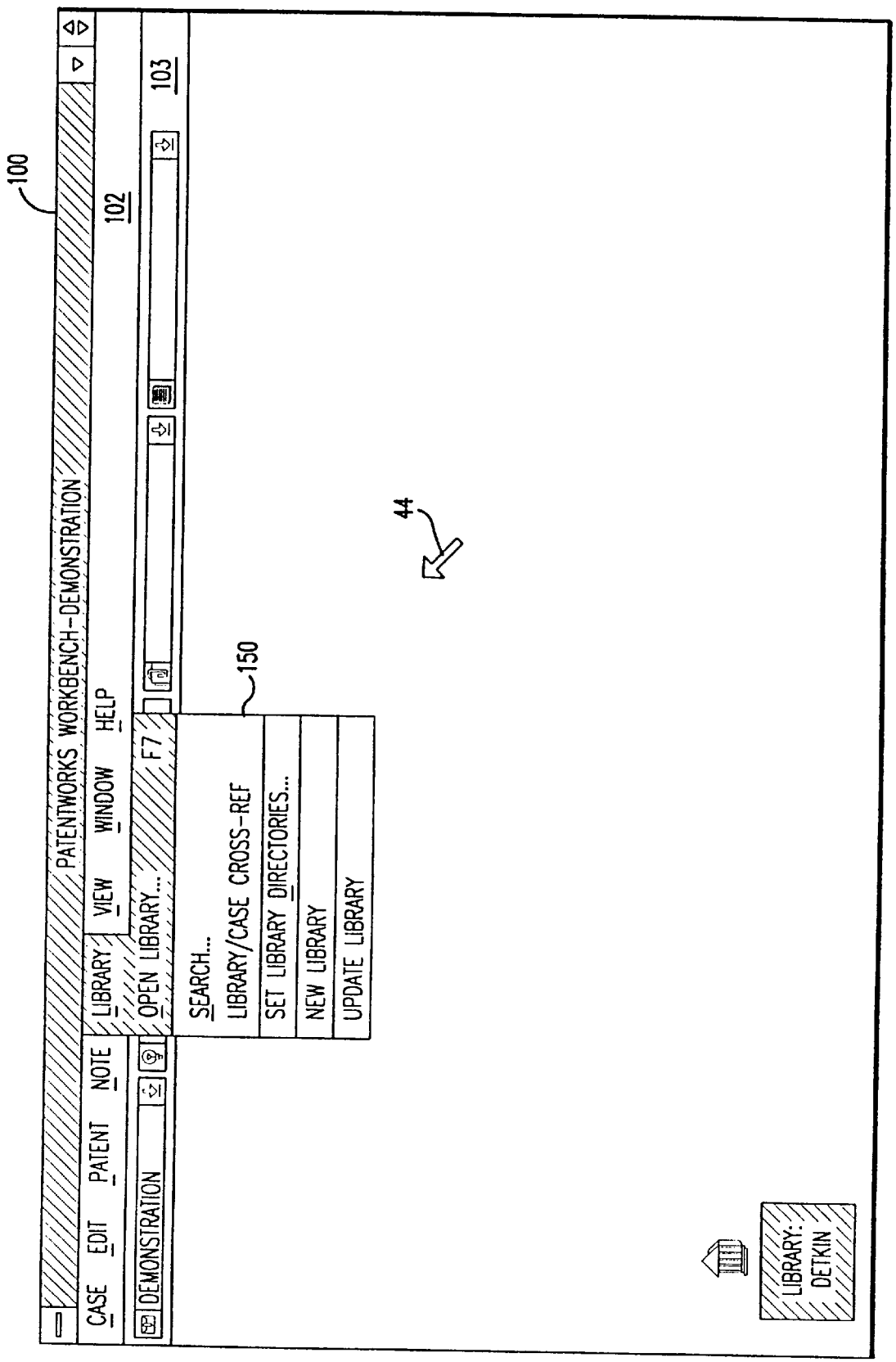
FIG. 15 illustrates the sub-command items available for selection by a user upon activating the Library menu option.

As illustrated in FIG. 15, the activation of the library menu on menu bar 102 results in the display of a library drop down menu 150. The menu 150 includes a variety of command items including "Open Library", "Search", "Case Cross Reference", and "Set Library Directories". For purposes of this specification, a description of the various functions of the present invention will be set forth below. However, it will be appreciated by one skilled in the art, that the operation of the present invention is dynamic, and that a particular order or sequence of events illustrated herein is only one of a variety of possible sequences of images and operations which the present invention is capable of performing. Since the present invention comprises a graphic user interface which permits an operator to interact with the computer system illustrated in FIG. 3, the particular sequences of operations and displays generated herein, are dependent upon the computer system illustrated in FIG. 3 in cooperation with the human operator.

Figure 16:
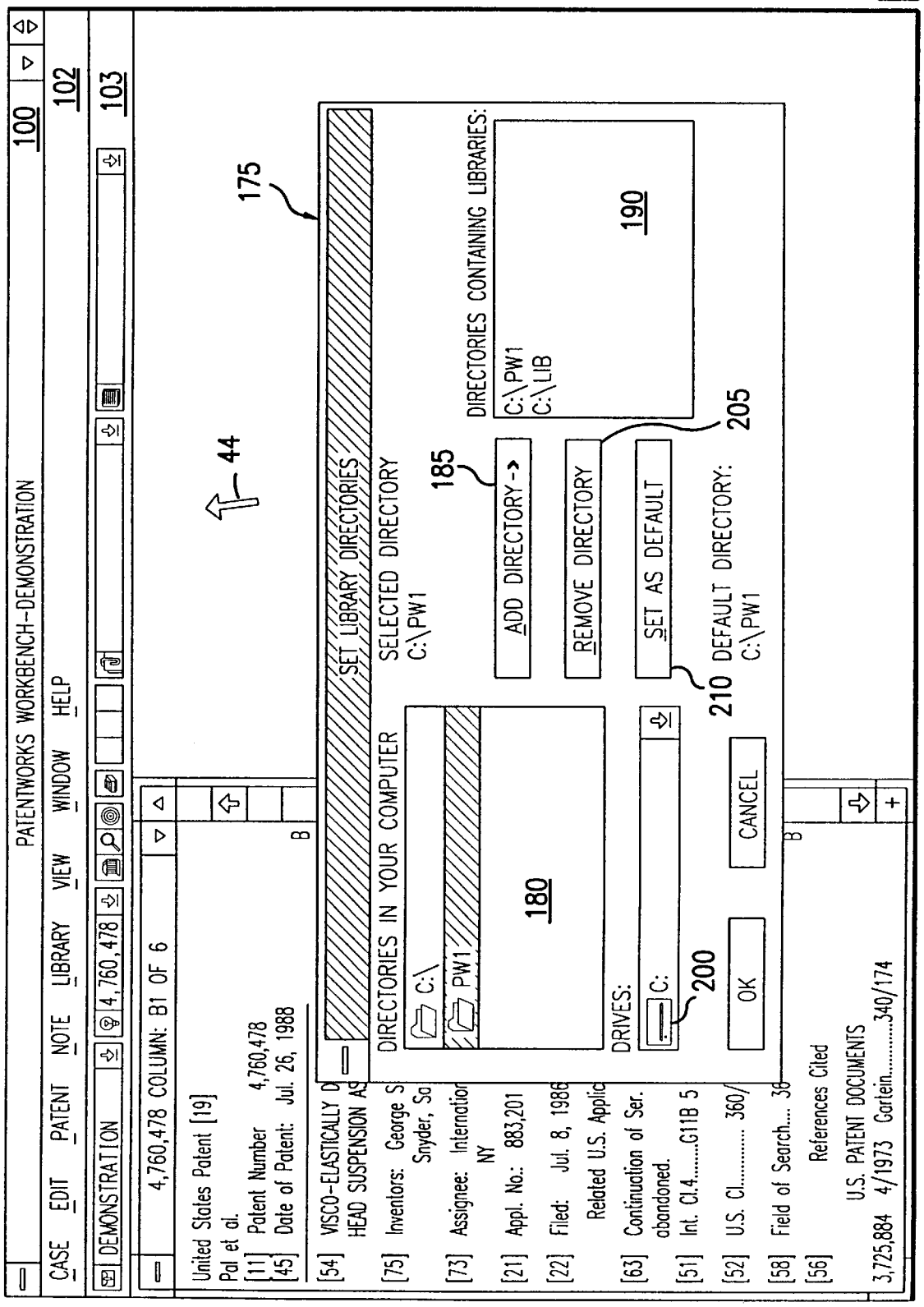
FIG. 16 illustrates the Set Library Directories dialog box, displayed after selection of the Set Library Directories sub-command item on the Library menu.

Referring now to FIG. 16, assume for example that a user selects the function "Set Library Directories" from the library drop down menu 150 illustrated in FIG. 15. In response to the selection of the Set Libraries Directories command, the CPU 52 in FIG. 2 displays a Set Library Directories dialog box 175 as shown in FIG. 16. The Set Library Directories dialog box 175 permits a user to define the directories that contain libraries, and the directory used when creating new libraries. The Set Library Directories dialog box 175 includes a variety of dialog box options. As shown in FIG. 16, a directories window 180 displays current directories available to the user. A user may place cursor 44 in FIG. 3 over a desired directory, and signal the computer to select the directory using the keyboard 56 or the mouse 42 in FIG. 3. After the selection of a directory, the directory may be added to the path list using the add directory button function 185. By double clicking on a directory to open the directory, the directories contained in the selected directory are then listed below the selected directory within a window 180. Additionally, various drives may be selected such as the CD drive 62 (see FIG. 3). An icon representation of the CD drive 62 is also displayed in the Set Library Directories dialog box 175. For example, in FIG. 16 the CD drive 62 is represented by an icon 200. By clicking on an icon to select it, all directories contained on the selected drive are then listed in the directories list displayed in window 180. As illustrated, the currently selected directory is also identified within the Set Library Directories dialog box 175. The currently selected directory may be a directory selected from the directories list or path list. Once a user has selected a directory, the activation of the add directory button function 185 adds the directory to the list of directories containing libraries in the window 190. A button function Remove Directory 205 removes a selected directory from the path list. Once removed, the directory is no longer used in searches for available libraries. The Set Library Directories dialog box 175 also includes a Set as Default button function 210. The Set as Default button 210 sets the currently selected directory as the default directory. When setting directories for libraries, the directory set as a default is the directory where new libraries are created. As illustrated in FIG. 16, the Set Library Directories dialog box 175 also identifies the current default directory.

Figure 17:
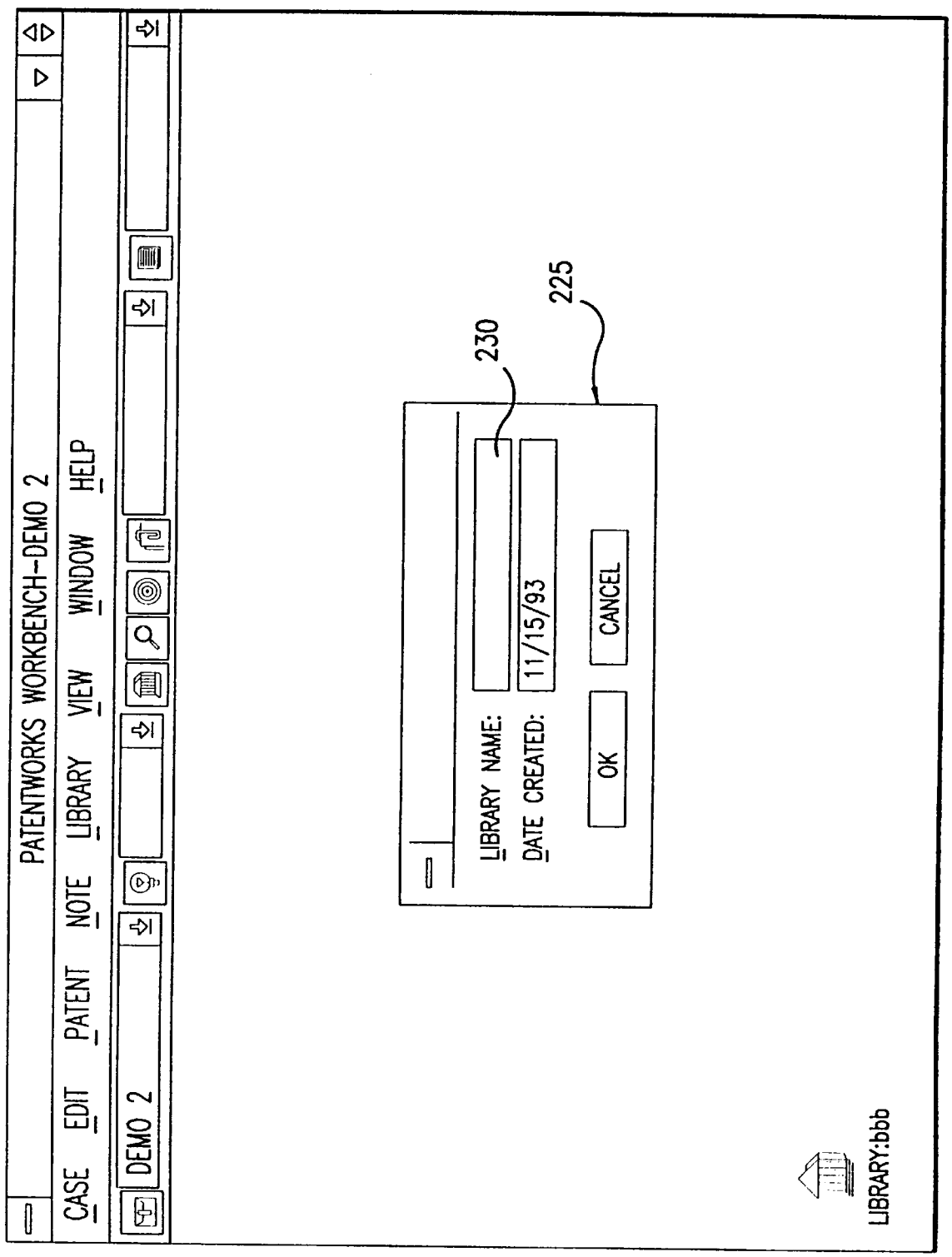
FIG. 17 illustrates the New Library dialog box.

Referring now to FIG. 17, selecting a New Library option from menu 150 in FIG. 15, results in the display of a New Library dialog box 225. Using the keyboard 56 in FIG. 3 or other input device, a user may then input a library name into an open field 230 for the new library, and create a new library using the inputted name.

Figure 18:
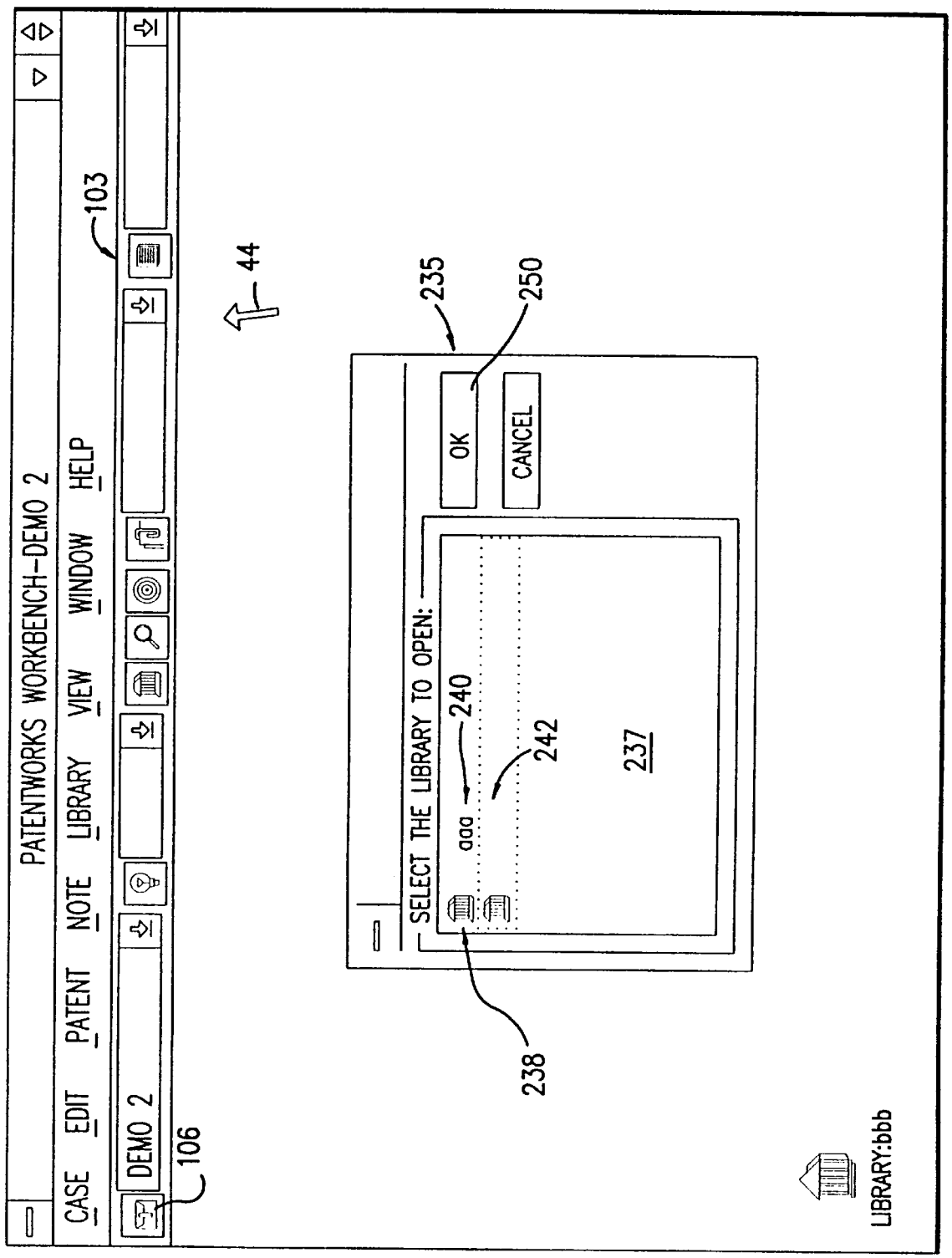
FIG. 18 illustrates the Open Library dialog box.

The selection of the Open Library sub-command item from menu 150 in FIG. 15 results in the computer 48 in FIG. 3 generating and displaying an Open Library dialog box 235, illustrated in FIG. 18. As shown in FIG. 18, the Open Library dialog box 235 includes a field 237 which displays previously created libraries in reference to only those libraries found in directories specified in the window 190. Additionally, the libraries are identified by name, for example, an "aaa" library 240 and a "bbb" library 242, are illustrated within the field 237. A scroll bar (not shown) is provided to permit the user to scroll through the various libraries in the event there are more libraries than can be displayed within the field 237 at any one time. The particular mechanism for scrolling will not be disclosed herein, since the scrolling of textual windows is known in the art.

In the presently preferred embodiment, referring to FIG. 18 and FIG. 3, a library is selected by the user by placing the cursor 44 over a library icon 238, or the name of the library, and double clicking switch 46 on the cursor control device 42. Alternatively, by placing cursor 44 over the name of the library or icon 238 and clicking switch 46 a single time, the library is highlighted. The library may then be selected by placing the cursor 44 over the OK button 250 and clicking switch 46. As shown in FIG. 18, once a library is selected (in the example of FIG. 18, the library "bbb"), the computer 48 highlights the name of the library. As used in this specification, a "library" contains a collection of electronic patents, which includes the Equivalent File and PTO Image File of each listed patent.

Figure 19:
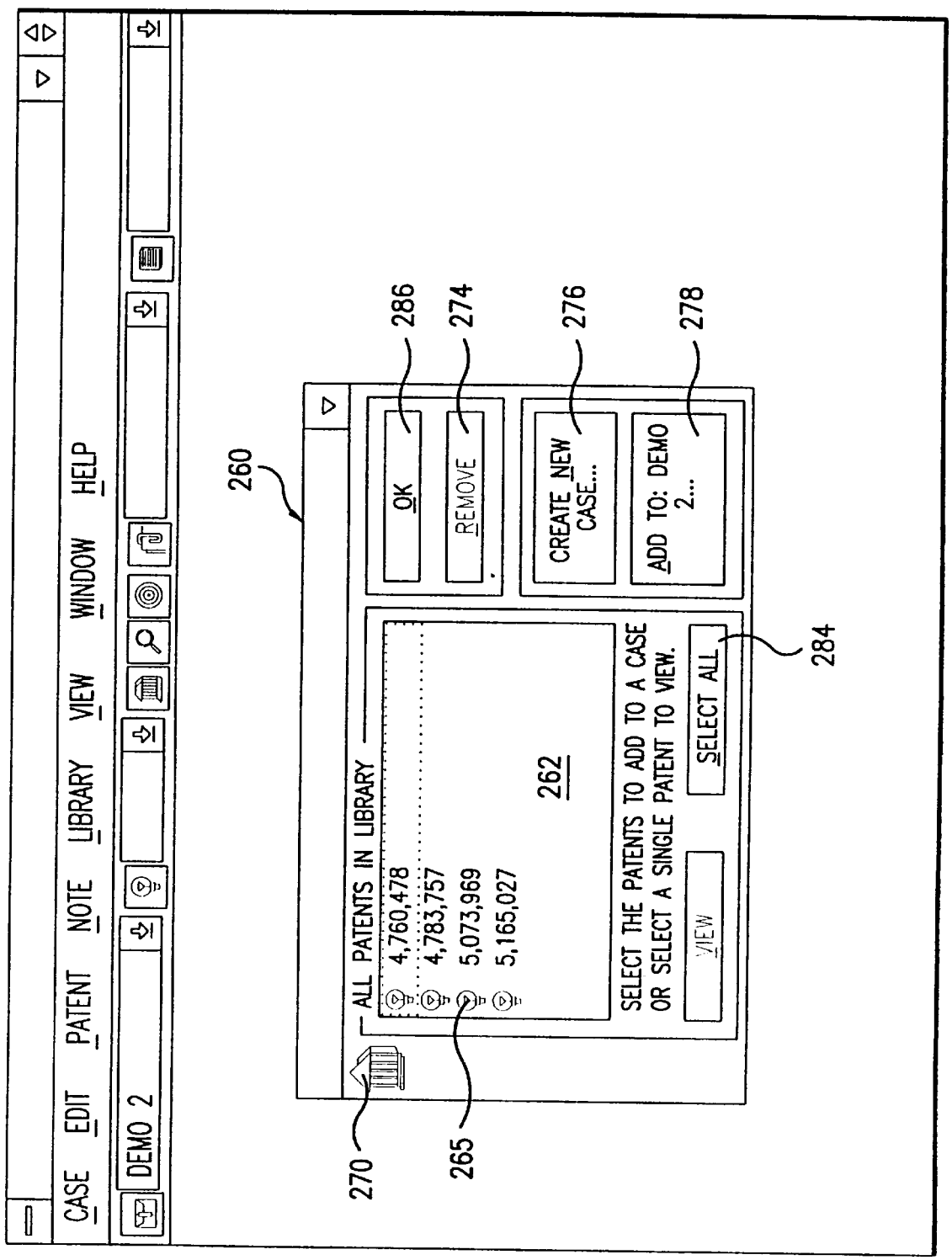
FIG. 19 illustrates the present invention's Library dialog box for working with the library currently in use.

Referring now to FIG. 19, the selection of a library (in the present example, the "bbb" library) results in the computer 48 in FIG. 3 generating and displaying a Library content dialog box 260. As shown, box 260 includes a field 262 in which all patents comprising the selected library are listed. In the example illustrated in FIG. 19, the "bbb" Library includes only four patents (U.S. Pat. Nos. 4,760,478; 4,783,757; 5,073,969 and 5,165,027). Additionally, all patents disposed within a library are identified by a light bulb icon 265 as well as the patent number as shown in the figure. Additional patent specific information may also be included such as inventor's name, assignee information, patent titles, etc. Box 260 further includes a patent library icon 270 to denote box 260 as comprising library patents, as opposed to case patents which will be described below. Box 260 further includes a variety of other button functions, such as a "remove" button 274 to remove a patent from the library, a "create a new case" button 276 for creating a new case from within the library box 260, and an "add to" button 278 for adding patents to a case.

In addition, as illustrated in FIG. 19, box 260 includes a "select all" button function 284 to choose all patents in the library window 262 to add. A user may select a single patent to view, in which case, the computer displays the patent Equivalent File in the equivalent window 160 illustrated in FIG. 14. The selection of an OK button 286 dismisses the window 260 and executes the function which the user has selected.

Figure 20:
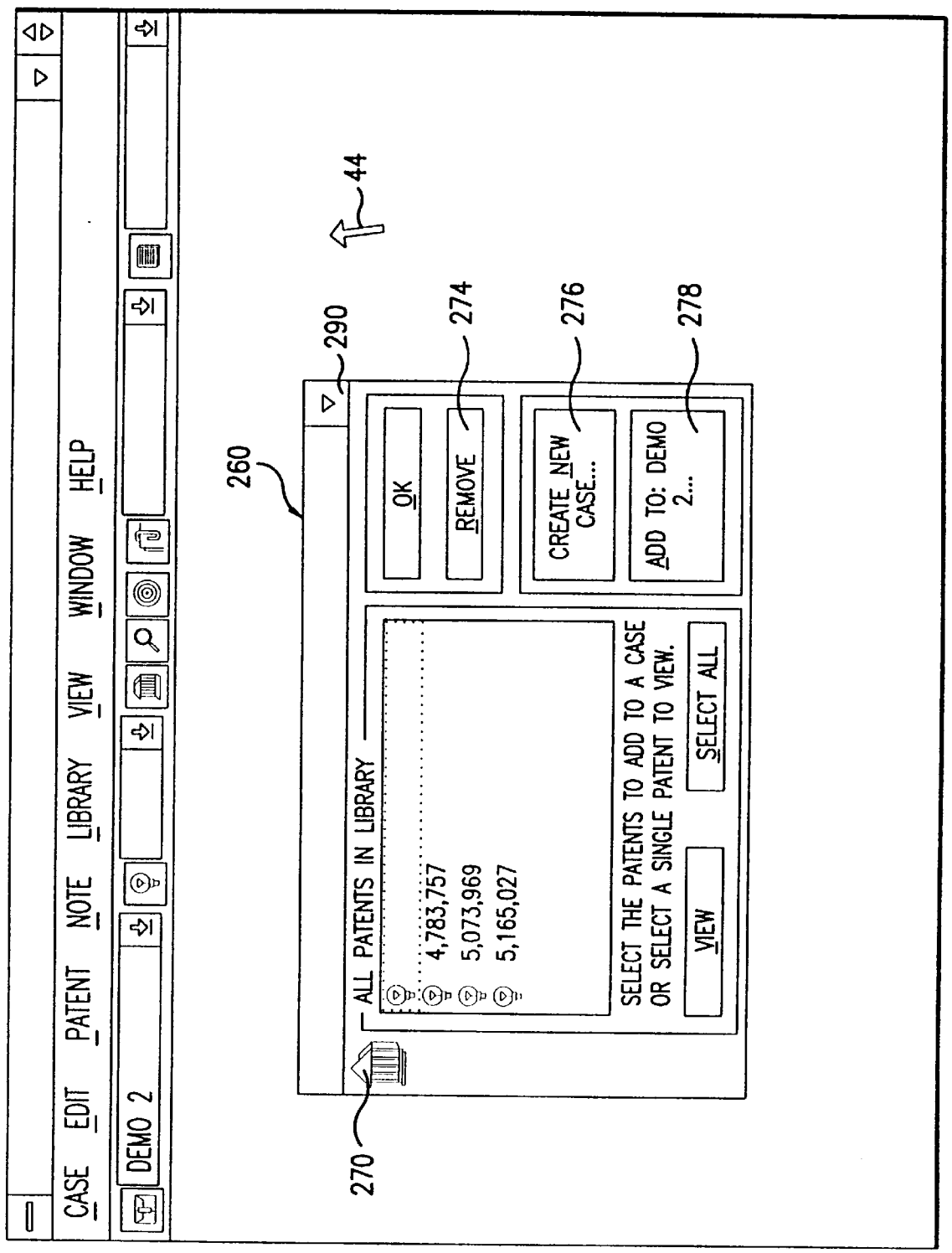
FIG. 20 illustrates the selection of a patent within the Intel® Library.
Figure 21:
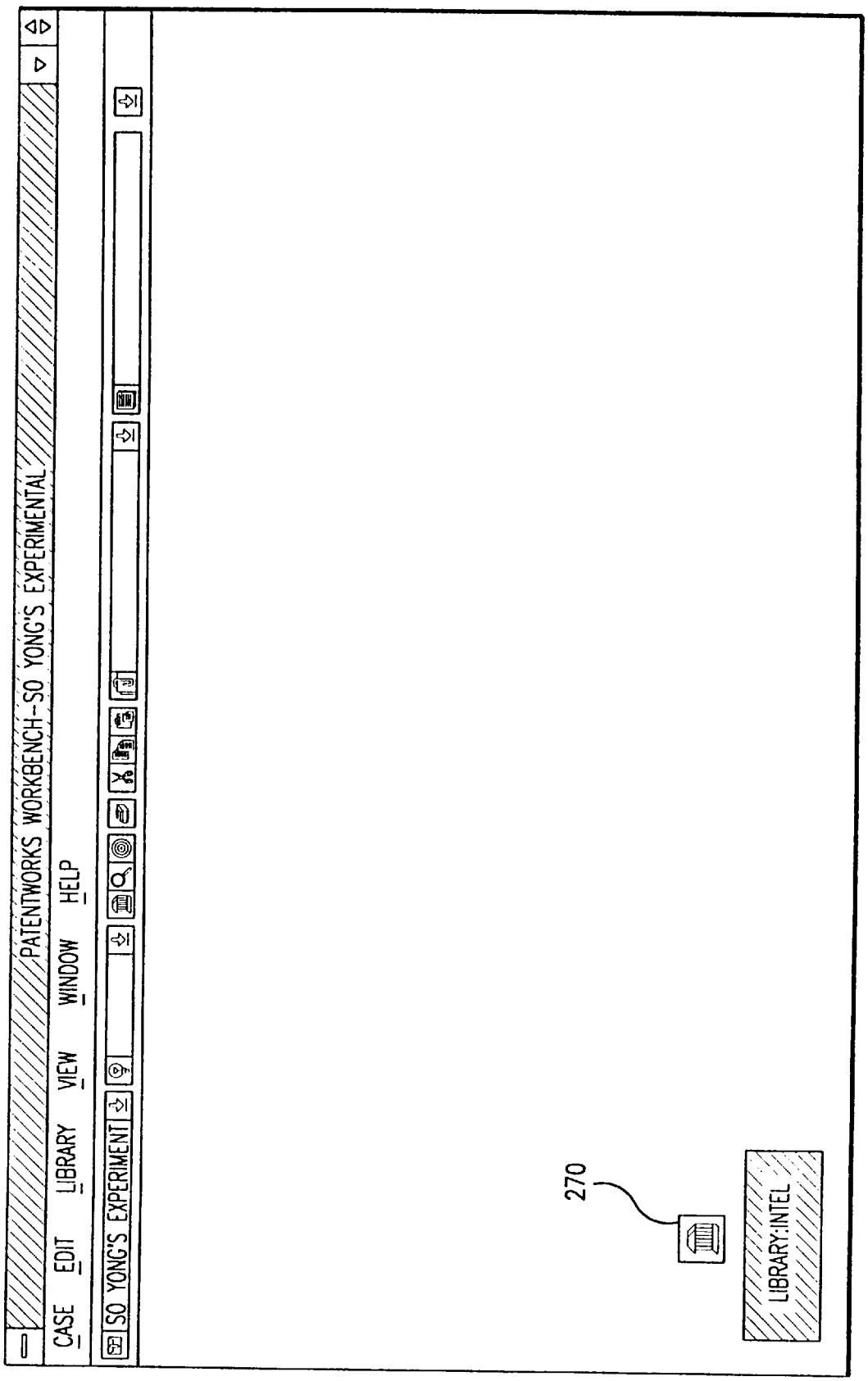
FIG. 21 illustrates the present invention's minimization of a library to an icon.

As shown in FIG. 20, the selection of Patent '478 by the user results in that patent being highlighted on the display. Box 260 further includes a downward arrow button 290 to minimize box 260 into the library icon 270, as shown in FIG. 21. To minimize box 260, cursor 44 of FIG. 3 is placed over button 290, and the mouse 42 of FIG. 3 is momentarily clicked. Computer 48 of FIG. 3, sensing the momentary depressing of switch 46, minimizes the box 260 as shown in FIG. 21 as the library icon 270 identified by the name of the library which has been minimized.

Figure 22:
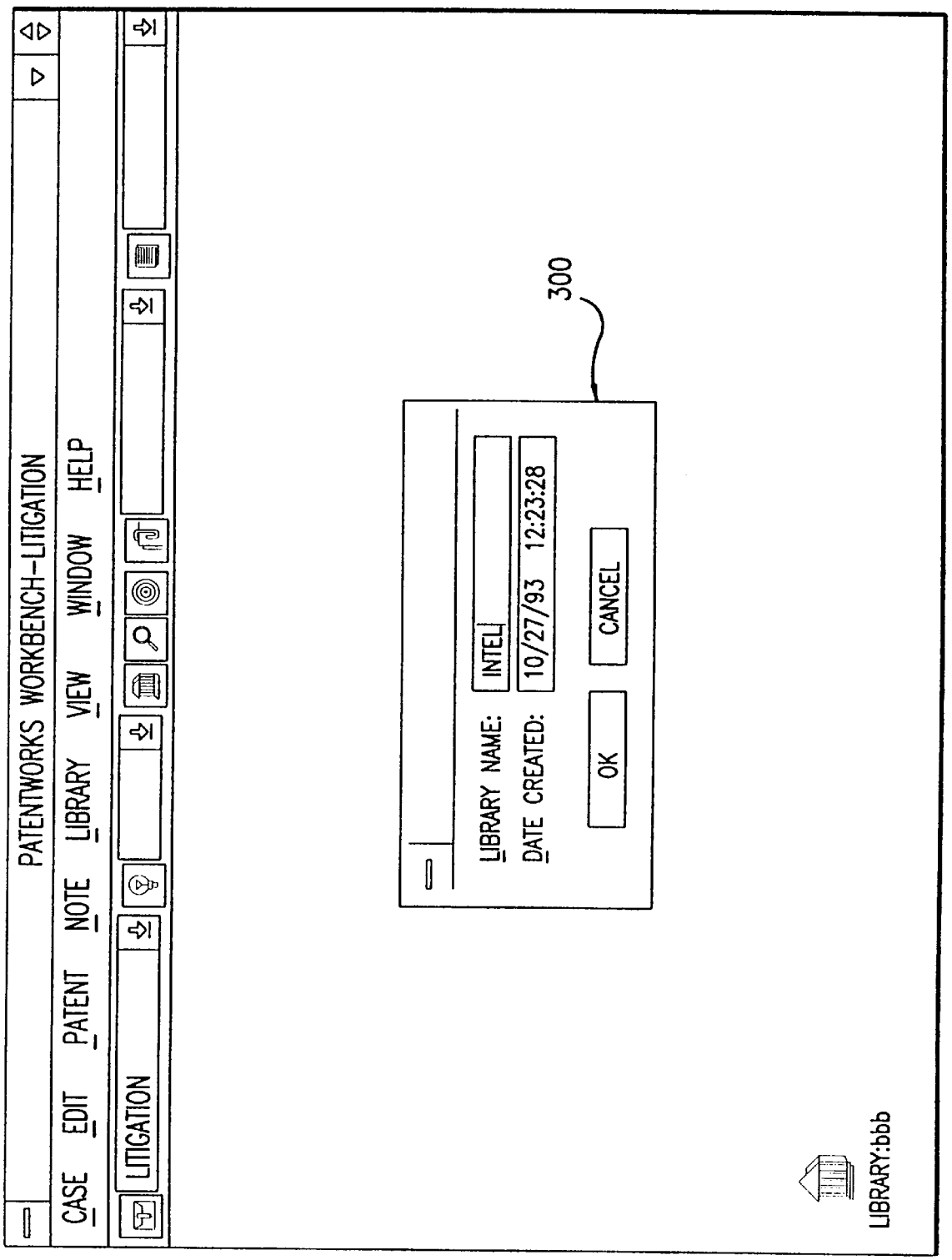
FIG. 22 illustrates the present invention's Update Library dialog box for updating the library currently in use, which in the present example, the Intel® Library.

The selection of the Update Library sub-command item within menu 150 of FIG. 15 results in the display of an Update Library dialog box 300 illustrated in FIG. 22. It will be noted that the Update Library box 300 refers to the current library in use, namely the Intel® Library in the present example. As shown in FIG. 22, the Intel® dialog box includes the name of the current library, the date of the update, as well as an OK button and a "cancel" button to cancel the box display. In the presently preferred embodiment, the Update Library sub-command may only be selected once a library has previously been selected.

Figure 23:
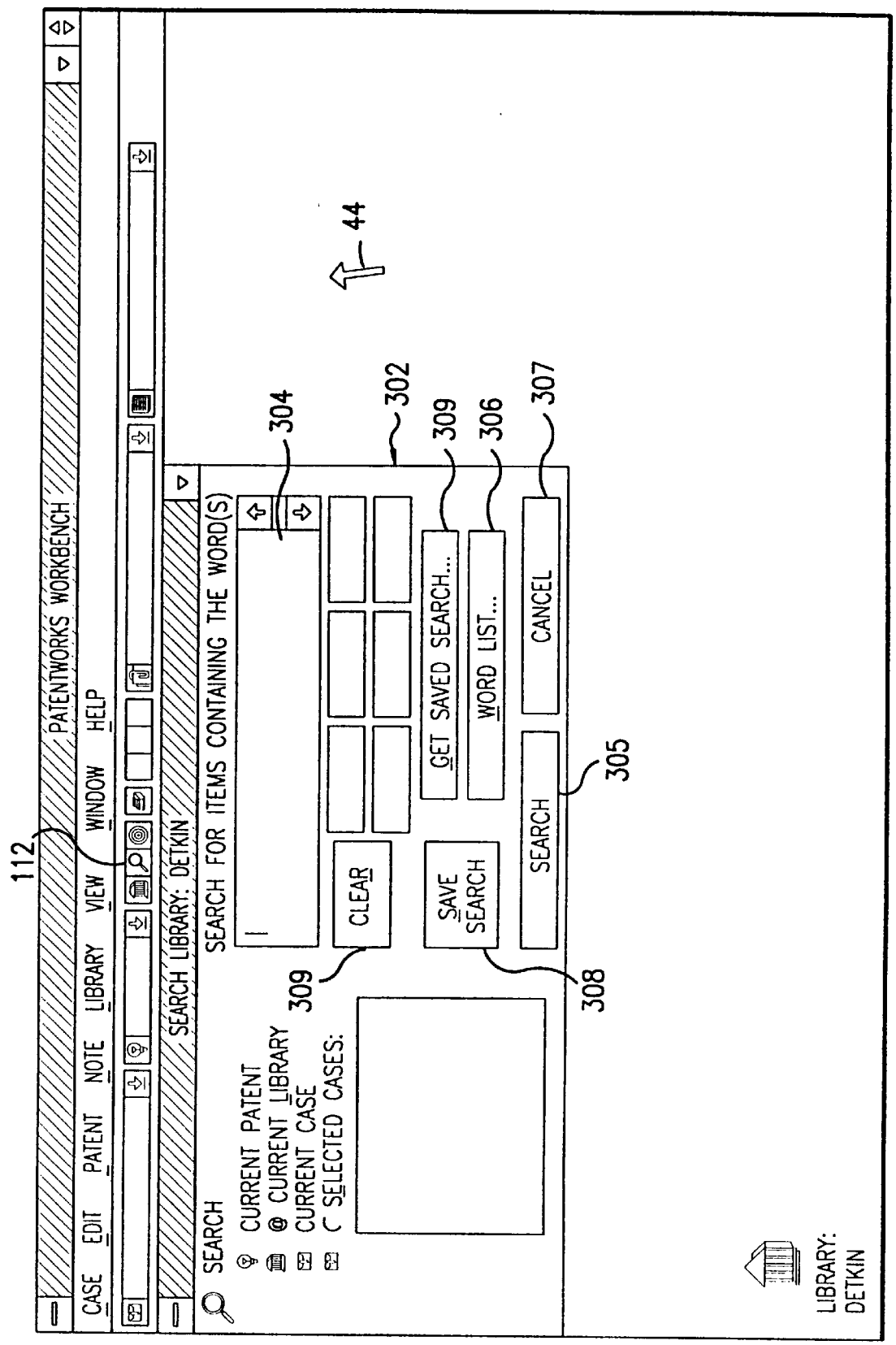
FIG. 23 illustrates the present invention's Search Library dialog box which is displayed upon selection of the Search sub-command item from the library menu.

Referring now to FIG. 23, the selection and operation of the Search sub-command from the menu 150 of FIG. 15, or from the search icon 112, will be described. Upon the selection of the Search sub-command item, the computer 48 in FIG. 3 generates and displays a Search Library dialog box 302 with the option to search in the current patent, current library, or current case. In operation, once the location of the search has been selected (for example, to search the current library), the user has the option to input various search words in a search word field 304 within the box 302, which may include Boolean terms such as "AND", "OR", and other logical search terms, such as for example, proximity searches within five, ten or twenty five words of a selected word. Additionally, the user may recall previously saved searches (button function 309), view word lists from selected patents being searched (button function 306), and save the current search (button function 308), or exit the dialog box by depressing a cancel button function. A variety of logical Boolean terms are predefined as button functions such as AND, OR, as well as other common search expressions to assist the user in defining the search. As shown in FIG. 23, box 302 includes a word list button function 306. The activation of the cancel button 307 results in the dismissal of box 302.

Continuing to refer to FIG. 23, additional features of the Search dialog box 302 will be described. As previously discussed, the Search dialog box enables a user to conduct a search for a phrase or group of phrases incorporating Boolean terms. The user may choose the current library, the current patent, or the current case from the menu option, as shown in FIG. 23. To conduct a search of patent notes, the reader is referred to the "find" command from the notes menu bar, to be described more fully below. Assume for example that a user desires to conduct a search. First, the user must select a desired scope of the search. The scope identifies how much information will be searched. The selection of the "current patent" in box 302 results in the currently active patent being searched. Upon completion of the search, all occurrences ("hits") of the search string will be highlighted in the text of the Equivalent File displayed in the equivalent window 160 in FIG. 28. The user may also search the current library by clicking on that option in box 302. If the current library is selected, the search will encompass the entire patent library currently open. Upon completion of the search, all patents in the library found to contain the search string will be listed in the Search Results dialog box which will be described with reference to FIG. 26. If the user selected the "Current Case" by clicking on that option in box 302, the currently open case will be searched. Upon completion of the search, all patents in the case found to contain a search string will be listed in the Search Results dialog box. It is also possible for the user, using the teachings of the present invention, to search for words containing sub-words or parts thereof. By entering words or numbers to find in field 304 of the box 302, and activating a Search button function 305, the search is initiated for the inputted words and/or numbers. A complex string search may be conducted by combining words with Boolean terms such as AND, OR, or proximity searches. As will be described, a user may also select a saved search or select words using a word list. A user may also select portions of text from the Equivalent Text File. A Clear button function 309 in the search library dialog box 302 enables the user to clear current search words which have been defined in the search window 304. The activation of the Clear button 309 results in the clearing of the entire contents of the window 304. Alternative methods for clearing are the use of a back space delete key from the keyboard 56 in FIG. 3. In addition, words can be copied and pasted onto the field 304 of the box 302.

With regard to the Boolean expressions, as is well known, the "AND" term results in all occurrences of a word AND a word to be searched. For example, searching the words "data AND device" will yield all occurrences of the term "data (and all occurrences of the word) device" throughout the entire search scope. For example, searching the string "data OR device" will yield all occurrences of either "data" or "device". An asterisk option signifies a wild card in the search term. This allows searching using incomplete words or a word which may contain additional characters to the term being search. For example, searching "de*" will find all the words in the search scope that begin with "de", such as "device", "denote", etc. The use of proximity searches within five, ten, or twenty five words is also well known, and supported by the interface of the present invention.

The Save Search button function 308 allows the user to save the search in a separate table which may be retrieved later for viewing, editing, or adding into other searches by clicking on the "Get Saved Search" button function 309. The Get Saved Search button function 309 lists all previously saved searches. A user may select any of the previously searched items to view. The saved searches are listed in alphabetical and chronological order. The activation of the button function Word List 306 results in a list of all words which exist in the patent or library.

Figure 24:
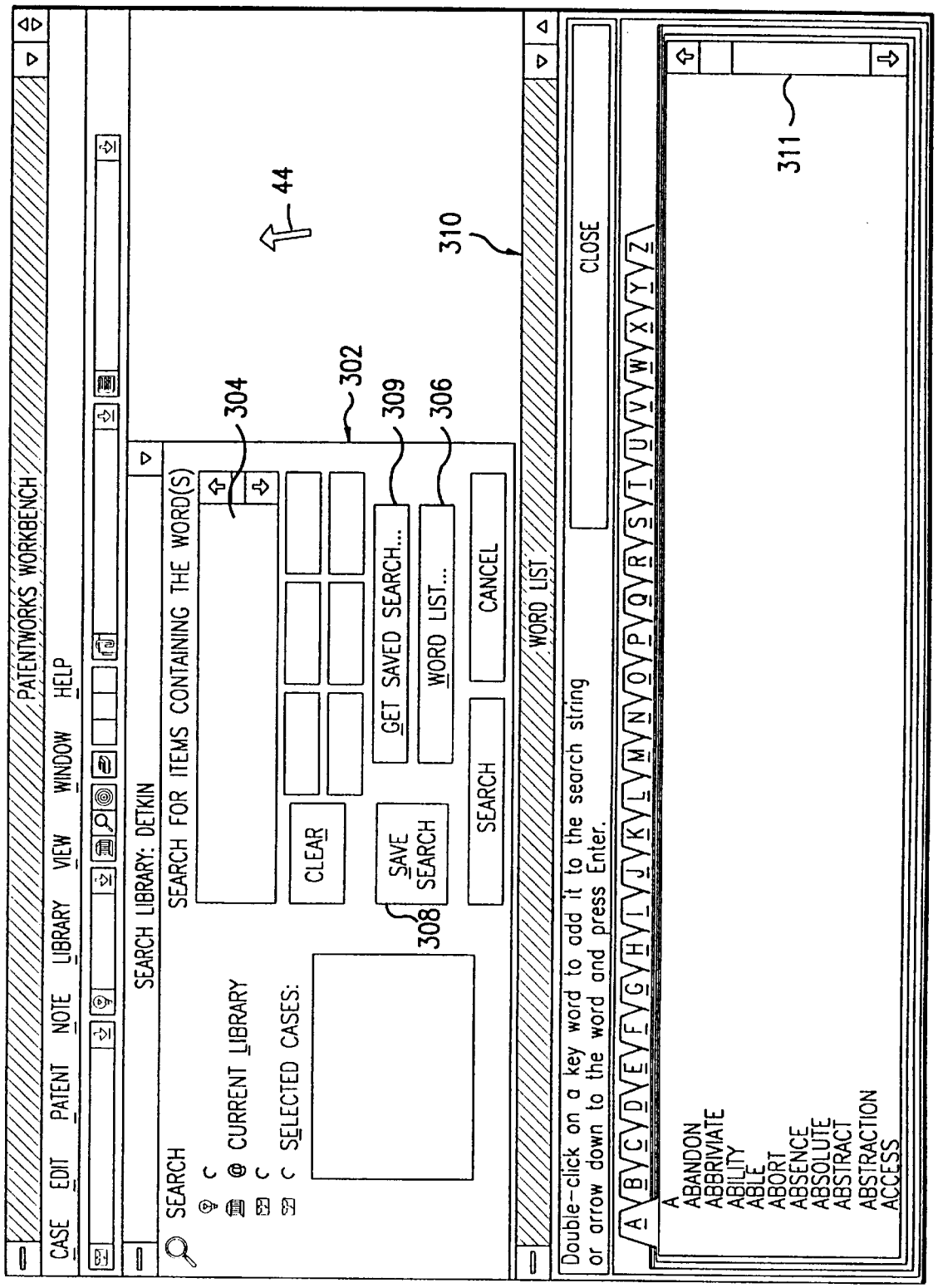
FIG. 24 illustrates the present invention's Word List dialog box which is displayed upon the activation of the Word List button function within the Search library dialog box.
Figure 25:
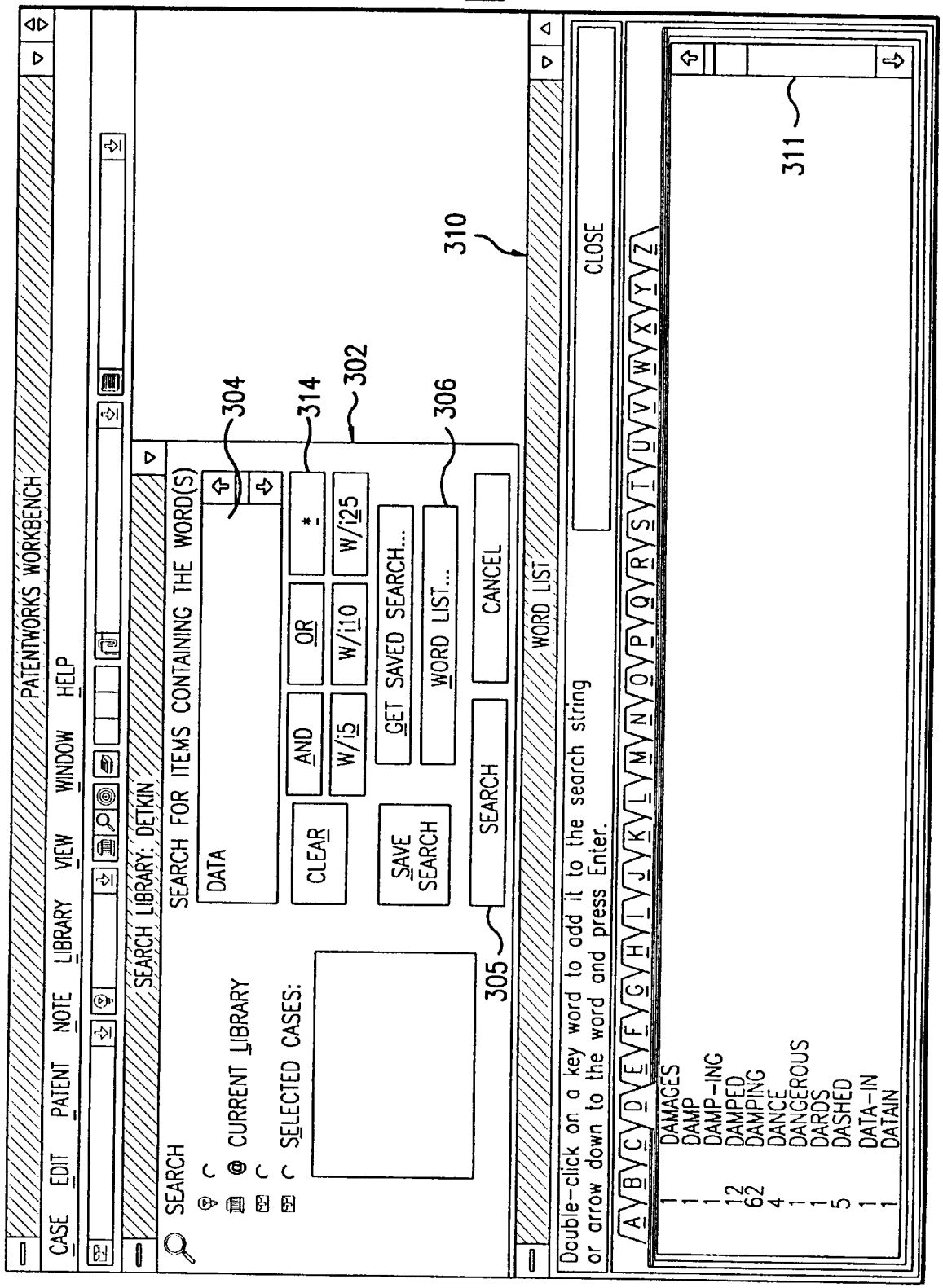
FIG. 25 illustrates the operation of the present invention's Word List dialog box for selecting an alphabetical tab and viewing the corresponding list of words from the library patents.

Referring to FIG. 24 and FIG. 3, the placement of cursor 44 over the Word List button function 306, and the momentary depression of switch 46 on the mouse 42, results in the generation and display of a word list dialog box 310, illustrated in FIG. 24. The word list dialog box 310 includes an alphabetized listing of all words which exist in the selected patent, or all patents in a library, with a numerical identifier indicating the number of times the particular word occurs appearing in the left hand column of the word list. For example, within the Detkin Library and the selected patent, the word "abandon" occurs seven times. Similarly, the word "ability" occurs two times. By placing cursor 44 over a letter tab of the list, the user is able to quickly maneuver through the Est of words. For example, as shown in FIG. 25, by placing cursor 44 over the letter "D" and momentarily clicking switch 46, computer 48 generates and displays a listing of all words beginning with the letter "D" within the selected patents within the field of search identified in box 302. In addition, it will be noted that through the use of a scroll bar 311, the word list is scrollable. The selection of the word "data" from the word list results in the word automatically appearing in the search window 304. Placing the cursor 44 over the "wild card" (*) button function 314, permits the user to identify all words which begin with the selected word and any additional characters following the word. For example, if the user has selected the letters "de" and attached a wild card* at the end of the word (for example, de*), then the search dialog box 302 will locate all words which begin with the letters "de" and have any ending attached thereon. In addition, the "wild card" (*) may be placed in front of a suffix. For example, ff the user enters the word "*tion", the search dialog box 302 will find all words which end with the letters "tion".

Figure 26:
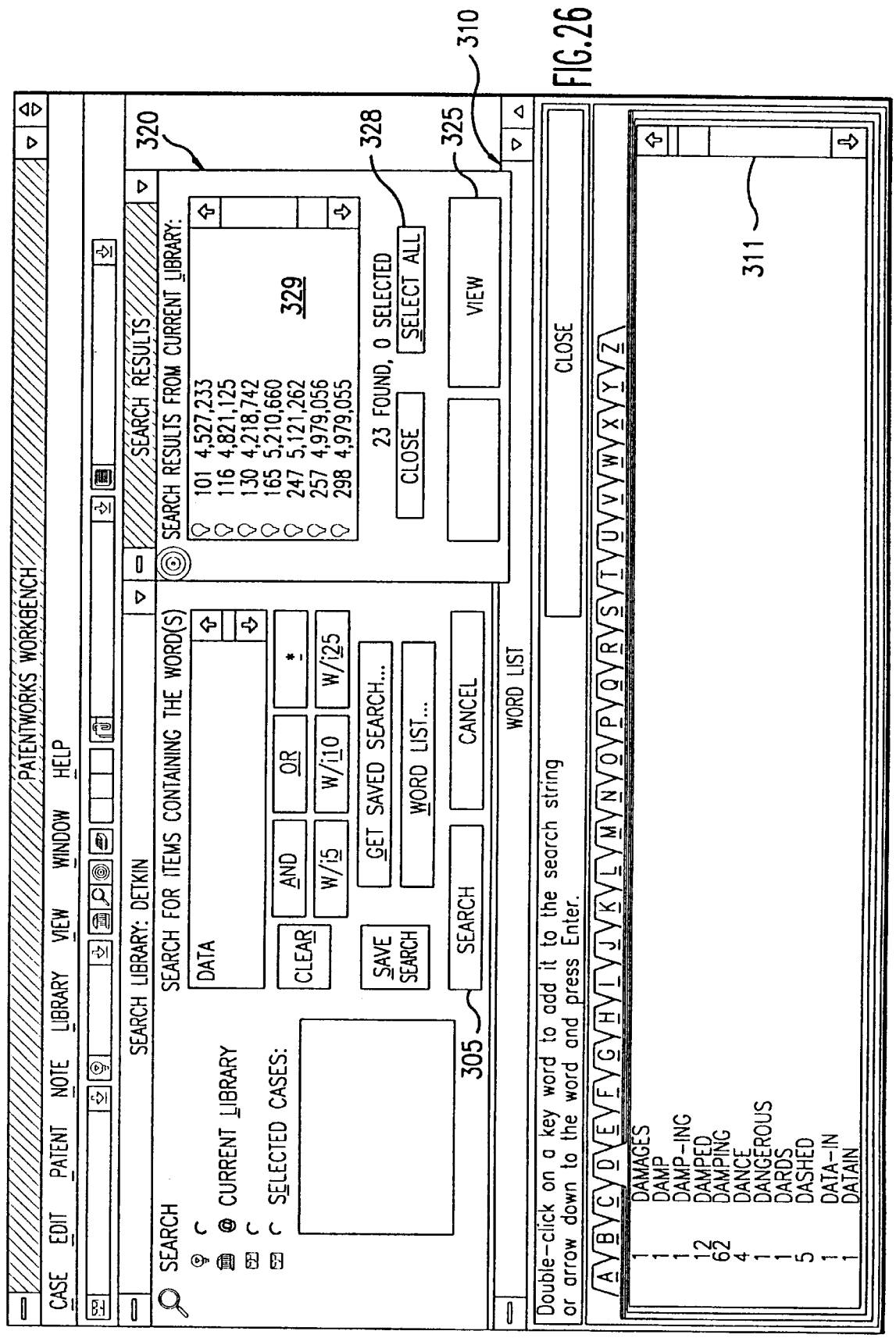
FIG. 26 illustrates the present invention's Search Results dialog box identifying the number of occurrences of the search term defined by the user in each of the library patents.

Assume for example that the user desires to initiate the search identified in FIG. 25 having the search word "data" in window 304 for the current library. By placing the cursor 44 over the search button of the box 302 and clicking switch 46, computer 48 in FIG. 3 generates and displays a Search Results box 320, as shown in FIG. 26. The Search Results box 320 lists the number of times the selected word occurs in all of the patents of the particular library. In the present example, the Detkin Library comprises twenty three patents that contain the search word, "data". The display area 329 shows the '233, '125, '742, '660, '262, '056 and '055 patents. The other sixteen patents will appear in the display over 329 as the user scrolls the area 329 down. As shown in FIG. 26, the search term "data" occurs 101 times in patent '233, and 247 times in patent '262. Additionally, it will be noted that the Search Results box 320 identifies the number of patents in which the search term was located, and the number of patents which are selected. The user may now select a patent to view each of the occurrences of the word "data". Moreover, the Search Results box 320 includes a button function to create a new case, or the user may add the patents to a current case using a separate button function.

Assume for example that the user desires to view the Equivalent File of patent '233. The user places the cursor 44 of FIG. 3 over a portion of the patent search result listed in box 320. For example, the user may place cursor 44 over the light bulb icon, the number of occurrences (in the current example, 101) or any portion of the patent number, and momentarily depress switch 46. The selection of a patent within box 320 results in the computer 48 of FIG. 3 highlighting the selection. Double-clicking on the selection, or the activation of the View button function 325 results in computer 48 displaying the Equivalent File of the library version of the patent, and displaying all instances of the search term (in the present example, the word "data"). As illustrated in FIG. 28, in the presently preferred embodiment of the invention, the Equivalent File of the selected patent is displayed on display 68 of FIG. 3 in the left hand portion of the screen 68 within an Equivalent window 160. The repetitive activation of the right arrow button 351 results in the navigation to each "hit" of the search term in the equivalent patent text. Also illustrated in the figures as part of the equivalent window 160 are (+) button functions 372 and (−) button function 374 (see for example, FIG. 27). The activation of the plus function 372 or minus function 374 results in computer 48 of FIG. 3 displaying the Equivalent File, in increments based on the column numbers. For example, the activation of the plus button 372 will result in the next column of the patent being displayed in the Equivalent window 160. The activation of the minus button 374 results in a decrement so that the previous column of the patent is displayed. Additionally, the present invention supports the scrolling of the Equivalent File in window 160, such that the text may be scrolled through any displayed column.

As illustrated in FIG. 26, the Search Results dialog box 320 includes a Select All button function 328. The activation of the Select All button function 328 results in the selection of all patents in the results list displayed in area 329. The selected patents can be added to the current case or create a new case with the search results displayed in area 329.

Figure 27:
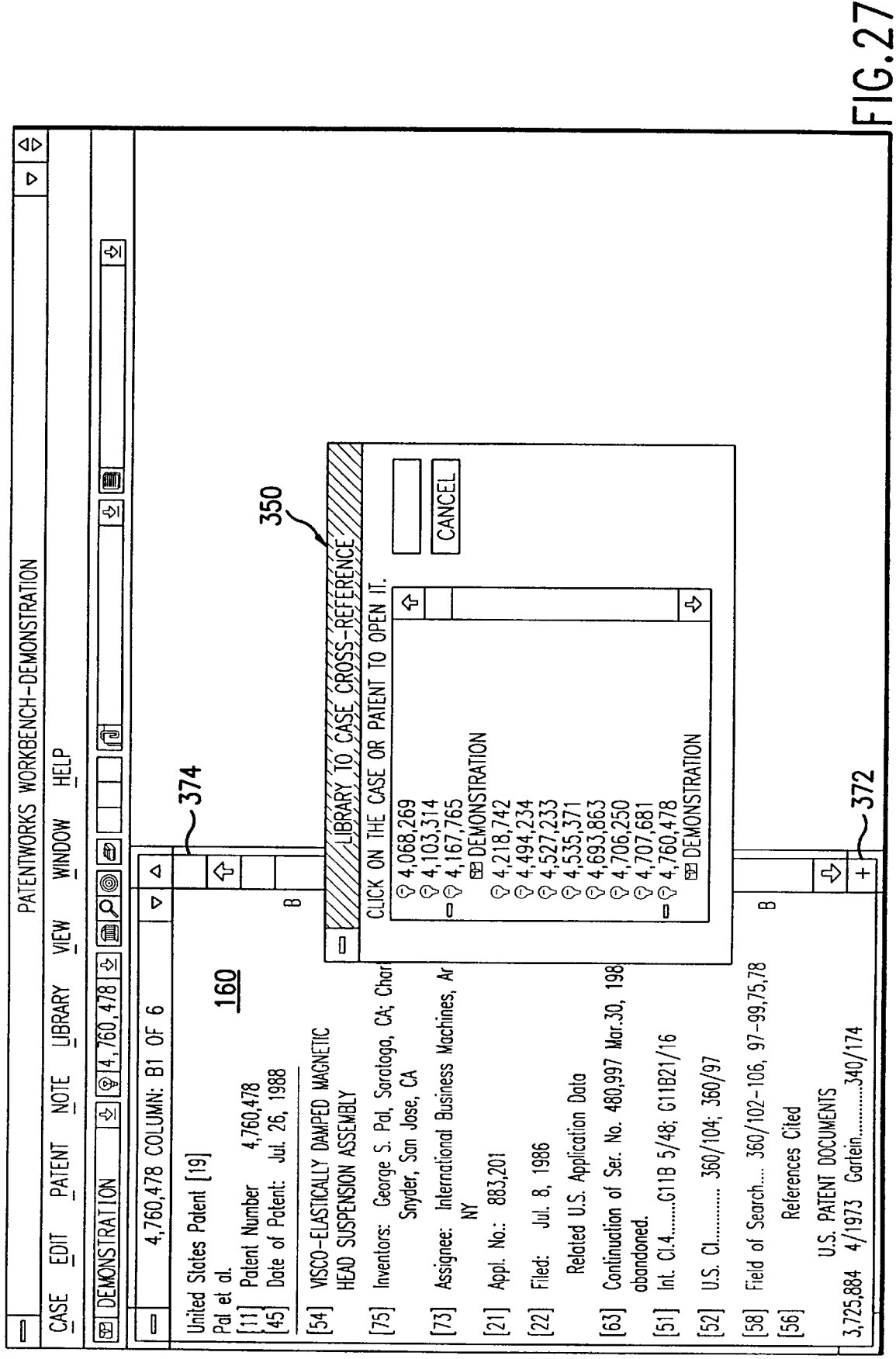
FIG. 27 illustrates the present invention's Library to Case Cross Reference dialog box.
Figure 28:
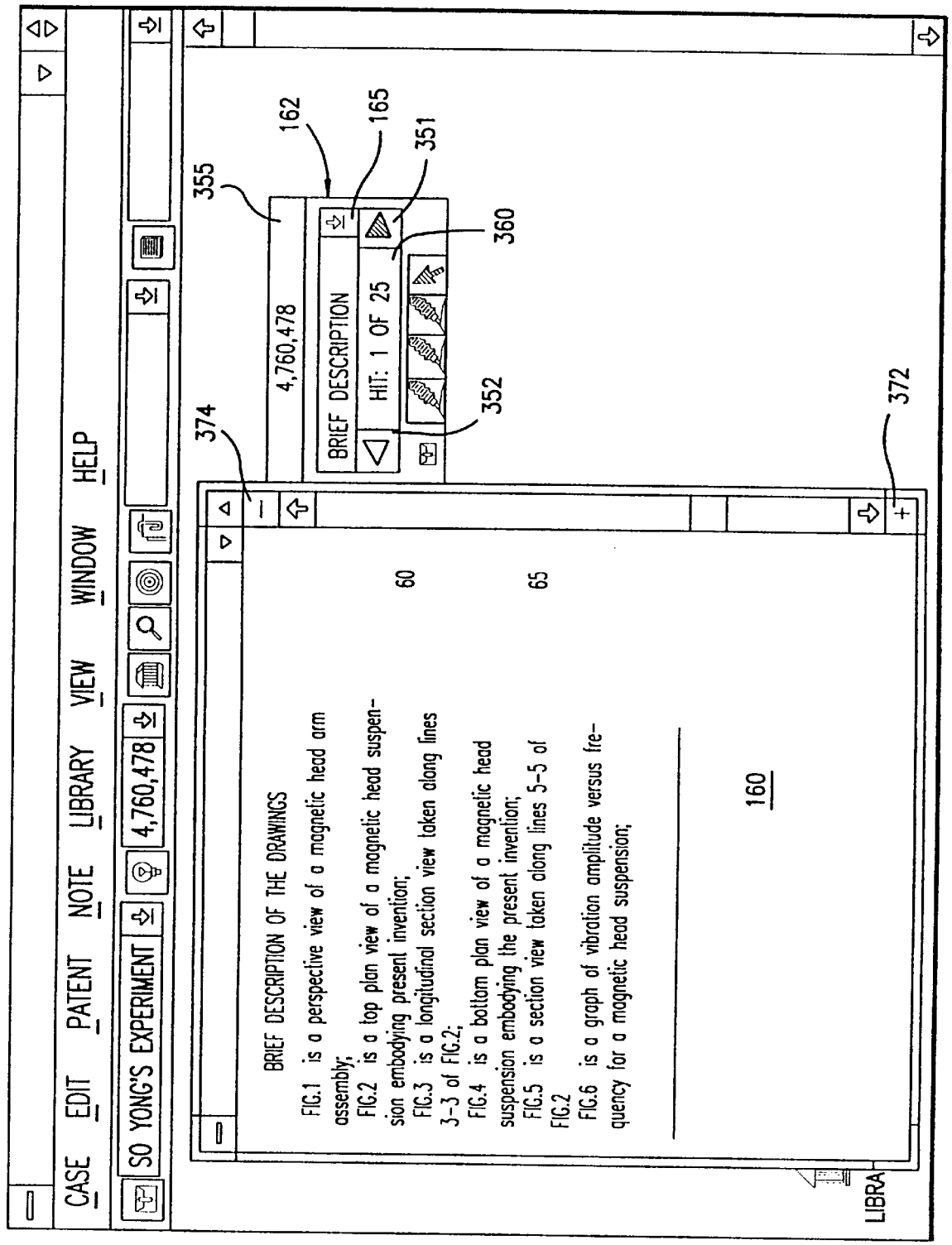
FIG. 28 illustrates the present invention's Patent Text Toolbox for operating upon Equivalent Files displayed in an equivalent window.

As illustrated in FIG. 27, the selection of the button function Library/Case Cross-reference from menu 150 (see FIG. 15) results in the display of a Library to Case Cross Reference dialog box 350. The Library/Case Cross-reference dialog box 350 permits the user to view a list of all patents on the current library cross referenced to the cases in which they are utilized. As illustrated, the dialog box 350 "floats" over the other displayed windows, such as for example, the equivalent window 160, and may be selectively placed at any location on screen 68 of FIG. 3, as may many of the present invention's dialog and control boxes.

Assume for example that the user selects the view button function 325 of the Search Results dialog box 320 in FIG. 26. The computer 48 of FIG. 3 displays the Equivalent File of the selected patent (in the example of FIG. 28, the '478 patent) and highlights all instances of the search term occurring in the Equivalent File displayed in equivalent window 160. Additionally, computer 48 generates and displays the Patent Text Toolbox 162, which takes the form of a window which may selectively be moved and retained anywhere on screen 68 in FIG. 3. As shown, Patent Text Toolbox 162 includes a number of button functions including a right arrow button function 351, a left arrow button function 352, a patent identifier box 355 which identifies the currently displayed patent, and a down arrow button 165 which, upon selection, displays a menu including section headings of the patent currently being displayed. As illustrated, the Patent Text Toolbox 162 further includes a "Hit" window 360 which identifies the occurrence number of the search term. For example, in column 3 of the '478 patent illustrated in FIG. 28, the first occurrence of the search term would be described in window 360 as "Hit 1 of 25", where the total number of occurrences of the term number 25. By activating the right arrow button 351, the next Equivalent File is scrolled to the occurrence of the search term in equivalent window 160.

In FIG. 28, the sub-heading "Brief Description" is currently selected. By activating button 165, all other headings of the patent (for example, Background of the Invention, Prior Art, etc.) are displayed for the particular patent as previously described with reference to FIG. 14. It should be noted by the reader that the listing of headings displayed by the activation of button 165 is a listing of the actual headings in the patent selected. Since patents, like many other documents, are tailored by the author of the document and identified by unique headings, computer 48 of FIG. 3 generates and displays the actual headings used in the particular patent which was selected, as opposed to pre-defined headings which may or may not apply to the specific patent which is being viewed.

Figure 29:
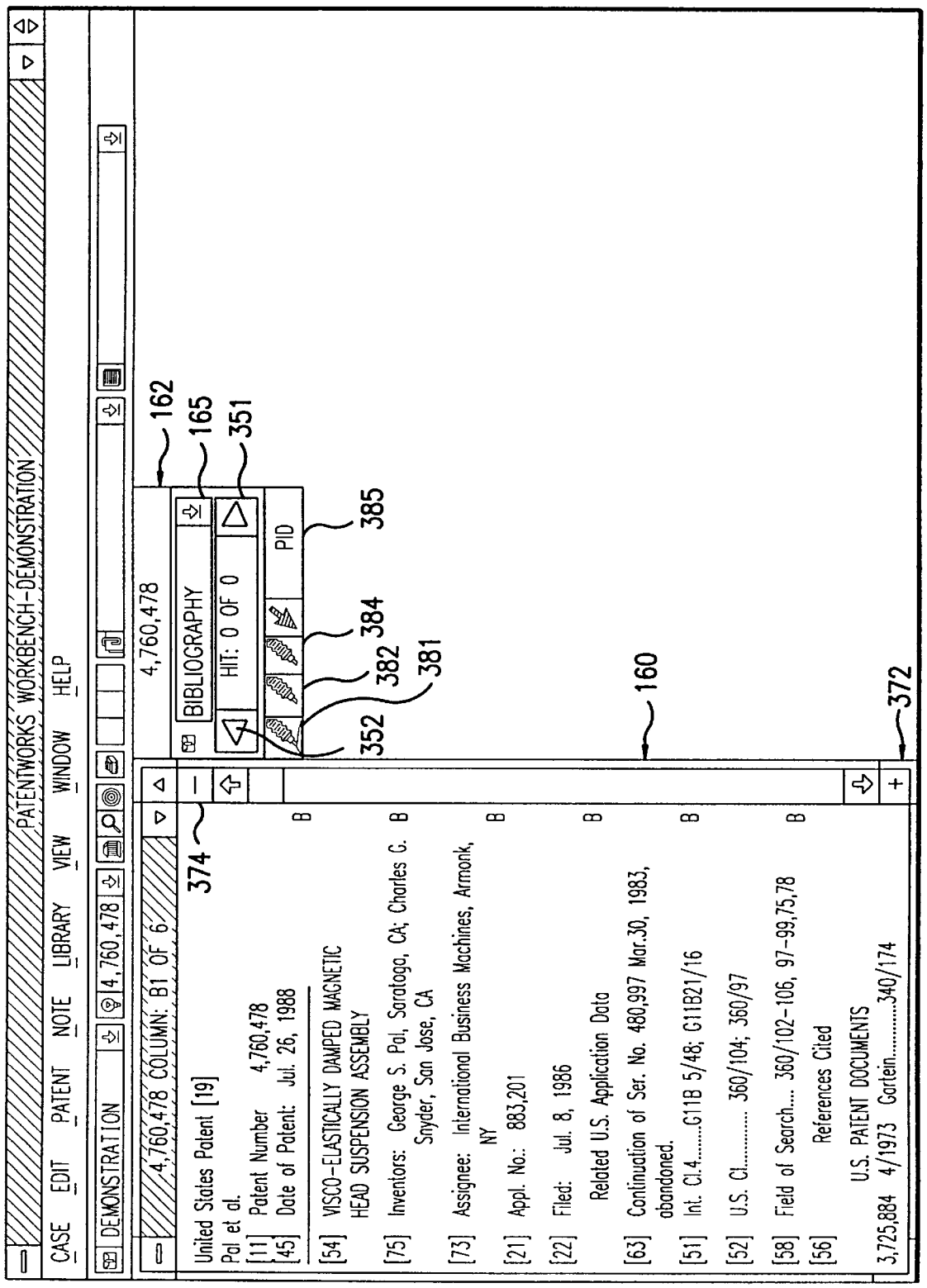
FIG. 29 further illustrates the present invention's Patent Text Toolbox for operating upon the Equivalent File within the equivalent window.

With reference now to FIG. 29, Patent Text Toolbox 162 includes a plurality of marker icons 381, 382, and 384, which represent markers of varying colors for highlighting portions of the text in the displayed Equivalent File, as will be described more fully below. A pen icon is also provided for identifying portions of patent text. As previously described, the activation of right arrow button 351 results in computer 48 of FIG. 3 scrolling through each sequential instance ("hit") in which the search word is encountered after the first instance. By activating left arrow button 352, the reverse order will be generated by the computer 48 of each instance of the selected search term. As the instances of the search term are incremented or decremented, respectively, the window 160 is updated (e.g. "hit 5 of 24", "hit 2 of 24", etc.). Moreover, it will be noted that in FIG. 28, the Patent Text Toolbox 162 also includes a library icon or a case icon. The display of a library icon indicates that the Equivalent File of the patent displayed in the Equivalent window 160 is a library copy. As a library copy, the user may not make notes or highlight the Equivalent File. A working Equivalent File is denoted by a case icon (similar to icon 106) in place of the library icon (see FIG. 29). As described herein, the working Equivalent File may be searched, annotated and/or highlighted by the user.

Further, it will be noted that the current heading identifier (for example, "Brief Description") illustrated in the box 162 corresponds to the text displayed in the upper portion of window 160. Thus, in the example illustrated in FIG. 29, the bibliography begins at column B1. Since the upper portion of the display window 160 displays the bibliography of the patent, the heading identifier within box 160 identifies the currently viewed portion of the patent as the "Bibliography".

Figure 30:
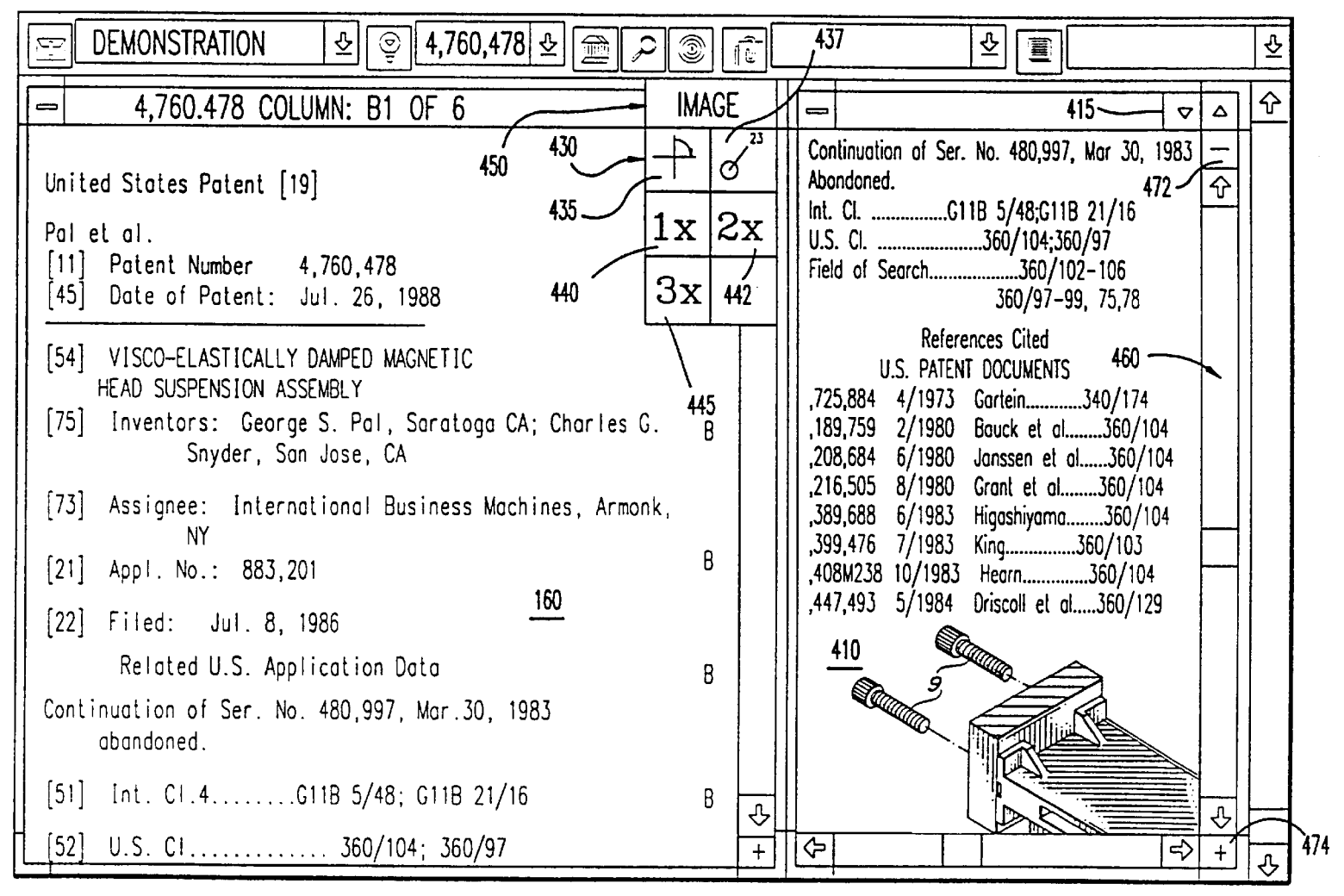

Referring now to FIG. 30, the Equivalent File of patent '478 includes location identifiers for various sections of the Equivalent File displayed. In the example illustrated in FIG. 30, the Bibliography section of the patent is identified by the letter "B". The letter B (400) appears vertically along the length of the column BI in the patent equivalent '478. In the presently preferred embodiment, the B identifier 400 is in the color blue. Referring to FIG. 30 and FIG. 3, placing the cursor 44 over any one of the letter Bs and clicking switch 46 on mouse 42, the corresponding bitmapped image file of the Bibliographic official United States patent document is displayed in an image window 410 on display 68. The linking between the Equivalent File displayed in Equivalent window 160 and the PTO Image File displayed in image window 410, was previously described with reference to synchronization in this specification.

The present invention provides the user with the ability to view multiple versions of the same patent on display 68 in FIG. 3. In FIG. 31, the patent Equivalent File displayed within the window 160 represents the searchable ASCII text equivalent of the official United. States patent, as previously described in this specification. The patent image displayed in image window 410 of the screen 68 represents the PTO Image File of the official United States Patent, including the figures for the patent. As previously noted, the image patent in window 410 is not searchable, and is not in an ASCII text format, but may be manipulated and enlarged within the window 410 as may any bitmapped image. As shown in FIG. 30, window 410 includes a down arrow button function 415 that is used to minimize window 410 and a minus button function 420 (see FIG. 31) that is used to scroll down the window 410 by page. Also illustrated in FIG. 30 is a Patent Image Toolbox 430, which may be selectively positioned anywhere on display 68 by the user. Patent Image toolbox 430 includes a variety of functions which may be employed when operating on the patent image in window 410. One of these functions includes a rotate image icon 435 which, upon activation, rotates the image horizontally, then back vertically, if the icon 435 is activated again. The Patent Image Toolbox 430 further includes a Go To element icon 437, which, upon activation, permits a user to type in using keyboard 56 of FIG. 3, an element number (from, for example, a drawing displayed in image window 410). The computer of the present invention then searches the Equivalent File of the patent displayed in Equivalent window 160 and displays that portion of the Equivalent File in which the first instance of the element number is described. The Patent Image Toolbox 430 also includes various magnification icons, for example, a "1X" icon 440, a "2X" icon 442, and a "3X" icon 445. The activation of icon 442 results in a zoom option, such that medium resolution is achieved and the image displayed within the image window 410 is enlarged. The activation of icon 445 results in a three times zoom option to permit a user to view images displayed within image window 410 with the highest degree of resolution in the presently preferred embodiment.

As illustrated in FIG. 31, the toolboxes of the present invention may be selectively placed at any location on the screen 68. To move a toolbox to a different location, cursor 44 of FIG. 3 is placed over a portion of a top bar area (for example, top bar 450 of box 430 in FIG. 30, or top bar 455 of box 162 in FIG. 31). Referring to FIG. 31 and FIG. 3, once the cursor 44 is placed over the top bar area of a toolbox, switch 46 is depressed, thereby resulting in the effective coupling of the cursor 44 to the toolbox. The movement of the mouse 42 results in a corresponding movement of both the cursor 44 and the toolbox, such that the toolbox may be placed at any location on screen 68. Cursor 44 may be decoupled from the toolbox by simply releasing the switch 46.

Referring once again briefly to FIG. 30, it will be noted that the image window 410 includes a vertical scroll bar 460, and a horizontal scroll bar 470. Using the vertical scroll bar 460, the image displayed within the image window 410 may be scrolled vertically. Similarly, the use of the horizontal scroll bar 470 permits the horizontal scrolling of the image illustrated in the image window 410. Moreover, a minus function ("−") 472 and a plus ("+") function 474 are provided along the vertical scroll bar 460. Functions 472 and 474 permit a user to navigate through images of both the drawings and text (the complete PTO Image File) of the patent displayed within the image window 410. Accordingly, it will be appreciated by one skilled in the art, that a user may view the image of a patent in window 410, and the text equivalent in equivalent window 160, in an unsynchronized manner, or in a synchronized fashion, as described herein. The keyboard 56 in FIG. 3 includes a "up PG" key and a "down PG" key to allow for the unsynchronized viewing of the images within window 410 as well.

Referring now to FIG. 32 and FIG. 3, there is shown the example wherein cursor 44 is placed over down arrow button 165 of the control box 162 and switch 46 is activated. Computer 48 generates the list 170 which displays the various groupings found within the displayed patent (in the present example, patent '027). As shown, patent '027 includes a "Bibliography", an "Abstract", "Background of the Invention", Brief Description of the Drawings", Detailed Description of the Invention", and "Claims". By placing the cursor 44 over any of the sections listed in the list 170, and clicking switch 46, computer 48 displays the selected text portion of the Equivalent File (for example, "Bibliography" in FIG. 32) within window 160.

Figure 33:
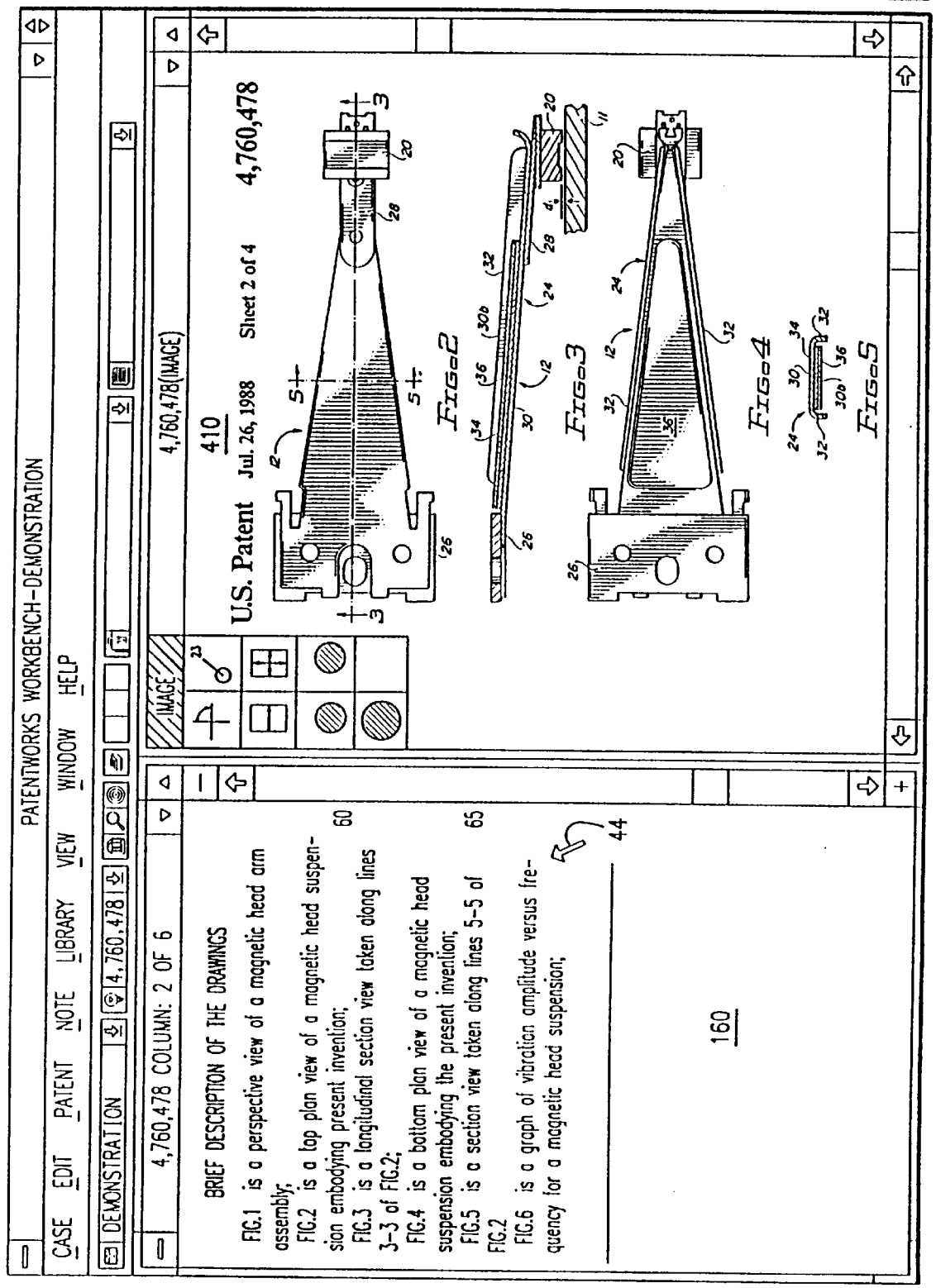
FIG. 33 illustrates the present invention's synchronization of an Equivalent File displayed in the equivalent window with the drawings of a patent disposed in an image file displayed in an image window on the display screen. The present invention links references to the figure numbers in the Equivalent File to the figures in the image file displayed in the image window.

Referring to FIG. 33 and FIG. 3, the present invention provides a mechanism by which a user may view corresponding patent drawings in the PTO Image File displayed in window 410, by selecting figure numbers in the Equivalent File within window 160. By placing cursor 44 over a figure number in the Equivalent File displayed in window 160, and momentarily double-clicking switch 46 on mouse 42, CPU 48 locates and displays the image of the corresponding figure within the image displayed in window 410 (see FIG. 33). It will be appreciated that the present invention's capability of locating and displaying the selected figure within the image window 410 is due to the synchronization of the Equivalent File in window 160 with the PTO Image File displayed within image window 410, as previously described in sections above. As will be appreciated, the synchronization of the Equivalent File with the PTO Image File, permits a user to place the cursor 44 over a reference to a figure within the Equivalent File, activate the cursor control device, and thereby view the corresponding figure within the image window 410.

Figure 34:
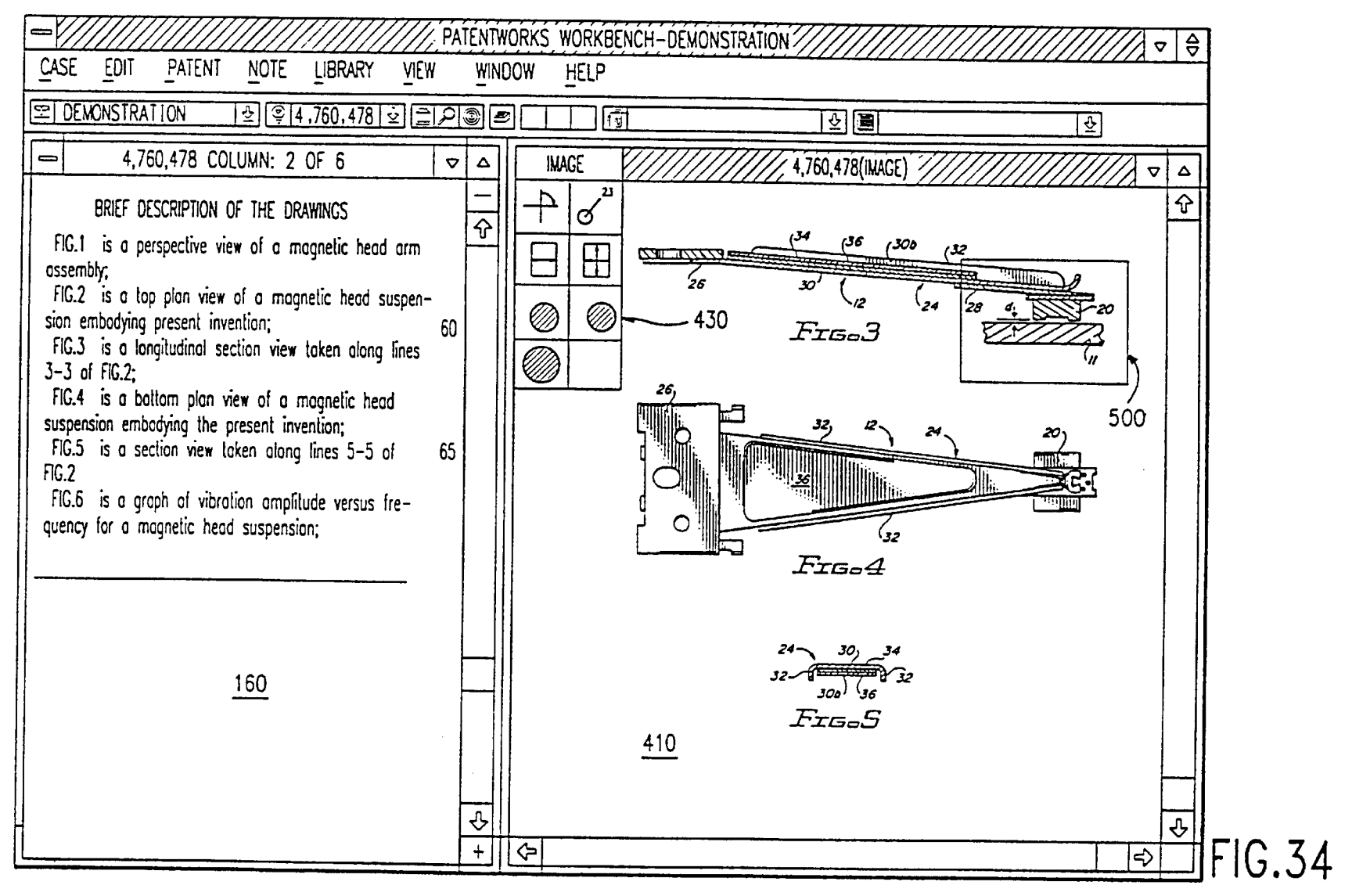
Figure 35:
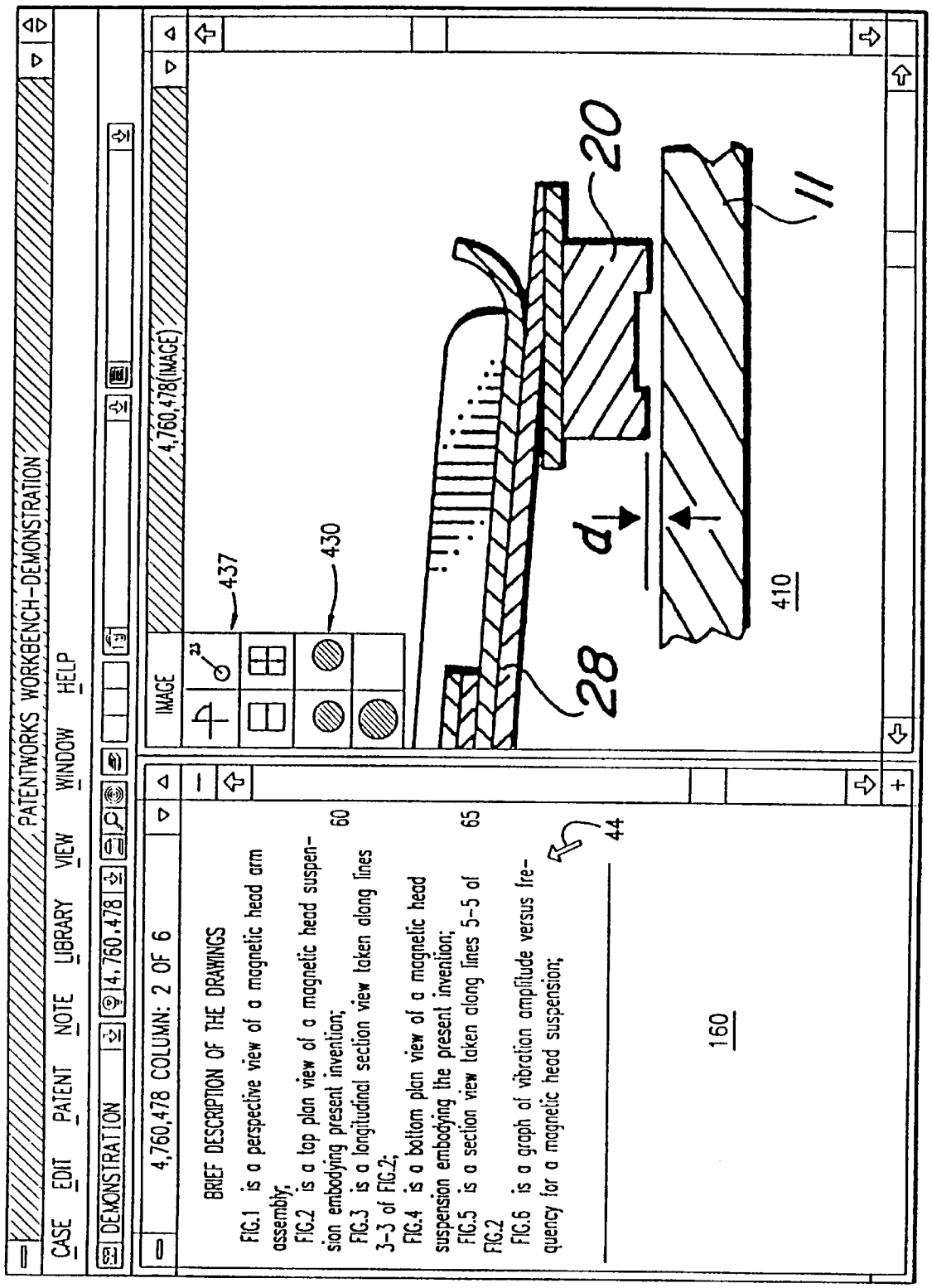
FIG. 35 illustrates the present invention's user interface in which an Equivalent File is displayed in an equivalent window, and simultaneously, an enlarged portion of a figure from the image file is displayed in the image window on the display screen.

To enlarge a portion of the figure displayed in the image window 410, the user places cursor 44 over the area of the image where the enlargement is desired and depresses switch 46. CPU 48 then generates a dynamic outline box 500 (see FIG. 34). By continuously depressing switch 46 and selectively moving mouse 42, the user defines an area within the outline box 500 to be enlarged. The user then releases switch 46, and as shown in FIG. 35, that portion of the image in window 410 disposed within the-outlined box 500 is enlarged and displayed in the window 410. In the example illustrated in FIGS. 34 and 35, the user has defined an outline box 500 over a portion of FIG. 3 of the '478 Patent. The enlarged portion is then displayed as shown in FIG. 35. Additionally, as previously described, other controls are provided in the Patent Image Toolbox 430 for rotation of the image, enlargement of the image in set increments, and to provide additional functions in operating on the image within the window 410.

Figure 36:
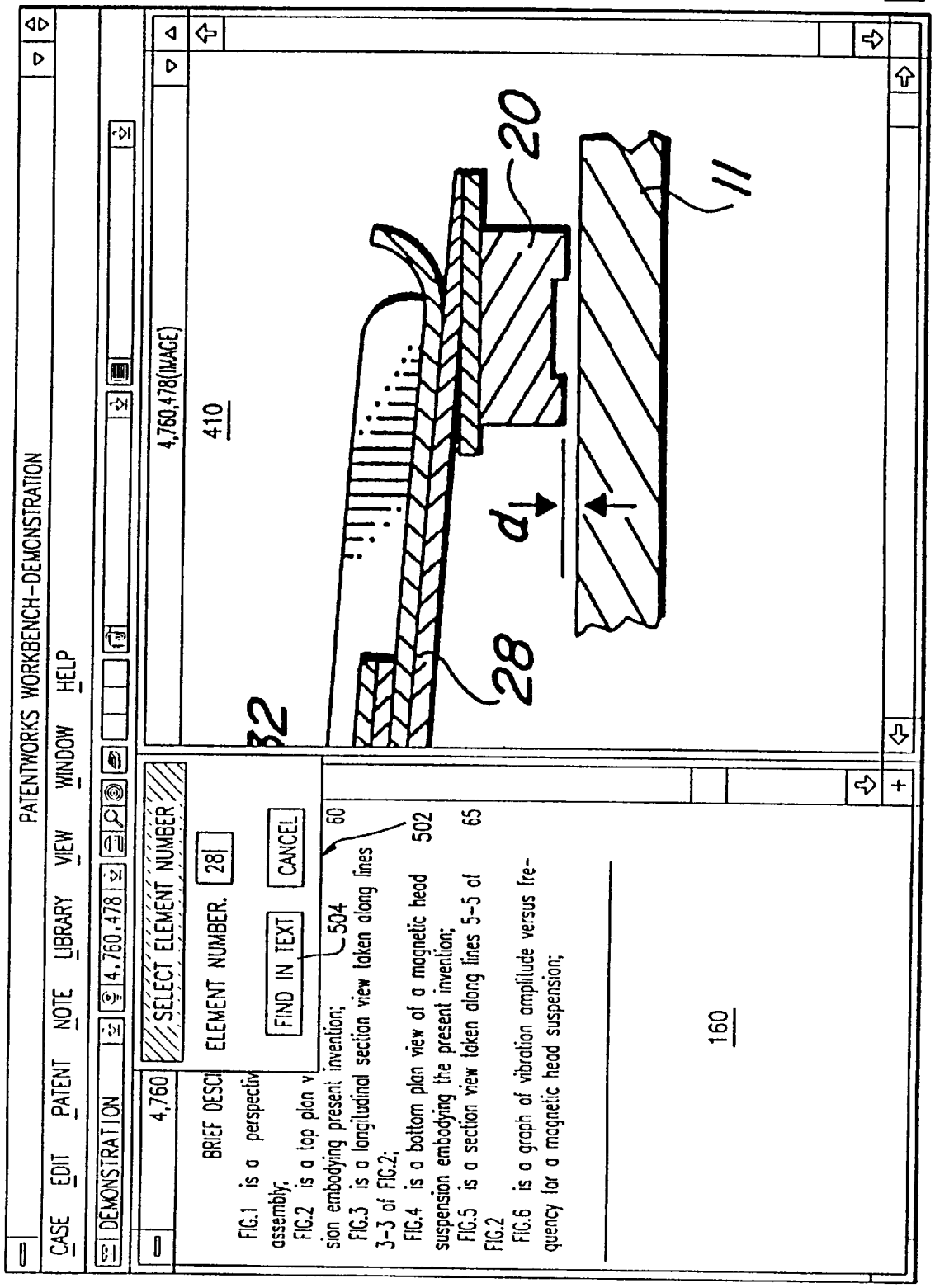
FIG. 36 illustrates the present invention's Select Element Number dialog box, which permits a user to input a drawing element and locate the first occurrence and the subsequent occurrences of the drawing element in the Equivalent File displayed in the equivalent window.

Referring to FIG. 35 and FIG. 36, assume for example that a user desires to locate the first instance in the Equivalent File of patent '478 which refers to element 28. In a typical application of the present invention, the user will locate a particular element number of interest illustrated in the figures of the patent (and displayed within image window 410). The activation of icon 437 of the Patent Image Toolbox 430 in FIG. 35 results in display of a Select Element Number dialog box 502 in FIG. 37. Using the keyboard 56 of FIG. 3, the user may input the particular element number of interest, and activate a Find In Text button function 504 provided in the Select Element Number dialog box 502. The present invention searches and then finds the first and the subsequent instances of the selected element number within the Equivalent File, and displays in highlighted form the text in window 160 beginning at the first instance ("hit") location in the patent. The subsequent instances are also highlighted. To view each instance that the element is found, the user proceeds to click the mouse switch 46 while the cursor 44 is placed on the right arrow button 351 in FIG. 30. When every instance of the element has been viewed, a further click on the right arrow button 351 in FIG. 30 will indicate in the Patent Text Toolbox 162 that there are no more hits.

Figure 37:
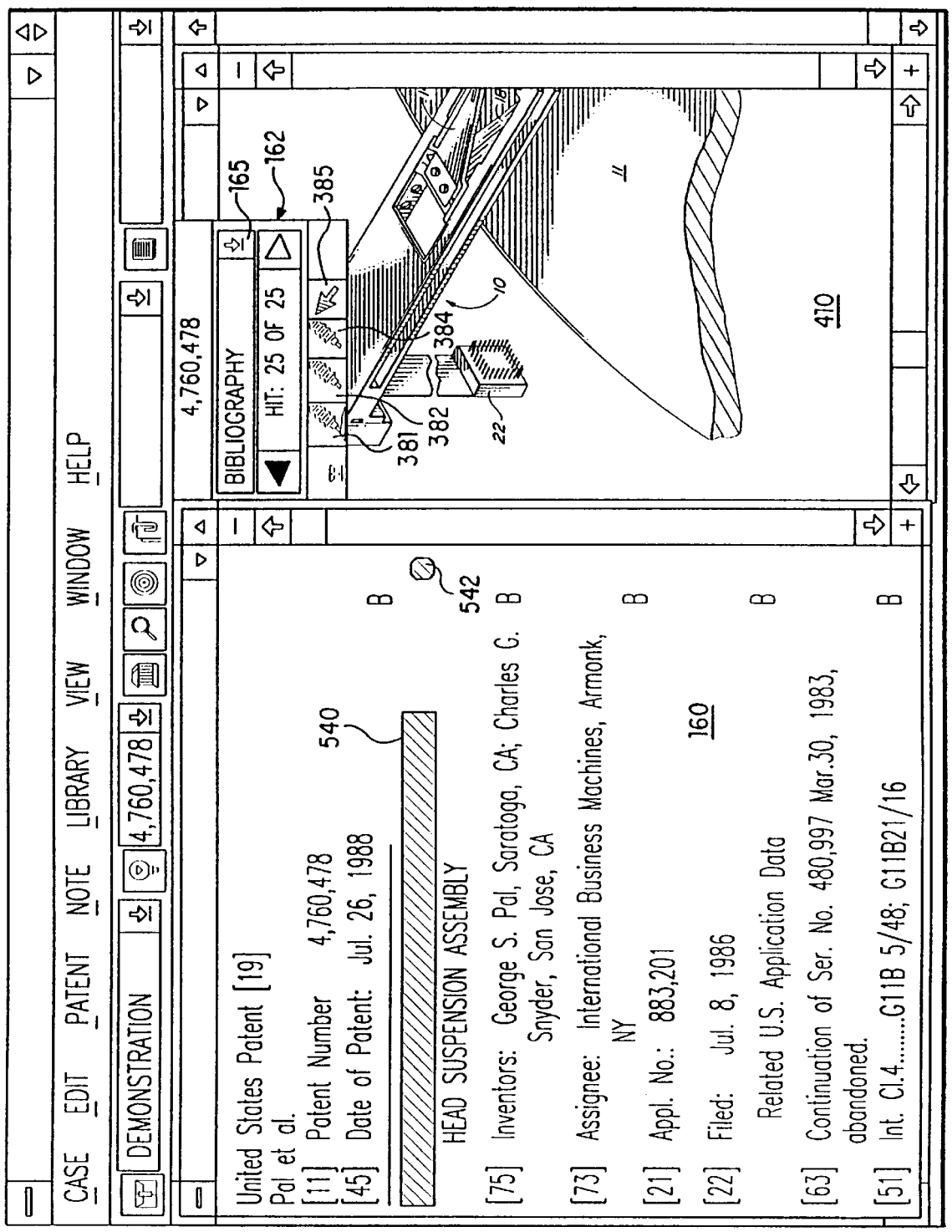
FIG. 37 illustrates the present invention's use of highlighting to highlight desired portions of the Equivalent File in various colors.

Referring now to FIG. 37 and FIG. 3, the present invention's highlight functions will be described. To highlight text within a case copy of the Equivalent File displayed in window 160, a user places cursor 44 over a marker having a desired color. In the presently preferred embodiment, marker icons 381, 382, and 384, are displayed as having different colors in the Patent Text Toolbox 162. By placing the cursor 44 over one of the marker icons, such as for example marker icon 381, and momentarily clicking switch 46, the marker color is selected. The movement of cursor 44 into the area defined by window 160, results in cursor 44 having the visual appearance of a marker tip similar to that shown in icon 381. By placing the cursor 44 over a desired portion of text within the Equivalent File displayed in window 160, and depressing switch 46, the marker is "turned on". Dragging the cursor 44 over the text to be highlighted, results in that portion of the text having a color tint corresponding to the color of the marker which has been selected. The marker may be turned "off" by releasing switch 46 on mouse 42. In FIG. 37, a portion of the text has been highlighted and identified as a highlighted area 540. Due to the limitations of the written specification and the inability to illustrate color, the highlighted area 540 is simply shown as a black rectangle. -Additionally, a corresponding color indicator 542 is displayed next to the highlighted text 540. As will be described more fully below, placing cursor 44 over color indicator 542 and clicking switch 46 results in the patent note window, originally connected to this location in the Equivalent File, being displayed on screen 68 in which the user may read or type notes related to that portion of the highlighted text. Color indicators have different shapes to aid in identification by users with monochromatic display screens, or those with color blindness.

In the presently preferred embodiment, color indicator 542 further identifies the color by using symbols. For example, in the present embodiment, if a red marker is selected, color indicator 542 is round and red. However, if a yellow marker is selected, then the color indicator 542 is in the shape of a yellow triangle, or if a green marker is selected, color indicator 542 is in the shape of a green rectangle. Additionally, it is possible using the teachings of the present invention to overlap marker colors over the same area of text. By overriding one marker with another, multiple patent notes for the same text may be created. If a given portion of text within window 160 has been highlighted, multiple color indicators 542 will be displayed in a horizontal row adjacent to one another. Clicking on any of the color indicators (542) results in the display of the corresponding patent note.

Figure 38:
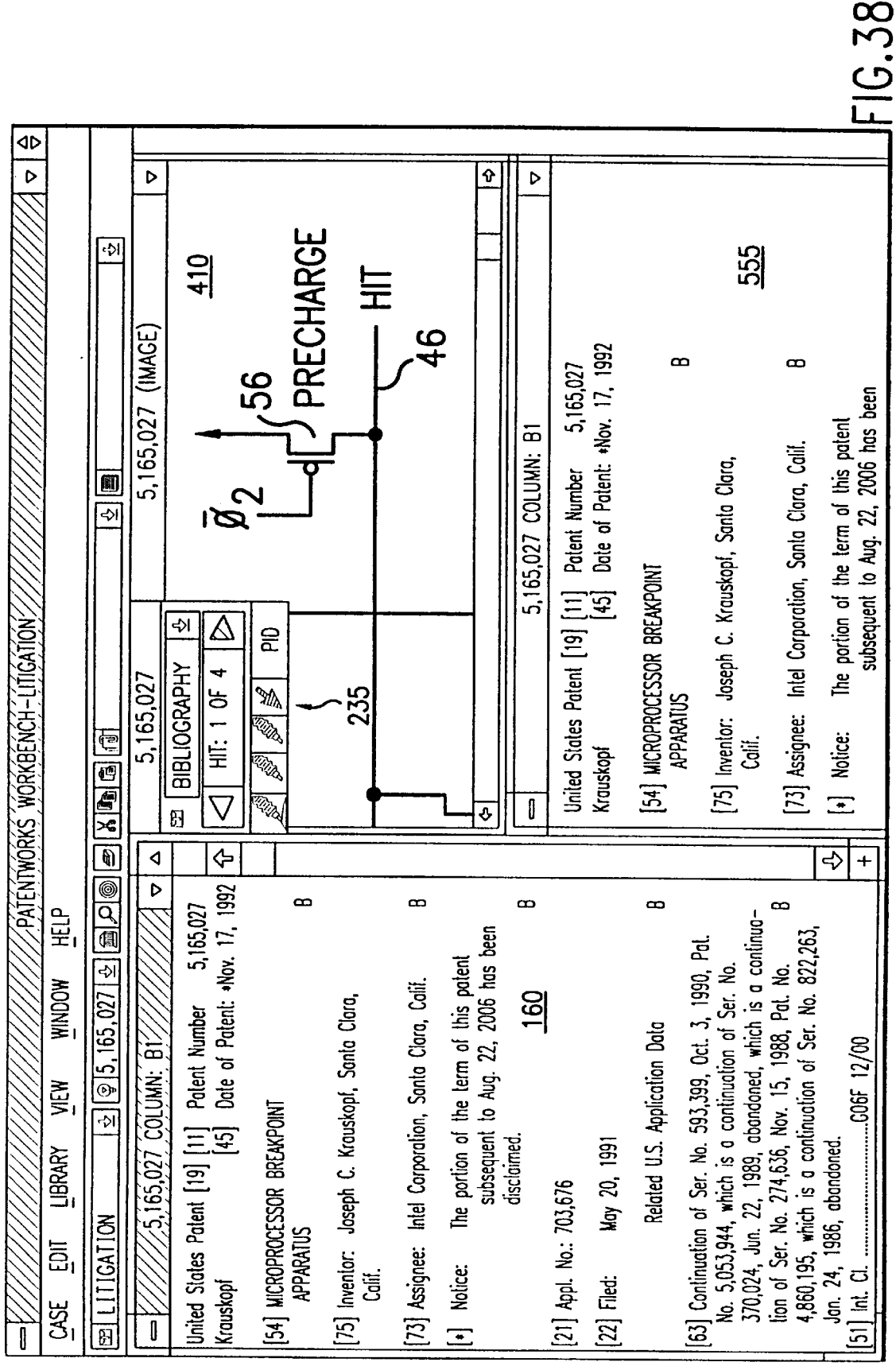
FIG. 38 illustrates the present invention's display of two equivalent windows and one image window on the display screen.

Referring now to FIG. 38, the present invention's graphic user interface permits multiple copies of the same or different patents to be viewed simultaneously. In the example illustrated in FIG. 38, window 160 is displaying a case copy of the Equivalent File of the '027 patent. As a case copy, the user may search edit, and highlight the Equivalent File of the '027 patent displayed in the window 160. As shown, an image of the '027 Patent, with an enlarged area from its FIG. 3 is displayed in the window 410 of screen 68 in FIG. 3. Additionally, a library Equivalent copy of the '027 patent is also displayed in a third area 555 on display screen 68. As a library copy, the Equivalent File displayed in window 555 is not annotatable or highlightable by the user, but may be searched, and used for purposes of comparison to the figures in window 410, or the notes or other-modifications which a user may make in window 160 to the case copy of the Equivalent File.

Figure 39:
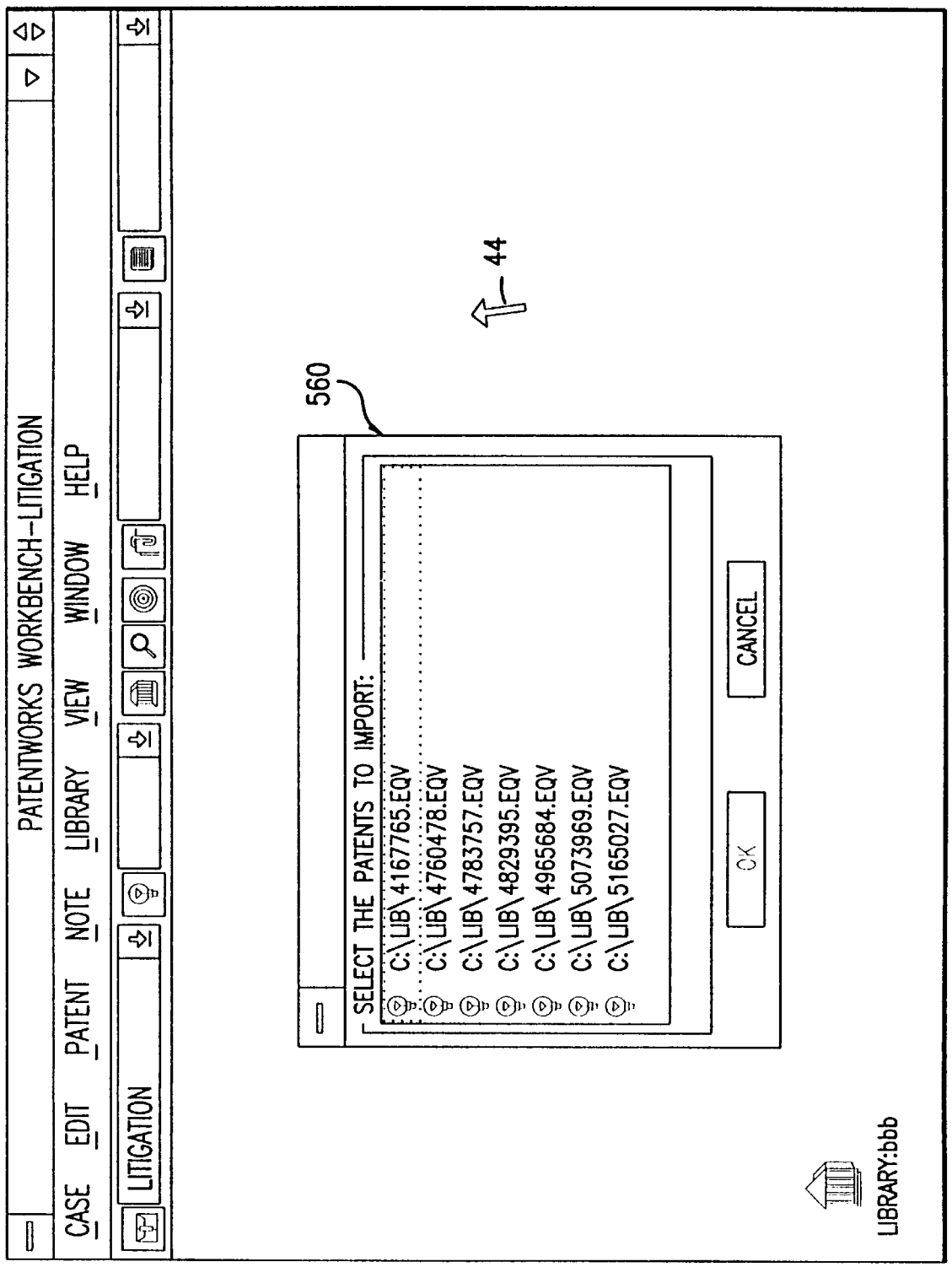
FIG. 39 illustrates the Import Patents dialog box of the present invention.
Figure 40:
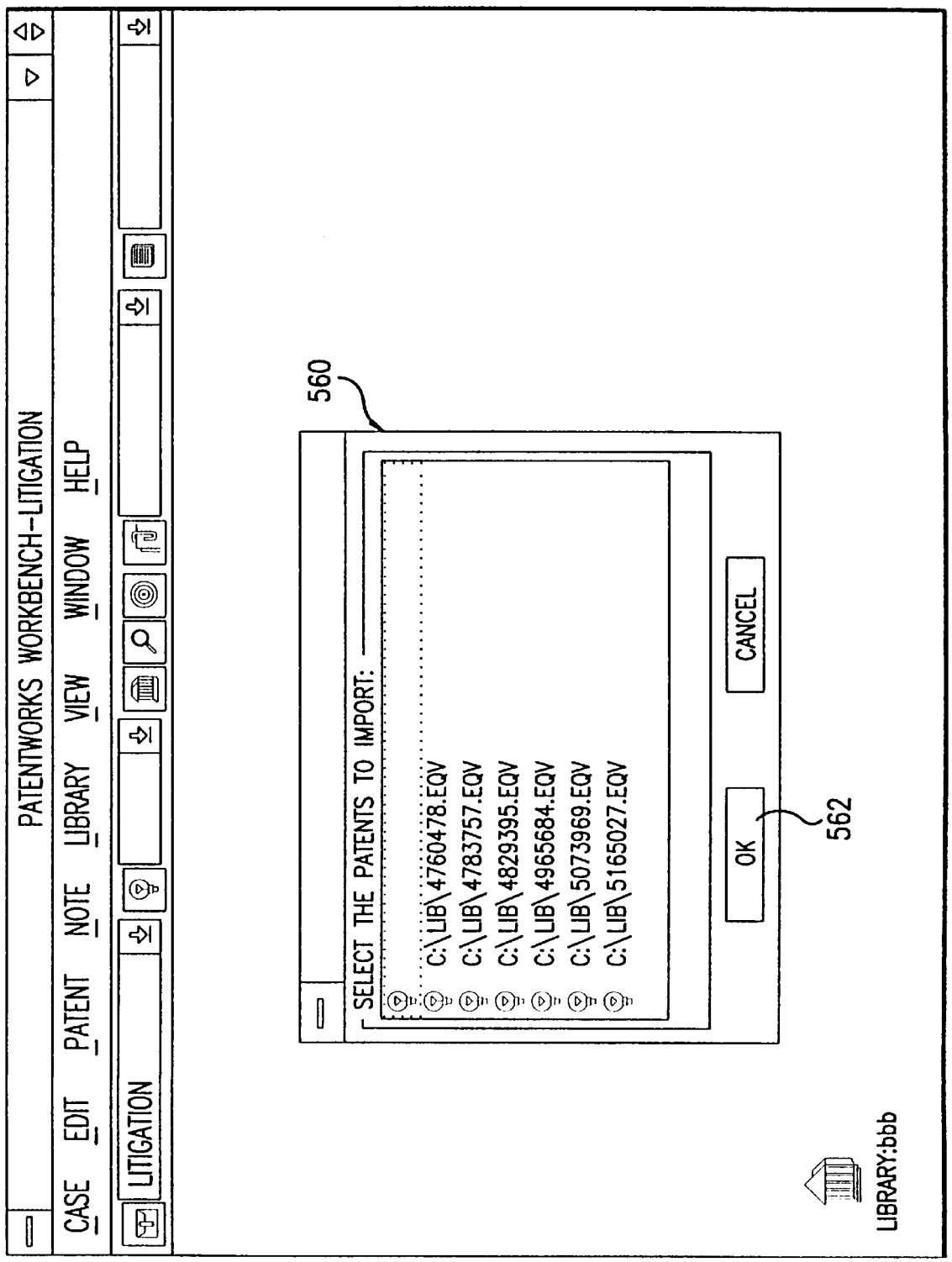
FIG. 40 illustrates the Import Patents dialog box after the selection of an Equivalent File to be imported.

Referring to FIG. 39, the selection of the Import Patents option from the Library menu results in the display of an Import Patents dialog box 560. The Import Patents dialog box 560 permits the importation of additional patent Equivalent Files into a library file. As illustrated in FIG. 40 and FIG. 3, by placing cursor 44 over a selected Equivalent File to be imported and momentarily clicking switch 46, the selected Equivalent File is highlighted. Once the selected patent Equivalent File is highlighted, cursor 44 is placed over an OK button 562 and switch 46 is once again clicked. The Equivalent File is then imported into the current library file.

Figure 41:
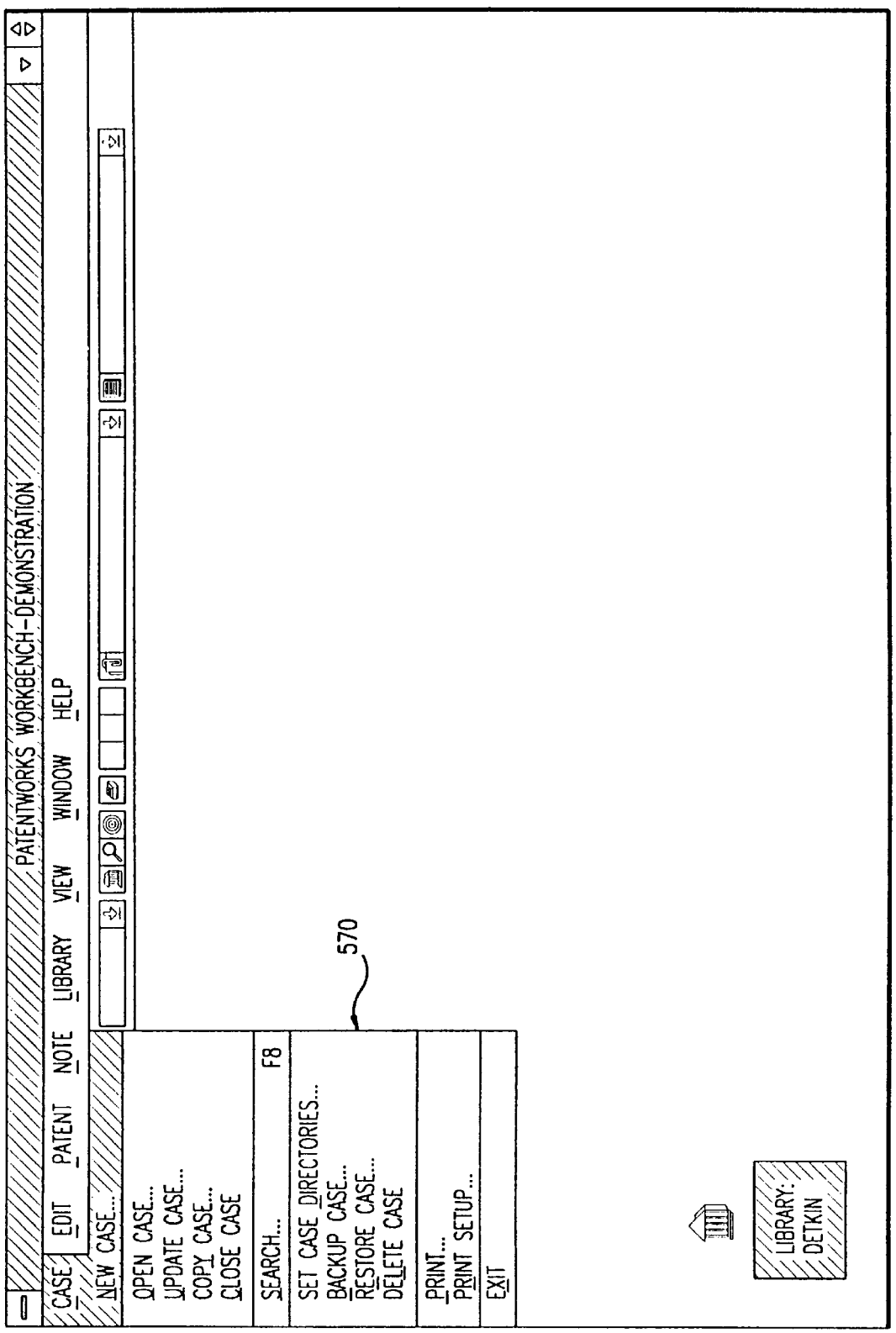
FIG. 41 illustrates sub-command items available for selection upon the activation of the Case menu option.

FIG. 41 and FIG. 3, the placement of cursor 44 over the Case icon 106 and the depression of switch 46 on mouse 42 results in the display of a Case menu bar 570. As illustrated, a variety of sub-command items are displayed in Case menu 570, including sub-command items identified as New Case, Open Case, Update Case, Copy Case, Close Case, Search, Set Case Directories, Backup Case, Restore Case, Delete Case, Print, Print Setup and Exit. If cursor 44 is placed over the Open Case sub-command item and switch 46 is clicked, an Open Case dialog box 580 is displayed (see FIG. 42) which includes an area 587 in which all of the cases accessible are displayed. In the present example, the case "Infringement study" is selected by placing cursor 44 over any portion of the words "Infringement study", or on the briefcase icon 590 adjacent to the words "Infringement study". Alternatively, in the event the New Case sub-command item is selected from case menu 570, the computer 48 generates and displays a New Case control box 594 (see FIG. 43). The user may define, by inserting into the appropriate fields, a new case by identifying the case name, attorney name, client name and date in which the case was opened. Once these fields have been inputted by the user, an OK button 600 is activated by placing cursor 44 over the OK button 600 and momentarily clicking switch 46.

Figure 42:
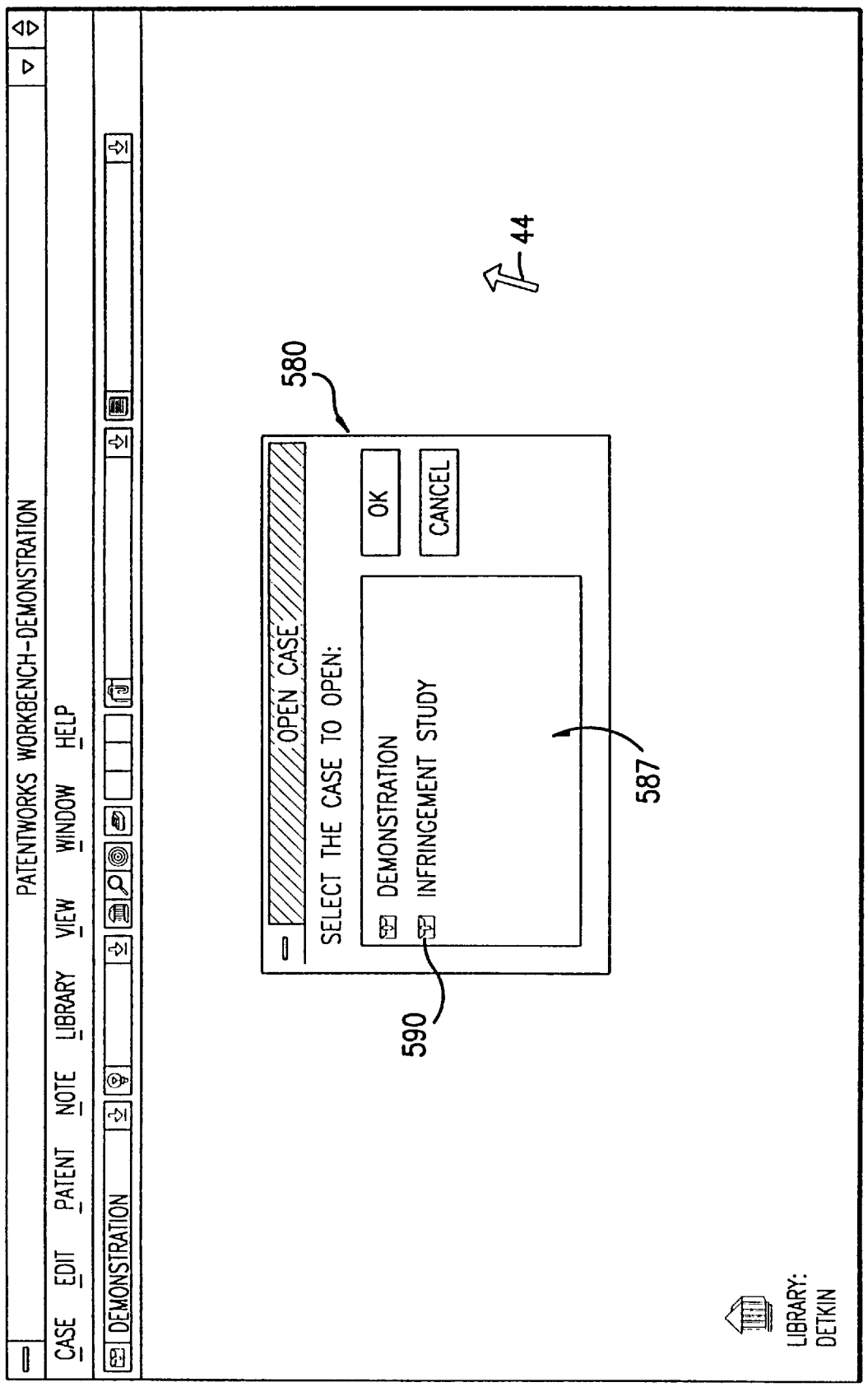
FIG. 42 illustrates the Open Case dialog box which is displayed once the Open Case sub-command item illustrated in FIG. 41 is selected.
Figure 43:
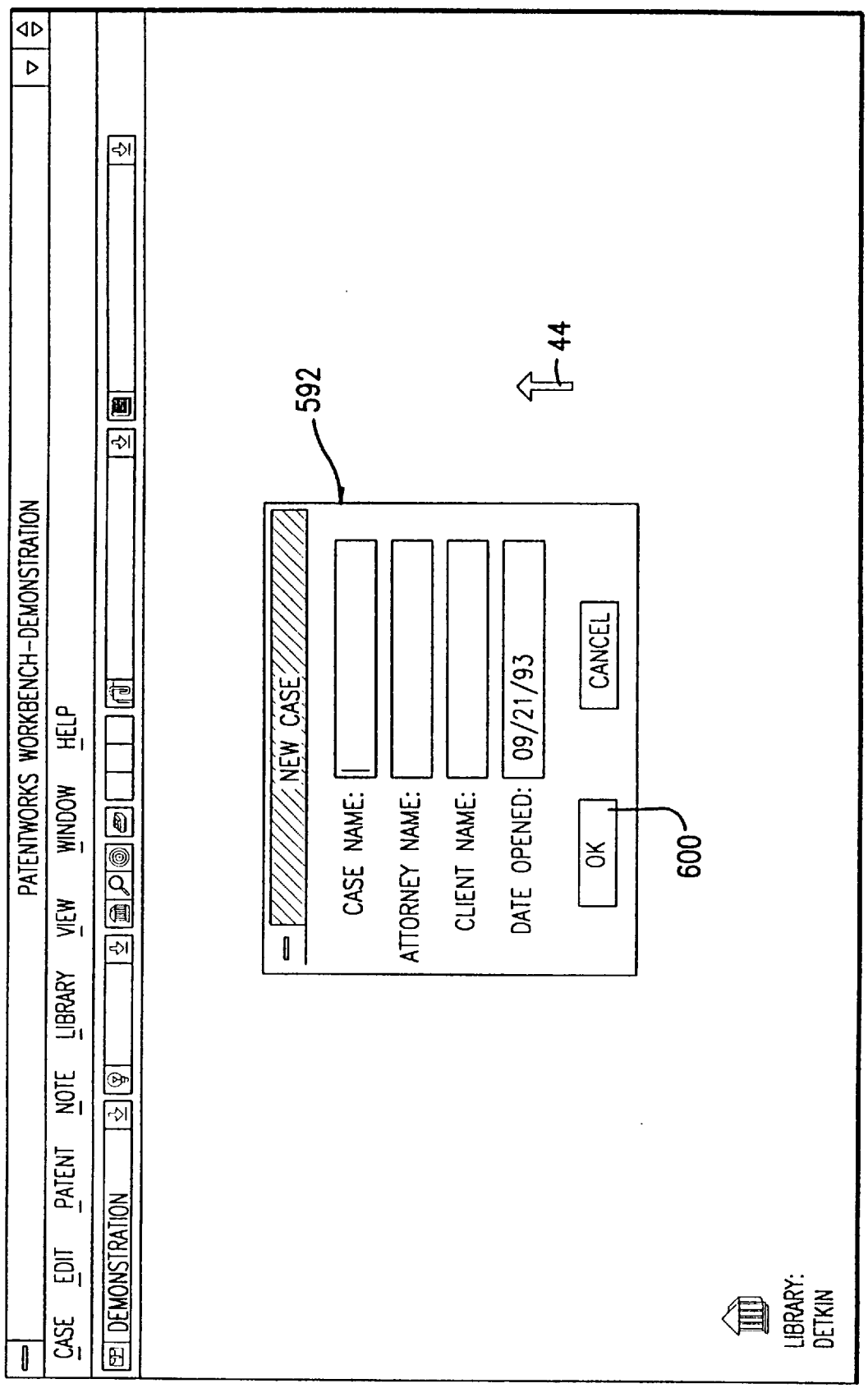
FIG. 43 illustrates the New Case dialog box which is displayed upon the selection of the New Case sub-command item illustrated in FIG. 41.
Figure 44:
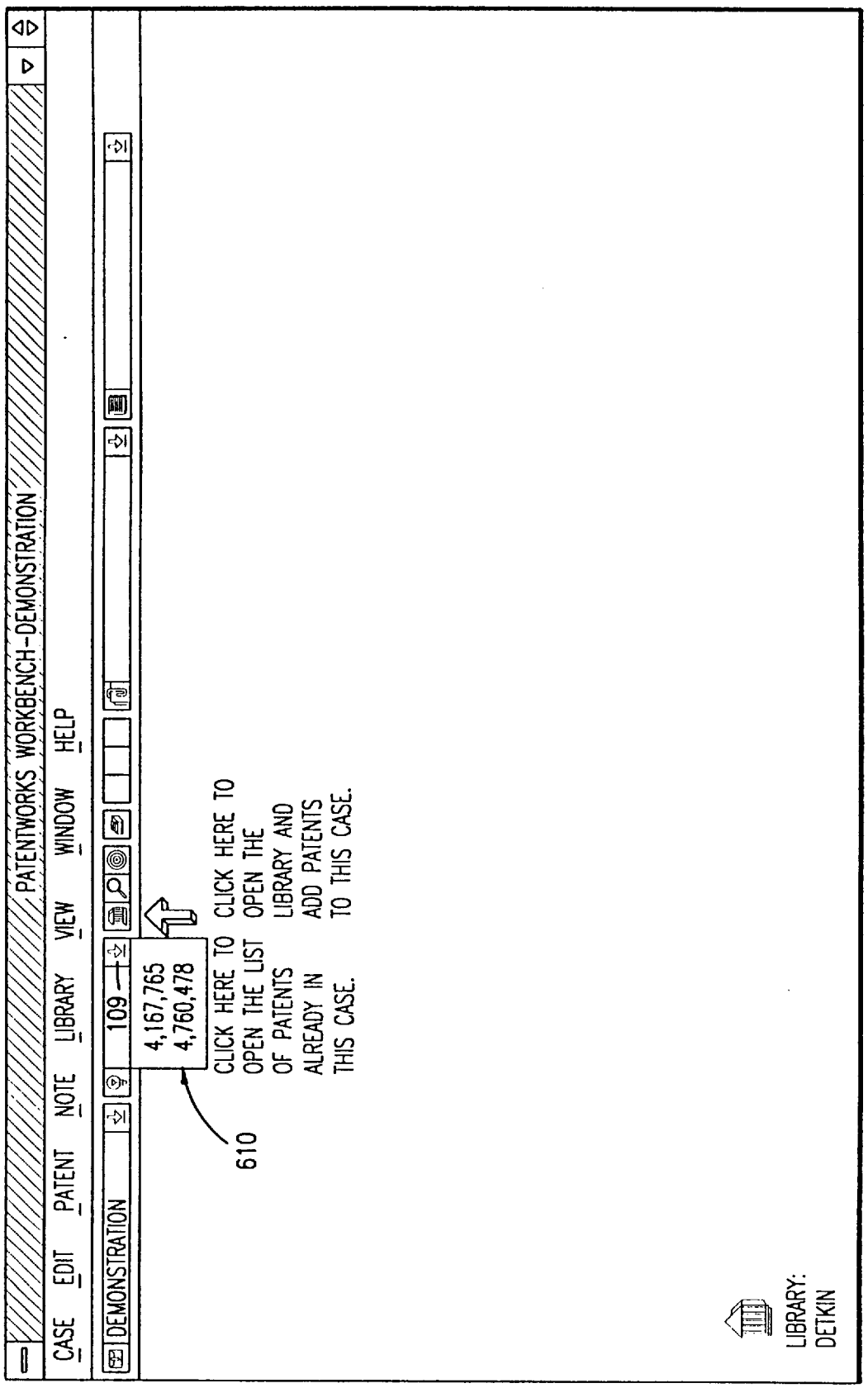
FIG. 44 illustrates the patent number drop down menu which permits a user to select a patent within a case for displaying.

Referring to FIG. 43 and FIG. 2, assume for example that the user has selected the case identified as "Demonstration" following the steps described with reference to FIG. 42. By placing cursor 44 over the down arrow 109 on the tool bar 103 and depressing switch 46 on mouse 42, computer 48 generates and displays a menu 610 listing all patents comprising the case "Demonstration". By placing cursor 44 over any one of the listed patents comprising the case "Demonstration", and clicking switch 46, the Equivalent File of the selected patent will be displayed, including any previous highlights, patent notes or other edits made by a user in prior sessions.

Figure 45:
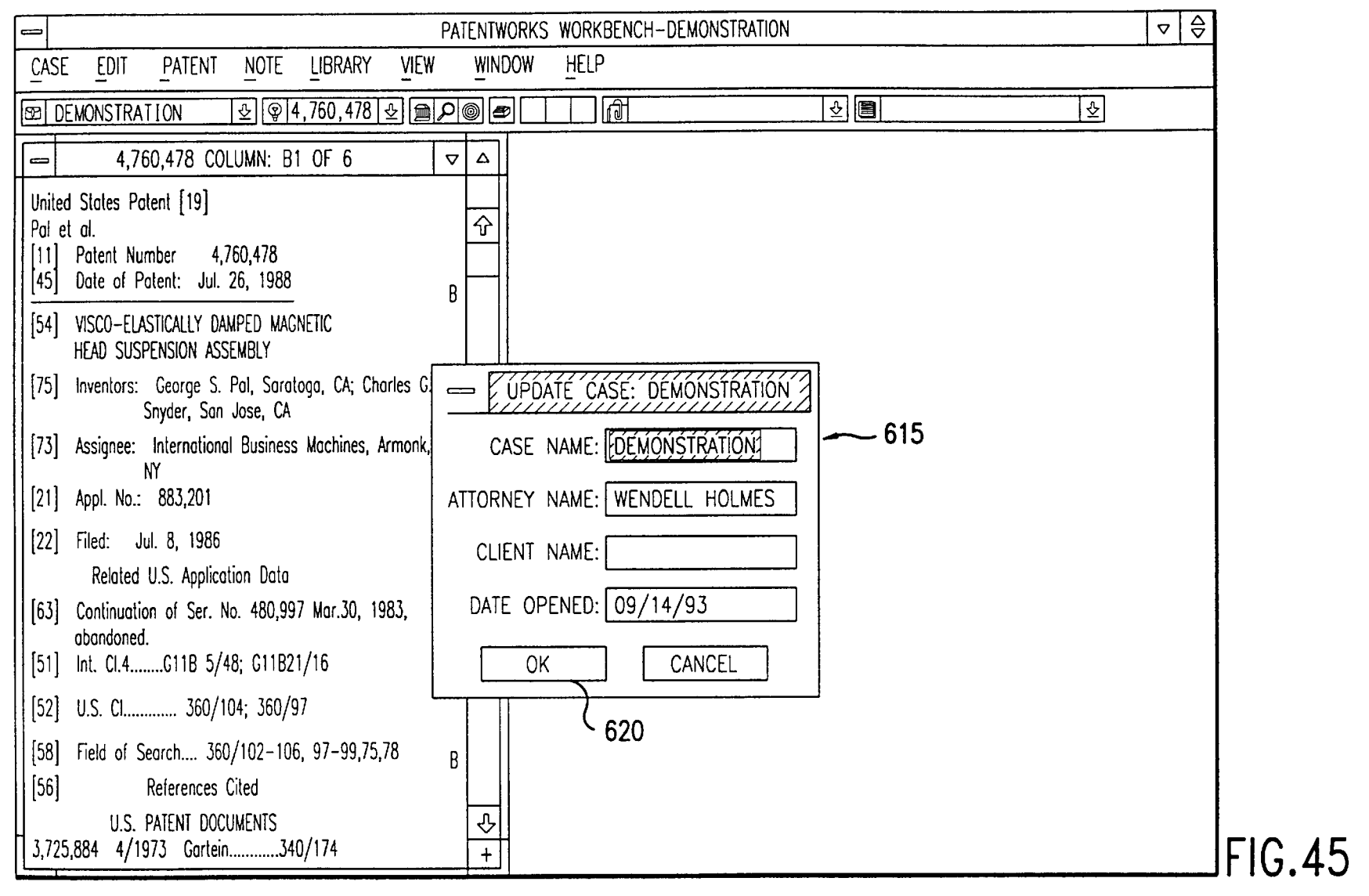
Figure 46:
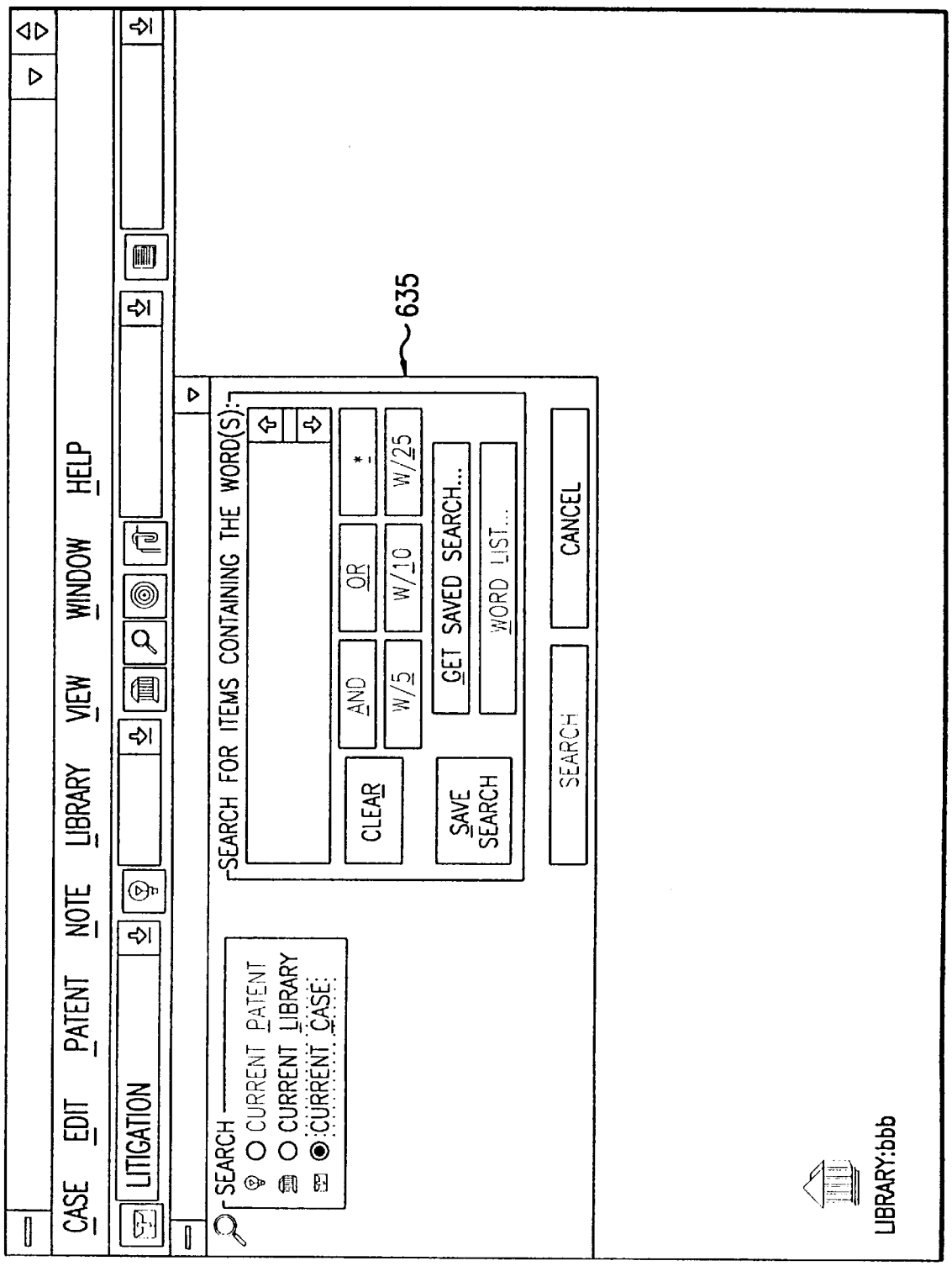
FIG. 46 illustrates the search case dialog box which is displayed upon the selection of the Search sub-command item of the Case menu illustrated in FIG. 41.

Referring to FIG. 45, the selection of the sub-command item Update Case from the case menu 570 (see FIG. 41) results in the display of an Update Case dialog box 615 in which the current case name, attorney name, client and date of opening of the case are displayed. A user may update this data by making the necessary modifications within the appropriate fields and activating an OK button function 620. The selection of the Search sub-command item from menu 570 results in the display of a Search Case dialog box 635 illustrated in FIG. 46. Using box 635, the user may perform searches on patents located in case files, or the library, in a manner similar to that described with reference to the search box 302 in FIG. 24.

Figure 47:
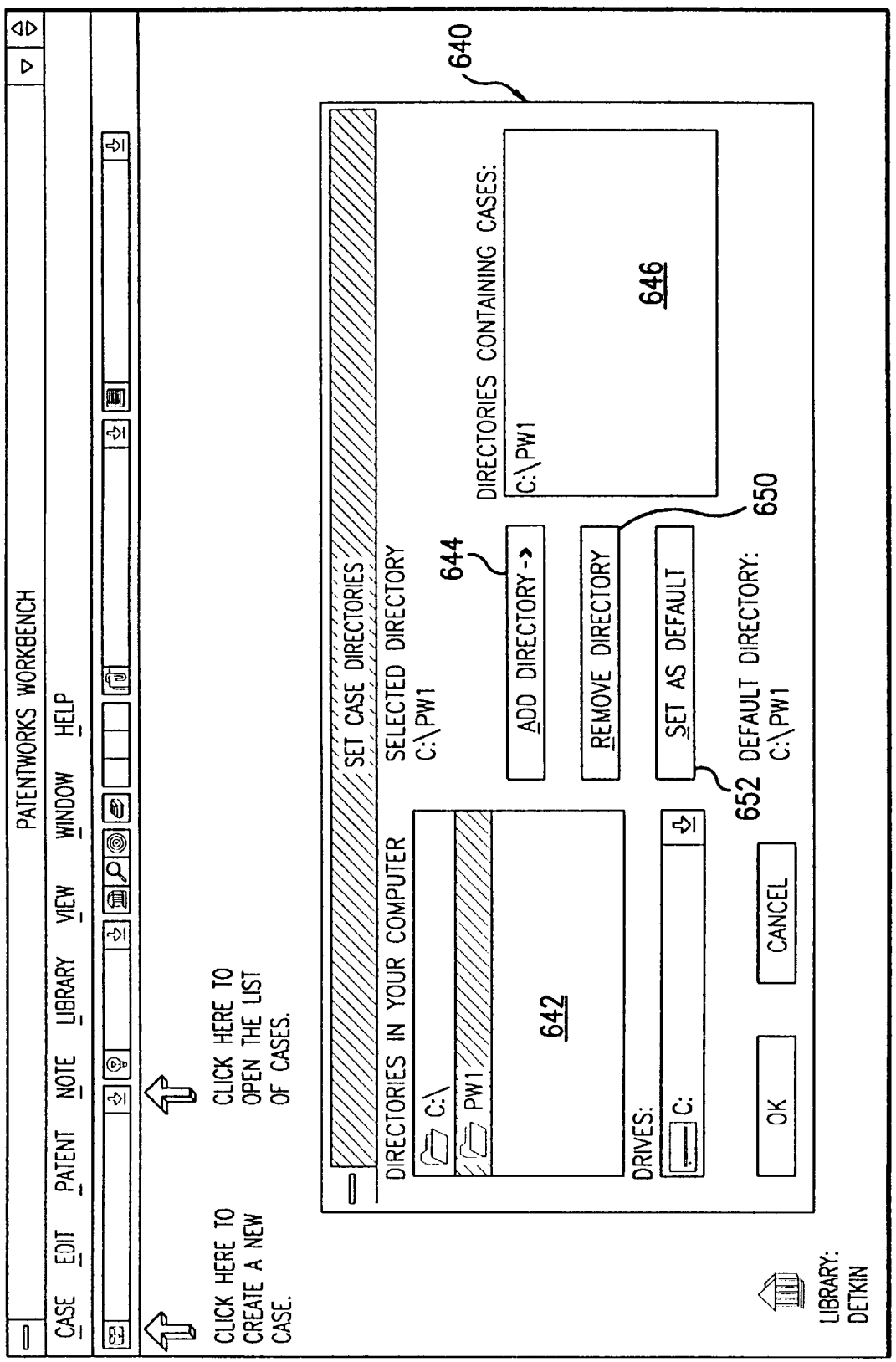
FIG. 47 illustrates the Set Case Directories dialog box which is displayed upon the activation of the Set Case Directories sub-command item illustrated in FIG. 41.

Referring now to FIG. 47, the selection of the Set Case Directories sub-command item of menu 570 (see FIG. 41) results in the generation and display of a Set Case Directories dialog box 640. As illustrated, the Set Case Directories dialog box 640 includes a variety of features for the manipulation, including addition and removal of directories. The Set Case Directories dialog box 640 also permits the user to define case default directories where cases will be created. A warning message will appear when a user accesses this command, since modifications of this function will affect the ability to access cases. In operation, a user may double-click on a directory illustrated within an area 642 of the dialog box 640 to select the directory and open it. The directories contained in the selected directory will be listed below the selected directory within the window 642.

Similarly, various drive icons are provided that represent resources to the computer system of the present invention. All directories contained on the selected drive are then listed in the directories list. As shown in FIG. 47, the selected directory is identified, as is the default directory. Once a user has chosen a directory from which cases will be found, the activation of a button function Add Directory 644 adds the selected directory to the directories containing cases shown in an area 646. A Remove Directory function 650 removes the selected directory from the path list such that the directory will no longer be used when finding cases. A Set as Default function 652 sets the currently set directory as the default directory. When setting directories for cases, the default directory is the directory where new cases are created. When setting directories for libraries, the default directory is where new libraries are created.

Figure 48:
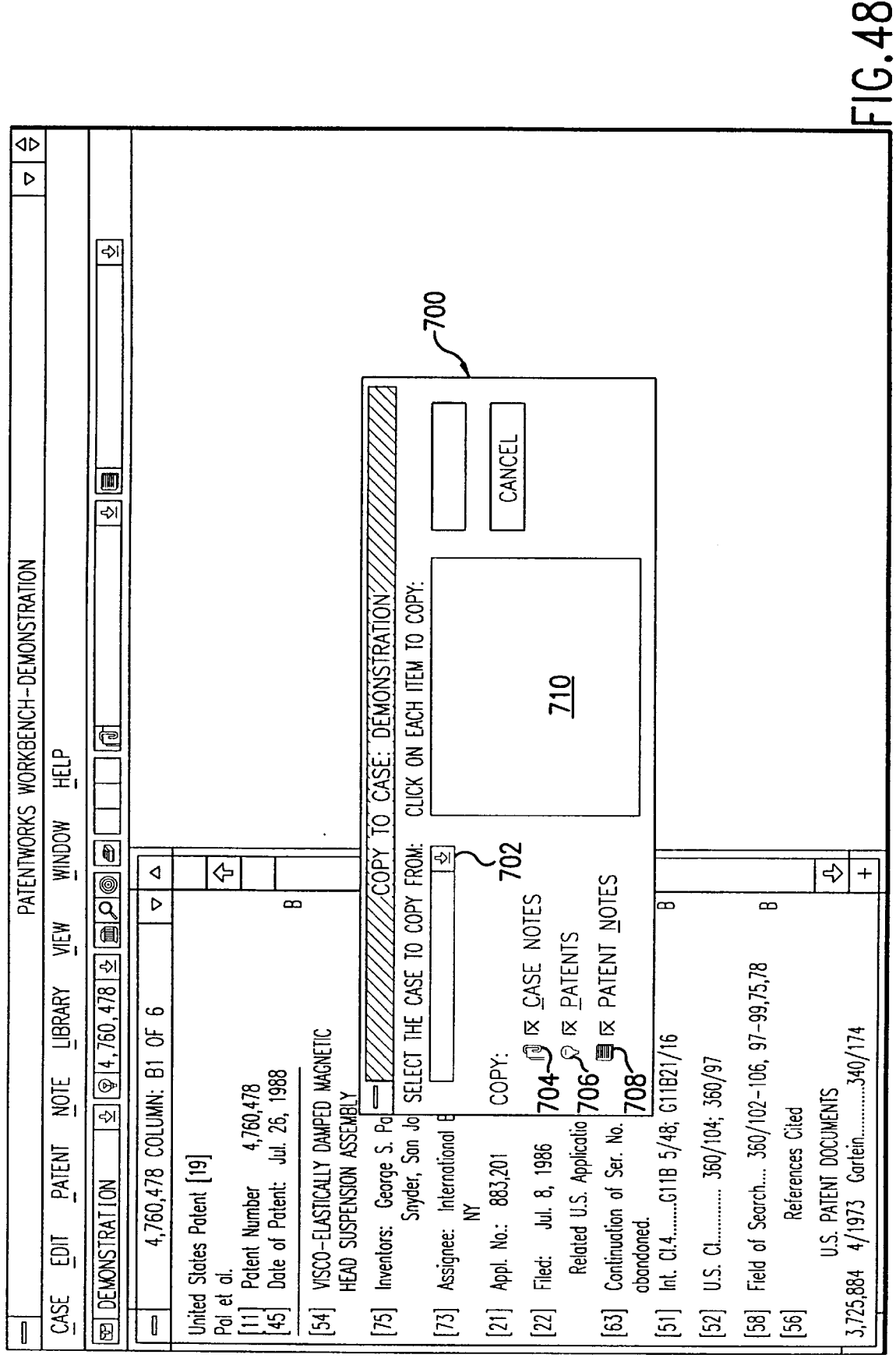
FIG. 48 illustrates the Copy to Case dialog box which is displayed upon the selection of the Copy Case sub-command item illustrated in FIG. 41.

Referring to FIG. 48, the selection of the function Copy Case from menu 570 (see FIG. 41) results in the display of a Copy-to-Case dialog box 700 illustrated in FIG. 48. The Copy-to-Case dialog box 700 permits a user to copy information from an existing case into the current case. In operation, a click down menu is selected and displayed through activation of a downward arrow button function 702. The click down menu includes a listing of all cases which a user may choose from to copy into the currently active case. In the present specification, the click down menu is not shown for sake of brevity. The user then has the option of identifying case notes, patents, or patent notes to copy from the selected case. If the user checks the case note icon 704, all case notes from a selected case will be listed in alphabetic order in the list area 710. If the patents icon 706 is selected, all patents from the selected case will be listed after any case notes in the list area 710. If the patent note icon 708 is selected, all patent notes from the selected case will be listed after each patent in the list area 710. An area 710 is provided within the dialog box 700 in which all patents are listed in ascending order from the lowest number to the highest number, as well as their associated case and patent notes. A user may then click on each item within the window 710 which is to be copied.

Figure 49:
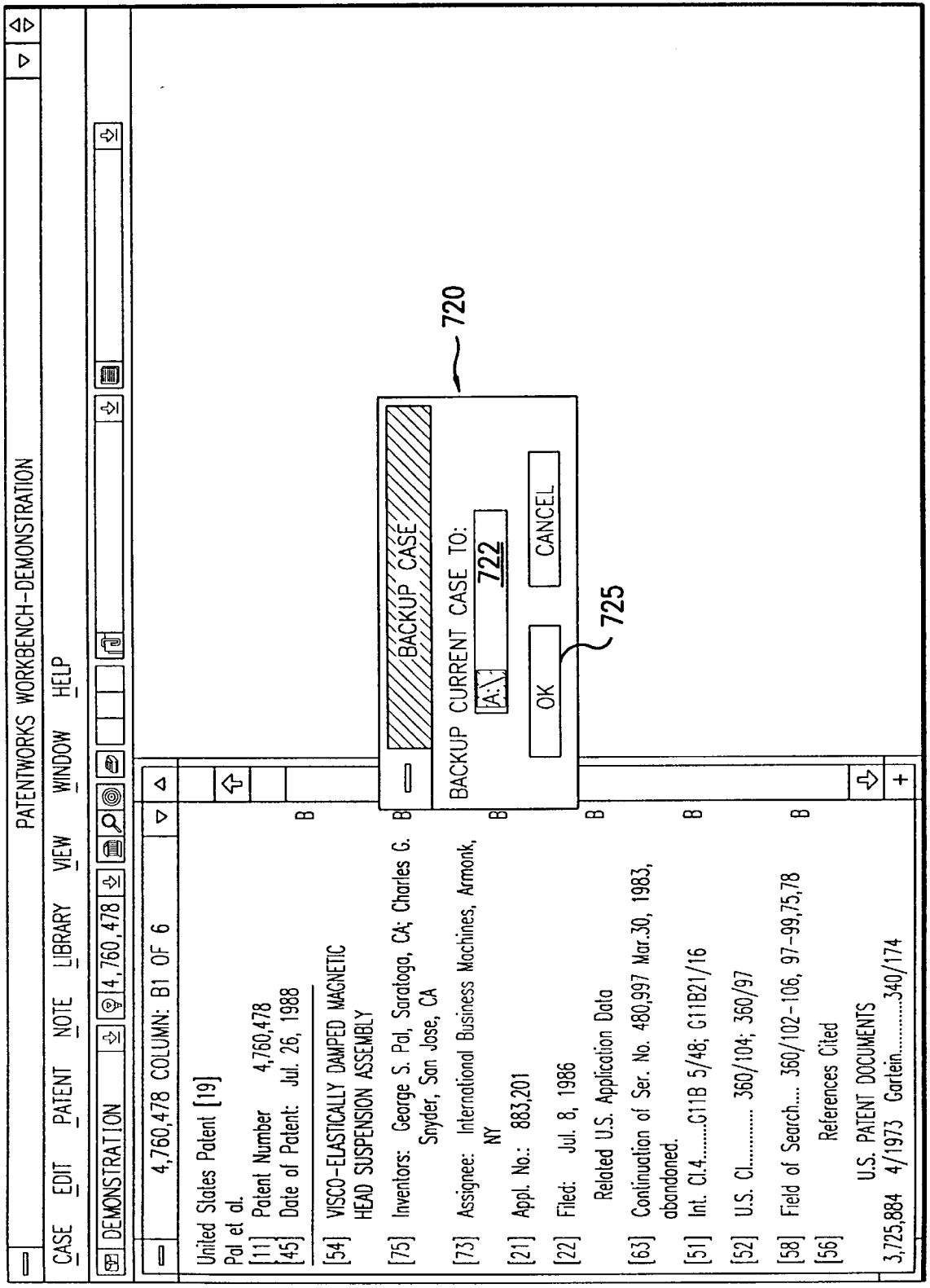
FIG. 49 illustrates the Backup Case dialog box which is displayed upon the activation of the Backup Case sub-command item of FIG. 41.

The selection of the Backup Case option from menu 570 (see FIG. 41) results in a Backup Case dialog box 720 being displayed on screen 68 as shown in FIG. 49. A user may utilize the Backup Case dialog box to save a current case onto a backup disk or directory, or onto another computer. A user enters the backup drive and directory within a display window 722 of the dialog box 720 using keyboard 56. Once entered, the button function OK 725 is activated and the case is backed up to the defined location.

Figure 50:
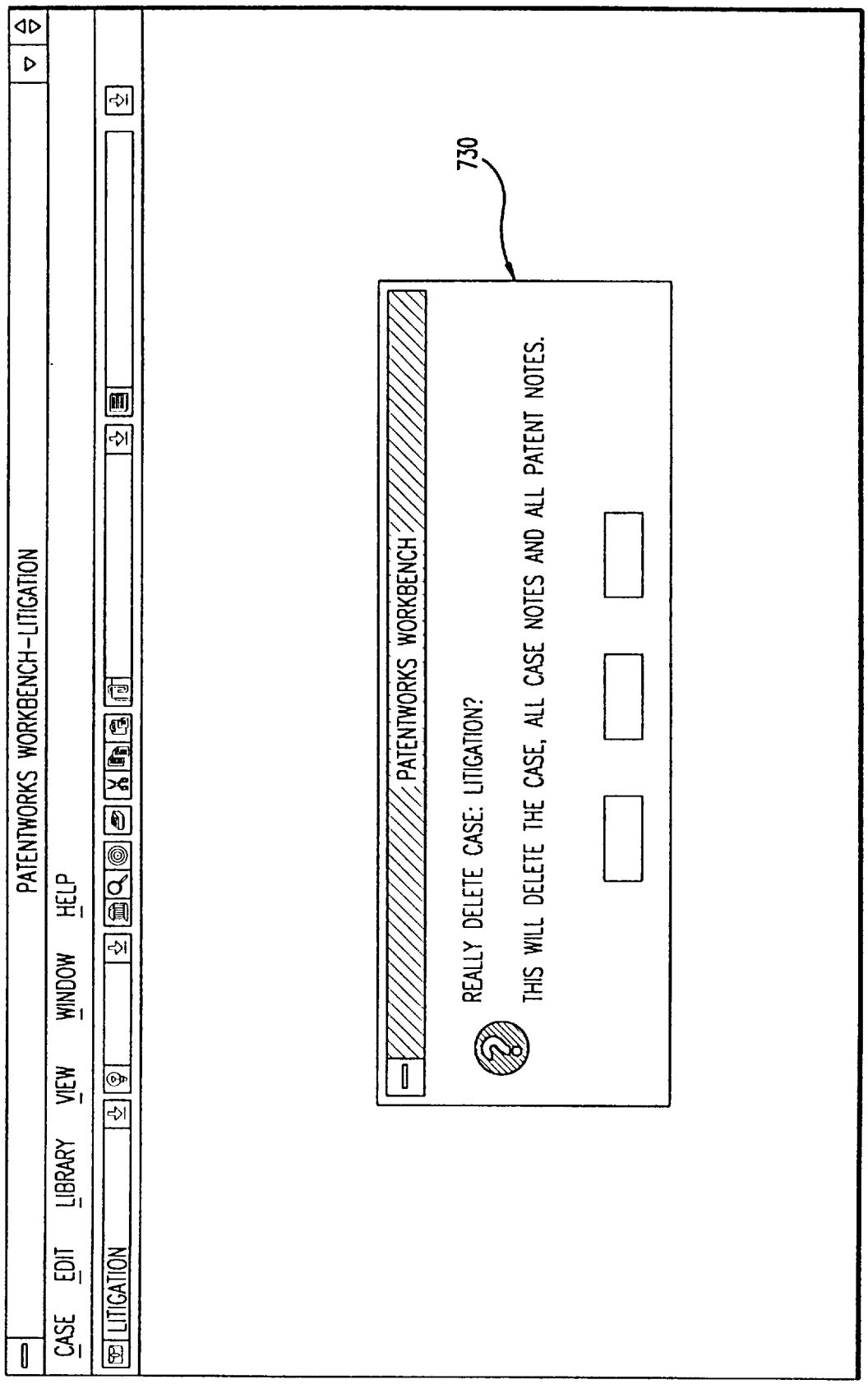
FIG. 50 illustrates the Delete dialog box which is displayed upon the selection of the Delete Case sub-command item illustrated in FIG. 41.

Referring to FIG. 50, a case may be deleted by the selection of the Delete function in menu 570 (see FIG. 41) which results in the display of a delete case dialog box 730 as illustrated in FIG. 50. A case may be deleted using this dialog box including all case notes and all patent notes.

Figure 51:
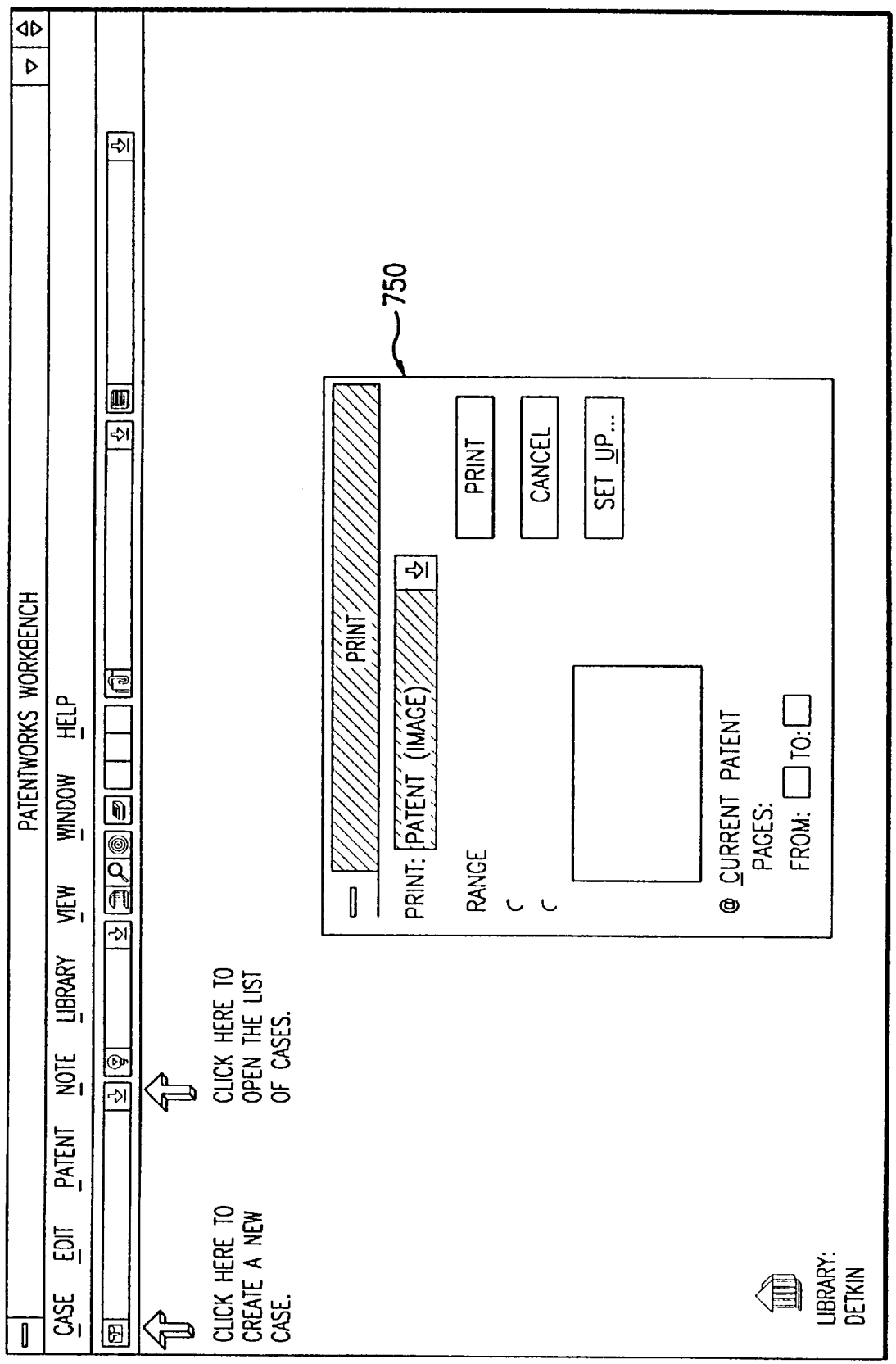
FIG. 51 illustrates the Print dialog box of the present invention which is displayed upon the activation of the Print sub-command item illustrated in FIG. 41.
Figure 52:
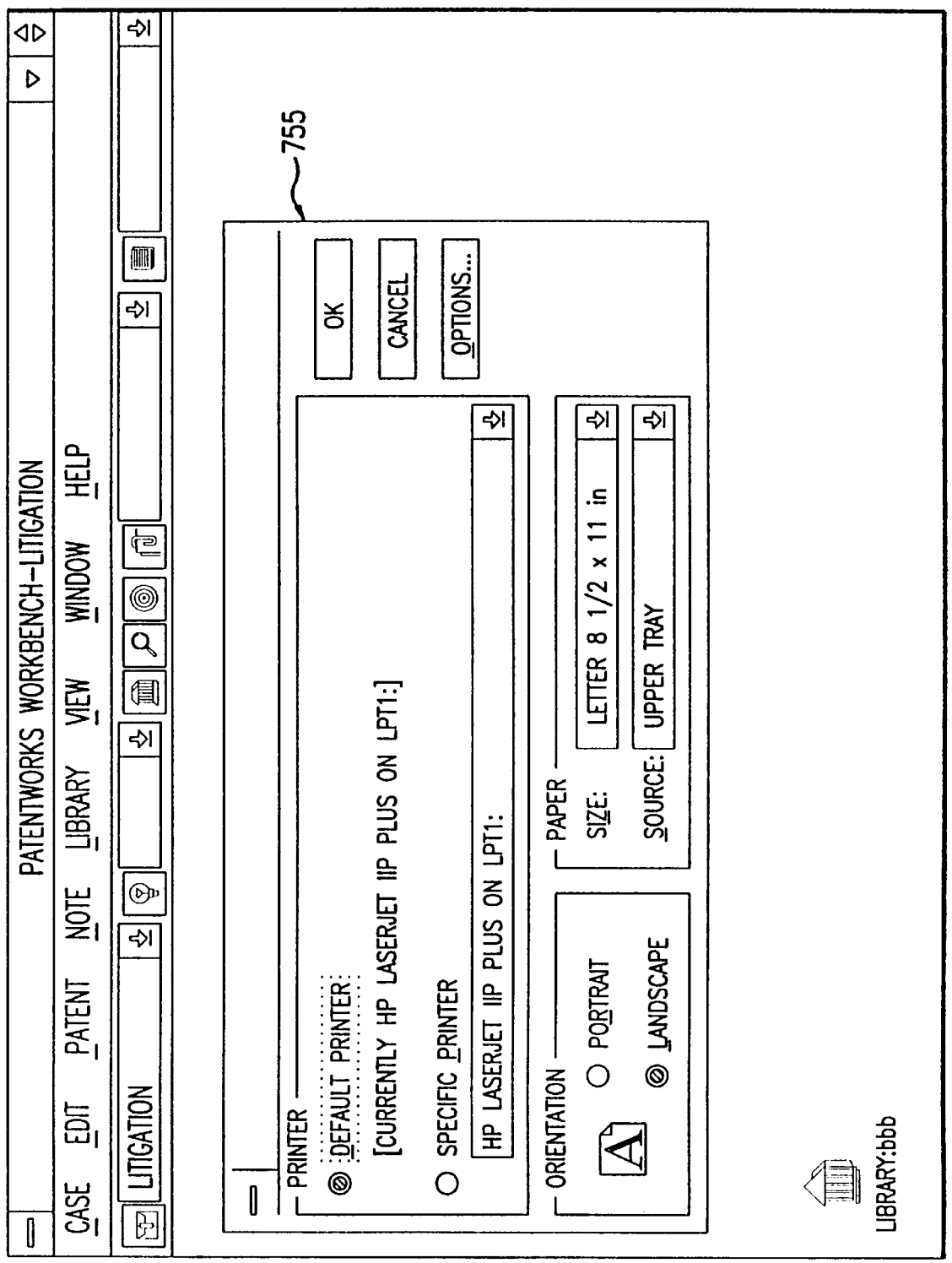
FIG. 52 illustrates the Print Setup dialog box which is displayed upon the activation of the Print Setup sub-command item illustrated in FIG. 41.

The selection of the Print command from menu 570 of FIG. 41 results in the display of a Print dialog box 750, as shown in FIG. 51. The Print dialog box permits the printing of various files, including but not limited to, patent images, case and patent notes and Equivalent Files on a printer 57 in FIG. 3 or to a file. Selection of a Print Setup command in menu 570 of FIG. 41 results in the display of a print setup dialog box 755, as shown in FIG. 52. The Print Setup dialog box 755 permits a user to set up printers, paper orientation, resolution, size and source of paper. In addition, default printers may be selected, and if the user is utilizing a network printer, the printer server information is listed in the print setup dialog box along with the printer/default printer setup options.

Figure 53:
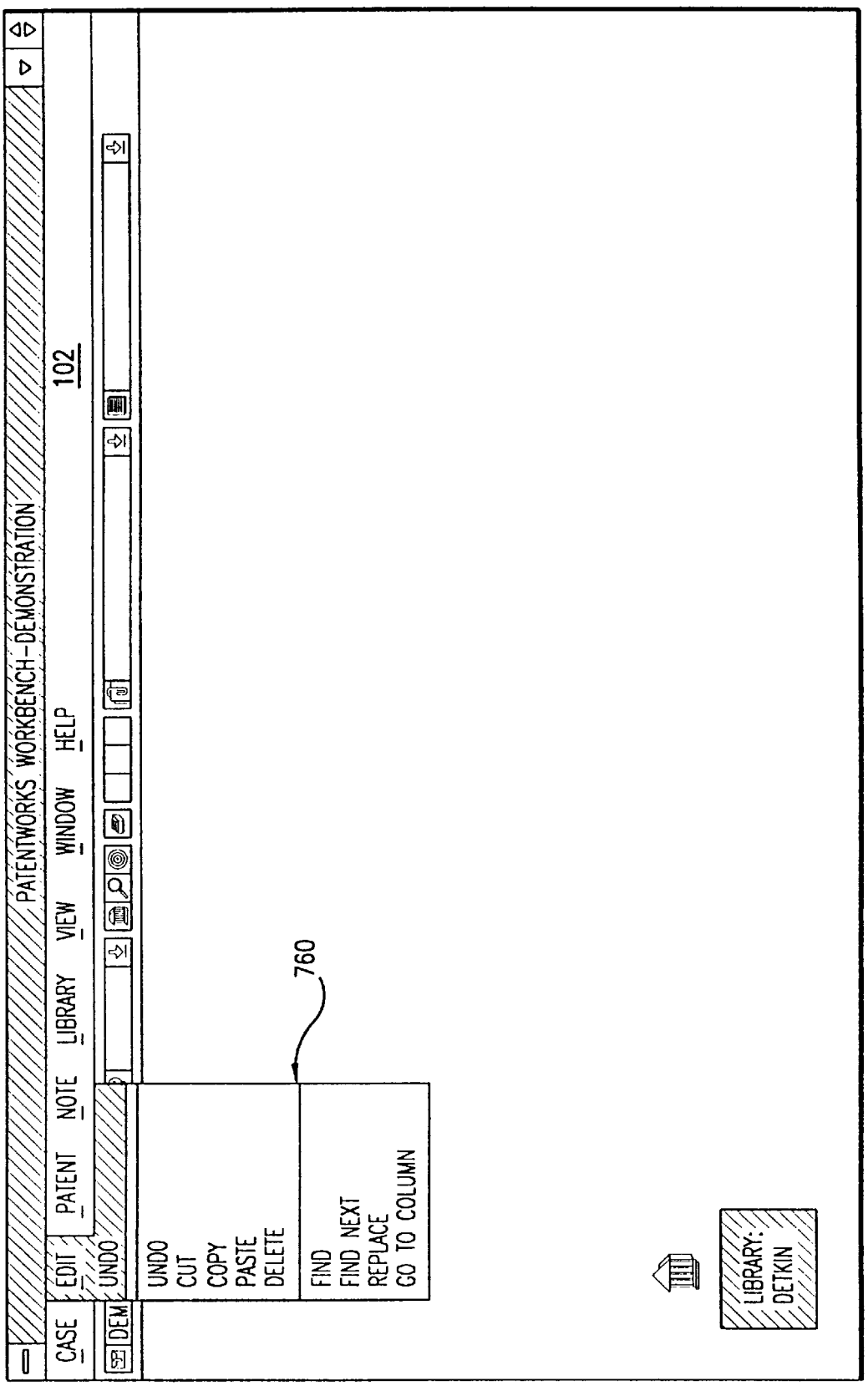
FIG. 53 illustrates the sub-command items available for selection upon the activation of the Edit command option.
Figure 54:
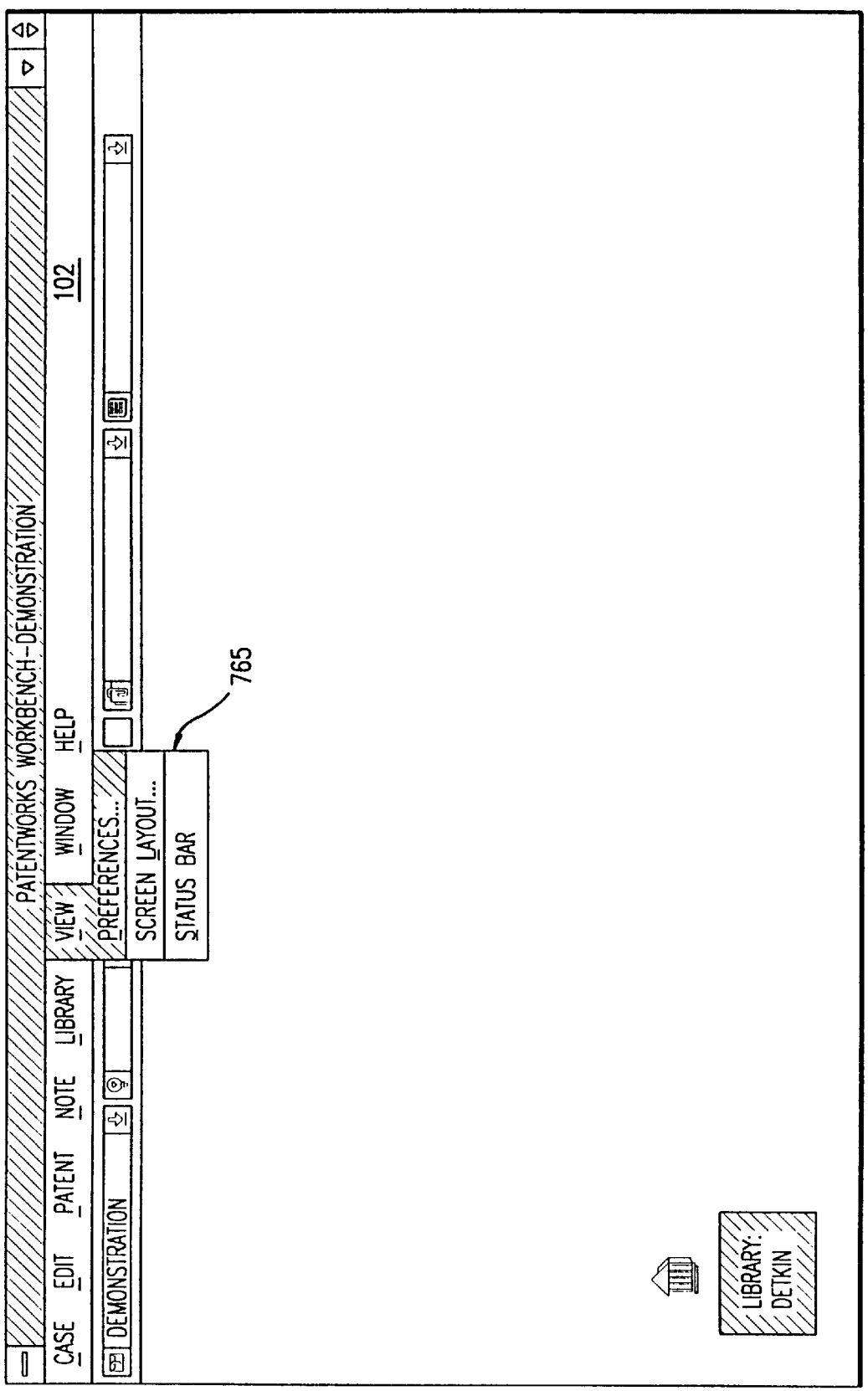
FIG. 54 illustrates the sub-command items available for selection by a user upon the activation of the View command option.
Figure 55:
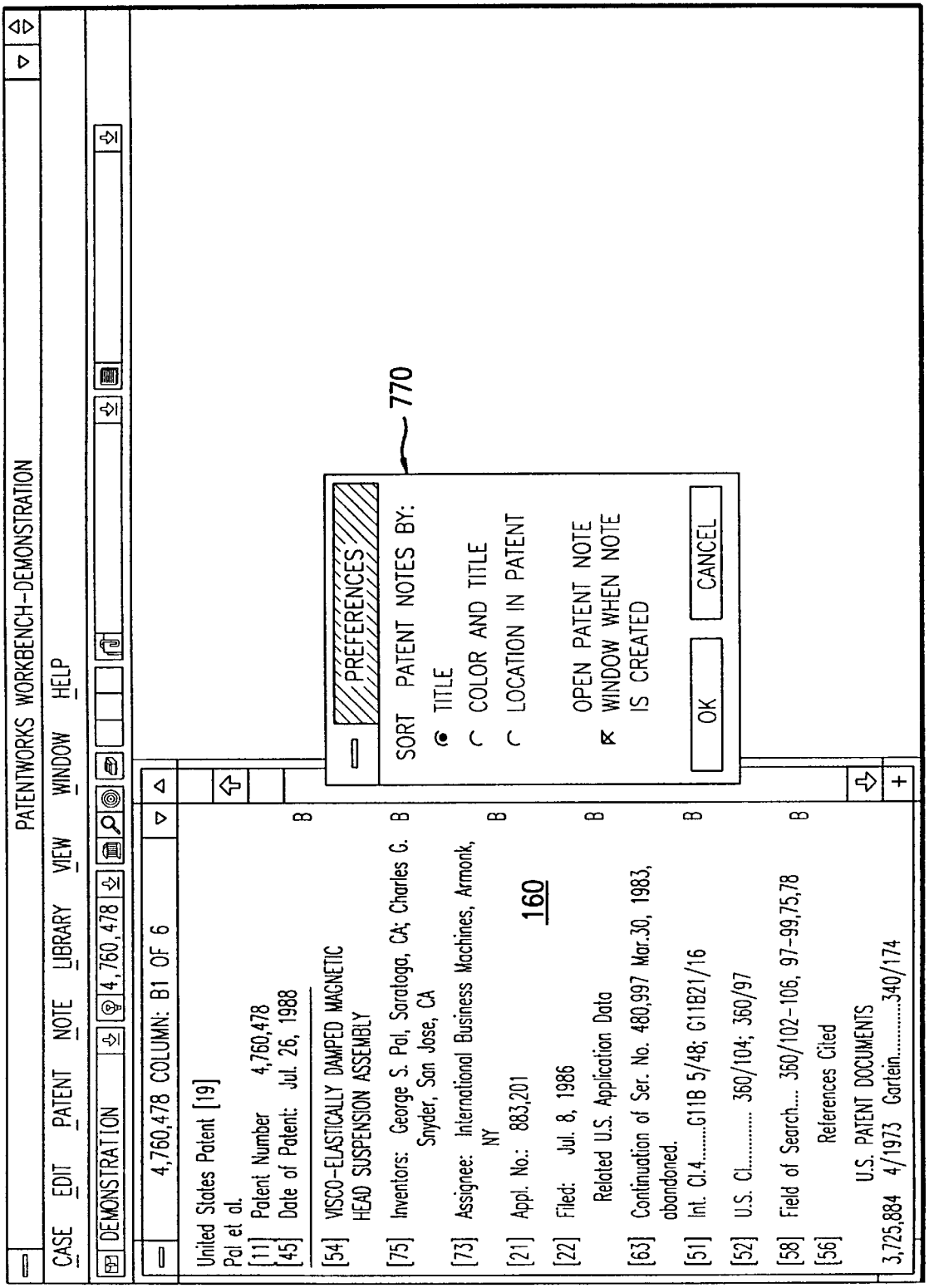
FIG. 55 illustrates the Preferences dialog box displayed upon the activation of the Preferences sub-command item of FIG. 54.

Referring now to FIG. 53, the selection of the Edit function from menu bar 102 results in the display of Edit menu 760. As illustrated, the Edit menu 760 includes sub-command items Undo, Cut, Copy, Paste, Delete, Find and Find Next, Replace, and Go To Column. As illustrated in FIG. 54, the selection of the View command option on menu bar 102 results in the generation and display of a view menu 765. The View menu options include preferences, screen layout, and status bar. The selection of the Preferences option on menu 765 results in the display of a Preferences dialog box 770, as shown in FIG. 55. The Preferences dialog box 770 permits a user to set preferences for sorting and opening various patent notes. Also included in the Preferences dialog box 770 is the option to open a patent window when the note is created. Patent notes can be sorted by title, color and location. The activation of the "Open Patent Note Window When Note is Created" results in the patent note window being displayed every time a highlight is made within window 160. A user may deactivate the feature so that the note window is not displayed when the highlights are done. The selection of the function "Sort Patent Note by Title" results in the patent notes being sorted in an alphabetical and ascending numerical order. If the patent notes are sorted by color and title, then the present invention separates the red, green and yellow notes, and arranges them in alphabetical and numerical order. If the patent notes are sorted by location in the Equivalent File, the present invention lists the patent notes as they appear from the beginning of the patent Equivalent text displayed in window 160, to the end of the patent, disregarding alphabetization and color coding.

Figure 56:
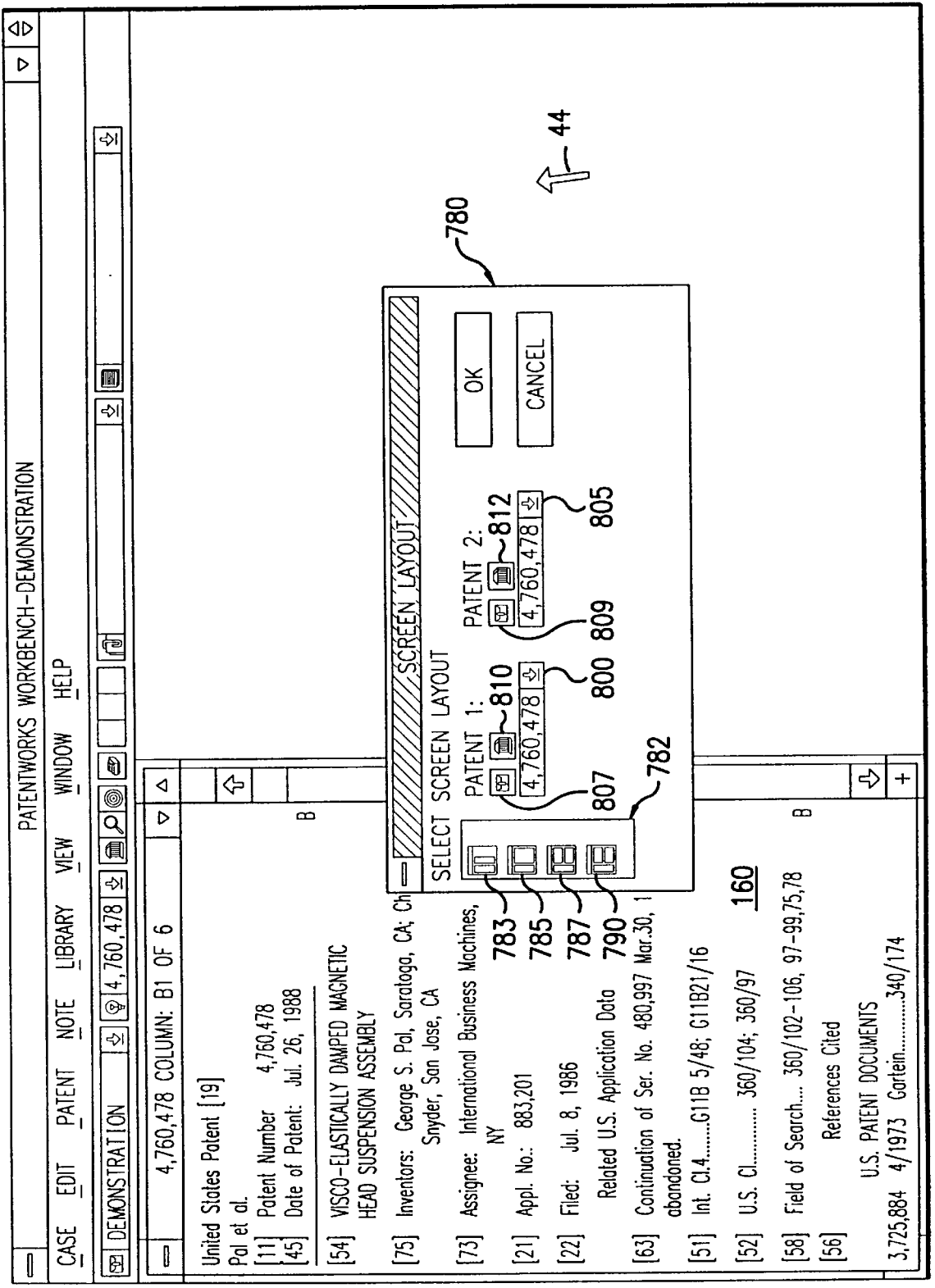
FIG. 56 illustrates the Screen Layout dialog box which is displayed upon the selection of a Screen Layout sub-command item of FIG. 54.
Figure 57:
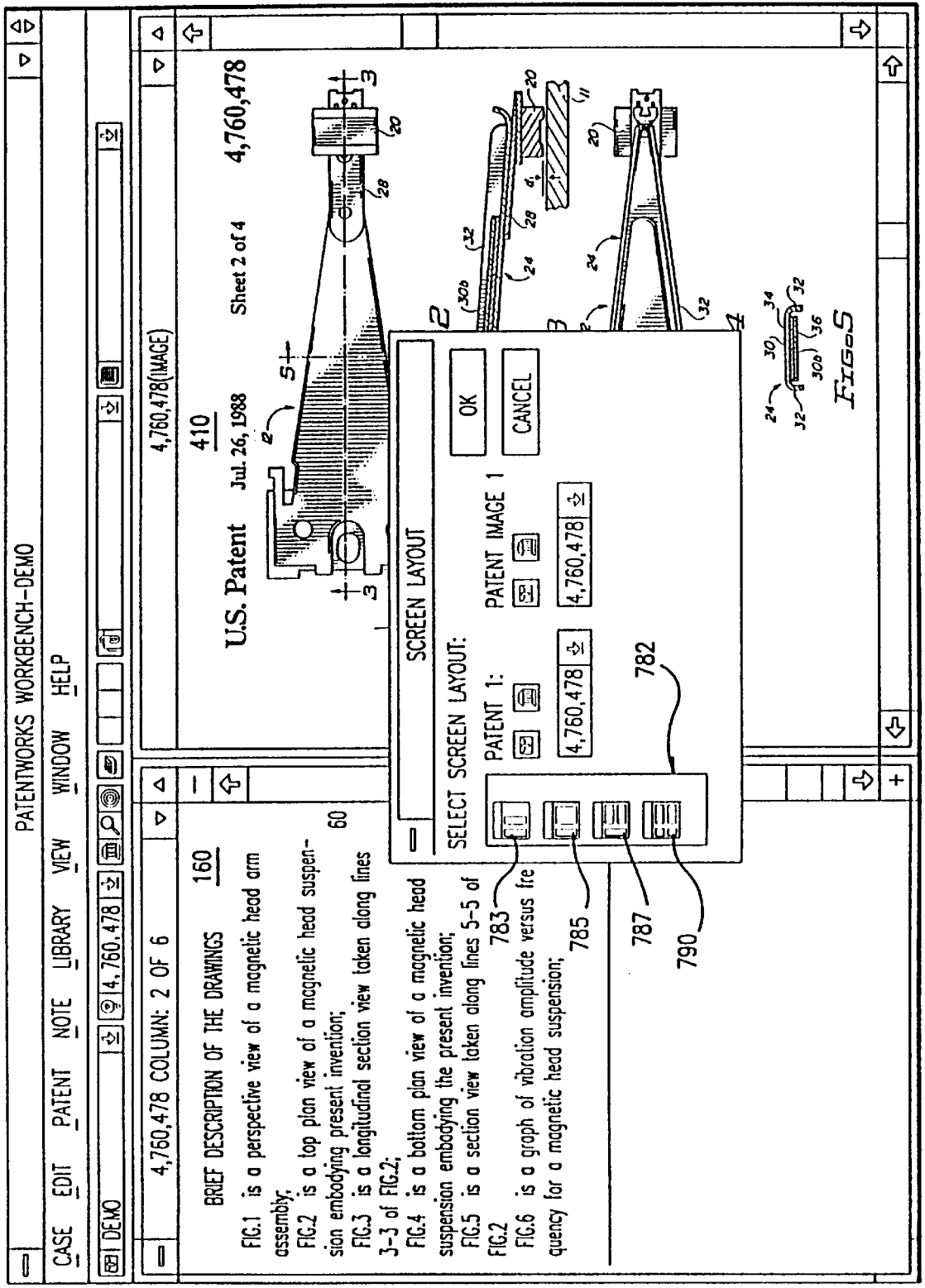
FIG. 57 illustrates the user interface of the present invention upon the selection of the Screen Layout of the Screen Layout dialog box illustrating one equivalent window and one image window on the display screen.

The selection of the Screen Layout function of menu 765 in FIG. 54 results in the display of a Screen Layout dialog box 780 as shown in FIG. 56. Referring to FIGS. 56 and 57, the Screen Layout dialog box permits a user to arrange the Equivalent File in window 160 and the image displayed within the image window 410 on the screen 68 of FIG. 3. In the presently preferred embodiment, four layout options with the choice of up to four windows to be active simultaneously are provided to the user. The four screen layout options are denoted by icons to the left within an area 782. As shown in FIG. 56, within the area 782, four layouts are provided in icon form, namely, layout 783, 785, 787, and 790. It will, of course, be appreciated by one skilled in the art that additional layouts may be provided within the Screen Layout dialog box 780, and supported by the present invention. The selection of icon 783 results in the display of two equivalent windows simultaneously. In operation, the two equivalent windows may be two views of the same patent or of different Equivalent Files. The selection of icon 785 results in the display of one equivalent window (for example window 160) and one image window (for example image window 410), simultaneously. The selection of icon 787 results in the display of two equivalent windows and one image window, simultaneously. The selection of icon 790 results in the display of two equivalent windows and two image windows simultaneously. Additional features of the Screen Layout dialog box 780 are provided, including downward arrow icon 800 and a downward arrow icon 805, as shown. The selection of the downward arrow icon 800 results in the display of a menu listing of patents in the selected case or library, identified as "Patent 1" in the Screen Layout dialog box 780. The selection of downward arrow icon 805 results in the display of a menu listing the patents within the selected case or library, identified as "Patent 2". Placing cursor 44 of FIG. 3 over the case icon 807 or case icon 809 permits a user to select a patent from the current case. Similarly, placing cursor 44 over a library icon 810 or library icon 812 and activating the mouse results in the user selecting a patent from the current library.

Figure 58:
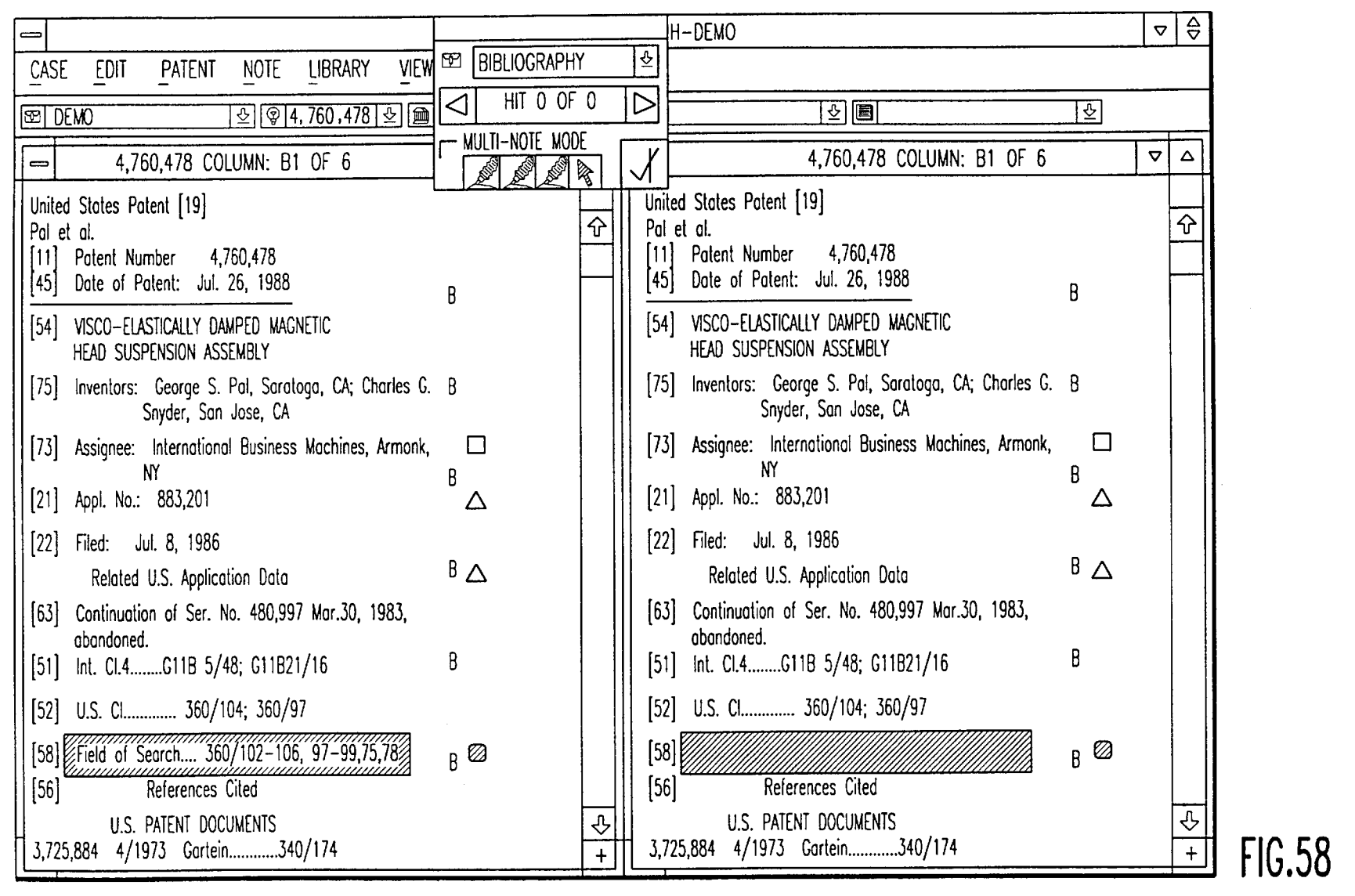
Figure 59:
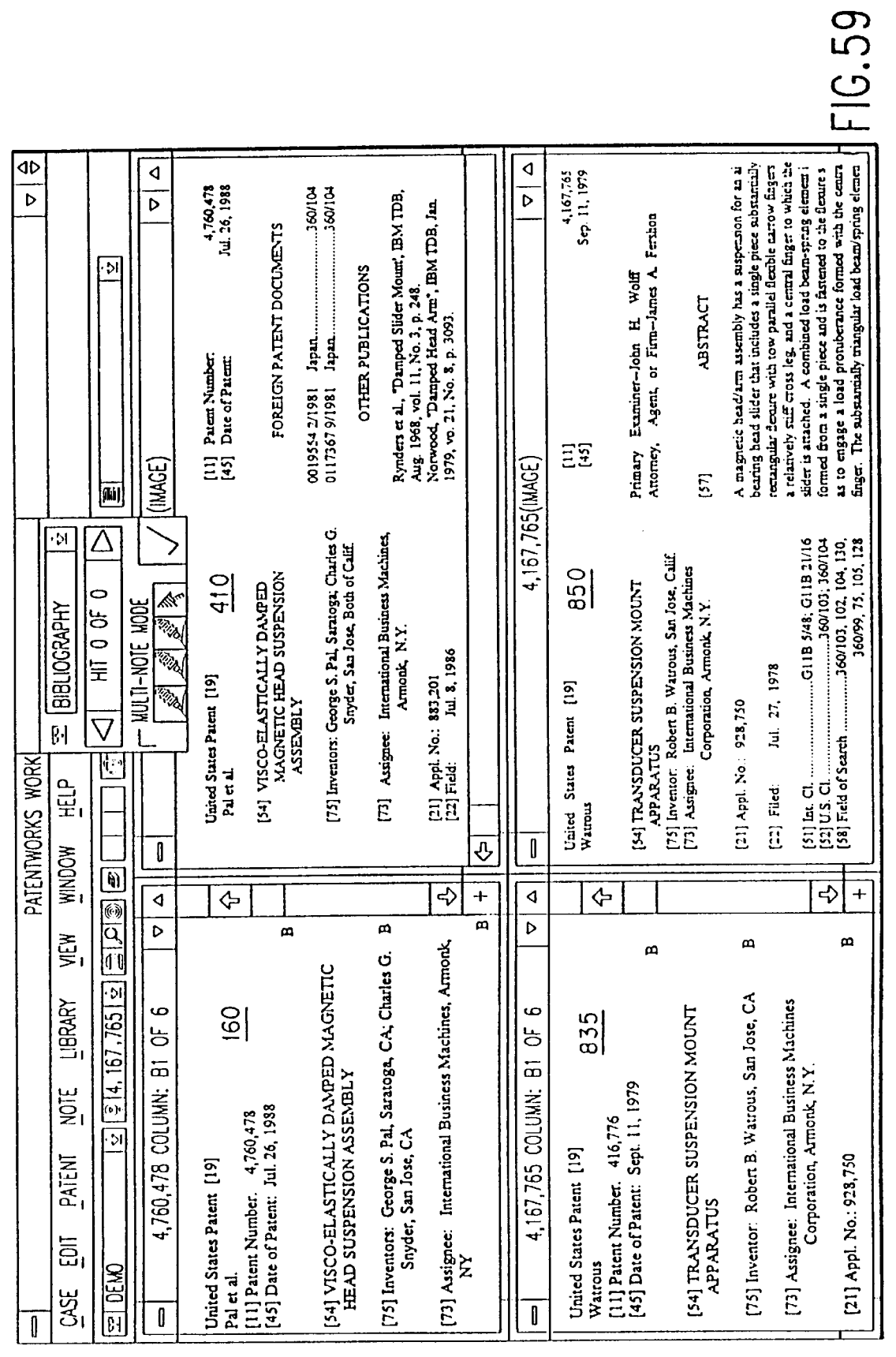
Figure 60:
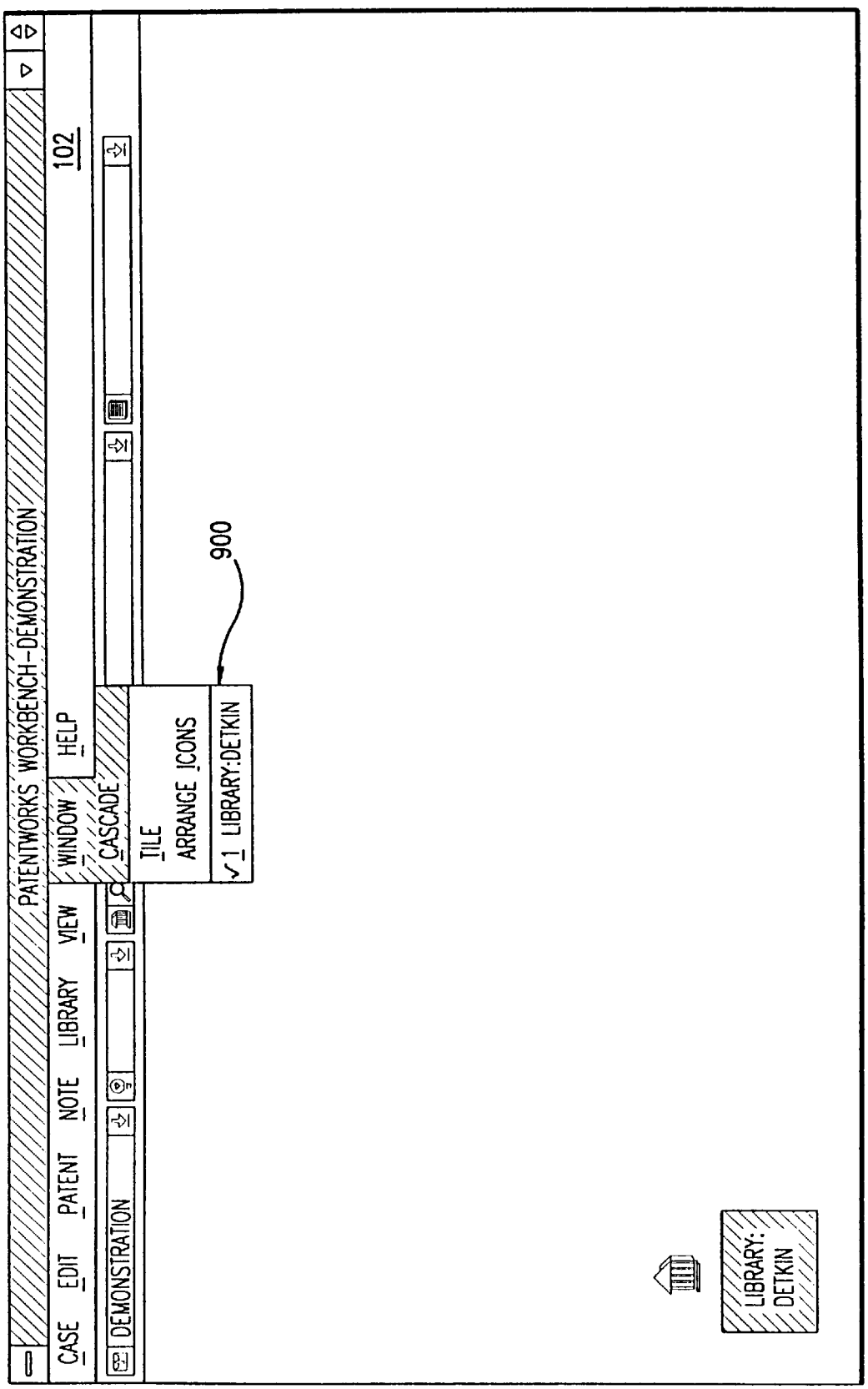
FIG. 60 illustrates the sub-command items available for selection upon the activation of the Window command option.

Referring again to FIG. 56, in the event the icon 785 is selected, the present invention displays a text equivalent window 160 on a left-hand portion of screen 68, and an image window 410 on the right portion of screen 68 of FIG. 3, as illustrated in FIG. 57. The selection of icon 783 results in the display of two equivalent windows simultaneously, as shown in FIG. 58. The selection of icon 790 results in the screen layout illustrated in FIG. 59. As shown in FIG. 60, an equivalent window 160, an image window 410, and a second equivalent window 835 and a second image window 850 are simultaneously displayed on screen 68.

Referring now to FIG. 60, selection of the Window option of the menu bar 102 results in the display of a Window menu 900. Window menu 900 includes sub-command items Cascade, Tile, Arrange Icons, and a listing of all open windows. Selecting a window from this list will bring the window to the top.

Figure 62:
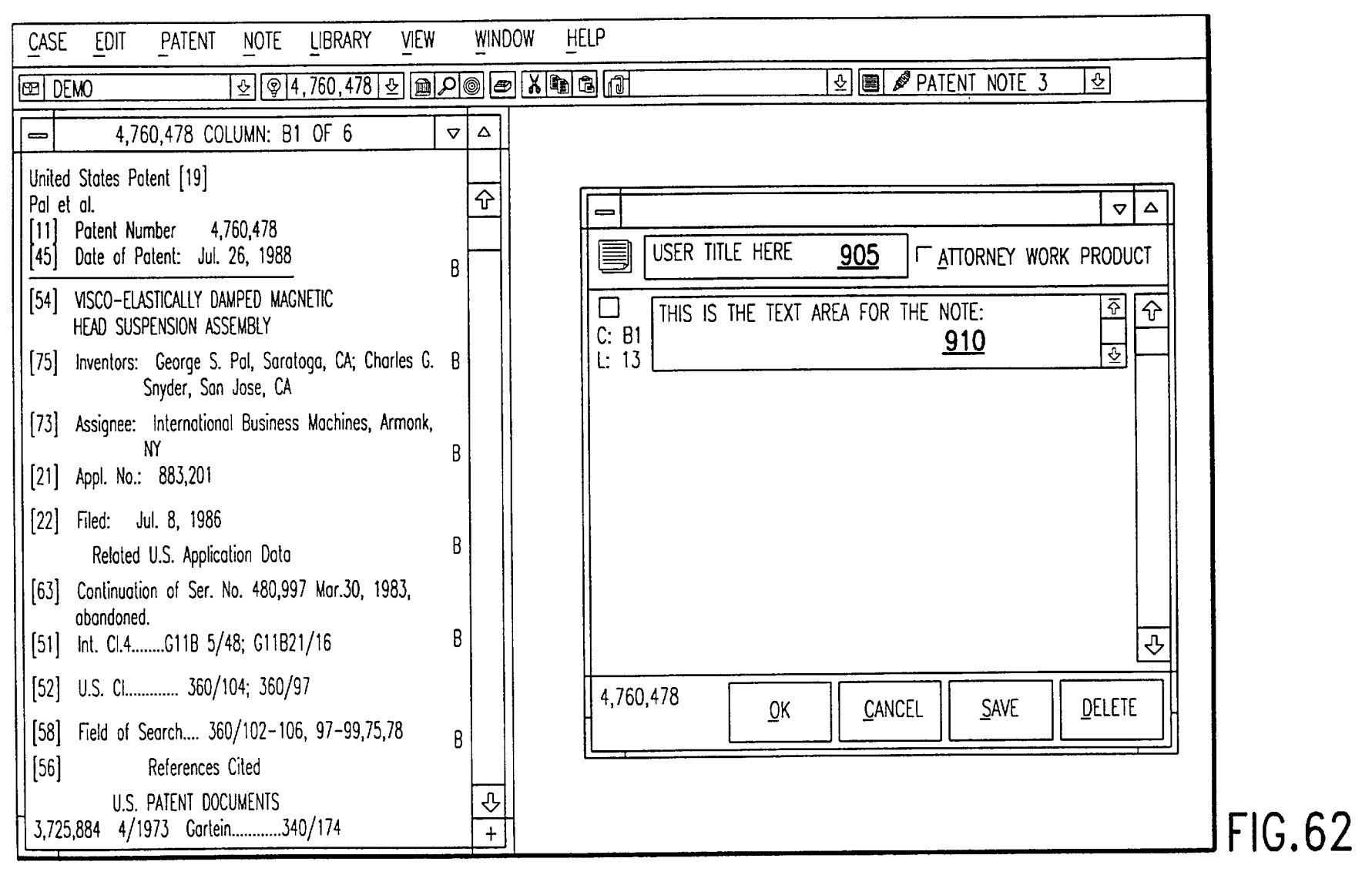
Figure 63:
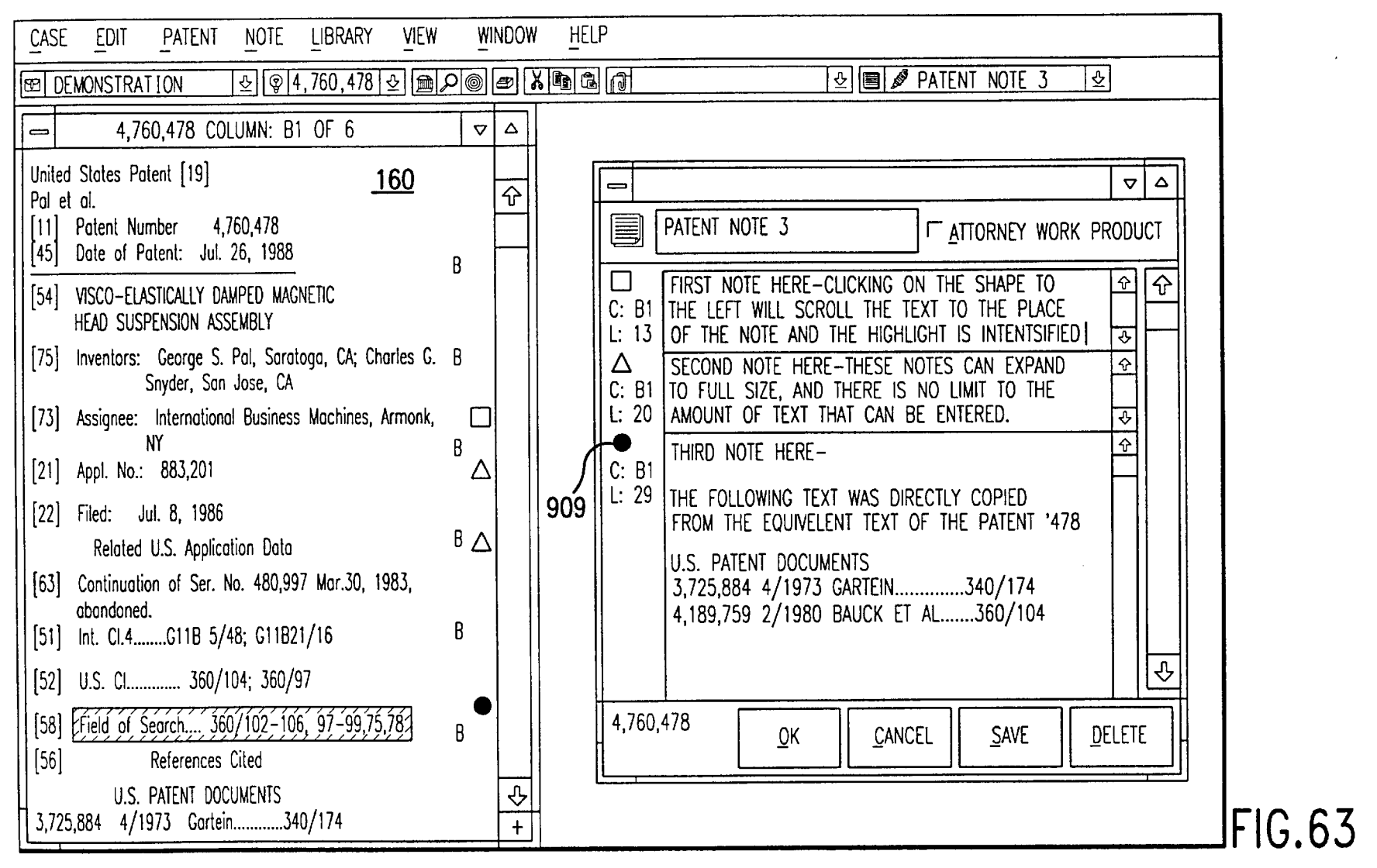

The selection of the patent note icon downward arrow 127 (see FIG. 11) results in the display of a menu 902 in FIG. 62 listing all patent notes which have been sorted according to the specifications in the preferences dialog box 770 in FIG. 56. As shown, the patent notes include various symbol icons in appropriate colors as well as a numerical indicator of the patent note number. As previously discussed, various markers of different colors are provided for highlighting portions of text of the Equivalent File. Referring now to FIG. 62 in conjunction with FIG. 61, placing cursor 44 of FIG. 3 over any of the patent note selections in menu 902 and clicking the mouse button results in the contents of the note being displayed. In the example of FIG. 62, each patent note includes a title 905, and an area 910 in which the user may input text through keyboard 56 in FIG. 3. Moreover, as illustrated in FIG. 63, a user has the option of opening multiple patent notes simultaneously. As will be appreciated from FIG. 63, each patent note includes text, as well as the notation as to the column and line number of the highlight to which the patent note corresponds. Moreover, a geometric shape indicator 909 (for example, in FIG. 63, a square, triangle, and circle) in the appropriate color corresponds to the highlight in the Equivalent File within, for example, window 160 in FIG. 63. In the example of FIG. 63, the user has selected the multi-note mode and created notes using different colored highlighter pens within the Equivalent File displayed in window 160.

Continuing to refer to FIG. 63, the present invention can copy and paste a portion of, or an entire external file, such as a deposition, an interrogatory, or an article into the patent note. A user can also search for a term or terms in the patent note. In addition, when the user clicks on a portion of the text in the patent note or an indicator 909, a portion of the text relating to the particular patent note is displayed in the equivalent window 160.

Figure 64:
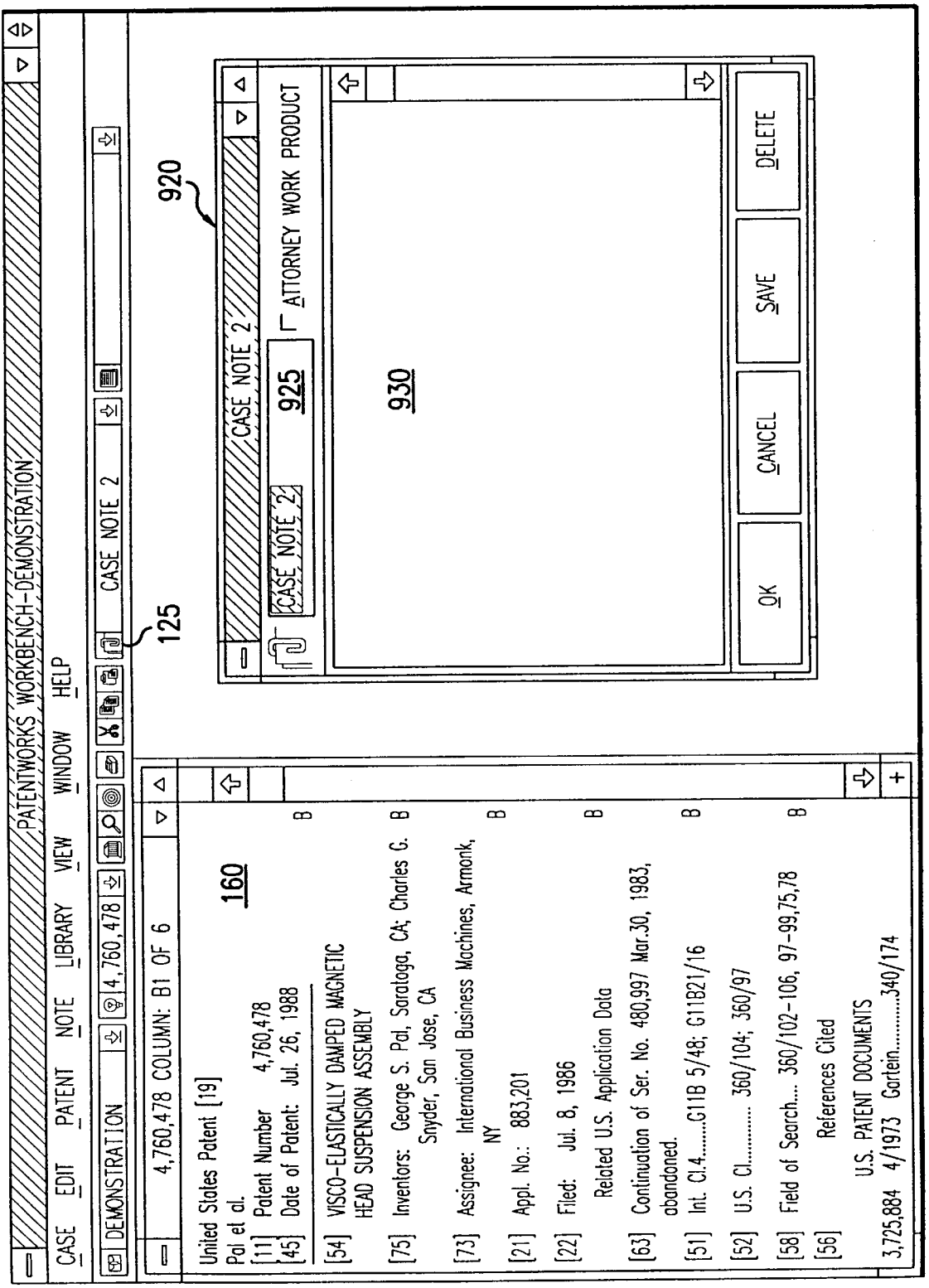
FIG. 64 illustrates the present invention's case note.

FIG. 64 illustrates a case note window entitled "Case Note 2". As shown, Case Note 2 comprises a window 920 having a case note title area 925 and an open text area 930. A user may define the case note title 925, and input text regarding a particular case directly into area 930 using the keyboard 56 in FIG. 3. In addition, the user can copy and paste a portion of or a whole file into a case note as well as search for a term, or terms in the case notes.

Figure 65:
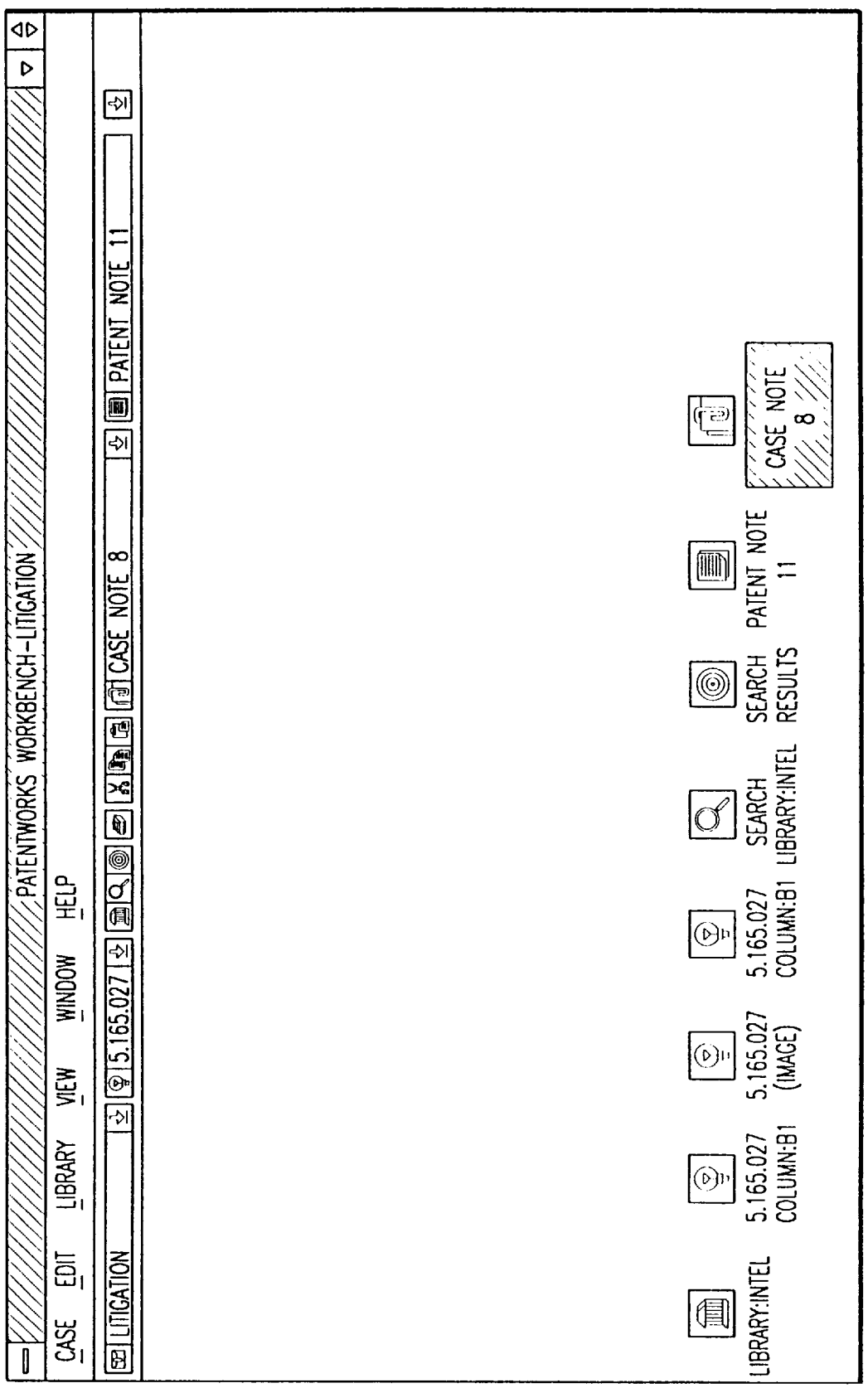
FIG. 65 illustrates the minimization of exemplary documents, such as search results and the like on the display of the present invention.

FIG. 65 illustrates the minimization of libraries, patents, search results, patent and case notes to icons to conserve real estate space on screen 68 in FIG. 3. In as much as the minimization of documents and the like are known in the art, no further description of the minimization utilized by the present invention is provided in this specification.

Figure 66:
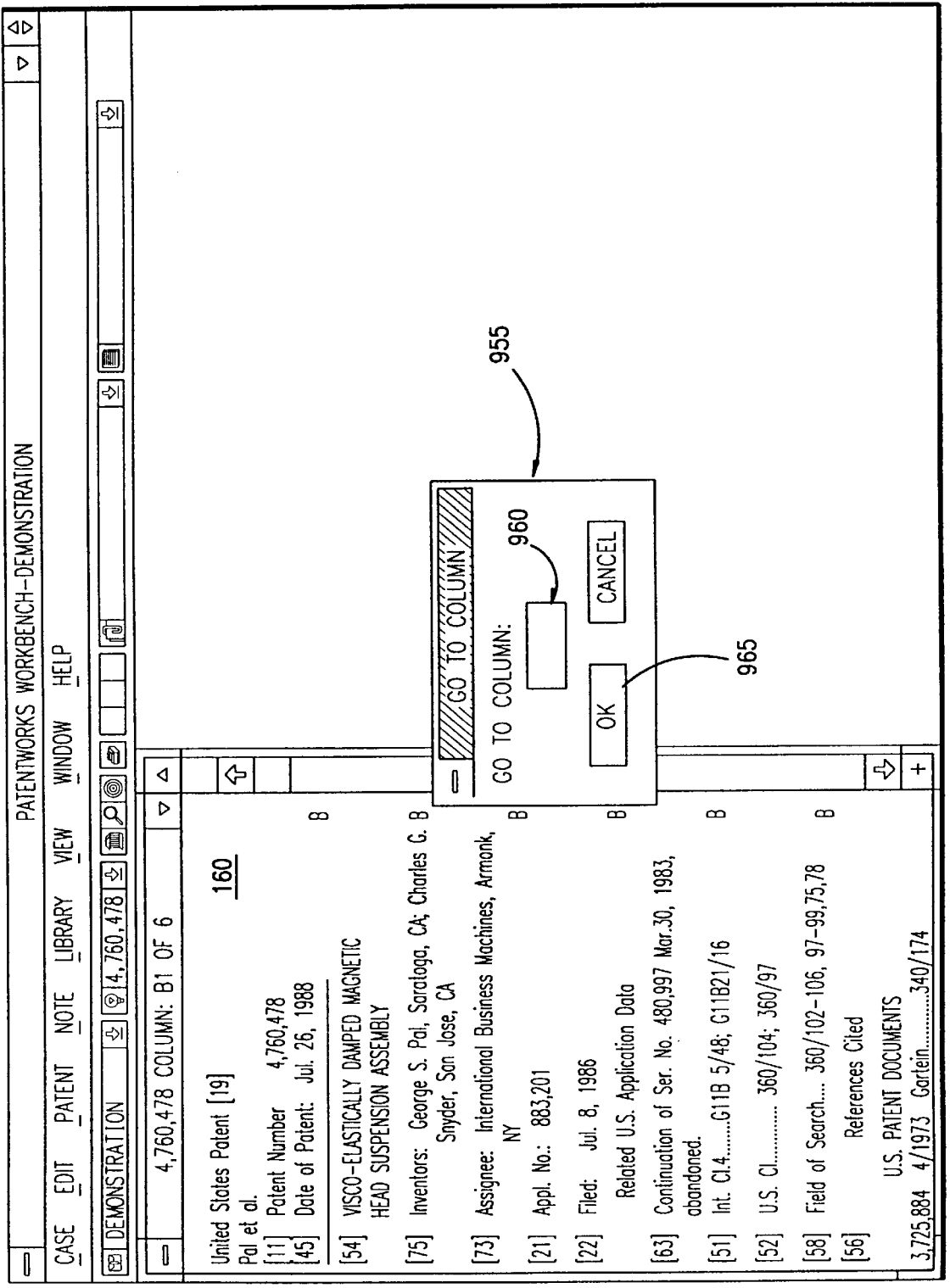
FIG. 66 illustrates the present invention's Go To Section dialog box which permits a user to input a patent column number and upon activation, results in the display of the column in the Equivalent File corresponding to the desired patent column.
Figure 67:
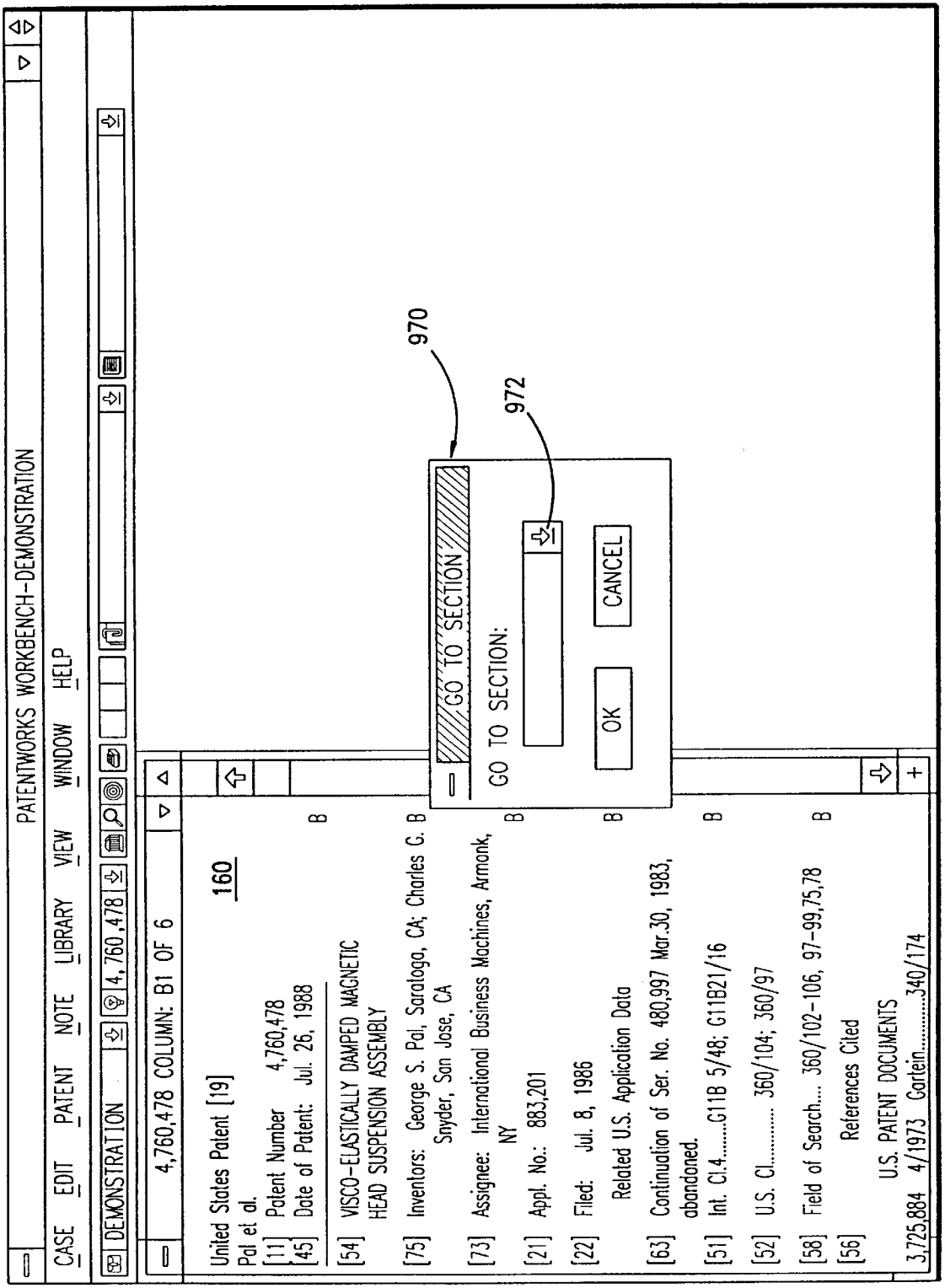
FIG. 67 illustrates the present invention's Go To section dialog box which permits a user to select a section of the patent and upon activation, results in the display of the selected section in the Equivalent window.

FIG. 66 illustrates the Go To dialog box 955 of the present invention which permits a user to directly input a column number into a field 960, using keyboard 56 in FIG. 3. The activation of an OK button 965 results in the display of the designated column of the Equivalent File in the equivalent window 160. In practice, it has been found that the quickest method for locating and displaying a specific column in the Equivalent File is through the use of the Go To column dialog box 955. FIG. 67 illustrates the present invention's Go To Section dialog box 970. The dialog box 970 includes the downward pointing arrow function 972, the activation of which results in the display of all sections in the particular patent displayed within the equivalent window 160. The Go To Section dialog box 970 is provided as a method for navigating from section to section within the Equivalent File displayed in the equivalent window 160. The selection of a section, and the subsequent display of the section, in the equivalent window 160 obviates the need to search page by page for the desired section in the Equivalent File.

Figure 68:
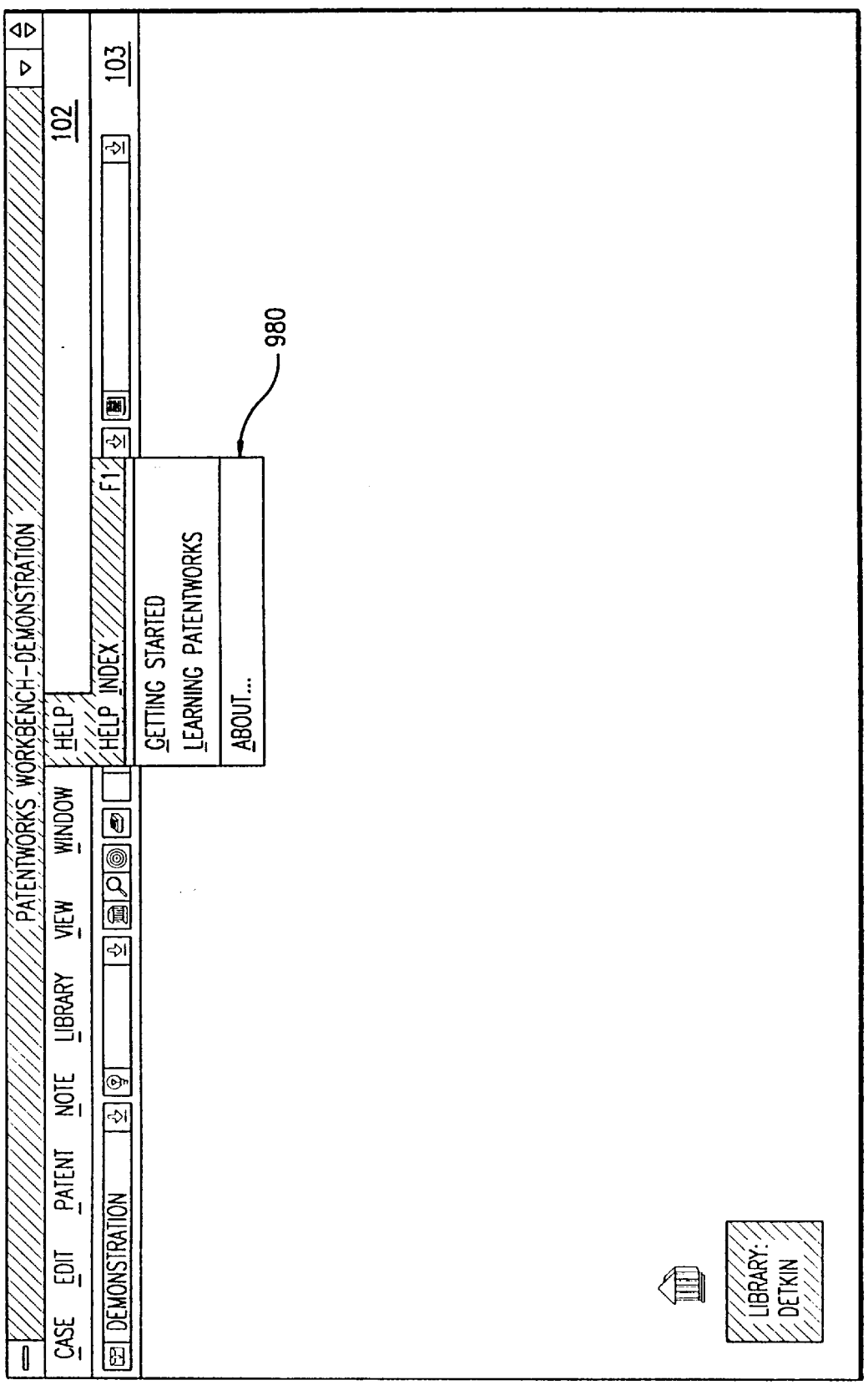
FIG. 68 illustrates the sub-command items available for selection by a user upon the activation of the Help command option.
Figure 69:
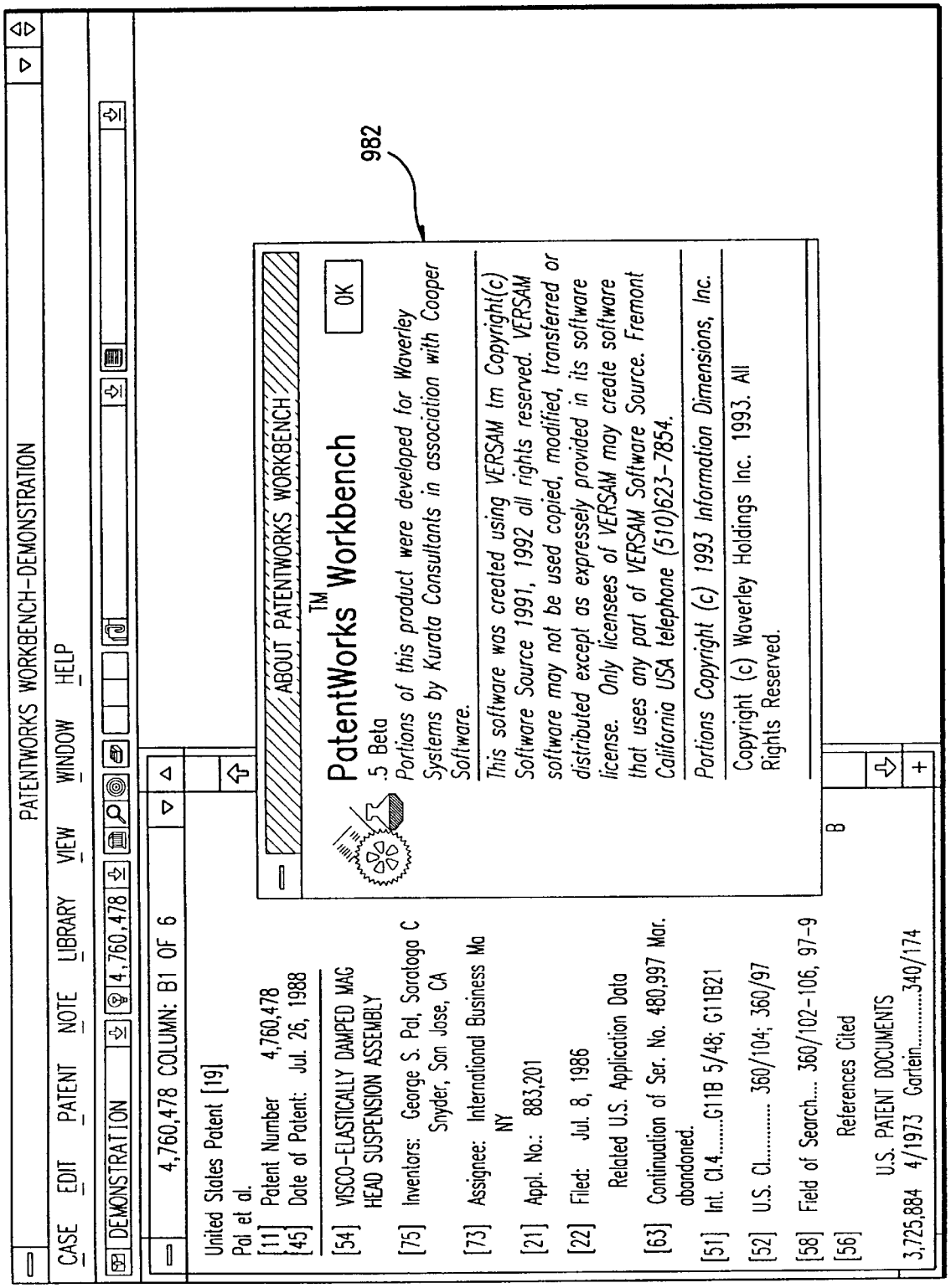
FIG. 69 illustrates the About dialog box which is displayed upon the activation of the About sub-command item illustrated in FIG. 68.

Referring now to FIG. 68, the selection of the Help function from menu 102 results in the display of a Help menu 980. Help menu 980 includes various sub-command options, including Help Index, Getting Started, Learning PatentWorks™, and About. The selection of the About command results in the display of an About information box 982, shown in FIG. 69. The About dialog box 982 lists information on the invention comprising the subject of this application, copyright information and other pertinent information related to the product.

Figure 70:
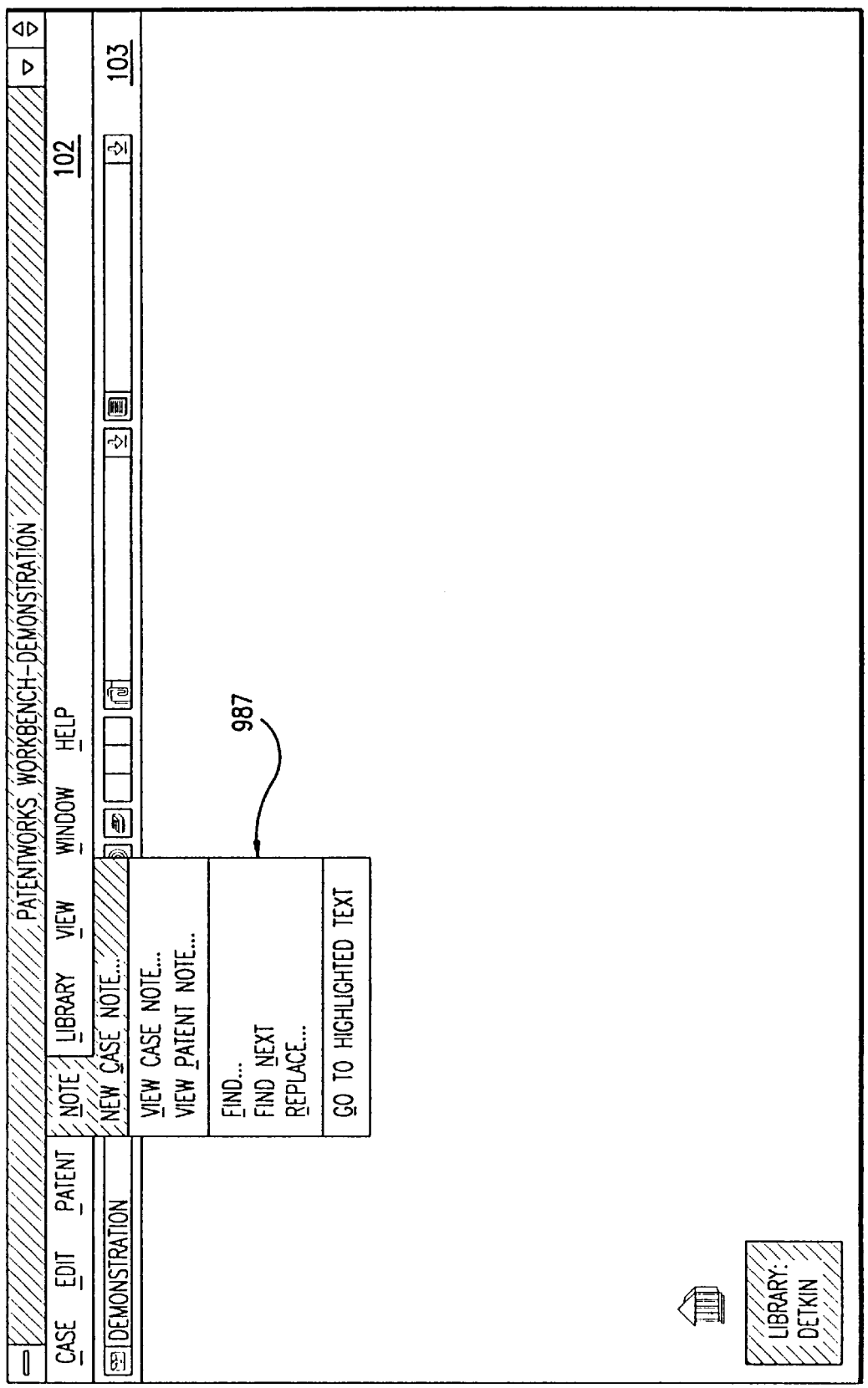
FIG. 70 illustrates the sub-command items which are available for selection by a user upon the activation of the Note command option.
Figure 71:
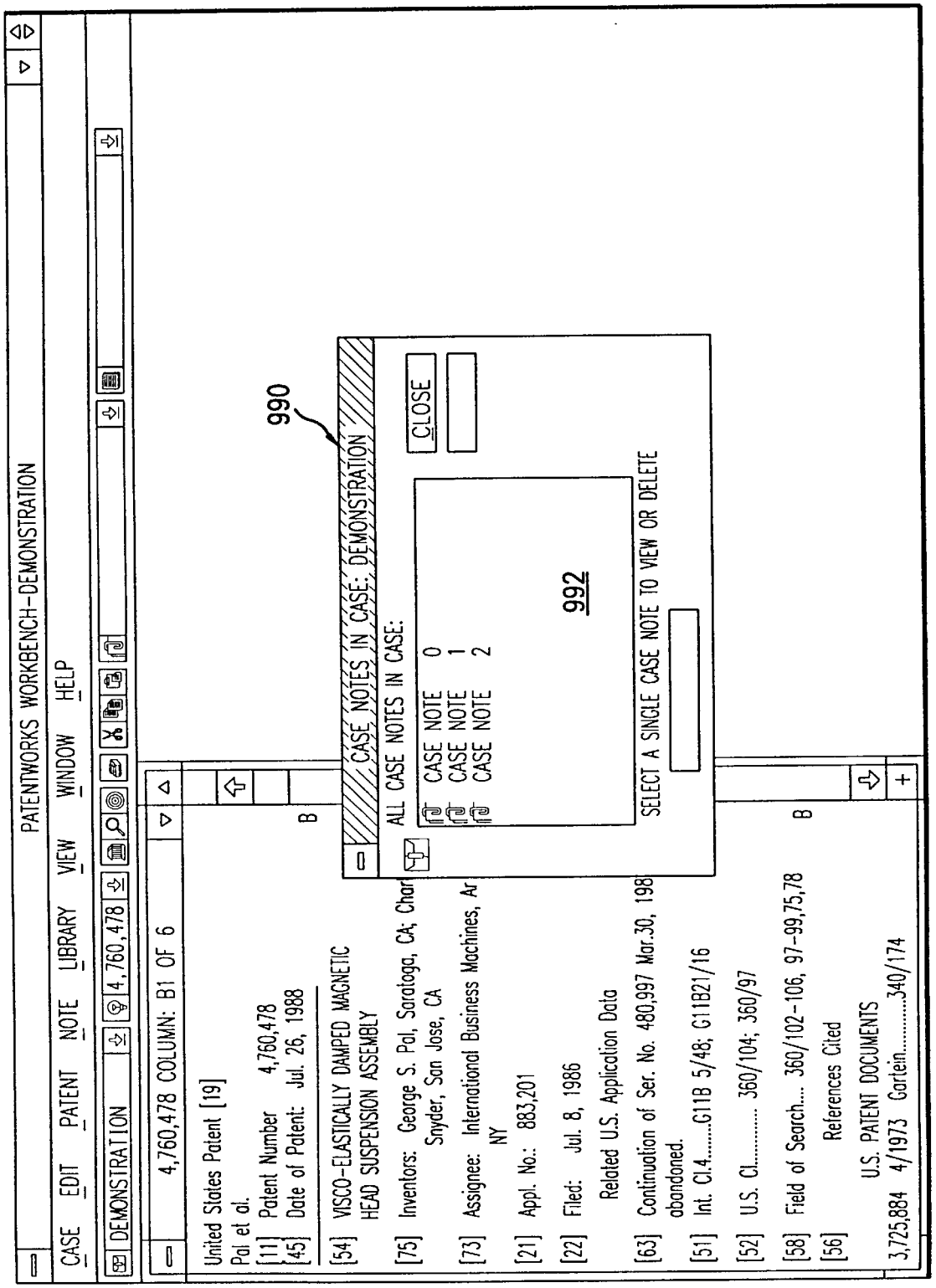
FIG. 71 illustrates the case notes in Case dialog box which is displayed upon the selection of the View Case Note sub-command option illustrated in FIG. 70.

Referring to FIG. 70, the selection of the Note function of menu 102 results in the display Note menu 987. The Note menu 987 includes a variety of options including New Case Note, View Case Note, View Patent Note, Find, Find Next, Replace, and Go To Highlighted Text. The selection of the View Case Note option results in the display of a Case Notes in Case dialog box 990 as shown in FIG. 71. Box 990 permits a user to select a case note to view. An area 992 in box 990 lists all of the case notes in the current case. The user may then select a single case note to view.

Figure 72:
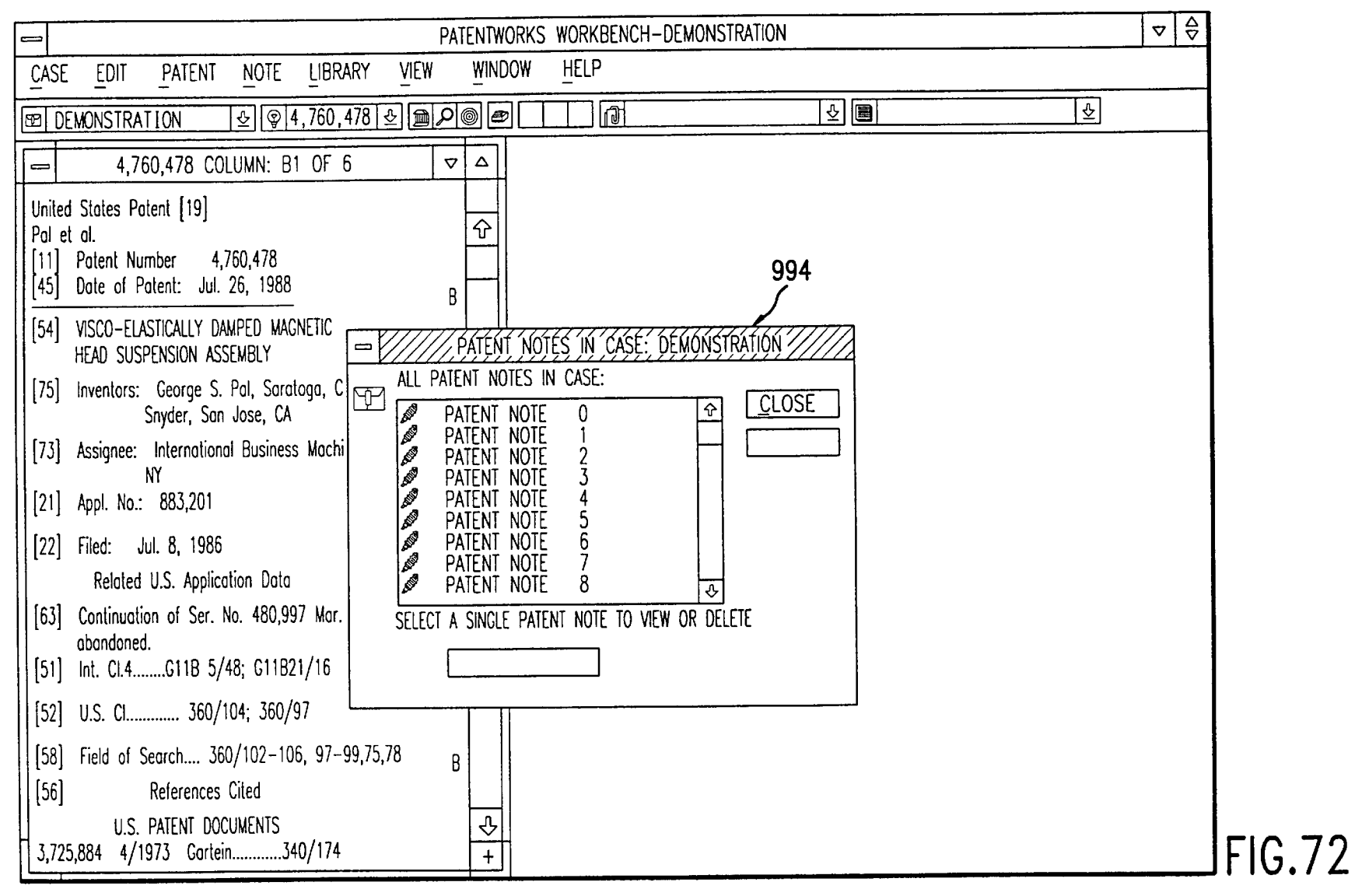

The selection of the View Patent Note option of menu 987 of FIG. 70 results in the display of a Patent Notes in Case dialog box 994 shown in FIG. 72. Box 994 permits a user to select a patent note to view or to delete. Patent notes are sorted as specified in the preferences dialog box 770 in FIG. 56, then by the patent note number. A user may select one of the patent notes by placing the cursor 44 of FIG. 3 over the note and by clicking the switch on the mouse.

The user interface of the present invention includes a number of additional features, as described below.

FLEXIBLE NOTES

Figure 87:
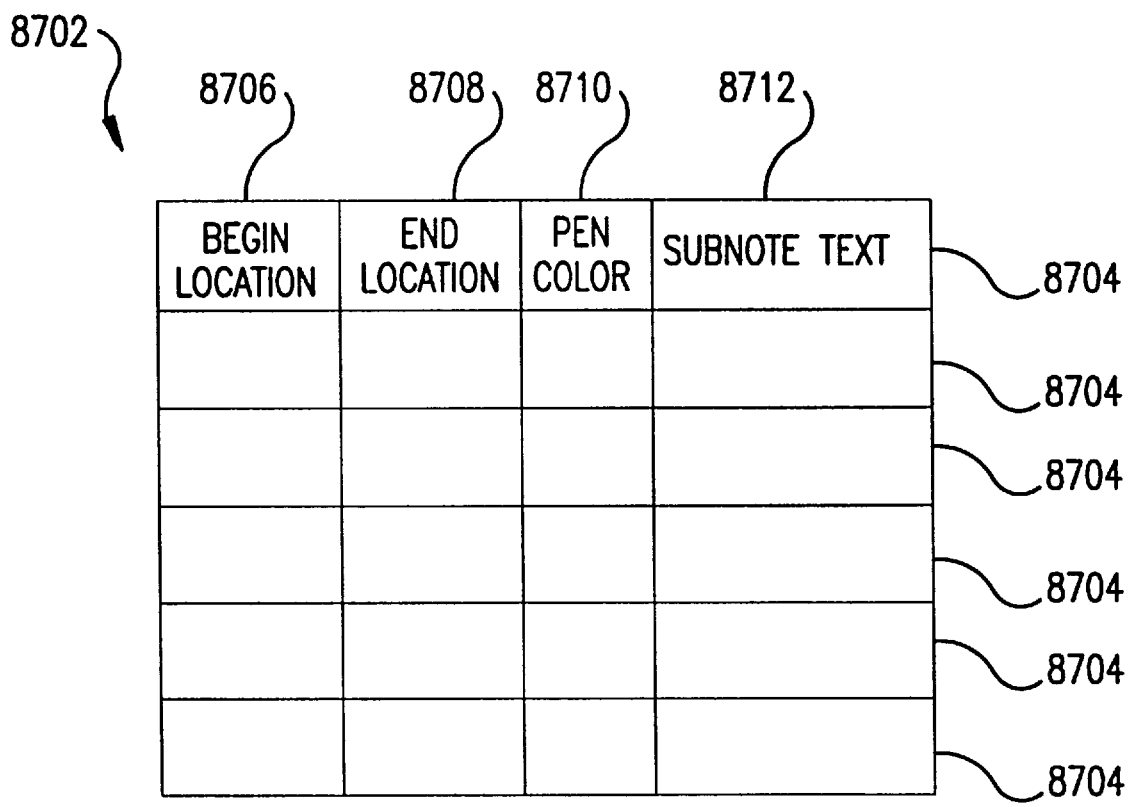

According to one embodiment of the present invention, each patent note is associated with one patent (a patent note can be associated with one or more text portions of a patent). Patent notes and subnotes are stored in a note database, such as note database 8702 shown in FIG. 87. Note database 8702 is associated with a single patent, and stores all the notes and subnotes created by the user for the patent.

Note database 8702 includes a row 8704 for each subnote associated with the patent. Note database 8702 may also include entries to identify which subnotes are associated with which master notes (a master note is a note that contains one or more subnotes). Each row 8704 includes a begin location field 8706, an end location field 8708, a pen color field 8710, and a subnote text field 8712. The begin location field 8706 and the end location field 8708 store information that identify the text in the patent associated with the subnode. In particular, the begin location field 8706 stores information (such as column and line number) where this text in the patent begins, and the end location field 8708 stores information (such as column and line number) where this text in the patent ends. (In an embodiment where a subnote can be linked to more than one text portion of a patent, there is a begin location value and an end location value for each such text portion.)

The pen color field 8710 stores information that identifies the color of the pen which the user utilized to highlight this text of the patent (i.e., the text in the patent with which the patent subnote is associated). (In an embodiment where a note can be linked to more than one text portion of a patent, there is a pen color value for each such text portion.) The subnote text field 8712 stores the actual text of the patent subnote.

The present invention retrieves information from the note database 8702 as requested by the user and displays such information in a note window such as that shown in FIG. 63. Whenever the user adds, deletes, or modifies a patent subnote the present invention reflects this addition, deletion, or modification in the appropriate note database. The user interface which the present invention provides to allow users to interact and manipulate patent notes and subnotes is discussed above. The invention enables users to perform keyword searches through any one note.

According to an alternative embodiment of the present invention, each patent note is associated with any or all of the patents in a case. In particular, each subnote of a note can be associated with any or all of the patents in a case. The user specifies the patents in a case associated with each patent subnote.

In this alternative embodiment, patent notes are stored in a note database, such as note database 8802 shown in FIG. 88. Note database 8802 is associated with a case, and stores all of the notes and subnotes created by the user for the patents in the case.

Note database 8802 includes a row 8804 for each subnote associated with the patents in a case. Each row 8804 includes a patent(s) field 8814, a begin location(s) field 8806, an end location(s) field 8808, a pen color(s) field 8810, and a note text field 8812. The note database 8802 may also include rows to identify which subnotes are associated with which master notes.

The patent(s) field 8814 lists all of the patents associated with the patent subnote. The begin location(s) field 8806 and the end location(s) field 8808 store information that identify the text in the patents associated with the patent subnote. There is a begin location value and an end location value for each patent listed in the patent(s) field 8814. (In an embodiment where a subnote can be linked to more than one text portion of a patent, there is a begin location value and an end location value for each such text portion in each patent listed in the patent(s) field 8814.)

The pen color(s) field 8810 stores information that identifies the pen colors which the user utilized to highlight text in the patents listed in the patent(s) field 8814. There is a pen color value for each patent listed in the patent(s) field 8814. (In an embodiment where a subnote can be linked to more than one text portion of a patent, there is a pen color for each such text portion in each patent listed in the patent(s) field 8814.)

The subnote text field 8812 stores the actual text of the patent subnote.

As just described, a patent subnote may be associated with any of the patents in a single case. In another embodiment of the invention, a patent subnote may be associated with any patents stored in the system, irrespective of case.

Figure 89:
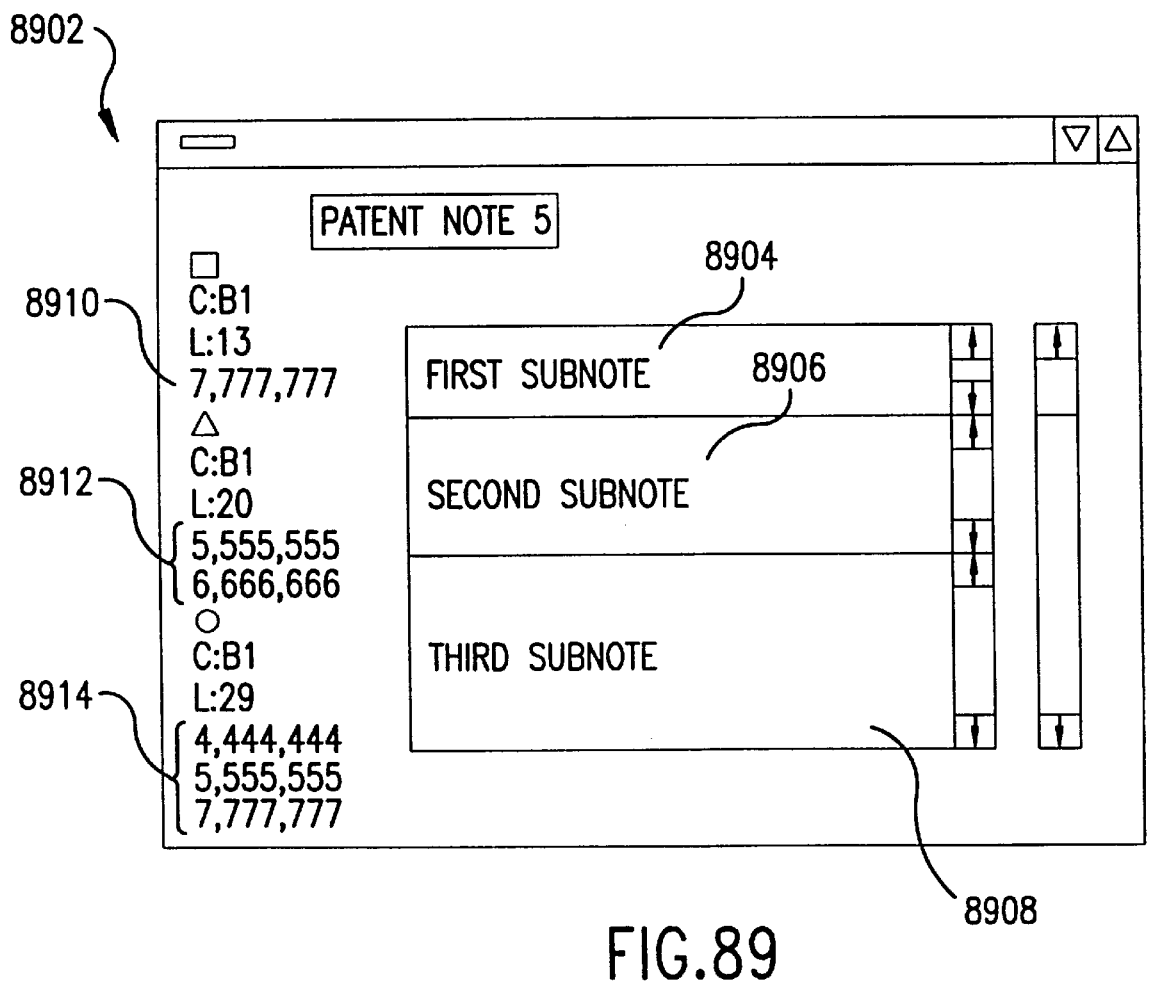
FIG. 89 illustrates an example note window according to the second embodiment shown in FIG. 88.

The present invention retrieves information from the note database 8802 as requested by the user and displays such information in a note window 8902 such as that shown in FIG. 89. In this example note window 8902, a first patent subnote, a second patent subnote, and a third patent subnote are being displayed in scroll windows 8904, 8906, and 8908, respectively. The patent(s) associated with these patent subnotes are indicated in display areas 8910, 8912, and 8914, respectively. Specifically, the-first patent subnote is associated with U.S. Pat. No. 7,777,777, the second patent subnote is associated with U.S. Patent Nos. 5,555,555 and 6,666,666, and the third patent subnote is associated with U.S. Patent Nos. 4,444,444; 5,555,555; and 7,777,777. According to an embodiment of the present invention, a user can display a patent (and, in particular, the section of the patent containing the text associated with the subnote) by double clicking on the patent number listed in display areas 8910, 8912, and 8914.

Figure 61:
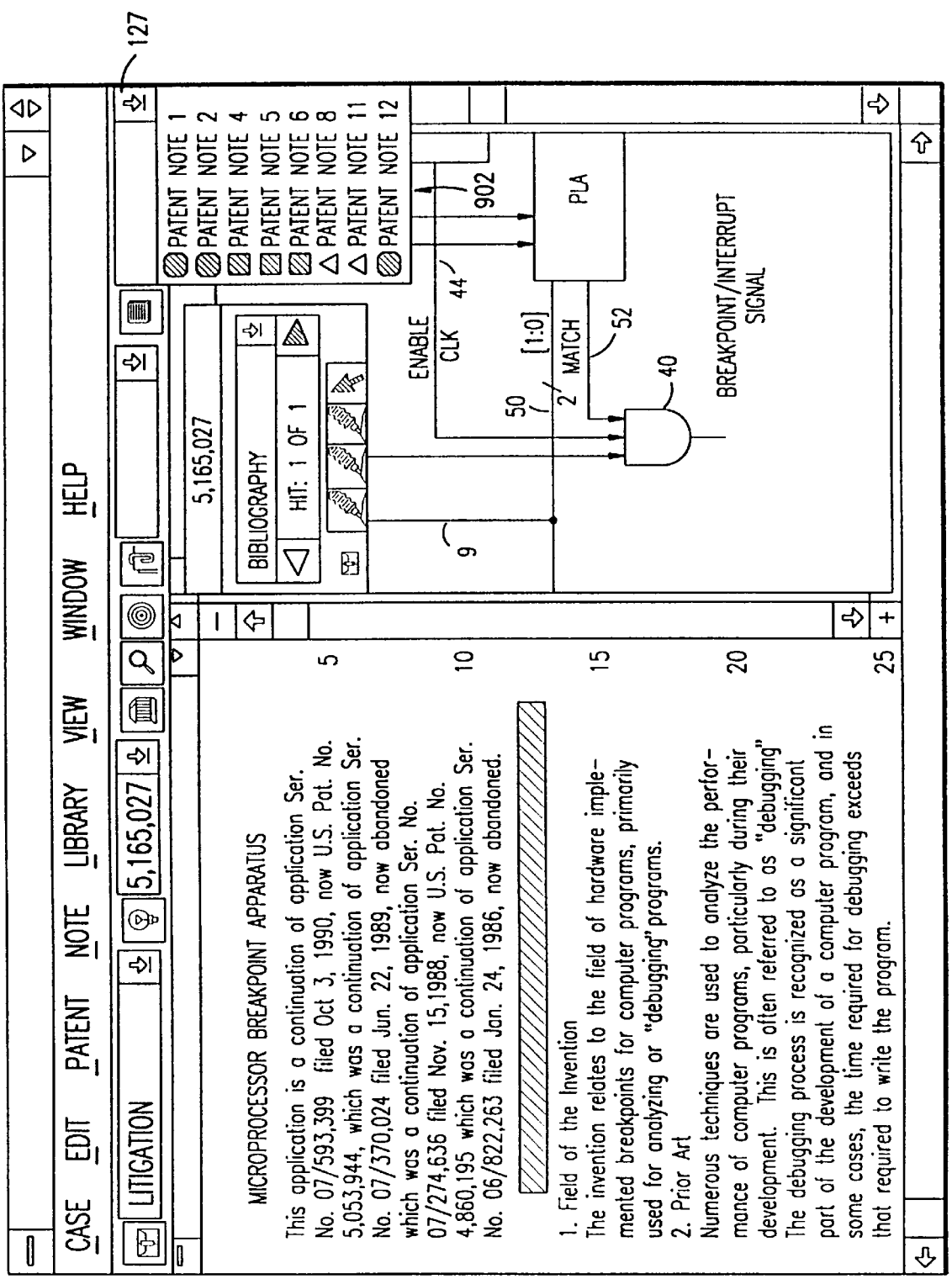
FIG. 61 illustrates the patent note menu of the present invention which displays all patent notes which have been generated by a user.

When a user creates a patent note or subnote (by highlighting a section of text in a patent using a color pen, as shown in FIG. 61), the user is allowed to create an entirely new patent note, or to form a linkage to an already existing patent note. The user creates an entirely new patent note by selecting a section of text (with a pen) while the note window 8902 is closed. The user forms a linkage to an already existing patent note by selecting a section of text (with a pen) while the note window 8902 is open. The invention then creates a new subnote in the note being displayed in the note window 8902.

The invention enables users to perform keyword searches through all of the notes and subnotes (or any subset of such notes and subnotes) associated with a case. Preferably, the invention performs linear searches through the notes and subnotes (i.e., word by word text comparisons), although other well known searching strategies could alternatively be used.

According to an alternative embodiment of the present invention, a patent note is associated with any or all of the patents in a case. However, each subnote can be associated with only one of the patents in a case. In this embodiment, patent notes are stored in a note database, such as note database 8802 shown in FIG. 88 and described above. In this case, however, the patent field 8814 in each row 8804 stores information identifying only one patent (again, each row 8804 corresponds to a patent subnote).

Subnotes of a note are displayed in a note window 8902 such as that shown in FIG. 89 and described above. In this case, however, the display areas 8910, 8912, and 8914 each identify a single patent.

The embodiments described above are directed to notes and subnotes linked to portions of patent text. It should be understood, however, that the invention is also directed to notes and subnotes linked to non-textual and/or non-patent objects. In particular, notes and subnotes may be linked to patent related and non-patent related documents, images, audio clips, etc.

Figure 90:
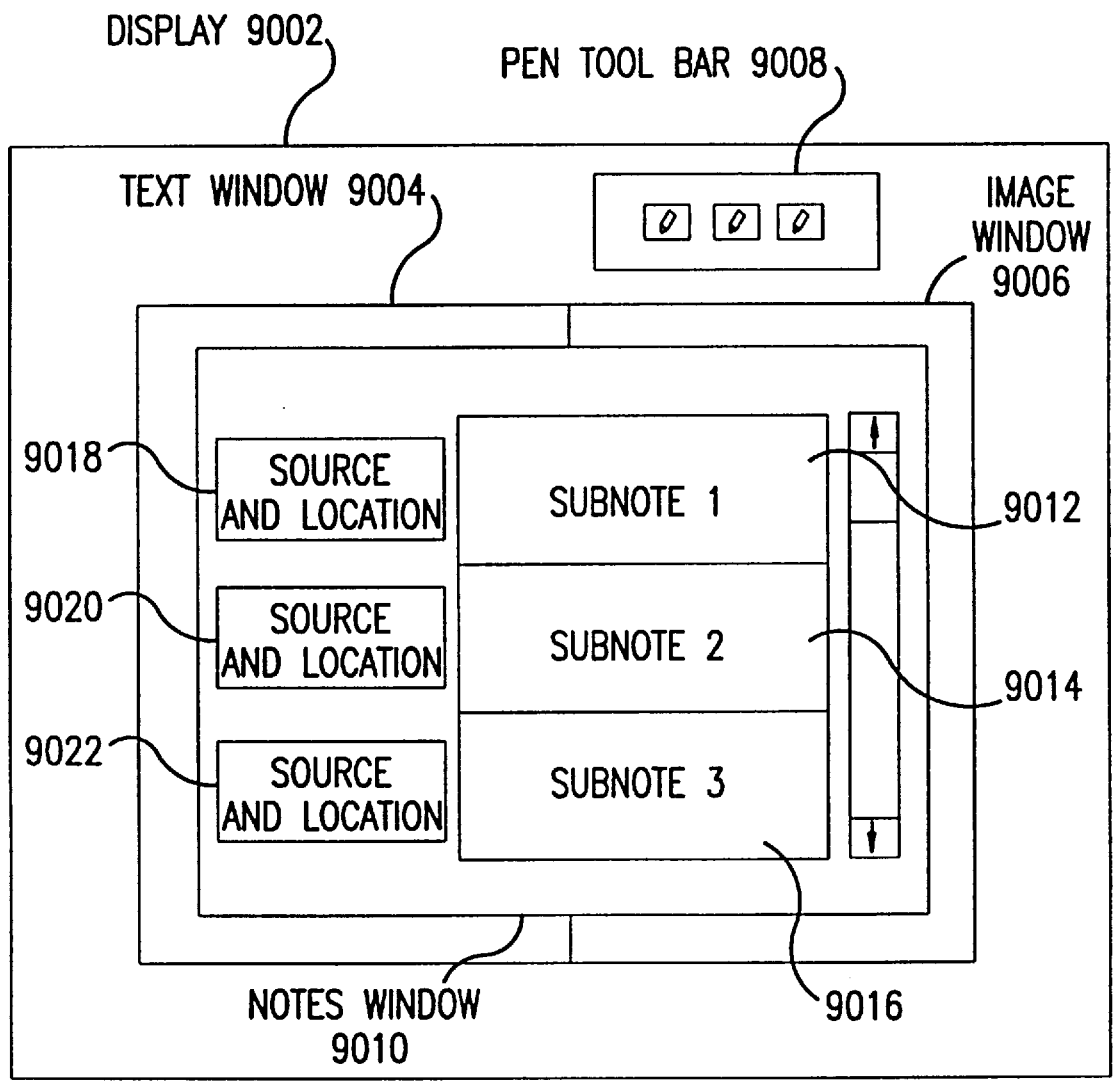
FIG. 90 illustrates an example display showing a text window, an image window, and a notes window.

The subnotes for a note are displayed in a notes window 9010 of a display 9002 as shown in FIG. 90. This notes window 9010 is similar to that shown in FIG. 89. Associated with each subnote 9012, 9014, 9016 being displayed is a source and location field 9018, 9020, 9022 displaying information that identifies the items and locations in the items respectively associated with the subnotes 9012, 9014, 9016.

The notes window 9010 is on top of a text window 9004 and an image window 9006 (alternatively, multiple text windows and/or multiple image windows could be displayed). The text window 9004 displays therein a text document, such as patent or non-patent related text. The image window 9006 displays an image, which may be patent or non-patent related.

A user creates a new subnote in the note displayed in the notes window 9010 by using a pen (from a pen tool bar 9008) to select a portion of text from the text window 9004, or a portion of an image displayed in the image window 9006. Upon selecting such text or image, the invention creates a new subnote in the notes window 9010, this new subnote being associated with the selected item. The user can then enter information pertaining to the selected text/image in the new subnote. (If the notes window 9010 was not open at the time that the user selected the text/image, then a new note would have been created.)

As indicated above, subnotes can also be associated with other types of items, such as audio and/or video clips. In this case, information identifying such audio and/or video clips is displayed in a window (for example, a window containing icons each corresponding to an audio clip or a video clip is displayed in a window). A user creates a new note or subnote by using a pen (from the pen tool bar 9008) to select one of these icons.

In this embodiment, information for notes and subnotes are stored in a note database, such as the note database 8802 shown in FIG. 88 and described above. In this case, the patent column 8814 stores information identifying the item associated with the respective subnote.

COPY CLAIMS

Figure 79:
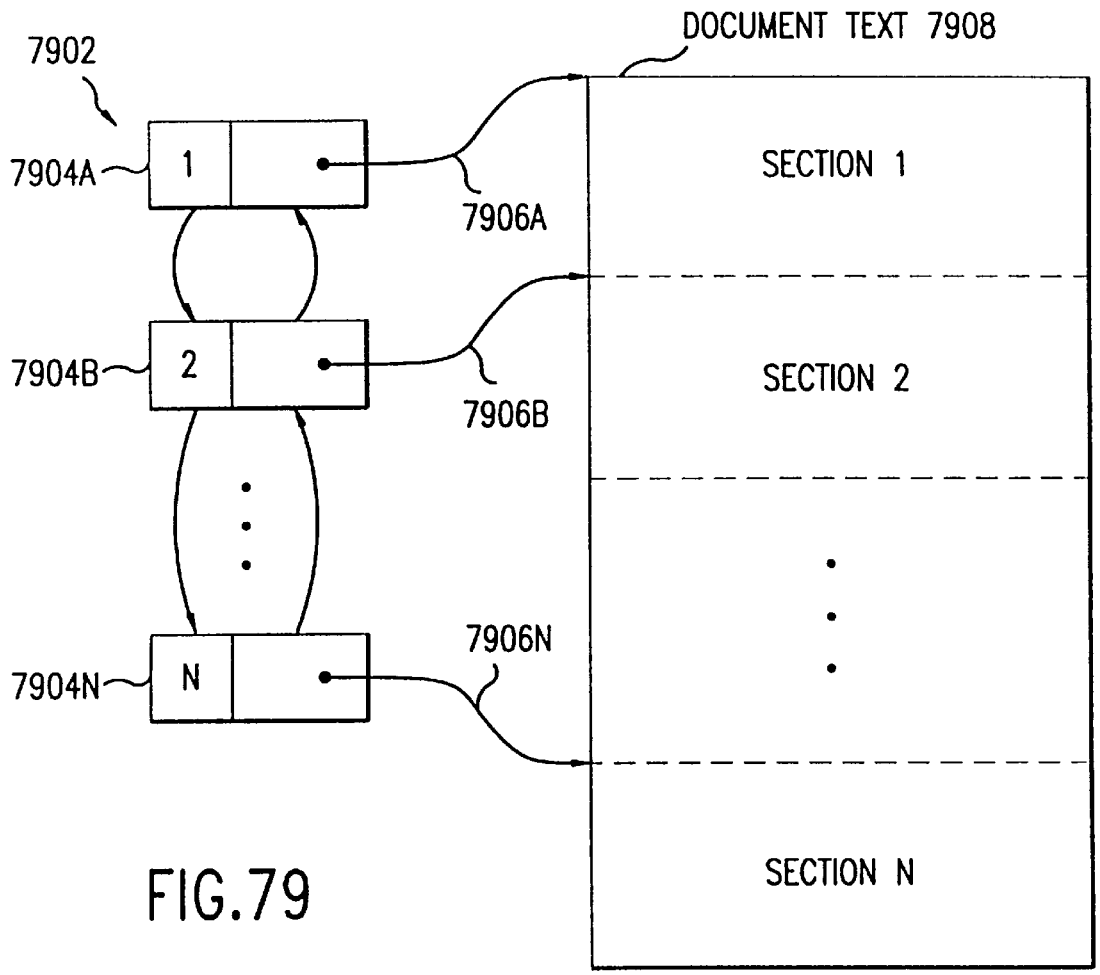
FIGS. 79 and 80 are used to describe a "Copy Claims" option preferably provided by the user interface of the present invention.

As described above, during pagination the PTO text file is analyzed to identify Section headings (see FIG. 10 and the section above entitled "Initial Automatic Pagination"). During such processing, a linked list 7902 (shown in FIG. 79) is generated. The actual implementation of the linked list 7902 is implementation dependent. For example, the linked list 7902 may be implemented as a doubly linked list (this is the case shown in FIG. 79).

The linked list 7902 is synchronized with the corresponding text file 7908, and is used to quickly navigate through the text file 7908. The linked list 7902 includes a record 7904A–7904N for each section in the text file 7908 (in the example of FIG. 79, the text file has N sections). Each of these records 7904A–7904N includes a pointer 7906A–7906N that points to the top of the corresponding section in the text file 7908. For example, record 7904A corresponds to Section 1 in the text-file 7908. This record 7904A contains a pointer 7906A that points to the top of Section 1 in the text file 7908. The records 7904A–7904N may also include other information, such as the section names (represented in FIG. 79 as "1", "2", . . . , "N").

The user interface of the present invention includes a user-selectable feature called "Copy Claims to Clipboard". This is an option that is available from the menu bar. When the user selects this option, the claims are automatically copied to the clipboard (or, alternatively, to a user specified file). It should be understood that this feature is also applicable in a non-patent context. For example, this feature can be used to automatically copy any user specified section from the text file to the clipboard (or to a user specified file). However, this feature is particularly useful in a patent context. For example, this feature greatly simplifies the generation of claim charts that are often included as part of validity and infringement opinions.

Figure 80:
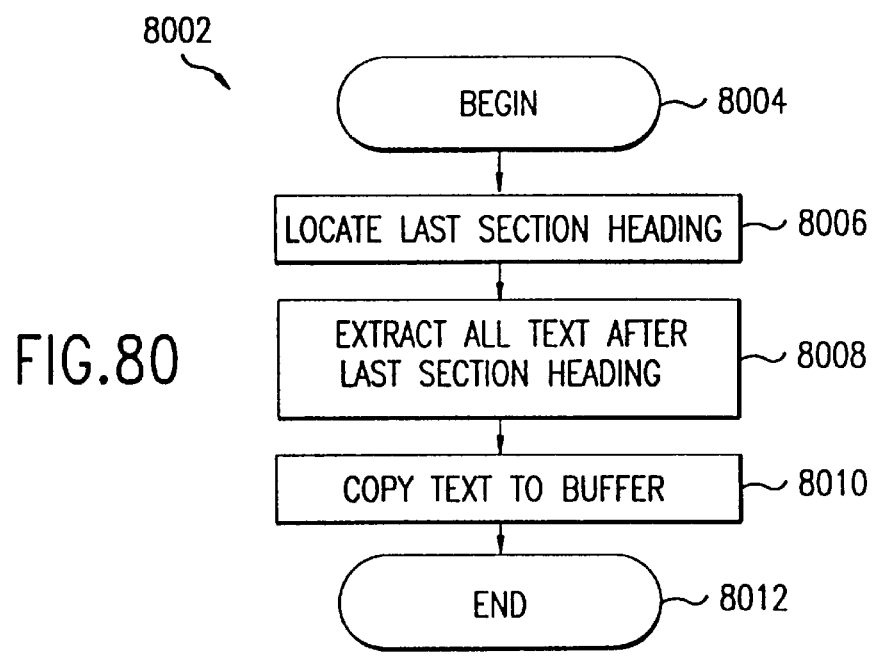

The operation of the present invention according to this feature is depicted in a flowchart 8002 in FIG. 80. Flowchart 8002 begins with step 8004, where control immediately passes to step 8006.

In step 8006, the last section heading in the text file is automatically located (as will be appreciated, the last section in a patent is the claims section). This is preferably done by using the linked list 7902. In particular, the last section heading in the text file 7908 is located by following the pointer 7906N in the last record 7904N of the linked list 7902.

In step 8008, all text in the text file that follows the last section heading is automatically extracted from the text file.

In step 8010, this extracted text is copied to the clipboard (or to a user specified file). Operation of flowchart 8002 is complete after performance of step 8010, as indicated by step 8012. It should be understood that these operations are performed automatically, without any input or direction from the user.

ZOOM IMAGE

The user interface of the present invention includes a "Zoom Image" feature that may be selected by an operator. The operator can use this feature to magnify a selected portion of the image currently being displayed. As discussed above with reference to FIGS. 75, 76A, and 76B, the uncompressed PTO image file is compressed to a 1D (one dimensional) image file. This is done to reduce storage requirements. According to the present invention, zooming operations involve a transformation from the 1D image file directly to the image that is ultimately displayed on the monitor. This is done to increase the overall speed of the present invention.

Figure 81:
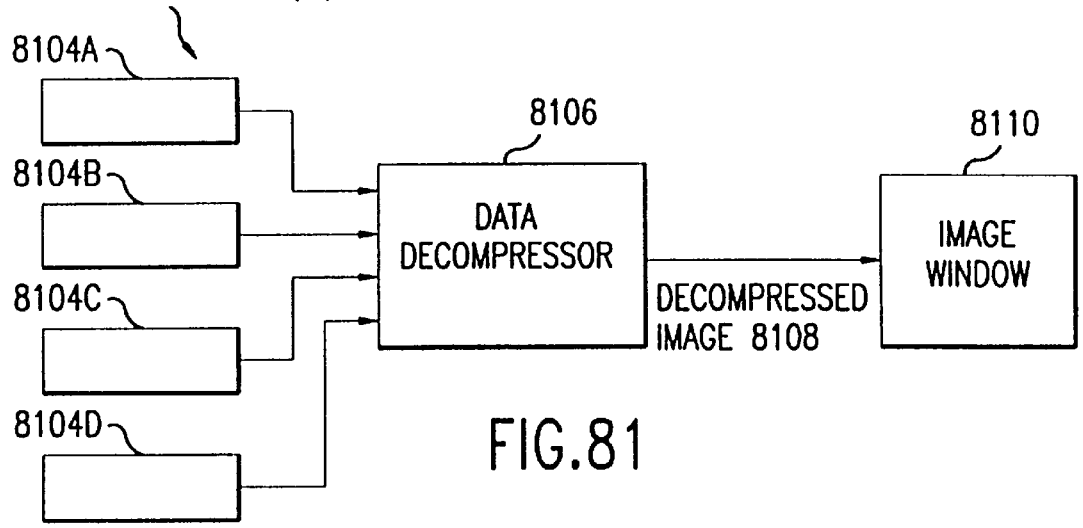
FIGS. 81 and 82 are used to describe a "Zoom Image" option preferably provided by the user interface of the present invention.

The manner in which the zoom image operation is performed is generally depicted in FIG. 81, which shows a 1D compressed image 8102. For illustrative purposes, this 1D compressed image 8102 is shown as having four lines 8104A–8104D. The compressed image 8102 is supplied to a data decompressor 8106, which is preferably implemented as a processor operating according to control logic (software). Alternatively, the data decompressor 8106 is implemented as a hardware state machine. The data decompressor 8106 decompresses the compressed image 8102 to the degree indicated by the operator's zoom request. For example, the operator may have requested a 75 DPI (dot per inch) or a 150 DPI zoom. Operation of the data decompressor 8106 results in a decompressed image 8108, that is displayed in the image window 8110.

Figure 82:
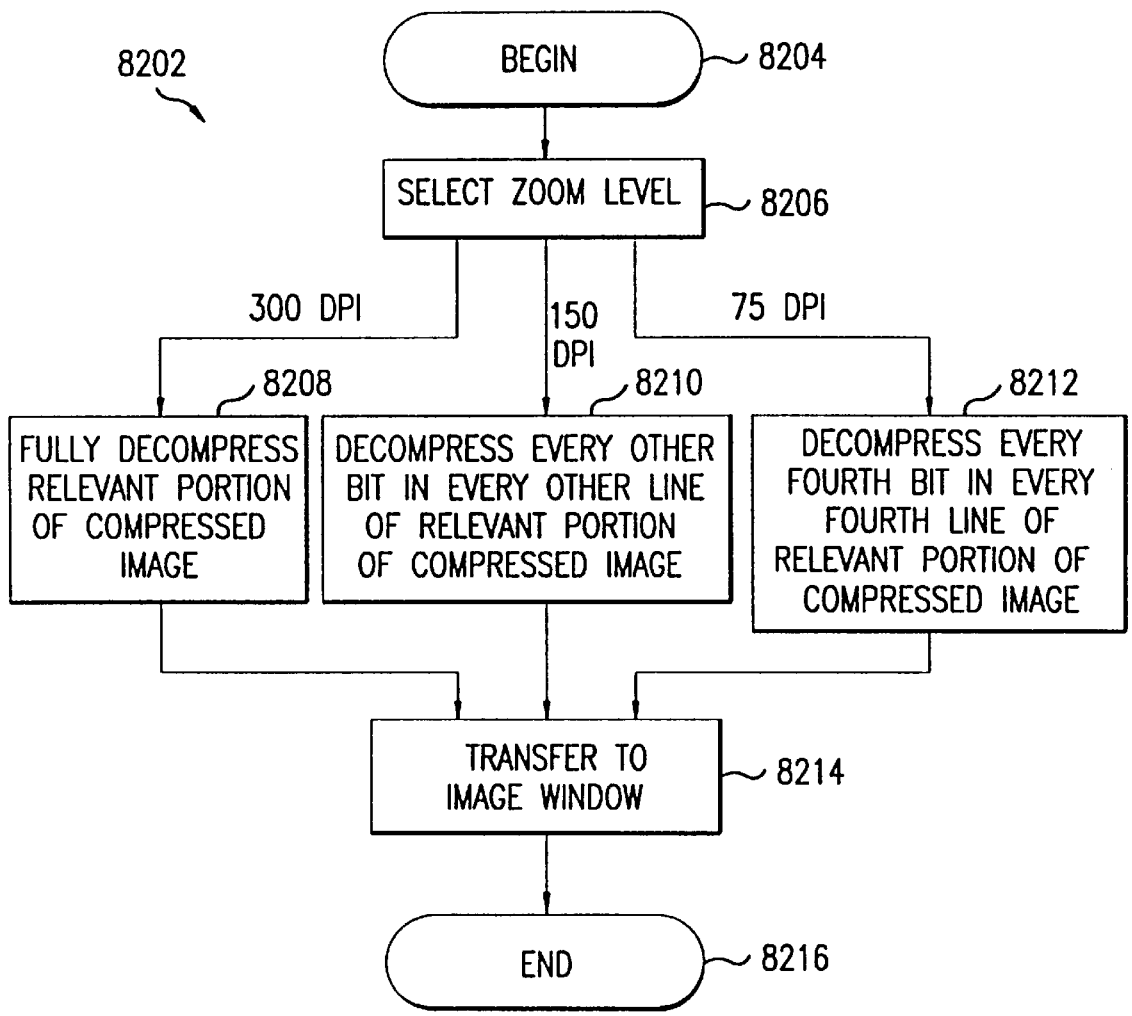

The operation of the data decompressor 8106 shall now be further described with reference to a flowchart 8202 in FIG. 82. Flowchart 8202 begins with step 8204, where control immediately passes to step 8206.

In step 8206, the operator selects the zoom image option. The operator does so in order to zoom a portion of an image currently being displayed. Preferably, the portion of the image that is to be zoomed is indicated by the current position of the cursor or mouse (i.e., the portion of the image proximate to the current position of the cursor or mouse is the area that is to be zoomed), although other selection mechanisms could alternatively be employed.

Also in step 8206, the operator indicates the desired zoom level. Preferably, there are three zoom levels: 300 DPI (dots per inch), 150 DPI, and 75 DPI. However, the present invention can alternatively support additional zoom levels. The operation of the present invention according to such additional zoom levels will be apparent to persons skilled in the relevant art based on the discussion contained herein.

A zoom level denotes both magnification level and resolution (i.e., the amount of data used to represent the final, zoomed image). According to the present invention, the 300 DPI zoom level is the greatest magnification level, and is of the highest resolution. The 150 DPI zoom level is one half the magnification of the 300 DPI level, and is one half the resolution (that is, the 150 DPI level uses one forth the data to represent the final image as the 300 DPI level). The 75 DPI zoom level is one fourth the magnification of the 300 DPI level, and is one fourth the resolution (that is, the 75 DPI level uses one sixteenth the data to represent the final image as the 300 DPI level).

If the operator selected the 300 DPI zoom level in step 8206, then step 8208 is performed. In step 8208, the data decompressor 8106 fully decompresses that portion of the 1D compressed image corresponding to the portion of the image currently being displayed that the operator wishes to zoom (this portion of the image currently being displayed was selected in step 8206). The phrase "fully decompresses" means that the decompressor 8106 decompresses every bit in every line of this portion of the 1D compressed image. Procedures for performing this decompression operation will be apparent to persons skilled in the relevant art. In step 8214, the data decompressor 8106 transfers this decompressed data to the image window 8110 for display.

If, instead, the operator selected the 150 DPI zoom level in step 8206, then step 8210 is performed. In step 8210, the data decompressor 8106 partially decompresses that portion of the 1D compressed image corresponding to the portion of the image currently being displayed that the operator wishes to zoom. Specifically, the decompressor 8106 decompresses every other bit in every other line of this portion of the 1D compressed image. The decompressor 8106 is able to ignore (i.e., not decompress) all other bits in all other lines since, as discussed above, the 150 DPI level uses one fourth the data to represent the final image as the 300 DPI level. This results in a significant increase in overall system processing speed (since it is necessary to only decompress a portion of the ID compressed image). In step 8214, the data decompressor 8106 transfers this decompressed data to the image window 8110 for display.

If, instead, the operator selected the 75 DPI zoom level in step 8206, then step 8212 is performed. In step 8212, the data decompressor 8106 partially decompresses that portion of the 1D compressed image corresponding to the portion of the image currently being displayed that the operator wishes to zoom. Specifically, the decompressor 8106 decompresses every fourth bit in every fourth line of this portion of the 1D compressed image. The decompressor 8106 is able to ignore (i.e., not decompress) all other bits in all other lines since, as discussed above, the 75 DPI level uses one sixteenth the data to represent the final image as the 300 DPI level. Again, this results in a significant increase in overall system processing speed. In step 8214, the data decompressor 8106 transfers this decompressed data to the image window 8110 for display. The operation of flowchart 8202 is complete after step 8214 is performed, as indicated by step 8216.

COPY IMAGE

Figure 83:
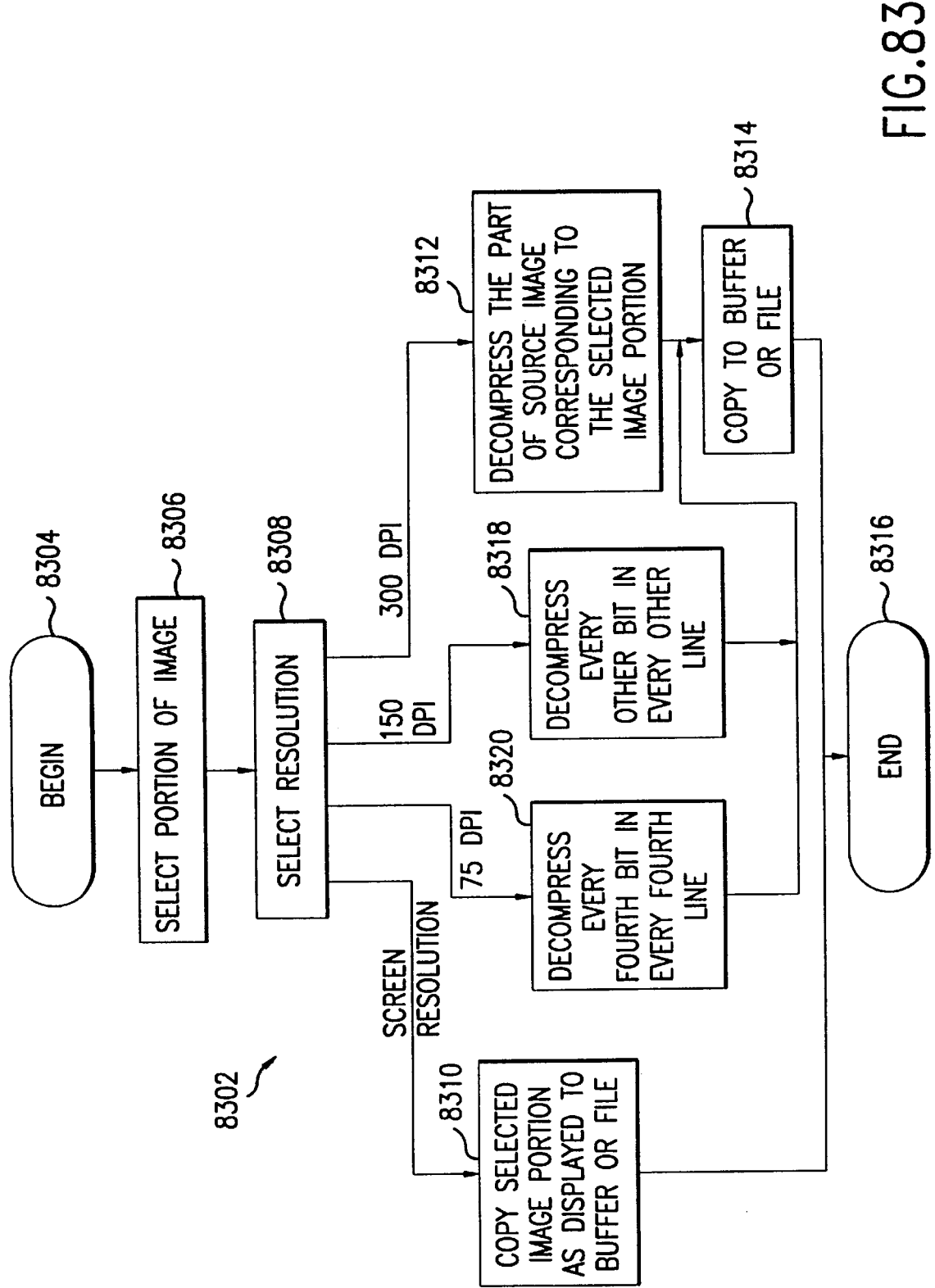
FIG. 83 is used to describe a "Copy Image" option preferably provided by the user interface of the present invention.

The user interface of the present invention includes a "Copy Image" feature where, if selected by the operator (preferably via a menu option), the image currently being displayed is copied to either the clipboard or a user specified file. This option shall now be described with reference to a flowchart 8302 in FIG. 83. Flowchart 8302 begins with step 8304, where control immediately passes to step 8306.

In step 8306, the operator selects the portion of the current image (i.e., the image currently being displayed) that he/she wishes to copy. The operator is permitted to do this in any well known fashion, for example, by using the mouse.

In step 8308, the operator selects the "Copy Image" option, and selects the desired resolution. Currently, there are four resolution levels (although the present invention can alternatively support additional resolution levels): screen resolution, 300 DPI, 150 DPI, and 75 DPI. Also in step 8308, the operator indicates whether he/she wishes to copy to the clipboard or to a file (which must be specified by the operator).

If the operator selected "screen resolution" in step 8308, then step 8310 is performed. In step 8310, the current image as it is currently being displayed is copied to either the clipboard or the user specified file. Preferably, this is accomplished by copying the contents of the image window (as represented in display memory, for example) to the clipboard or the user specified file.

If, instead, the operator selected "300 DPI resolution" in step 8308, then step 8312 is performed. In step 8312, the portion of the 1D compressed image corresponding to the portion of the current image that the operator wants to copy (as selected in step 8306) is fully decompressed. As discussed above, the phrase "fully decompressed" means that every bit in every line of this portion of the 1D compressed image is decompressed. In step 8314, this decompressed data is copied to the clipboard or the user specified file.

If, instead, the operator selected "150 DPI resolution" in step 8308, then step 8318 is performed. In step 8318, the portion of the 1D compressed image corresponding to the portion of the current image that the operator wants to copy (as selected in step 8306) is partially decompressed. Specifically, every other bit in every other line of this portion of the 1D compressed image is decompressed. Such partial decompression is possible since, as discussed above, the 150 DPI level uses one half the data to represent the final image as the 300 DPI level. This results in a significant increase in overall system processing speed (since it is necessary to only decompress a portion of the 1D compressed image). In step 8314, this decompressed data is copied to the clipboard or the user specified file.

If, instead, the operator selected "75 DPI resolution" in step 8308, then step 8320 is performed. In step 8320, the portion of the 1D compressed image corresponding to the portion of the current image that the operator wants to copy (as selected in step 8306) is partially decompressed. Specifically, every fourth bit in every fourth line of this portion of the 1D compressed image is decompressed. Such partial decompression is possible since, as discussed above, the 75 DPI level uses one fourth the data to represent the final image as the 300 DPI level. Again, this results in a significant increase in overall system processing speed. In step 8314, this decompressed data is copied to the clipboard or the user specified file. Processing of flowchart 8302 is complete after step 8310 or 8314 is performed, as indicated by step 8316.

LOCK WINDOWS

Figure 84:
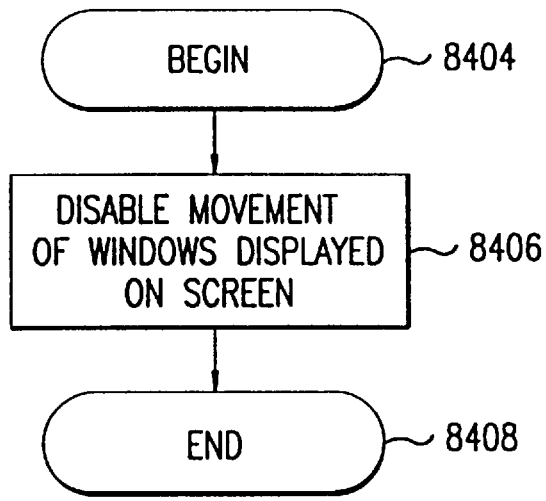
FIG. 84 is used to describe a "Lock Windows" option preferably provided by the user interface of the present invention.

The user interface of the present invention includes a "lock windows" option that may be selected by an operator (preferably via a menu option). The operation of the present invention when the "lock windows" option is selected is represented by flowchart 8402 in FIG. 84. When the "lock windows" option is selected, the position of all windows currently being displayed is locked (step 8406). In other words, all movement of the windows currently being displayed is disabled, so that it is not possible for the operator to move the windows.

This option is useful to prevent operators from accidentally moving the windows. Such inadvantent movement of windows is an inconvenience since it often results in the scroll bars of such windows being pushed out of the display screen, thereby making it difficult for operators to navigate through the windows.

CONCLUSION

As described herein, the present invention is implemented to process and display patent text and image files. However, the present invention may be utilized for any application where there is text data and image data that must be analyzed or manipulated in a synchronized and paginated format fashion. One such application is the processing of magazine or book electronic data. This data is commonly stored as text data similar to how patent text data is stored as described in the specification. Magazine and similar data would be far more useful if it were paginated with images of the actual magazine pages. The text and image data could be paginated to produce an Equivalent File that would contain page number, columns numbers within each page, font style information, and position of the first character in each page, column and line increasing ease of navigation and citation.

Users may perform analysis on publications, for example, in two side-by-side windows, users may perform text searches on the text and then study the diagrams that go with the text. A tremendous amount of legacy data exists in magazine and book form that has not been stored in electronic data form. This data could be used in a similar fashion by simply replacing the pagination process discussed above with a pagination process that uses no existing text data, and instead uses an optical character reader only to recover the text information from the images. If there are no image files, then they can easily be produced by scanning the original printed materials. These images could be stored in color format if color is important in the application.

While the present invention has been described in conjunction with a few specific embodiments identified in FIGS. 1 through 86, it will be apparent to those skilled in the art that many alternatives, modifications and variations in light of the foregoing description are possible. Accordingly, the present invention is intended to embrace all such alternatives, modifications and variations as may fall within the spirit and scope of the invention as disclosed. Moreover, due to the limitations of a written black and white specification and drawings, the reader is referred to the video tape entitled "PatentWorks™", the PatentWorks™ Manual, and the computer program under the same name, submitted with the filing of the parent application on which this patent is based. Since many of the features of the present invention involve dynamic events and the use of color, the viewing of the video tape, and use of the program, submitted to the United States Patent and Trademark Office is advised to thoroughly understand the nature of the present invention as disclosed above.

What is claimed is:

1. A computer based note system, comprising:
    a plurality of subnotes linked to portions of documents;
    a note database comprising an entry for each of said subnotes, said entry comprising a document identification field, a begin location field, an end location field, and a subnote content field, said begin location field and said end location field storing location information identifying a portion of a document that is linked to said each of said subnotes, said document identification field storing information that identifies said document, and said subnote content field storing informational content of said each of said subnotes;
    command receiving means for receiving a user command to display said each of said subnotes; and
    subnote displaying means, responsive to said command receiving means, for displaying said each of said subnotes, comprising:
        means for displaying in a subnote window said informational content from said subnote content field of said entry associated with said each of said subnotes;
        means for displaying, by reference to said document identification field of said entry associated with said each of said subnotes, information identifying said document; and
        means for displaying, by reference to said begin location field and said end location field of said entry associated with said each of said subnotes, information identifying a location of said portion in said document.

2. The system of claim 1, wherein said begin location field stores begin location information that identifies a location in said document where said portion begins, and said end location field stores end location information that identifies a location in said document where said portion ends.

3. The system of claim 2, wherein said document is a patent, and said begin location information and said end location information comprise column and line number information.

4. The system of claim 1, further comprising:
    linking means for creating an additional link between said each of said subnotes and a second portion in a second document; and
    updating means, responsive to said linking means, for updating said entry associated with said each of said subnotes to reflect said additional link.

5. The system of claim 4, wherein said updating means comprises:
    means for updating said document identification field of said entry associated with said each of said subnotes to also include information identifying said second document; and
    means for updating said begin location field and said end location field of said entry associated with said each of said subnotes to also include information identifying a location of said second portion in said second document.

6. The system of claim 4, wherein said subnote displaying means comprises:
    means, responsive to a command to display said each of said subnotes, for displaying in said subnote window said informational content from said subnote content field of said entry associated with said each of said subnotes;
    means for displaying, by reference to said document identification field of said entry associated with said each of said subnotes, information identifying said first document and said second document; and
    means for displaying, by reference to said begin location field and said end location field of said entry associated with said each of said subnotes, information identifying a location of at least said first document portion in said first document.

7. The system of claim 1, further comprising:

user preference means for enabling a user to indicate whether a document note window is to be opened when a subnote is created.

8. The system of claim 7, further comprising:

means for displaying a second document in a text window;

means for enabling a user to select a portion of said second document displayed in said text window;

means for creating a new subnote linked to said selected portion of said second document; and means for opening a document note window and displaying said new subnote in said opened document note window if said user previously indicated that a document note window is to be opened when a subnote is created.

9. The system of claim 1, wherein each subnote has a title and an associated color.

10. The system of claim 9, further comprising:

user preference means for enabling a user to indicate a preference for sorting subnotes.

11. The system of claim 10, wherein said user preference means comprises:

means for enabling said user to indicate that subnotes are to be sorted by any combination of title, color, and location.

12. The system of claim 11, further comprising:

means for sorting subnotes according to their titles if said user previously indicated that subnotes were to be sorted by title;

means for sorting subnotes according to their colors if said user previously indicated that subnotes were to be sorted by color; and means for sorting subnotes according to their respective locations in said document if said user previously indicated that subnotes were to be sorted by location.

13. The system of claim 12, further comprising:

means for displaying a list of subnotes sorted according to said user sorting preference;

means for enabling a user to select one of said subnotes in said list; and means for displaying said selected subnote in a document note window.

14. The system of claim 1, further comprising:

means for displaying a second document in a text window;

selecting means for enabling a user to select a portion of said second document displayed in said text window;

means, responsive to said selecting means, for automatically creating a new subnote linked to said selected portion;

means for enabling said user to copy said selected portion to a temporary storage location; and means for enabling said user to paste said selected portion from said temporary storage location to said new subnote.

15. A method of manipulating notes having subnotes linked to portions of documents, comprising the steps of:

(1) maintaining a note database comprising an entry for each of said subnotes, said entry comprising a document identification field, a begin location field, an end location field, and a subnote content field, said begin location field and said end location field storing location information identifying a portion of a document that is linked to said each of said subnotes, said document identification field storing information that identifies said document, and said subnote content field storing informational content of said each of said subnotes;

(2) receiving a user command to display said each of said subnotes; and (3) displaying said each of said subnotes, comprising the steps of:
  (a) displaying in a subnote window said informational content from said subnote content field of said entry associated with said each of said subnotes;
  (b) displaying, by reference to said document identification field of said entry associated with said each of said subnotes, information identifying said document; and
  (c) displaying, by reference to said begin location field and said end location field of said entry associated with said each of said subnotes, information identifying a location of said portion in said document.

16. The method of claim 15, wherein said begin location field stores begin location information that identifies a location in said document where said portion begins, and said end location field stores end location information that identifies a location in said document where said portion ends.

17. The method of claim 16, wherein said document is a patent, and said begin location information and said end location information comprise column and line number information.

18. The method of claim 15, further comprising the steps of:

(4) creating an additional link between said each of said subnotes and a second portion in a second document; and (5) updating said entry associated with said each of said subnotes to reflect said additional link.

19. The method of claim 18, wherein step (5) comprises the steps of:

updating said document identification field of said entry associated with said each of said subnotes to also include information identifying said second document; and updating said begin location field and said end location field of said entry associated with said each of said subnotes to also include information identifying a location of said second portion in said second document.

20. The method of claim 18, wherein step (3) comprises the steps of:

displaying in said subnote window said informational content from said subnote content field of said entry associated with said each of said subnotes;

displaying, by reference to said document identification field of said entry associated with said each of said subnotes, information identifying said first document and said second document; and displaying, by reference to said begin location field and said end location field of said entry associated with said each of said subnotes, information identifying a location of at least said first document portion in said first document.

21. The method of claim 15, further comprising the step of:

enabling a user to indicate whether a document note window is to be opened when a subnote is created.

22. The method of claim 21, further comprising the steps of:

displaying a second document in a text window;

enabling a user to select a portion of said second document displayed in said text window;

creating a new subnote linked to said selected portion of said second document; and opening a document note window and displaying said new subnote in said opened document note window if said user previously indicated that a document note window is to be opened when a subnote is created.

23. The method of claim 15, wherein each subnote has a title and an associated color.

24. The method of claim 23, further comprising the step of:

(4) enabling a user to indicate a preference for sorting subnotes.

25. The method of claim 24, wherein step (4) comprises the step of:

enabling said user to indicate that subnotes are to be sorted by any combination of title, color, and location.

26. The method of claim 25, further comprising the steps of:

sorting subnotes according to their titles if said user previously indicated that subnotes were to be sorted by title;

sorting subnotes according to their colors if said user previously indicated that subnotes were to be sorted by color; and sorting subnotes according to their respective locations in said document if said user previously indicated that subnotes were to be sorted by location.

27. The method of claim 26, further comprising the steps of:

displaying a list of subnotes sorted according to said user sorting preference;

enabling a user to select one of said subnotes in said list; and displaying said selected subnote in a document note window.

28. The method of claim 15, further comprising the steps of:

displaying a second document in a text window;

enabling a user to select a portion of said second document displayed in said text window;

automatically creating a new subnote linked to said selected portion;

enabling said user to copy said selected portion to a temporary storage location; and enabling said user to paste said selected portion from said temporary storage location to said new subnote.

29. A computer program product comprising a computer useable medium having computer program logic stored therein, said computer program logic enabling a computer to maintain a plurality of subnotes linked to portions of documents, wherein said computer program logic comprises:

means for enabling the computer to maintain a note database comprising an entry for each of said subnotes, said entry comprising a document identification field, a begin location field, an end location field, and a subnote content field, said begin location field and said end location field storing location information identifying a portion of a document that is linked to said each of said subnotes, said document identification field storing information that identifies said document, and said subnote content field storing informational content of said each of said subnotes;

command receiving means for enabling the computer to receive a user command to display said each of said subnotes; and subnote displaying means, responsive to said command receiving means, for enabling the computer to display said each of said subnotes, comprising:

means for enabling the computer to display in a subnote window said informational content from said subnote content field of said entry associated with said each of said subnotes;

means for enabling the computer to display, by reference to said document identification field of said entry associated with said each of said subnotes, information identifying said document; and means for enabling the computer to display, by reference to said begin location field and said end location field of said entry associated with said each of said subnotes, information identifying a location of said portion in said document.

30. The computer program product of claim 29, wherein said begin location field stores begin location information that identifies a location in said document where said portion begins, and said end location field stores end location information that identifies a location in said document where said portion ends.

31. The computer program product of claim 30, wherein said document is a patent, and said begin location information and said end location information comprise column and line number information.

32. The computer program product of claim 29, wherein said computer program logic further comprises:

linking means for enabling the computer to create an additional link between said each of said subnotes and a second portion in a second document; and updating means, responsive to said linking means, for enabling the computer to update said entry associated with said each of said subnotes to reflect said additional link.

33. The computer program product of claim 32, wherein said updating means comprises:

means for enabling the computer to update said document identification field of said entry associated with said each of said subnotes to also include information identify said second document; and means for enabling the computer to update said begin location field and said end location field of said entry associated with said each of said subnotes to also include information identify a location of said second portion in said second document.

34. The computer program product of claim 32, wherein said subnote displaying means comprises:

means, responsive to a command to display said each of said subnotes, for enabling the computer to display in said subnote window said informational content from said subnote content field of said entry associated with said each of said subnotes;

means for enabling the computer to display, by reference to said document identification field of said entry associated with said each of said subnotes, information identifying said first document and said second document; and means for enabling the computer to display, by reference to said begin location field and said end location field of said entry associated with said each of said subnotes, information identifying a location of at least said first document portion in said first document.

35. The computer program product of claim 29, wherein said computer program logic further comprises:

user preference means for enabling the computer to enable a user to indicate whether a document note window is to be opened when a subnote is created.

36. The computer program product of claim 35, wherein said computer program logic further comprises:

means for enabling the computer to display a second document in a text window;

means for enabling the computer to enable a user to select a portion of said second document displayed in said text window;

means for enabling the computer to create a new subnote linked to said selected portion of said second document; and means for enabling the computer to open a document note window and display said new subnote in said opened document note window if said user previously indicated that a document note window is to be opened when a subnote is created.

37. The computer program product of claim 29, wherein each subnote has a title and an associated color.

38. The computer program product of claim 37, wherein said computer program logic further comprises:

user preference means for enabling the computer to enable a user to indicate a preference for sorting subnotes.

39. The computer program product of claim 38, wherein said user preference means comprises:

means for enabling the computer to enable said user to indicate that subnotes are to be sorted by any combination of title, color, and location.

40. The computer program product of claim 39, wherein said computer program logic further comprises:

means for enabling the computer to sort subnotes according to their titles if said user previously indicated that subnotes were to be sorted by title;

means for enabling the computer to sort subnotes according to their colors if said user previously indicated that subnotes were to be sorted by color; and means for enabling the computer to sort subnotes according to their respective locations in said document if said user previously indicated that subnotes were to be sorted by location.

41. The computer program product of claim 40, wherein said computer program logic further comprises:

means for enabling the computer to display a list of subnotes sorted according to said user sorting preference;

means for enabling the computer to enable a user to select one of said subnotes in said list; and means for enabling the computer to display said selected subnote in a document note window.

42. The computer program product of claim 29, wherein said computer program logic further comprises:

means for enabling the computer to display a second document in a text window;

select means for enabling the computer to enable a user to select a portion of said second document displayed in said text window;

means, responsive to said selecting means, for enabling the computer to automatically create a new subnote linked to said selected portion;

means for enabling the computer to enable said user to copy said selected portion to a temporary storage location; and means for enabling the computer to enable said user to paste said selected portion from said temporary storage location to said new subnote.

\* \* \* \* \*

UNITED STATES PATENT AND TRADEMARK OFFICE
CERTIFICATE OF CORRECTION

PATENT NO. : 5,809,318

DATED : September 15, 1998

INVENTOR(S) : Rivette et al.

It is certified that error appears in the above-identified patent and that said Letters Patent is hereby corrected as shown below:

On the cover page, item 54, and also in Column 1, Lines 1-4, please delete "Method and Apparatus For Synchronizing, Displaying And Manipulating Text And Image Documents" and insert --System, Method, And Computer Program Product For Manipulating Notes And Subnotes Linked To Portions Of Documents-- in place thereof;

In Line 4 of the Abstract (item 57 of the cover page), please delete the word "heuristic";

In Line 8 of the Abstract (item 57 of the cover page), please replace the word "ore" with the word --more--;

UNITED STATES PATENT AND TRADEMARK OFFICE
CERTIFICATE OF CORRECTION

PATENT NO. : 5,809,318
DATED : September 15, 1998
INVENTOR(S) : Rivette et al.

It is certified that error appears in the above-identified patent and that said Letters Patent is hereby corrected as shown below:

In item 75 of the cover page, please delete "Adam Jackson, Belmont; Don Ahn, Daly City" and insert --Adam Jackson, Don Ahn, both of Sunnyvale-- in place thereof.

Signed and Sealed this

Ninth Day of March, 1999

Attest:

Q. TODD DICKINSON

*Attesting Officer*  *Acting Commissioner of Patents and Trademarks*